US012528882B2

(12) United States Patent
Missiakas et al.

(10) Patent No.: US 12,528,882 B2
(45) Date of Patent: Jan. 20, 2026

(54) METHODS AND COMPOSITIONS FOR TREATING STAPHYLOCOCCAL INFECTIONS

(71) Applicant: The University of Chicago, Chicago, IL (US)

(72) Inventors: Dominique M. Missiakas, Chicago, IL (US); Olaf Schneewind, Chicago, IL (US); Xinhai Chen, Naperville, IL (US)

(73) Assignee: The University of Chicago, Chicago, IL (US)

( * ) Notice: Subject to any disclaimer, the term of this patent is extended or adjusted under 35 U.S.C. 154(b) by 950 days.

(21) Appl. No.: 17/753,692

(22) PCT Filed: Sep. 11, 2020

(86) PCT No.: PCT/US2020/070530
§ 371 (c)(1),
(2) Date: Mar. 11, 2022

(87) PCT Pub. No.: WO2021/051136
PCT Pub. Date: Mar. 18, 2021

(65) Prior Publication Data
US 2023/0041644 A1  Feb. 9, 2023
US 2025/0382389 A2  Dec. 18, 2025

Related U.S. Application Data

(60) Provisional application No. 62/992,457, filed on Mar. 20, 2020, provisional application No. 62/900,170, filed on Sep. 13, 2019.

(51) Int. Cl.
C07K 16/46    (2006.01)
A61K 9/00     (2006.01)
A61P 31/04    (2006.01)

(52) U.S. Cl.
CPC .......... *C07K 16/464* (2013.01); *A61K 9/0019* (2013.01); *A61P 31/04* (2018.01)

(58) Field of Classification Search
CPC .................................................. C07K 16/464
See application file for complete search history.

(56) References Cited

U.S. PATENT DOCUMENTS

| | | |
|---|---|---|
| 4,027,010 A | 5/1977 | Kiselev et al. |
| 4,327,082 A | 4/1982 | Armitage |
| 4,690,915 A | 9/1987 | Rosenburg |
| 4,902,616 A | 2/1990 | Fournier et al. |
| 5,189,015 A | 2/1993 | Hook et al. |
| 5,199,942 A | 4/1993 | Gillis |
| 5,320,951 A | 6/1994 | Hook et al. |
| 5,648,240 A | 7/1997 | Hook et al. |
| 5,801,234 A | 9/1998 | Hodgson et al. |
| 5,840,846 A | 11/1998 | Hook et al. |
| 5,985,285 A | 11/1999 | Titball et al. |
| 6,008,341 A | 12/1999 | Foster et al. |
| 6,288,214 B1 | 9/2001 | Hook et al. |
| 6,294,177 B1 | 9/2001 | Fattom |
| 6,299,879 B1 | 10/2001 | Flock et al. |
| 6,627,730 B1 | 9/2003 | Burnie |
| 6,635,473 B1 | 10/2003 | Foster et al. |
| 6,638,510 B1 | 10/2003 | Brubaker et al. |
| 6,680,195 B1 | 1/2004 | Patti et al. |
| 6,692,739 B1 | 2/2004 | Patti et al. |
| 6,703,025 B1 | 3/2004 | Patti et al. |
| 6,737,248 B2 | 5/2004 | Kunsch et al. |
| 6,841,154 B2 | 1/2005 | Foster et al. |
| 6,964,770 B2 | 11/2005 | Brubaker et al. |
| 6,984,381 B2 | 1/2006 | O'Brien et al. |
| 7,045,131 B2 | 5/2006 | Patti et al. |

(Continued)

FOREIGN PATENT DOCUMENTS

| | | |
|---|---|---|
| EP | 1829892 | 9/2007 |
| WO | WO 98/57994 | 12/1998 |

(Continued)

OTHER PUBLICATIONS

"Policy Responses to the Growing Threat of Antibiotic Resistance: A Shot Against MRSA?" Extending the Cure (http://www.extendingthecure.org), Policy Brief 7, available online at http://www.extendingthecure.org/sites/default/files/PolicyBrief7_1.pdf, Mar. 2009.
Adlam et al., "Effect of immunization with highly purified alpha- and beta-toxins on staphylococcal mastitis in rabbits," Infect. Immun., 17(2):250-6, 1977.
Albus et al., "Virulence of *Staphylococcus aureus* mutants altered in type 5 capsule production," *Infect. Immun.*, 59: 1008-1014, 1991.
Allen et al., "HtaA is an iron-regulated hemin binding protein involved in the utilization of heme iron in *Corynebacterium diphtheriae*," J. Bacteriol., 191:2638-2648, 2009.
Andersen et al., "Recall of long-lived immunity to *Mycobacterium tuberculosis* infection in mice," J. Immunol., 154:3359-3372, 1995.

(Continued)

*Primary Examiner* — Prema M Mertz
(74) *Attorney, Agent, or Firm* — Norton Rose Fulbright US LLP

(57) ABSTRACT

The current disclosure provides novel compositions for treating bacterial infections. Accordingly, aspects of the disclosure relate to an engineered antibody comprising: LCDR1, LCDR2, and LCDR3 of the light chain variable region of the 3F6 antibody and HCDR1, HCDR2, and HCDR3 of the heavy chain variable region of the 3F6 antibody. Also provided are compositions comprising the antibodies and nucleic acids encoding either the heavy chain or light chain (or both) of the antibodies. Other aspects relate to host cells comprising the antibodies and/or nucleic acids of the disclosure. Further aspects relate to a method of preventing or treating staphylococcal infection comprising the step of administering the antibody of the disclosure to a subject in need thereof. Yet further aspects relate to a method of making the antibody comprising expressing the nucleic acid(s) of the disclosure in a cell and isolating the expressed protein.

19 Claims, 40 Drawing Sheets

Specification includes a Sequence Listing.

(56) References Cited

U.S. PATENT DOCUMENTS

| | | |
|---|---|---|
| 7,115,264 B2 | 10/2006 | Patti et al. |
| 7,195,763 B2 | 3/2007 | Hook et al. |
| 7,488,807 B2 | 2/2009 | Mach et al. |
| 8,945,588 B2 | 2/2015 | Schneewind et al. |
| 9,095,540 B2 | 8/2015 | Schneewind et al. |
| 9,567,379 B2 | 2/2017 | Schneewind et al. |
| 2002/0169288 A1 | 11/2002 | Hook et al. |
| 2003/0087864 A1 | 5/2003 | Talbot et al. |
| 2003/0113350 A1 | 6/2003 | Naso et al. |
| 2004/0006209 A1 | 1/2004 | Patti et al. |
| 2004/0101919 A1 | 5/2004 | Hook et al. |
| 2005/0026170 A1 | 2/2005 | Patti et al. |
| 2005/0106597 A1 | 5/2005 | Choi |
| 2005/0106648 A1 | 5/2005 | Foster et al. |
| 2005/0220788 A1 | 10/2005 | Nagy et al. |
| 2005/0232940 A1 | 10/2005 | Brubaker et al. |
| 2006/0002939 A1 | 1/2006 | Fischer et al. |
| 2006/0134141 A1 | 6/2006 | Fattom et al. |
| 2006/0177462 A1 | 8/2006 | Anderson et al. |
| 2006/0177464 A1 | 8/2006 | Schneewind et al. |
| 2006/0188515 A1 | 8/2006 | Anderson et al. |
| 2006/0205016 A1 | 9/2006 | Silverman |
| 2006/0222651 A1 | 10/2006 | Patti et al. |
| 2006/0228368 A1 | 10/2006 | Fattom et al. |
| 2006/0246083 A1 | 11/2006 | Dale |
| 2006/0263792 A1 | 11/2006 | Mohamed et al. |
| 2006/0275905 A1 | 12/2006 | Bae et al. |
| 2007/0166281 A1 | 7/2007 | Kosak |
| 2008/0118937 A1 | 5/2008 | Mach |
| 2008/0131457 A1 | 6/2008 | Fattom et al. |
| 2009/0053235 A1 | 2/2009 | Fattom et al. |
| 2009/0162902 A1 | 6/2009 | Mach et al. |
| 2009/0252729 A1 | 10/2009 | Farrington et al. |
| 2009/0317421 A1 | 12/2009 | Missiakas et al. |
| 2010/0047252 A1 | 2/2010 | Mach |
| 2010/0063256 A1 | 3/2010 | Spector |
| 2010/0183623 A1 | 7/2010 | Patti et al. |
| 2010/0233173 A1 | 9/2010 | Wu et al. |
| 2011/0002932 A1 | 1/2011 | Pier et al. |
| 2011/0027265 A1 | 2/2011 | Bubeck-Wardenburg et al. |
| 2011/0059085 A1 | 3/2011 | Kim |
| 2011/0117099 A1 | 5/2011 | Arrecubieta et al. |
| 2011/0177523 A1 | 7/2011 | Bommarito et al. |
| 2011/0206676 A1 | 8/2011 | Missiakas et al. |
| 2011/0262477 A1 | 10/2011 | Cheng et al. |
| 2012/0114686 A1 | 5/2012 | Schneewind et al. |
| 2012/0282247 A1 | 11/2012 | Schneewind et al. |
| 2013/0136746 A1 | 5/2013 | Schneewind et al. |
| 2013/0171183 A1 | 7/2013 | Schneewind |
| 2013/0189249 A1 | 7/2013 | Bubeck-Wardenburg et al. |
| 2013/0230550 A1 | 9/2013 | Schneewind et al. |
| 2013/0236419 A1 | 9/2013 | Schneewind et al. |
| 2014/0037650 A1 | 2/2014 | Kim et al. |
| 2014/0170134 A1 | 6/2014 | Schneewind et al. |
| 2014/0271649 A1 | 9/2014 | Schneewind et al. |
| 2014/0302084 A1 | 10/2014 | Schneewind et al. |
| 2015/0246024 A1 | 9/2015 | Richter et al. |
| 2015/0273040 A1 | 10/2015 | McAdow et al. |
| 2015/0368322 A1 | 12/2015 | McAdow et al. |
| 2016/0074497 A1 | 3/2016 | Falugi et al. |
| 2016/0137749 A2 | 5/2016 | Schneewind et al. |
| 2019/0112342 A1 | 4/2019 | Missiakas et al. |
| 2022/0323563 A1 | 10/2022 | Schneewind et al. |

FOREIGN PATENT DOCUMENTS

| | | |
|---|---|---|
| WO | WO 99/27109 | 6/1999 |
| WO | WO 00/02523 | 1/2000 |
| WO | WO 00/12131 | 3/2000 |
| WO | WO 00/12132 | 3/2000 |
| WO | WO 00/12678 | 3/2000 |
| WO | WO 00/12689 | 3/2000 |
| WO | WO 00/15238 | 3/2000 |
| WO | WO 00/64925 | 11/2000 |
| WO | WO 01/34809 | 5/2001 |
| WO | WO 01/60852 | 8/2001 |
| WO | WO 01/70267 | 9/2001 |
| WO | WO 01/70955 | 9/2001 |
| WO | WO 01/98499 | 12/2001 |
| WO | WO 02/059148 | 8/2002 |
| WO | WO 02/094868 | 11/2002 |
| WO | WO 02/102829 | 12/2002 |
| WO | WO 03/011899 | 2/2003 |
| WO | WO 03/041726 | 5/2003 |
| WO | WO 03/076470 | 9/2003 |
| WO | WO 2004/025416 | 3/2004 |
| WO | WO 2004/030699 | 4/2004 |
| WO | WO 2004/110367 | 12/2004 |
| WO | WO 2005/009378 | 2/2005 |
| WO | WO 2005/009379 | 2/2005 |
| WO | WO 2005/079315 | 9/2005 |
| WO | WO 2006/032472 | 3/2006 |
| WO | WO 2006/032475 | 3/2006 |
| WO | WO 2006/032500 | 3/2006 |
| WO | WO 2006/059247 | 6/2006 |
| WO | WO 2006/078213 | 7/2006 |
| WO | WO 2007/001361 | 1/2007 |
| WO | WO 2007/010413 | 1/2007 |
| WO | WO 2007/089470 | 8/2007 |
| WO | WO 2007/095057 | 8/2007 |
| WO | WO 2007/100580 | 9/2007 |
| WO | WO 2007/113222 | 10/2007 |
| WO | WO 2007/113223 | 10/2007 |
| WO | WO 2007/145689 | 12/2007 |
| WO | WO 2008/081014 | 7/2008 |
| WO | WO 2008/140487 | 11/2008 |
| WO | WO 2008/152447 | 12/2008 |
| WO | WO 2009/029132 | 3/2009 |
| WO | WO 2010/042481 | 4/2010 |
| WO | WO 2011/005341 | 1/2011 |
| WO | WO 2011/127032 | 10/2011 |
| WO | WO 2012/003474 | 1/2012 |
| WO | WO 2013/096948 | 6/2013 |
| WO | WO 2013/142349 | 9/2013 |
| WO | WO 2014/177461 | 11/2014 |
| WO | WO 2015/089073 | 6/2015 |
| WO | WO 2018/224951 | 12/2018 |

OTHER PUBLICATIONS

Anderson et al., "Recombinant V antigen protects mice against pneumonic and bubonic plague caused by FI-capsule-positive and -negative strains of Yersinia pestis," Infect. Immun., 64:4580-4585, 1996.

Anisimov et al, "Intraspecific diversity of Yersinia pestis," Clin. Microbial. Rev., 17(2):434-464, 2004.

Archer, "*Staphylococcus aureus*: A Well-Armed Pathogen ," Clin. Infect. Dis., 26:1179-1181, 1998.

Athanasopoulos et al., "The extracellular adherence protein (Eap) of *Staphylococcus aureus* inhibits wound healing by interfering with host defense and repair mechanisms," Blood., 107(7):2720-2727, 2006.

Atkins et al., "*S. aureus* IgG-binding proteins SpA and Sbi: host specificity and mechanisms of immune complex formation", *Mol. Immunol*, 45(6):1600-1611, 2008.

Baba et al., "Genome and virulence determinants of high virulence community-acquired MRSA", *Lancet*, 359(9320):1819-1827, 2002.

Baba et al., "Genome sequence of *Staphylococcus aureus* strain Newman and comparative analysis of staphylococcal genomes," J. Bacteriol., 190:300-310, 2008.

Bae et al., "*Staphylococcus aureus* virulence genes identified by bursa aurealis mutagenesis and nematode killing," *PNAS*, 101 (33): 12312-12317, 2004.

Becker et al., "Release of protein A from the cell wall of *Staphylococcus aureus*" Proc Natl Acad Sci USA 2014, 111:1574-1579.

Bello et al. "The Use of Polyacrylamide Gel in Soft-Tissue Augmentation: An Experimental Assessment" Plastic and Reconstructive Surgery 2007, 119: 1326-1336.

Bendig M. M. *Methods: A Companion to Methods in Enzymology*, 1995; 8: 83-93.

(56) References Cited

OTHER PUBLICATIONS

Berberian et al, "A VH clonal deficit in human immunodeficiency virus-positive individuals reflects a B-cell maturational arrest", *Blood*, 78(1):175-179, 1991.
Berberian et al., "Immunoglobulin VH3 gene products: natural ligands for HIV gp120", *Science*, 261(5128):1588-1591, 1993.
Bergman et al., "Analysis of the V antigen lcrGVH-yopBD operon of Yersinia pseudotuberculosis: evidence for a regulatory role of LcrH and LcrV," J. Bacteriol., 173: 1607-1616, 1991.
Bhakdi and Tranum-Jensen, "Alpha-toxin of *Staphylococcus aureus,*" *Microbiol. Rev.*, 55 (4): 733-751, 1991.
Bhakdi et al. "Functionally inactive *S. aureus* alpha-toxin containing a single amino acid subsitution: potential usefulness as a vaccine," Behring Inst. Mitt., (5):80-4, 1994. (English abstract).
Bjerketorp J, Jacobsson K, Frykberg I. (2004) The von Willebrand factor-binding protein (vWbp) of *Staphylococcus aureus* is a coagulase. *FEMS Microbiology Letters* 234: 309-314.
Boucher and Corey, "Epidemiology of methicillin-resistant *Staphylococcus aureus*", *Clin Infect Dis.*, 46(Suppl 5):S344-S349, 2008.
Brady et al., "Osteomyelitis and the role of biofilms in chronic infection," FEMS Immunol. Med. Microbiol., 52:13-22, 2008.
Brodin et al., "ESAT-6 proteins: protective antigens and virulence factors?" *Trends in Microbiology*, 12 (11): 500-508, 2004.
Brodin et al., "Functional analysis of early secreted antigenic target-6, the dominant T-cell antigen of *Mycobacterium tuberculosis*, reveals key residues involved in secretion, complex formation, virulence, and immunogenicity," J. of Biol. Chem., 280 (40): 33953-33959, 2005.
Brouillette et al., "DNA immunization against the clumping factor A (ClfA) of *Staphylococcus aureus,*" Vaccine, 20(17-18):2348-2357, 2002.
Brubaker, "Interleukin-IO and inhibition of innate immunity to Yersiniae: roles of Yops and LcrV (V antigen)," Infect. Immun., 71 :3673-3681, 2003.
Brubaker, "Mutation rate to nonpigmentation in Pasteurella pestis," J. Bacterial., 98:1404-1406, 1969.
Bubeck-Wardenburg et al., "Surface proteins and exotoxins are required for the pathogenesis of *Staphylococcus aureus* pneumonia." *Infection and Immunity* 2007, 75(2), p. 1040-1044.
Bubeck-Wardenburg et al., "Vaccine protection against *Staphylococcus aureus* pneumonia" *J Exp Med* 2008, 205:287-294.
Burman et al., "Interaction of human complement with Sbi, a staphylococcal immunoglobulin-binding protein: indications of a novel mechanism of complement evasion by *Staphylococcus aureus*", *J. Biol. Chem*, 283(25):17579-17593, 2008.
Burts et al., "EsxA and EsxB are secreted by an ESAT-6-like system that is required for the pathogenesis of *Staphylococcus aureus* infections" PNAS 2005, 102(4):1169-1174.
Burts et al., "EsaC: A new secretion substrate of the staphylococcal ESAT-6 secretion pathway," Abstracts of the General Meeting of the American Society for Microbiology, 107:102-103, 2007.
Burts, "EsaC substrate for the ESAT-6 secretion pathway and its role in persistent infections of *Staphylococcus aures,*" Mol. Microbiol., 69(3):736-746, 2008.
Campbell, A.M. (1984) *Laboratory Techniques in Biochemistry and Molecular Biology* vol. 13.
Campo et al., "Subcellular sites for bacterial protein export," *Mol. Microbiol.*, 53 (6): 1583-1599, 2004.
Cary et al., "The murine clan V(H) III related 7183, J606 and S107 and DNA4 families commonly encode for binding to a bacterial B cell superantigen", *Mol Immunol.*, 36(11-12):769-776, 1999.
Casset et al. (2003) "A Peptide mimetic of an anti-CD4 monoclonal antibody by rational design," Biochem. Biophys. Res. Commun. 307(1): 198-205.
Chen et al. (1999) "Selection and analysis of an optimized anti-VEGF antibody: crystal structure of an affinity-matured Fab in complex with antigen," J. Mol. Biol. 293(4): 865-881.
Chen et al., "*Staphylococcus aureus* Decolonization of Mice With Monoclonal Antibody Neutralizing Protein A" *The Journal of Infectious Diseases* 2019, 219, 884-888.

Cheng et al., "Contribution of Coagulases towards *Staphylococcus aureus* Disease and Protective Immunity" PLoS Pathog 2010, 6(8):e1001036, 18 pages.
Cheng et al., "Genetic requirements for *Staphylococcus aureus* abscess formation and persistence in host tissues" Faseb J. 2009, 23(10): 3393-3404.
Cheung et al., "Diminished virulence of a sar-/agr- mutant of *Staphylococcus aureus* in the rabbit model of endocarditis," J. Clin. Invest., 94 (5): 1815-1822, 1994.
Chhatwal, "Anchorless adhesins and invasins of Gram-positive bacteria: a new class of virulence factors," *Trends Microbiol.*, 10 (5): 205-208, 2002.
Clarke et al., "Identification of in vivo-expressed antigens of *Stapylococcus aureus* and their use in vaccinations for protection against nasal carriage," Journal of Infectious Diseases, 193(8):1098-1108, 2006.
Claro et al., "*Staphylococcus aureus* Protein A Binds to Osteoblasts and Triggers Signals That Weaken Bone in Osteomyelitis", *PLoS One*, 6(4):e18748, 2011.
Colman P. M. *Research in Immunology*, 1994; 145: 35-36.
Craven et al., "*Staphylococcus aureus* alpha-hemolysin activatest he NLRP3-inflammasome in human and mouse monocytic cells," PLoS One, 4(10): e7746, 11 pages, 2009.
DeDent et al., "Exploring *Staphylococcus aureus* pathways to disease for vaccine development", *Semin Immunopathol*, 34(2):317-333, 2012.
Derewenda et al., "The structure of Yersinia pestis V-antigen, an essential virulence factor and mediator of immunity against plague," *Structure*, 12:301-306, 2004.
Diep et al., "Complete genome sequence of USA300, an epidemic clone of community-acquired meticillin-resistant *Staphylococcus aureus*", *Lancet*, 367(9512):731-739, 2006.
Dinges et al., "Exotoxins of *Staphylococcus aureus,*" Clin. Microbiol. Rev., 13:16-34, 2000.
Dramsi et al., "Sorting sortases: a nomenclature proposal for the various sortases of Gram-positive bacteria," Research in Microbiology, 156(3):289-297, 2005.
Dryla et al., "High-affinity binding of the staphylococcal HarA protein to haptoglobin and hemoglobin involoves a domain with an antiparallel eight-stranded beta-barrel fold," J. Bacteriol., 189:254-264, 2007.
Dryla et al., "Identification of a novel iron regulated staphylococcal surface protein with haptoglobin-haemoglobin binding activity," Mol. Microbiol., 49:37-53, 2003.
Duthie et al., *J. Gen. Microbiol.* 6(1-2): 95-107, 1952.
Etz et al., "Identification of in vivo expressed vaccine candidate antigens from *Staphylococcus aureus,*" PNAS, 99 (10): 6573-6578, 2002.
Extended European Search Report issued in European Patent Application No. EP 11167985.8, dated Apr. 2, 2012.
Extended European Search Report issued in European Patent Application No. EP 11004407.0, dated Apr. 2, 2012.
Falugi et al., "The role of protein A in the evasion of host adaptive immune responses by *Staphylococcus aureus*" mBio 2013, 4(5):e00575-13, 9 pages.
Fattom et al., "Development of StaphVAX, a polysaccharide conjugate vaccine against *S. aureus* infection: from the lab bench to phase III clinical trials," *Vaccine*, 22 (7): 880-887, 2004.
Fischetti, "Streptococcal M protein: molecular design and biological behavior", *Clin Microbiol Rev*, 2(3):285-314, 1989.
Forsgren et al., "Lymphocyte stimulation by protein A of *Staphylococcus aureus*", *Eur. J. Immunol.*, 6(3):207-213, 1976.
Forthal et al., "Fc-Glycosylation Influences Fcγ Receptor Binding and Cell-Mediated Anti-HIV Activity of Monoclonal Antibody 2G12" *The Journal of Immunology* 2010, vol. 185, No. 11, pp. 6876-6882.
Foster, "Immune evasion by staphylococci," Nat. Rev. Microbiol., 3:948-958, 2005.
Friedrich R, Panizzi P, Fuentes-Prior Richter K, Verhamme I, et al. (2003) Staphylocoagulase is a prototype for the mechanism of cofactor-induced zymogen activation. *Nature* 425: 535-539.
Galán and Collmer, "Type III secretion machines: bacterial devices for protein delivery into host cells," *Science*, 284: 1322-1333, 1999.

(56) References Cited

OTHER PUBLICATIONS

Garcia-Lara et al., "*Staphylococcus aureus*: the search for novel targets," Drug Discovery Today, 10:643-651, 2005.
Gaudreau et al., "Protective immune responses to a multi-gene DNA vaccine against *Staphylococcus aureus*," Vaccine, 25(5):814-824, 2006.
Gen Bank Accession No. COL (YP_186036.1) (gi57650272), "Alpha-hemolysin precursor [*Staphylococcus aureaus* subsp. *Aureus* COL]," 2005.
Gen Bank Accession No. JH9 (YP_001246598.1) (gi148267655), "beta-channel forming cytolysin [*Staphylococcus aureus* subsp. *aureus* JH9]," 2007.
Gen Bank Accession No. MSSA476 (YP_043222.1) (gi49486001), "alpha-hemolysin precursor [*Staphylococcus aureus* subsp. *aureus* MSSA476]," .2004.
Gen Bank Accession No. Mu50 (NP_371687.1) (gi5924153), "alpha-hemolysin precursor [*Staphylococcus aureus* subsp. *aureus* Mu50]," 2001.
Gen Bank Accession No. Newman (YP_001332107.1) (gi151221285), "alpha-hemolysin precursor [*Staphylococcus aureus* subsp. *aureus* str. Newman]," 2007.
GenBank Accession No. AAA26498 (gi52953), "EryG [*Saccharopolyspora erythraea* NRRL2338]," 1991.
GenBank Accession No. JH1 (YP_001316387.1) (gi50393712), "beta-channel forming cytolysin [*Staphylococcus aureaus* subsp. *aureus* JH1,]" 2007.
GenBank Accession No. MW2 (NP_645861.1) (gi21282773), "alpha-hemolysin [*Staphylococcus aureus* subsp. *aureus* MW2]," 2002.
GenBank Accession No. N315 (NP_374279.1) (gi150393712), "alpha-hemolysin [*Staphylococcus aureus* subsp. *aureus* N315]," 2001.
GenBank Accession No. NCTC8325 (YP_499665.1) (gi88194865), "alpha-hemolysin precursor [*Staphylococcus aureus* subsp. *aureus* NCTC 8325]," 2006.
Genbank Accession No. NP_371653, "Whole genome sequencing of meticillin-resistant *Staphylococcus aureus*," 2001.
Genbank Accession No. NP_371654, "Whole genome sequencing of meticillin-resistant *Staphylococcus aureus*," 2001.
Genbank Accession No. NP_373773, "Whole genome sequencing of meticillin-resistant *Staphylococcus aureus*," 2001.
Genbank Accession No. NP_373774, "Whole genome sequencing of meticillin-resistant *Staphylococcus aureus*," 2001.
Genbank Accession No. Q99WT7, "Whole genome sequencing of meticillin-resistant *Staphylococcus aureus*," 2001.
Genbank Accession No. Q99WU4, "Whole genome sequencing of meticillin-resistant *Staphylococcus aureus*," 2001.
GenBank Accession No. USA300 (YP_493756.1) (gi151221285), "alpha-hemolysin precursor [*Staphylococcus aureus* subsp. *aureus* USA300_FPR3757]," 2006.
GenBank Accession No. CAC80837, "*Staphylococcus aureus*," 2003.
Goodyear and Silverman, "Death by a B cell superantigen: In vivo VH-targeted apoptotic supraclonal B cell deletion by a Staphylococcal Toxin", *J Exp Med*, 197(9):1125-1139, 2003.
Goodyear and Silverman, "Staphylococcal toxin induced preferential and prolonged in vivo deletion of innate-like B lymphocytes", *Proc Natl Acad Sci USA*, 101(31):11392-11397, 2004.
Gouaux et al., "alpha-Hemolysin, gamma-hemolysin, and leukocidin from *Staphylococcus aureus*: distant in sequence but similar in structure," Protein Sci., 6:2631-2635, 1997.
Gouaux, "alpha-Hemolysin from *Staphylococcus aureus*: An archetype of beta-barrel, channel forming toxins," Journal of Structural Biology, 121: 110-122, 1998.
Graille et al., "Crystal structure of a *Staphylococcus aureus* protein A domain complexed with the Fab fragment of a human IgM antibody: structural basis for recognition of B-cell receptors and superantigen activity", *Proc Natl Acad Sci USA*, 97(10):5399-5404, 2000.
Greenspan et al., "Defining epitopes: It's not as easy as it seems" Nature Biotechnology 1999, 17:936-937.

Grigg et al., "Haem recognition by a *Staphylococcus aureus* NEAT domain," Mol. Microbiol., 63:139-149, 2007.
Guinn et al., "Individual RD1-region genes are required for export of ESAT-6/CFP-10 and for virulence of *Mycobacterium tuberculosis,*" Mol. Microbiol., 51 (2): 359-370, 2004.
Guo et al., "Protein tolerance to random amino acid change" Proceedings of the National Academy of Sciences USA 2004, vol. 101, No. 5, pp. 9205-9210.
Harboe et al., "Evidence for occurrence of the ESAT-6 protein in *Mycobacterium tuberculosis* and virulent *Mycobacterium bovis* and for its absence in *Mycobacterium bovis* BCG," Infect. Immun., 64: 16-22, 1996.
Harlow et al. *Antibodies, a Laboratory Manual*. Cold Spring Harbor Laboratory, 1988, p. 67.
Hauck et al., "Sticky connections: extracellular matrix protein recognition and integrin-mediated cellular invasion by *Staphylococcus aureus*," Curr Opinion Microbiol., 9:5-11, 2006.
Haupt et al., "The *Staphylococcus aureus* protein Sbi acts as a complement inhibitor and forms a tripartite complex with host complement Factor H and C3b", *PLoS Pathog*, 4(12):e1000250, 2008.
Heath et al., "Protection against experimental bubonic and pneumonic plague by a recombinant capsular FI-V antigen fusion protein vaccine," Vaccine, 16:1131-1137, 1998.
Hill et al., "Regions of Yersinia pestis V antigen that contribute to protection against plague identified by passive and active immunization," Infect. Immun., 65:4476-4482, 1997.
Hollingshead et al., "A highly conserved region present in transcripts encoding heterologous M proteins of group A streptococci", *Infect Immun*, 55(12):3237-3239, 1987.
Holtfreter et al., "Human immune proteome in experimental colonization with *Staphylococcus aureus*," 16(11):1607-1614, 2009.
Houghten et al., "Relative importance of position and individual amino acid residues in peptide antigen-antibody interactions: Implications in the mechanism of antigenic drift and antigenic shift," In: New Approaches to Immunication, Vaccines 86, Cold Spring Harbor Laboratory, pp. 21-25, 1986.
Hsu et al., "Repeated neonatal handling with maternal separation permanently alters hippocampal GABAA receptors and behavioral stress responses," PNAS, 100:12420-12425, 2003.
Huang et al., "Immunoglobulin heavy chain gene expression in peripheral blood B lymphocytes", *J Clin Invest*, 89(4):1331-1343, 1992.
Hume et al., "Immunization with alpha-toxin toxoid protects the cornea against tissue damage during experimental *Staphylococcus aureus* keratitis," Infect. Immun, 68(10):6052-6055, 2000.
Iaschenko et al., "Changes in the peripheral blood lymphocytes after immunication and its effects on the course of experimental inflammatory process in the lung" Zh Mikrobiol Epidemiol Immunobiol., 4:88-92, 1978. (English Abstract).
International Search Report and Written Opinion for PCT/US2013/031927, mailed Jun. 25, 2013.
International Search Report and Written Opinion issued in Corresponding PCT Application No. PCT/US2020/070530, dated Feb. 25, 2021.
International Search Report and Written Opinion issued in PCT/US2012/050991, mailed Feb. 25, 2013.
International Search Report and Written Opinion, issued in Int. App. No. PCT/US2007/060720, dated Jun. 9, 2008.
International Search Report, issued in Int. App. No. PCT/US2008/074849, dated Dec. 9, 2008.
International Search Report, issued in Int. App. No. PCT/US2009/059648, dated Feb. 16, 2010.
Invitation to Pay Additional Fees, issued in Int. App. No. PCT/US2007/060720, dated Apr. 9, 2008.
Jensen, "A normally occurring staphylococcus antibody in human serum," Acta Path. Microbiol. Scandin., 44:421-428, 1958.
Johnson et al., "Iron-regulated biofilm formation in *Staphylococcus aureus* Newman requires ica and the secreted protein Emp," Infect. Immun., 76(4):1756-65, 2008.
Jones and Fischetti, "The importance of the location of antibody binding on the M6 protein for opsonization and phagocytosis of group A M6 streptococci", *J Exp Med*, 167(3):1114-1123, 1988.

(56) References Cited

OTHER PUBLICATIONS

Jones et al., "Protection conferred by a fully recombinant sub-unit vaccine against Yersinia pestis in male and female mice of four inbred strains," Vaccine, 19(2.3):358-366, 2000.
Jones et al., "Immunochemical localization and amino acid sequences of crossreactive epitopes within the group A streptococcal M6 protein", *J Exp. Med.*, 164(4):1226-1238, 1986.
Josefsson et al., "Protection against experimental *Staphylococcus aureus* arthritis by vaccination with clumping factor A, a novel virulence determinant," *J. Infect. Dis.*, 184 (2): 1572-1580, 2001.
Jursch et al., "Histidine residues near the N terminus of staphylococcal alpha-toxin as reporters of regions that are critical for oligomerization and pore formation," Infection and Immunity, 62(6): 2249-2256, 1994.
Kelly, "Immunotherapy against antibiotic-resistant bacteria: the Russian experience with an antistaphyloccal hyperimmune plasma and immunoglobulin," Microbes and Infection, 2: 1383-1392, 2000.
Kennedy et al., "Targeting of alpha-hemolysin by active or passive immunization decreases severity of USA300 skin infections in a mouse model," J. Inject. Dis. (in press), 2010.
Kennedy et al., "Epidemic community-associated methicillin-resistant *Staphylococcus aureus*: recent clonal expansion and diversification", *Proc Natl Acad Sci USA*, 105(4):1327-1332, 2008.
Kim et al. "Peptidoglycan-linked protein A promotes T-cell dependent antibody expansion during *Staphylococcus aureus* infection." Proc Natl Acad Sci USA 2016, 113(20):5718-5723.
Kim et al., "A monoclonal antibody that recognizes the E domain of staphylococcal protein A" Vaccine 2014, 32:464-469.
Kim et al., "Identifying protective antigens of *Staphylococcus aureus*, a pathogen that suppresses host immune responses" Faseb J. 2011, 25(10): 3605-3612.
Kim et al., "IsdA and IsdB antibodies protect mice against *Staphylococcus aureus* abscess formation and lethal challenge", *Vaccine*, 28(38):6382-6392, 2010b.
Kim et al., "Nontoxigenic protein A vaccine for methicillin-resistant *Staphylococcus aureus* infections in mice" J Exp Med 2010, 207:1863-1870.
Kim et al., "Protein A suppresses immune responses during *Staphylococcus aureus* bloodstream infection in guinea pigs." mBio 2015, 6(1):e02369-14, 11 pages.
Kim et al., "Protein A-Specific Monoclonal Antibodies and Prevention of *Staphylococcus aureus* Disease in Mice" *Infect Immun.* 2012, 80:3460-3470.
Kim et al., "Recurrent infections and immune evasion strategies of *Staphylococcus aureus*" Curr Opin Microbiol. 2012, 15:92-99.
Klevens et al., "Invasive methicillin-resistant *Staphylococcus aureus* infections in the United States", *JAMA*, 298(15):1763-1771, 2007.
Kopp and Medzhitov, "A plague on host defense," J. Exp. Med, 196:1009-1012, 2002.
Krishnasastry et al., "Suface labeling of key residues during assembly of the transmembrane pore formed by staphylococcal alpha-hemolysin," FEBS letters, 356:66-71, 1994.
Kronvall et al., "Protein A reactivity with mouse immunoglobulins. Structural relationship between some mouse and human immunoglobulins", *J Immunol*, 105(5):116-1123, 1970.
Kuklin et al., "A novel *Staphylococcus aureus* vaccine: iron surface determinant B induces rapid antibody responses in rhesus macaques and specific increased survival in a murine *S. aureus* sepsis model," *Infect. Immun.*, 74 (4): 2215-2223, 2006.
Kuroda et al., "Whole Genome sequencing of meticillin-resistant *Staphylococcus aureus,*" *Lancet*, 357 (9264): 1225-1240, 2001.
Lancefield, "Current knowledge of type-specific M antigens of group A streptococcia", *J Immunol*, 89:307-313, 1962.
Lancefield, "The antigenic complex of *Streptococcuss haemolyticus*. I. Demonstration of a type-specific substance in extracts of *Streptococcus hemolyticus*," J. Exp. Med., 47:91-103, 1928.
Leary et al., "Active immunization with recombinant V antigen from Yersinia pestis protects mice against plague," Infect. Immun., 63:2854-2858, 1995.
Lee et al., "Development of antistaphylococcal vaccines," Current Infectious Disease Reports, 3:517-524, 2001.
Lee et al., "LcrV, a substrate for Yersinia enterocolitica type III secretion, is required for toxin targeting into the cytosol of HeLa cells," J. Biol. Chem., 275:36869-36875, 2000.
Lee, "The prospects for developing a vaccine against *Staphylococcus aureus*", *Trends Microbiol.*, 4(4):162-166, 1996.
Lee, Jean C., Harvard Medical School "*S. aureus* vaccine development," available on line at www.ischemo.org/pdf/Lee.pdf, accessed Aug. 13, 2010.
Lindsay et al., "Microarrays reveal that each of the ten dominant lineages of *Staphylococcus aureus* has a unique combination of surface-associated and regulatory genes," J. Bacterial., 188:669-676, 2006.
Liu et al., "Direct hemin transfer from IsdA to IsdC in the iron-regulated surface determinant (Isd) heme acquisition system of *Staphylococcus aureus*," J. Biol. Chem., 283:6668-6676, 2008.
Lowy, "*Staphylococcus aureus* infections," New Eng. J. Med., 339:520-532, 1998.
MacCallum et al. (1996) "Antibody-antigen interactions: contact analysis and binding site topography," *J. Mol. Biol.* 262: 732-745.
Madden et al., "Cytolysin-mediated translocation (CMT): a functional equivalent of type III secretion in gram-positive bacteria," *Cell*, 104 (1): 143-152, 2001.
Mahairas et al., "Molecular analysis of genetic differences between *Mycobacterium bovis* BCG and virulent *M. bovis,*" *J. Bacteriol.*, 178 (5): 1274-1282, 1996.
Maione et al., "Identification of a universal Group B streptococcus vaccine by multiple genome screen," *Science*, 309 (5731):148-150, 2005.
Maira-Litran et al., "Comparative opsonic and protective activities of *Staphylococcus aureus* conjugate vaccines containing native or deacetylated Staphylococcal Poly-N-acetyl-beta-(1-6)-glucosamine," *Infect. Immun.* 73 (10): 6762, 2005.
Mamo et al., "Vaccination against *Staphylococcus aureus* mastitis: immunological response of mice vaccinated with fibronectin-binding protein (FnBP-A) to challenge with *S. aureus*," Vaccine, 12:988-992, 1994.
Manolova et al., "The creation of specific immunity to staphylococcal infection in newborn in facts by the intranasal administration of absorbed staphyloccal anatoxin," Zh Mikrobiol Epidemiol Immunobiol., 8:64-7, 1989. (In Russian, English Abstract).
Marianayagam et al., "The power or two: protein dimerization in biology" Trends in Biochemical Sciences 2004, 29(11 ): 618-625.
Marketon et al., "Plague bacteria target immune cells during infection," Science, 309: 1739-1741, 2005.
Marraffini and Schneewind, "Anchor structure of staphylococcal surface proteins. V. Anchor structure of the sortase B substate IsdC," J. Biol. Chem., 280:16263-16271, 2005.
Mazmanian et al., "Sortase-catalysed anchoring of surface proteins to the cell wall of *Staphylococcus aureus,*" *Molecular Microbiology*, 40 (5): 1049-1057, 2001.
Mazmanian et al., "*Staphylococcus aureus* sortase mutants defective in the display of surface proteins and in the pathogenesis of animal infections," Proc. Natl. Acad. Sci. USA, 97(10):5510-5515, 2000.
Mazmanian et al., "*Staphylococcus aureus* sortase, an enzyme that anchors surface proteins to the cell wall." Science 1999, 285:760-763.
Mazmanian et al., "An iron-regulated sortase-enzyme anchors a class of surface protein during *Staphylococcus aureus* pathogenesis," Proc. Natl. Acad. Sci. USA, 99:2293-2298, 2002.
Mazmanian et al., "Passage of heme-iron across the envelope of *Staphylococcus aureus*," Science, 299:906-909, 2003.
McAdow et al., "Preventing *Staphylococcus aureus* sepsis through the inhibition of its agglutination in blood." PLoS Pathog 2011, 7(10):e1002307, 12 pages.
McAdow M, Missiakas DM, Schneewind O (2012) *Staphylococcus aureus* Secretes Coagulase and von Willebrand Factor Binding Protein to Modify the Coagulation Cascade and Establish Host Infections. *Journal of Innate Immunity* 4: 141-148.
McAdow MD, A.C. Emolo, C.; Cheng, A.G.; Kreiswirth, B.; Missiakas, D.M.; Schneewind, O. (2012) Coagulases as determi-

(56) References Cited

OTHER PUBLICATIONS nants of protective immune responses against *Staphylococcus aureus*. *Infect. Immun.* 80(1): 3389-3398.

McCarthy and Lindsay, "Genetic variation in *Staphylococcus aureus* surface and immune evasion genes is lineage associated: implications for vaccine design and host-pathogen interactions", *BMC Microbiol.*, 10:173, 2010.

McElroy et al., "Alpha-toxin damages the air-blood barrier of the lung ni a rat model of *Staphylococcus aureus*-induced pneumonia," Infect. Immun., 67(10):5541-5544, 1999.

Mendoza et al. "Identification of *Staphylococcus* species by 16S-23S rDNA intergenic spacer PCR analysis" International Journal of Systematic Bacteriology, 1998, 48:1049-1055.

Menestrina et al., "Mode of action of beta-barrel pore-forming toxins of the staphylococcal alpha-hemolysin family," Toxicon, 39:1661-1672, 2001.

Menzies and Kernodle, "Passive immunization with antiserum to a nontoxic alpha-toxin mutant from *Staphylococcus aureus* is protective in a murine model," Infection and Immunity, 64(5):1839-1841, 1996.

Menzies and Kernodle, "Site-directed mutagenesis of the alpha-toxin gene of *Staphylococcus aureus*: Role of histidines in toxin activity in vitro and in a murine model," Infection and Immunity, 62(5)1843-1847, 1994.

Mikayama et al. (1993) "Molecular cloning and functional expression of a cDNA encoding glycosylation-inhibiting factor," *Proc. Natl. Acad. Sci USA* 90: 10056-10060.

Mills et al., "Yersinia enterocolitica induces apoptosis in macrophages by a process requiring functional type III secretion and translocation mechanisms and involving YopP, presumably acting as an effector protein," PNAS, 94 (23): 12638-12643, 1997.

Missiakas et al., "*Staphylococcus aureus* vaccines: Deviating from the carol" *J Exp Med* 2016, 231:1645-1653.

Mohamed et al., "Heteropolymers: A New Class of Therapeutics for Treating Lethal Bacterial and Viral Infections", Nov. 17, 2004 DTIC Online Accession No. ADA449597.

Moks et al., "Staphylococcal protein A consists of five IgG-binding domains", *Eur. J. Biochem*, 156(3):637-643, 1986.

Motin et al., "Passive immunity to yersiniae mediated by antirecombinant V antigen and protein A-V antigen fusion peptide," Infect. Immun., 62:4192-4201, 1994.

Motin et al., "V antigen-polyhistidine fusion peptide: binding to LcrH and active immunity against plague," Infect. Immun., 64:4313-4318, 1996.

Muryoi et al., "Demonstration of the iron-regulated surface determinant (Isd) heme transfer pathway in *Staphylococcus aureus*," J. Biol. Chem., 283:28125-28136S, 2008.

Nakajima and Brubaker, "Association between virulence of Yersinia pestis and suppression of gamma interferon and tumor necrosis factor alpha," Infection and Immunity, 61 :23-31, 1993.

Nakajima et al., "Suppression of cytokines in mice by protein A-V antigen fusion peptide and restoration of synthesis by active immunization," Infect. Immun., 63:3021-3029, 1995.

NCBI, "GenBank: AJ249487—*Staphylococcus epidermidis* aap gene for accumulation-associated protein, strain RP62A," <http://www.ncbi.nlm.nih.gov/nuccore/AJ249487>, 2000. Retrieved May 15, 2015.

NCBI, "GenBank: CAC80837—autolysin [*Staphylococcus aureus*]," <http://www.ncbi.nlm.nih.gov/protein/CAC80837>, 2005. Retrieved May 15, 2015.

NCBI, "GenBank: NP_372518—anti repressor [*Staphylococcus aureus* subsp. *aureus* Mu50]," <http://www.ncbi.nlm.nih.gov/protein/NP372518.1?report-genpept>, 2014. Retrieved May 15, 2015.

Nedialkov et al., "Resistance to lipopolysaccharide mediated by the Yersinia pestis V antigen-polyhistidine fusion peptide: amplification of interleukin-JO," Infection and Immunity, 65:1196-1203, 1997.

Ni Eidhin et al., "Clumping factor B (ClfB), a new surface-located fibrinogen-binding adhesin of *Staphylococcus aureus*," *Mol. Microbiol.*, 30 (2): 245-257, 1998.

Niles, "Dissecting the structure of LorV from Yersinia pestis, a truly unique virulence protein," Structure, 12:357-358, 2004.

Nitsche-Schmitz et al., "Invasion mechanisms of Gram-positive pathogenic cocci," Thrombosis and Haemostasis, 98(3):488-496, 2007.

Nordhaug et al., "A field trial with an experimental vaccine against *Staphylococcus aureus* mastitis in cattle. 2. Antibody response," J. Dairy Sci., 77:1276-1284, 1994.

Novick, "Autoinduction and signal transduction in the regulation of staphylococcal virulence," *Mol. Microbiol.*, 48 (6): 1429-1449, 2003.

Office Communication, issued in European Patent Application No. 07 840 104. 9, dated May 19, 2009.

O'Reilly et al., "Cryptic alpha-toxin gene in toxic shock syndrome and septicaemia strains of *Staphylococcus aureus*," Mal. Microbial., 4: 1947-1955, 1990.

O'Reilly et al., "Inactivation of the alpha-haemolysin gene of *Staphylococcus aureus* 8325-4 by site-directed mutagenesis and studies on the expression of its haemolysins," Microb. Pat hog., 1:125-138, 1986.

Overheim et al., "LcrV plague vaccine with altered immunomodulatory properties," Infect. Immun., 73:51S2-5159, 2005.

Pallen et al., "The ESAT-6/WXG100 superfamily—and a new Gram-positive secretion system," *Trends Microbiol.*, 10 (5): 209-212, 2002.

Palma M, Shannon O. Quezada HC, Berg A, Flock JI, (2001) Extracellular Fibrinogen-binding protein, Efb, from *Staphylococcus aureus* blocks platelet aggregation due to its binding to the alpha-chain. *The Journal of Biological Chemistry* 276: 31691-31697.

Pancholi and Fischetti, "A major surface protein on group A streptococci is a glyceraldehyde-3-phosphate-dehydrogenase with multiple binding activity," *J. Exp. Med.*, 176 (2): 415-426, 1992.

Panizzi P, Friedrich R, Fuentes-Prior P, Richter K, Bock PE, et al. (2006) Fibrinogen substrate recognition by staphylocoagulase. (pro)thrombin complexes. *The Journal of Biological Chemistry* 281: 1179-1187.

Park et al., "Immunogenicity of alpha-toxin, capsular polysaccharide (CPS) and recombinant fibronection-binding protein (r-FnBP) of *Staphylococcus aureus* in rabbit," J. Vet. Med. Sci., 61(9):995-1000, 1999.

Partial Supplementary European Search Report for EP 13781905.8, mailed Aug. 14, 2015.

Pascalis et al. (2002) "Grafting of 'Abbreviated' Complementarity-Determining Residues Essential for Ligand Contact to Engineer a Less Immunogenic Humanized Monoclonal Antibody," *The Journal of Immunology* 169: 3076-3084.

Paul, William E. *Fundamental Immunology*, 3$^{rd}$ ed. Raven Press, New York: 1993, 292-295.

Pauli et al., "*Staphylococcus aureus* infection induces protein A-mediated immune evasion in humans" J Exp Med 2014, 211:2331-2339.

Perry and Fetherston, "Yersinia pestis—etiologic agent of plague," Clin. Microbial. Rev., 10:35-66, 1997.

Perry et al., "Anchoring of surface proteins to the cell wall of *Staphylococcus aureus*. III. Lipid II is an in vivo peptidoglycan substrate for sortase-catalyzed surface protein anchoring", *J. Biol Chem*, 277(18):1241-16248, 2002.

Philipp et al., "Physical mapping of *Mycobacterium bovis* BCG Pasteur reveals differences from the genome map of *Mycobacterium tuberulosis* H37Rv and from *M. bovis,*" Microbiology, 142: 3135-3145, 1996.

Phillips et al., "Streptococcal M protein: alpha-helical coiled-coil structure and arrangement on the cell surface", *Proc Natl Acad Sci USA*, 78(8):4689-4693, 1981.

Phonimdaeng P, O'Reilly M, Nowlan P, Bramley AJ, Foster TJ ( 1990) The coagulase of *Staphylococcus aureus* 8325-4. Sequence analysis and virulence of site-specific coagulase-deficient mutants. *Molecular Microbiology* 4: 393-404.

Pilpa et al., "Functionally distinct NEAT (NEAr Transporter) domains within the *Staphylococcus aureus* IsdH/HarA protein extract heme from methemoglobin," J. Biol. Chem., 284:1166-1176, 2009.

(56) References Cited

OTHER PUBLICATIONS

Pilpa et al., "Solution structure of the NEAT (NEAr Transporter) domain from ISdH/HarA: the human hemoglobin receptor in *Staphylococcus aureus*," J. Mol. Biol., 360:435-447, 2006.

Poole-Warren et al., "Vaccination for prevention of CAPO associated staphylococcal infection: results of a prospective multicenter clinical trial," Clin. Nephrol., 35(5): 198-206, 1991.

Projan et al., "Staphylococcal vaccines and immunotherapy: to dream the impossible dream?" Current Opinion in Pharmacology, 6: 473-479, 2006.

Pullen et al., "Analysis of the Yersinia pestis V protein for the presence of linear antibody epitopes," Infect. Immun., 66:521-527, 1998.

Pym et al., "Loss of RD1 contributed to the attenuation of the live tuberculosis vaccines *Mycobacterium bovis* BCG and *Mycobacterium microti*," Molecular Microbiology, 46 (3): 709-717, 2002.

Pym et al., "Recombinant BCF exporting ESAT-6 confers enhanced protection against tuberculosis," Nature Medicine, 9 (5): 533-539, 2003.

Raedler et al., "Serologic assay to quantify human immunoglobulin antibodies to *Staphylococcus aureus* iron surface determinant B antigen," Clin. Vaccine Immunol., 16(5):739-48, 2009.

Ragle and Wardenburg, "Anti-alpha-hemolysin monoclonal antibodies mediate protection against *Staphylococcus aureus* pneumonia," Infection and Immunity, 77(7):2712-2718, 2009.

Ragle et al., "Prevention and treatment of *Staphylococcus aureus* pneumonia with a beta-cyclodextrin derivative," Antimicrobial Agents and Chemotherapy, 54(1 ):298-304, 2010.

Renshaw et al., "Conclusive evidence that the major T-cell antigens of the *Mycobacterium tuberculosis* complex ESAT-6 and CFP=10 form a tight, 1:1 complex and characterization of the structural properties of ESAT-6, CFP-10, and the ESAT-6CFP-10 complex. Implications for pathogenesis and virulence," J. of Biol. Chem., 277(24): 21598-21603, 2002.

Renshaw et al., "Structure and function of the complex formed by the tuberculosis virulence factors CFP-10 and ESAT-6," Embo Journal, 24 (14): 2491-2498, 2005.

Robbins and Schneerson, "Haemophilus influenzae type b: the search for a vaccine", Pediatr Infect Dis J., 6(8):791-794, 1987.

Robbins and Schneerson, "Polysaccharide-protein conjugates: a new generation of vaccines", J. Infect. Dis., 161(5):821-832, 1990.

Robbins et al., "Hypothesis: how licensed vaccines confer protective immunity", Adv Exp Med Biol, 397:169-182, 1996.

Rosch and Caparon, "A microdomain for protein secretion in Gram-positive bacteria," Science, 304: 1513-1515, 2004.

Rose et al., "Mediator generation and signaling events in alveolar epithelial cells attacked by *S. aureus* alpha-toxin," Am. J. Physiol. Lung Cell Mo !. Physiol., 282:L207-L214, 2002.

Rudikoff et al. (1982) "Single amino acid substitution altering antigen-binding specificity," Proc. Natl. Acad. Sci. USA 79, 1979-1983.

Rudinger et al. (Jun. 1976. Peptide Hormones. Biol. Council. pp. 5-7).

Russell et al., "A comparison of Plague vaccine, USP and EV76 vaccine induced protection against Yersinia pestis in a murine model," Vaccine, 13:1551-1556, 1995.

Sarker et al., "The Yersinia Yop Virulon: Lcr V Is Required for Extrusion of the Translocators YopB and YopD" Journal of Bacteriology 1998, 180(5), p. 1207-1214.

Sasso et al., "Human IgM molecules that bind staphylococcal protein A contain VHIII H chains", J Immunol., 142(8):2778-2783, 1989.

Sawa et al., "Active and passive immunization with the Pseudomonas V antigen protects against type III intoxication and lung injury," Nat. Med., 5:392-398, 1999.

Schaffer et al., "Immunization with *Staphylococcus aureus* clumping factor B, a major determinant in nasal carriage, reduces nasal colonization in a murine model," Infect. Immun., 74 (4): 2145-2153, 2006.

Schneewind et al., "Structure of the cell wall anchor of surface proteins in *Staphylococcus aureus*" Science 1995, 268:103-106.

Scott et al., "Conversion of an M- group A streptococcus to M+ by transfer of a plasmid containing an M6 gene", J Exp Med., 164(5):1641-1651, 1986.

Scriba et al., "The *Staphylococcus aureus* Eap protein activates expression of proinflammatory cytokines," Infect. Immun., 76(5):2164-2168, 2008.

Sequence 2913 from Patent EP 1829892, NCBI accession No. CS710373, Sep. 5, 2007.

*Staphylococcus aureus* Proteins and Nucleic Acids, NCBI accession No. DD120801, Jan. 27, 2005.

"A Method for identification, isolation and production of antigens to a specific pathogen," NCBI accession No. DD088871, Oct. 14, 2004.

Sequence 42 from Patent WO02059148, NCBI accession No. AX583665, Aug. 1, 2002.

Sequence 2913 from Patent WO02094868, NCBI accession No. AX619950, Nov. 28, 2002.

Sequence 42 from Patent EP1630172, NCBI accession No. CS274094, Mar. 1, 2006.

Sequence 42 from Patent EP1616876, Ncbi accession No. CS252757, Jan. 18, 2006.

Sequence 785 from patent U.S. Pat. No. 6,737,248, NCBI accession No. AR536223, May 18, 2004.

Sequence 785 from patent U.S. Pat. No. 6,593,114, NCBI accession No. AR354667, Jul. 15, 2003.

Sequence 94 from patent U.S. Pat. No. 6,348,582, NCBI accession No. AR194545, Feb. 19, 2002.

Sequence 2915 from Patent EP1829892, NCBI accession No. CS710375, Sep. 5, 2007.

*Staphylococcus aureus* Proteins and Nucleic Acids, NCBI accession No. DD120800, Jan. 27, 2005.

Sequence 2915 from Patent WO02094868, NCBI accession No. AX619952, Nov. 28, 2002.

Seeger et al., "Staphylococcal alpha-toxin elicits hypertension in isolated rabbit lungs. Evidence for thromboxane formation and the role of extracellular calcium," J. Clin. Invest., 74, 849-858, 1984.

Seeger et al., "Staphylococcal alpha-toxin-induced vascular leakage in isolated perfused rabbit lungs," Lab. Invest., 63:341-349, 1990.

Sharp et al., "Crystal structure of the heme-IsdC complex, the central conduit of the Isd iron/heme uptake system in *Staphylococcus aureus*," J. Biol. Chem., 282:10625-10631, 2007.

Shaw et al., "The role and regulation of the extracellular proteases of *Staphylococcus aureus*," Microbiology, 150:217-228, 2004.

Sibbald et al., "Mapping the Pathways to Staphylococcal Pathogenesis by Comparative Secretomics," Microbiol. Mol. Biol. Rev., 70:755-788, 2006.

Silverman and Goodyear, "Confounding B-cell defences: lessons from a staphylococcal superantigen", Nat Rev Immunol, 6(6):465-475, 2006.

Sing et al., "Contribution of toll-like receptors 2 and 4 in an oral Yersinia enterocolitica mouse infection model," Int. J. Med. Microbial., 293:341-348, 2003.

Sing et al., "Yersinia enterocolitica evasion of the host innate immune response by V antigen-induced IL-10 production of macrophages is abrogated in IL-I 0-deficient mice," J. Immunol., 168:1315-1321, 2002.

Sing et al., "Yersinia V-antigen exploits toll-like receptor 2 and CD14 for interleukin 10-mediated immunosuppression," J. Exp. Med., 196:1017-1024, 2002.

Sjodahl, "Repetitive sequences in protein A from *Staphylococcus aureus*. Arrangement of five regions within the protein, four being highly homologous and Fc-binding",Eur J Biochem, 73(2):343-351, 1977.

Sjoquist et al., "Protein A isolated from *Staphylococcus aureus* after digestion with lysostaphin", Eur. J. Biochem, 29(3):572-578, 1972.

Skaar et al., "Iron-source preference of *Staphylococcus aureus* infections," Science, 30(5690)5: 1626-1628, 2004.

Skaar et al., "IsdG and Isdl, heme degrading enzymes in the cytoplasm of *Staphylococcus aureus*," J. Biol. Chem., 279:436-443, 2004.

(56) References Cited

OTHER PUBLICATIONS

Skrzypek and Straley, "Differential effects of deletions in IcrV on secretion of V antigen, regulation of the low-Ca2+ response, and virulence of Yersinia pestis," J. Bacterial., 177:2530-2542, 1995.

Smith et al., "The immune evasion protein Sbi of *Staphylococcus aureus* occurs both extracellularly and anchored to the cell envelope by binding lipoteichoic acid", *Mol Microbiol*, 83(4):789-804, 2012.

Song et al., "Structure of staphylococcal alpha-hemolysin, a heptameric transmembrane pore," Science, 274: 1859-1866, 1996.

Sorenson et al., "Purification and characterization of a low-molecular-mass T-cell antigen secreted by *Mycobacterium tuberculosis*," *Infect. Immun.*, 63 (5): 1710-1717, 1995.

Spellberg and Daum, "Development of a vaccine against *Staphylococcus aureus*", *Semin Immunopathol*, 34(2):335-348, 2012.

Stalenheim et al., "Protein A From *Staphylococcus aureus*", J. Immunol., 103:467-473, 1970.

Stanley et al., "Acute infection and macrophage subversion by *Mycobacterium tuberculosis* require a specialized secretion system," PNAS, 100 (2): 13001-13006, 2003.

Staph Infections Overview, Mayo Clinic, http://www.mayoclinic.org/diseases-conditions/staph-infections/basics/definition/con-20031418; pp. 1-8 accessed Jun. 24, 2015.

Staph Infections Prevention, Mayo Clinic, http://www.mayoclinic.org/diseases-conditions/staph-infections/basics/prevention/con-20031418; 1 page accessed Jun. 25, 2015.

Stranger-Jones et al., "Vaccine assembly from surface proteins of *Staphylococcus aureus*", Proc natl Acad Sci USA, 103(45):16942-16947, 2006.

Studier et al., "Use of T7 Rna polymerase to direct expression of cloned genes," Methods Enzymol., 185:60-89, 1990.

Stugard et al., "A 101-kilodalton heme-binding protein associated with congo red binding and virulence of Shigella flexneri and enteroinfasive *Eschrichia coli* strains," Infect. Immun., 57:3534-3539, 1989.

Sun et al., "Staphylococcal Protein A Contributes to Persistent Colonization of Mice with *Staphylococcus aureus*" J Bacteriol 2018, 200(9):e00735-17, 16 pages.

Suttorp and Habben, "Effect of staphylococcal alpha-toxin on intracellular Ca2+ in polymorphonuclear leukocytes," Infect. Immun., 56:2228-34, 1988.

Tenover et al., "Characterization of a strain of community-associated methicillin-resistant *Staphylococcus aureus* widely disseminated in the United States," J. Clin. Microbiol., 44:108-118, 2006.

Thammavongsa et al., "Staphylococcal manipulation of host immune responses" Nat Rev Microbiol. 2015, 13(9): 529-543.

Thammavongsa et al., "*Staphylococcus aureus* degrades neutrophil extracellular traps to promote immune cell death" Science 2013, 342(6160): 863-866.

Thammavongsa et al., "*Staphylococcus aureus* synthesizes adenosine to escape host immune responses" J Exp Med 2016, 206(11):2417-2427.

Thammavongsa, et al., "Protein A-neutralizing monoclonal antibody protects neonatal mice against *Staphylococcus aureus* " Vaccine 2015, 33(4): 523-526.

Thomer et al., "Antibodies against a secreted product of *Staphylococcus aureus* trigger phagocytic killing" J Exp Med 2016, 213:293-301.

Titball and Williamson, "Yersinia pestis (plague) vaccines," Expert Opin. Biol. Ther., 4:965-973, 2004.

Tollersrud et al., "Antibody responses in sheep vaccinated against *Staphylococcus aureus* mastitis: A comparison of two experimental vaccines containing different adjuvants," Veterinary Research Communications, 26:587-600, 2002.

Ton-That et al., "Fatigue characterization of a hydroxyapatite-reinforced polyethylene composite. II. Biaxial fatigue," *J. Biomed. Matter Res.*, 51 (3): 461-468, 2000.

Torres et al., "*Staphylococcus aureus* IsdB is a hemoglobin receptor required for heme-iron utilization," J. Bacteriol., 188:8421-8429, 2006.

Une and Brubaker, "Roles of V antigen in promoting virulence and immunity in yersiniae," J. Immunol., 133:2226-2230, 1984.

U.S. Appl. No. 61/166,432, entitled "Compositions and Methods Related to Protein A (Spa) Variants," by Olaf Schneewind, filed Apr. 3, 2009.

U.S. Appl. No. 61/170,779, entitled "Compositions and Methods Related to Bacterial Eap and/or Emp Proteins," by Alice Cheng, filed Apr. 20, 2009.

U.S. Appl. No. 61/103,196, entitled "Compositions and Methods Related to Bacterial Eap and/or Emp Proteins, by Alice Cheng," filed Oct. 6, 2008.

Vajdos et al. (2002) "Comprehensive functional maps of the antigen-binding site of an anti-ErbB2 antibody obtained with shotgun scanning mutagenesis," *J. Mol. Biol.* 320(2): 415-428.

Valeva et al., "Staphyloccal alpha-toxin: Formation of the heptameric pore is partially cooperative and proceeds through multiple intermediate stages," Biochemistry, 36: 13298-13304, 1997.

Verkaik et al., "Immunogenicity of toxins using *Staphylococcus aureus* infections," Clinical Infectious Diseases, 50:61-8, 2010.

Villareal et al., "The IsdC protein from *Staphylococcus aureus* uses a flexible binding pocket to capture heme," J. Biol. Chem., 283:31591-31600, 2008.

Walker and Bayley, "Key residues for membrane binding, oligomerization, and pore forming activity of staphyloccal alpha-hemolysin identified by cysteine scanning mutagenesis and targeted chemical modification," The Journal of Biological Chemistry, 270(39):23065-23071, 1995.

Walker and Bayley, "Restoration of pore-forming activity in staphyloccal alpha-hemolysin by targeted covalent modification," Protein Engineering, 8(5):491-495, 1995.

Walker et al., "An intermediate in the assembly of a pore-forming protein trapped with a genetically-engineered switch," Chemistry & Biology, 2:99-105, 1995.

Wang et al., "A DNA vaccine producing LcrV antigen in oligomers is effective in protecting mice from lethal mucosa[ challenge of plague," Vaccine, 22:3348-3357, 2004.

Wardenburg et al., "Poring over pores: alpha-hemolysin and Panton-Valentine leukocidin in *Staphylococcus aureus* pneumonia," Nature Medicine, 13(12): 1405-1406, 2007.

Wardenburg et al., "Vaccines for *Staphylococcus aureus* infections," In: New Generation Vaccines, 4th edition, Dr. Myron Levine, Ed., Informa Healthcare, Chapter 67, 2009.

Watanabe S, Ito T, Sasaki T, Li S, Uchiyama I, et al. (2009) Genetic diversity of staphylocoagulase genes (coa): insight into the evolution of variable chromosomal virulence factors in *Staphylococcus aureus*. PloS One 4: e5714.

Watanabe S, Ito T, Takeuchi F, Endo M, Okuno E, et al. (2005) Structural comparison of ten serotypes of staphylocoagulases in *Staphylococcus aureus*. *Journal of Bacteriology* 187(11 ): 3698-3707.

Weichhart et al., "Functional selection of vaccine candidate peptides from *Staphylococcus aureus* whole-genome expression libraries in vitro," *Infect. Immun.*, 71(8): 4633-4641, 2003.

Welkos et al., "Determination of the virulence of the pigmentation-deficient and pigmentation-/plasminogen activator-deficient strains of Yersinia pestis in non-human primate and mouse models of pneumonic plague," Vaccine, 20:2206-2214, 2002.

Welkos et al., "Studies on the role of plasminogen activator in systemic infection by virulent Yersinia pestis strain C092," Microb. Pathog., 23(4):211-223, 1997.

Wilke and Warden burg, "Role of a disintegrin and metalloprotease 10 in *Staphylococcus aureus* alpha-hemolysin-mediated cellular injury," PNAS, 107(30):13473-8. Epub 2010.

Wleklinski et al., "Protective effects of active immunization against alpha hemolysin of *Staphylococcus aureus*," Zentralbl. Veterinarmed B. . , 29(8):596-603, 1982. (In German, English summary).

Wu et al. (1999) "Humanization of a murine monoclonal antibody by simultaneous optimization of framework and CDR residues," *J. Mol. Biol.* 294(1): 151-162.

Wu et al., "*Staphylococcus aureus* IsdG and Isdl, heme degrading enzymes with structural similarity to monooxygenases," J. Biol. Chem., 2005, 280(4), pp. 2840-2846.

(56) References Cited

OTHER PUBLICATIONS

Xie et al., "Suppression of experimental autoimmune encephalomyelitis by extracellular adherence protein of *Staphylococcus aureus*," J Exp. Med., 203(4):985-94, 2006.
Yanagisawa et al., "Neutralization of staphylococcal exotoxins in vitro by human-origin intravenous immunoglobulin," J. Infect. Chemother., 13:368-372, 2007.
Yang et al., "Monoclonal Antibody Targeting *Staphylococcus aureus* Surface Protein A (SasA) Protect Against *Staphylococcus aureus* Sepsis and Peritonitis in Mice" *PLOS One* 2016, vol. 11, No. 2, e0149460, pp. 1-15.
Yoshida et al. "Induction of resistance with heat-killed compact-type strains of *Staphylococcus aureus* against challenge with the diffuse variant of the Smith strain of *Staphylococcus aureus*," Infection and Immunity, 12(5):939-942, 1975.
Zhang et al. "Construction and expression of fused gene vaccine esat6-cfp10 of *Mycobacte-rium tuberculosis*" J Fourth Mil Med Univ 2005, vol. 26 No. 3 p. 193-195 (English Abstract).
Zhang et al., "A second IgG-binding protein in *Staphylococcus aureus*", *Microbiology*, 144(pt 4):985-991, 1998.
Zhang et al., "*Staphylococcus aureus* expresses a cell surface protein that binds both IgG and beta2-glycoprotein I", *Microbiology*, 145(pt 1):177-183, 1999.
Zhou et al., "An immunogenicity study of a newly fusion protein Cna-FnBP vaccinated against *Staphylococcus aureus* infections in a mice model," *Vaccine*, 24 (22): 4830-4837, 2006.
Zhu et al., "Pathway for heme uptake from human methemoglobin by the iron-regulated surface determinants system of *Staphylococcus aureus*," J. Biol. Chem., 283:18450-18460, 2008.
Extended European Search Report issued in European Patent Application No. 20864007.8, dated Sep. 13, 2023.

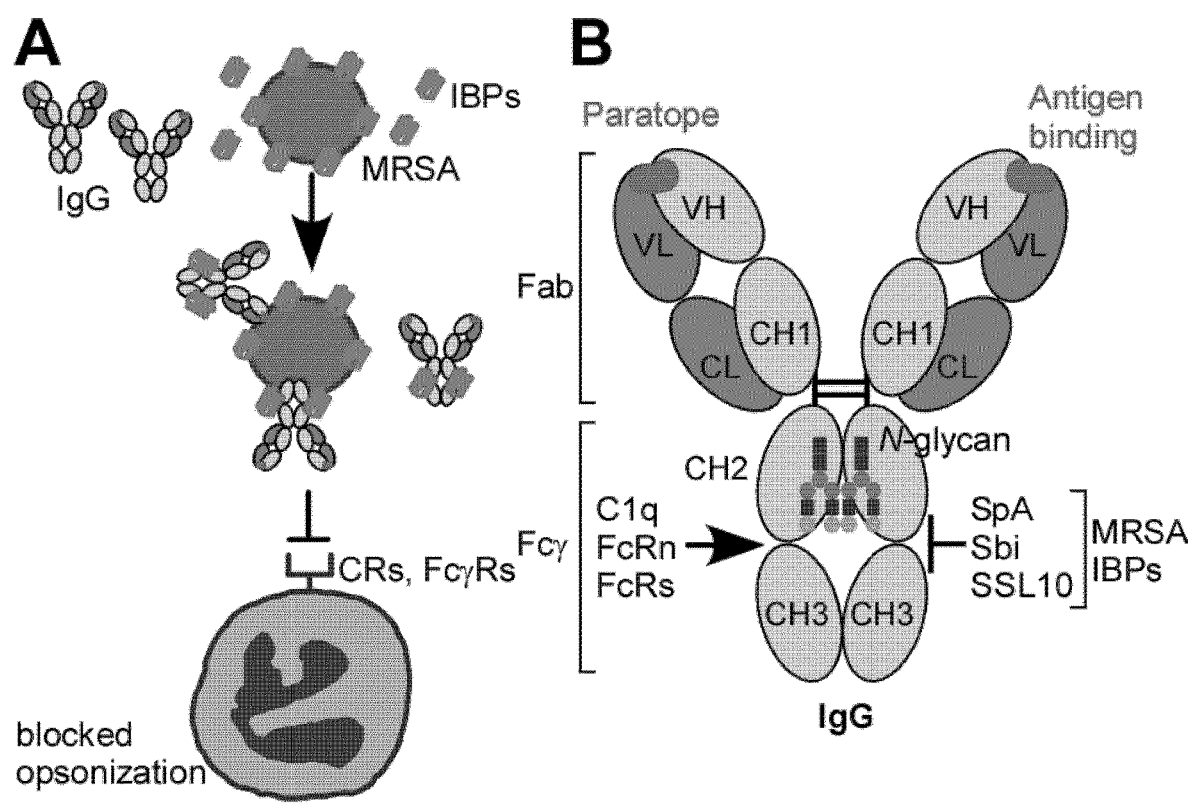
FIG. 1A-B

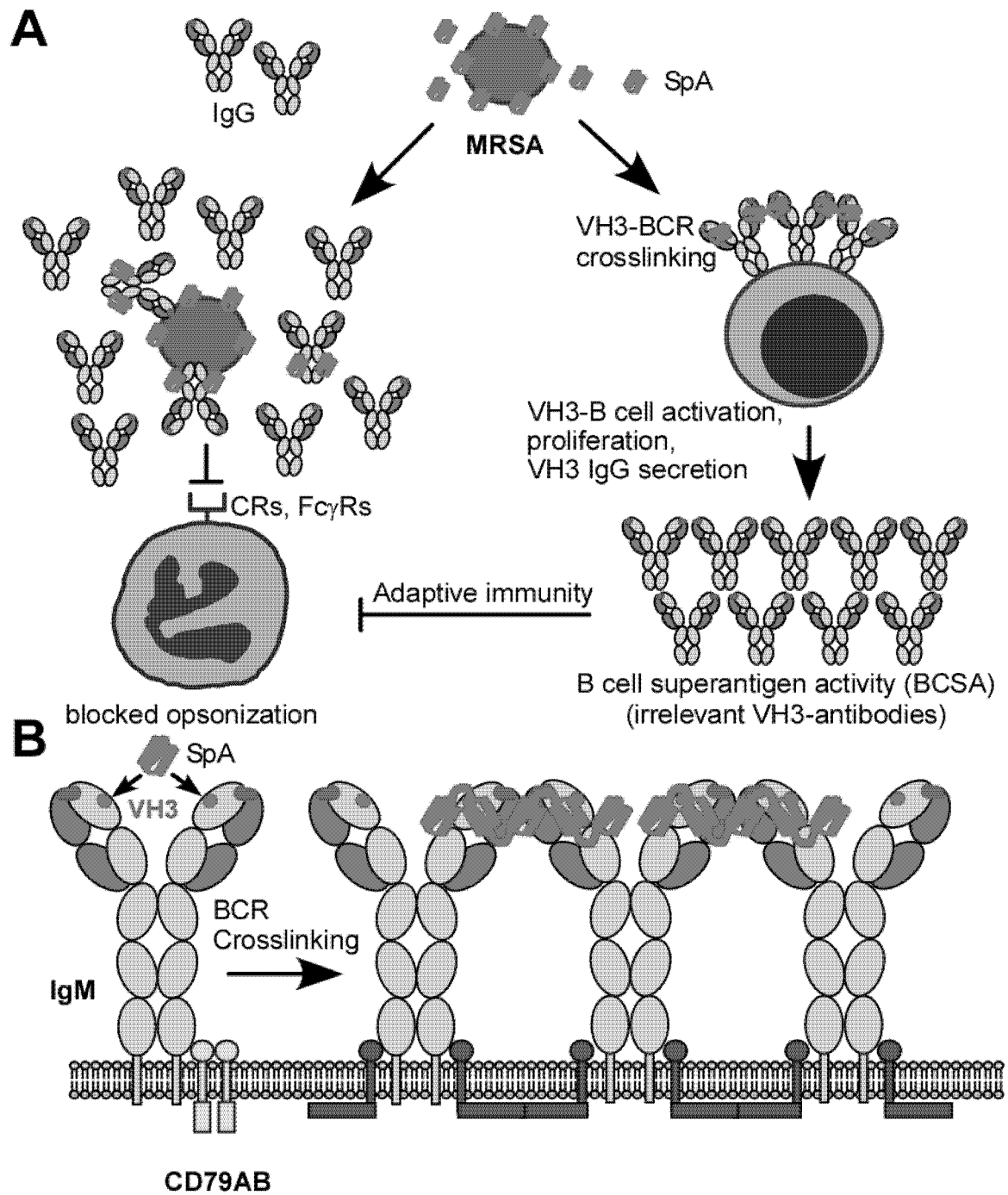
FIG. 2A-B

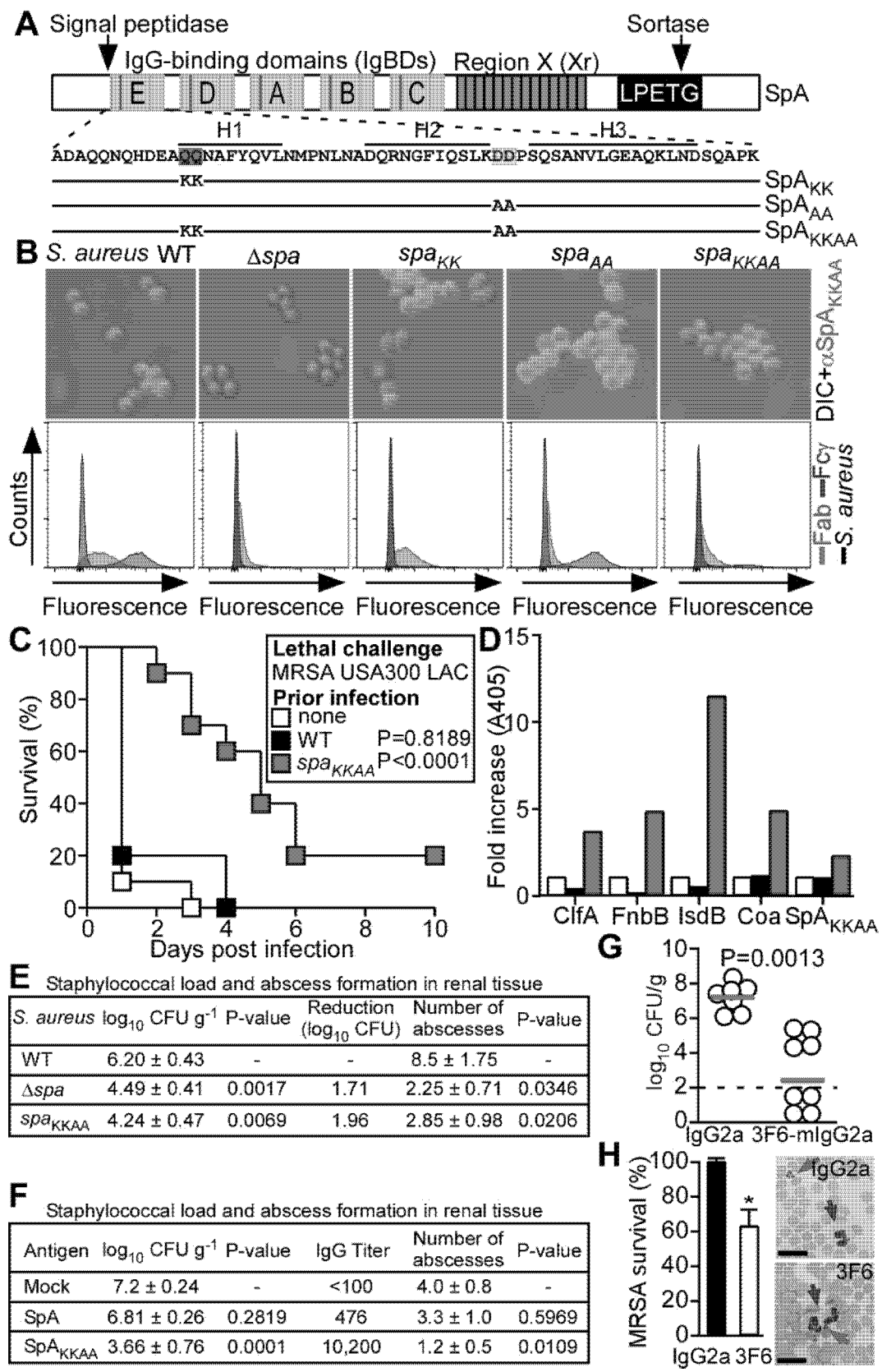
FIG. 3A-H

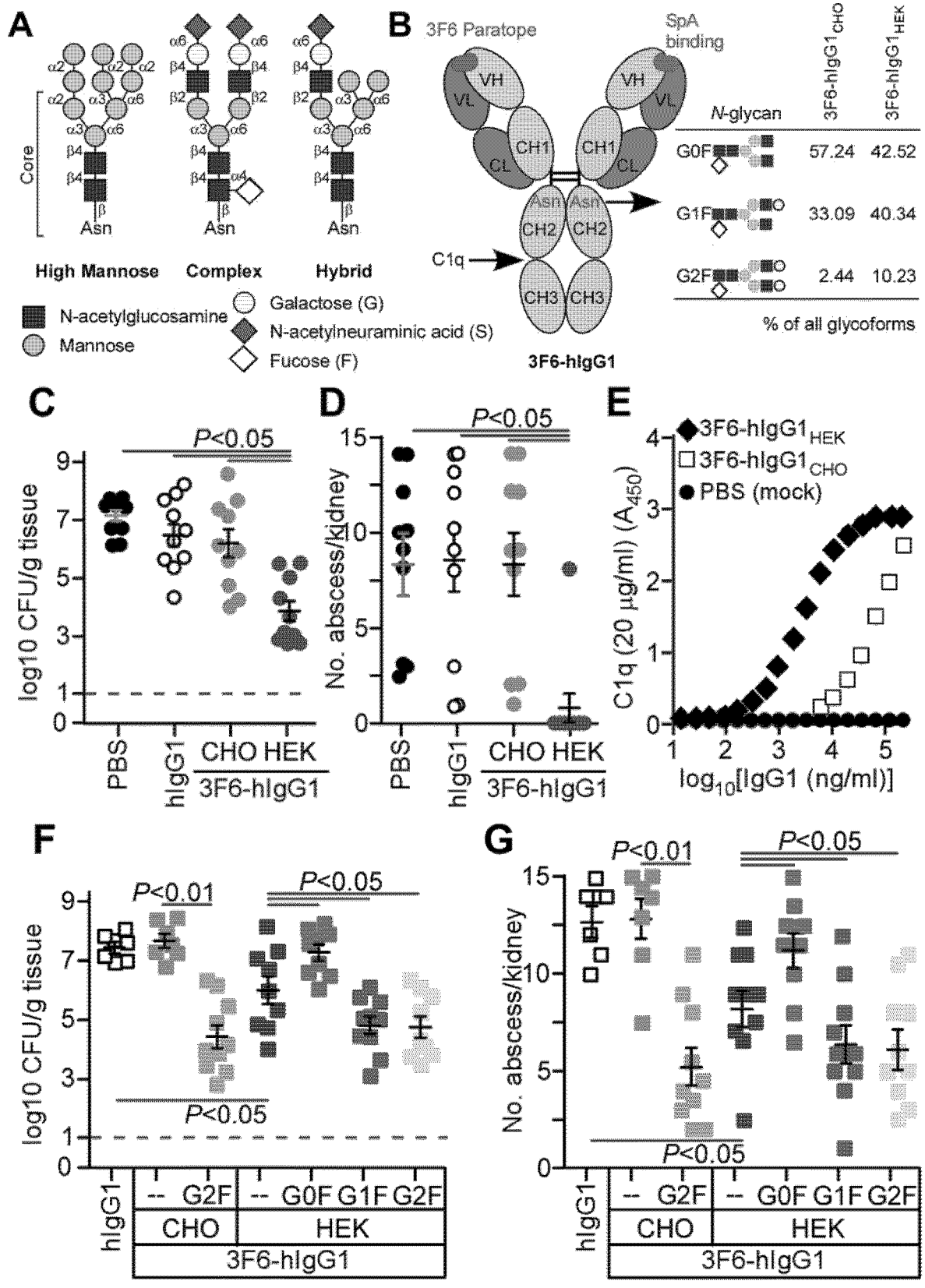
FIG. 4A-G

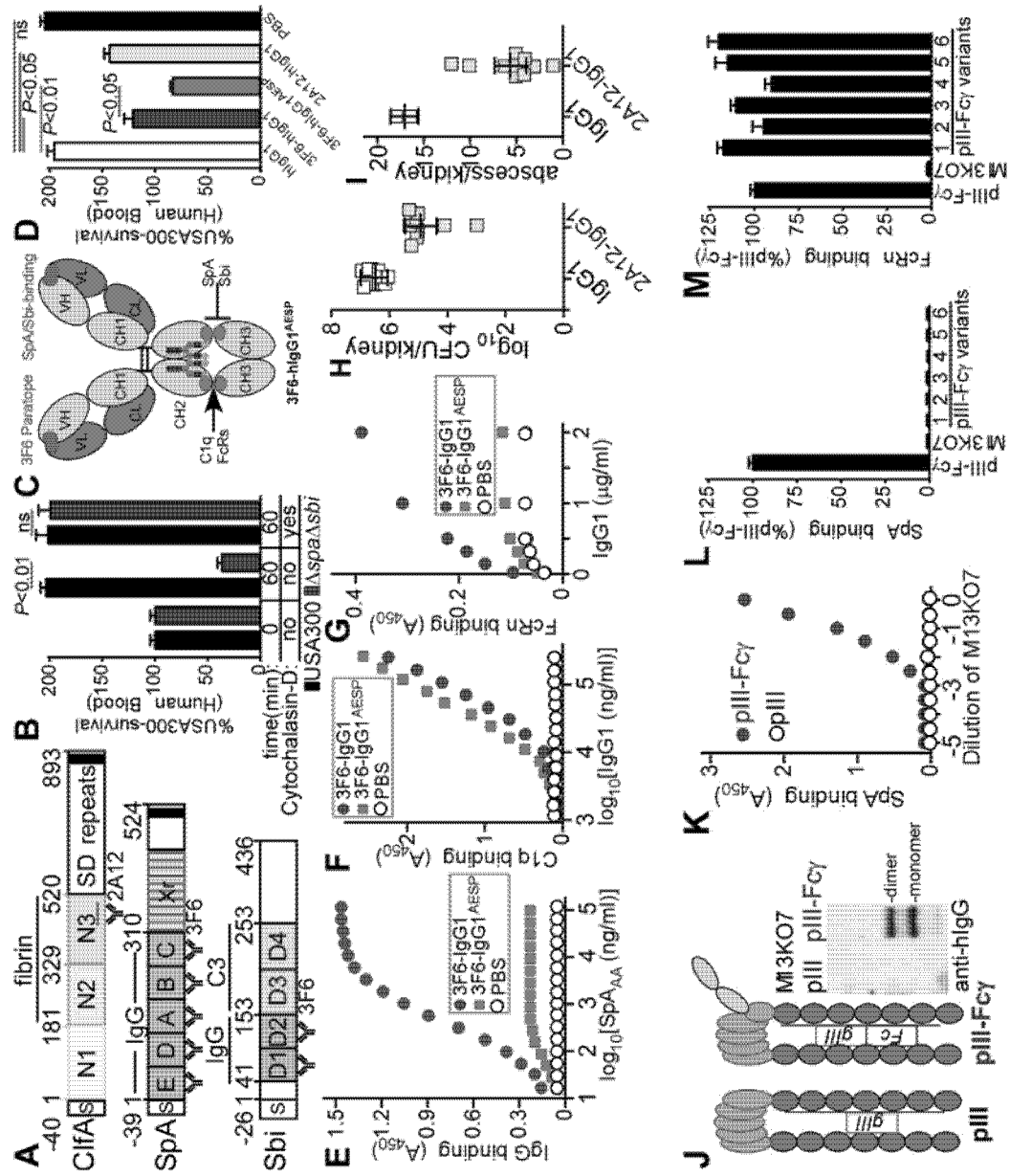
FIG. 5A-M

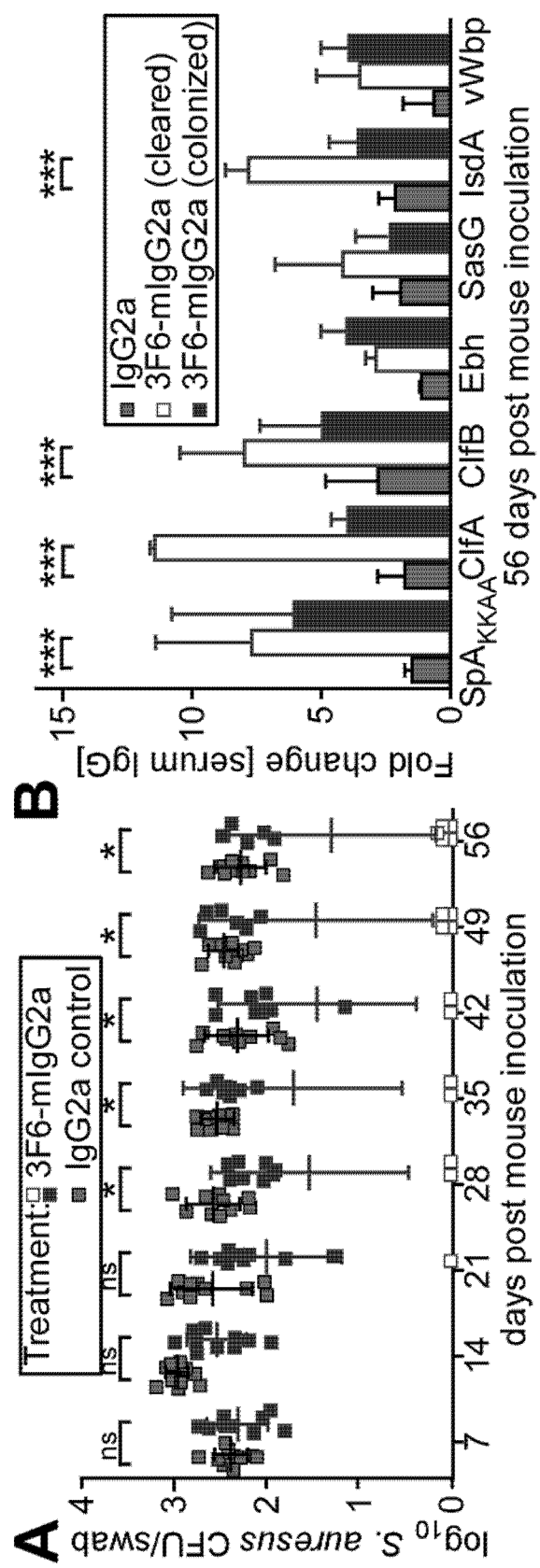
FIG. 6A-B

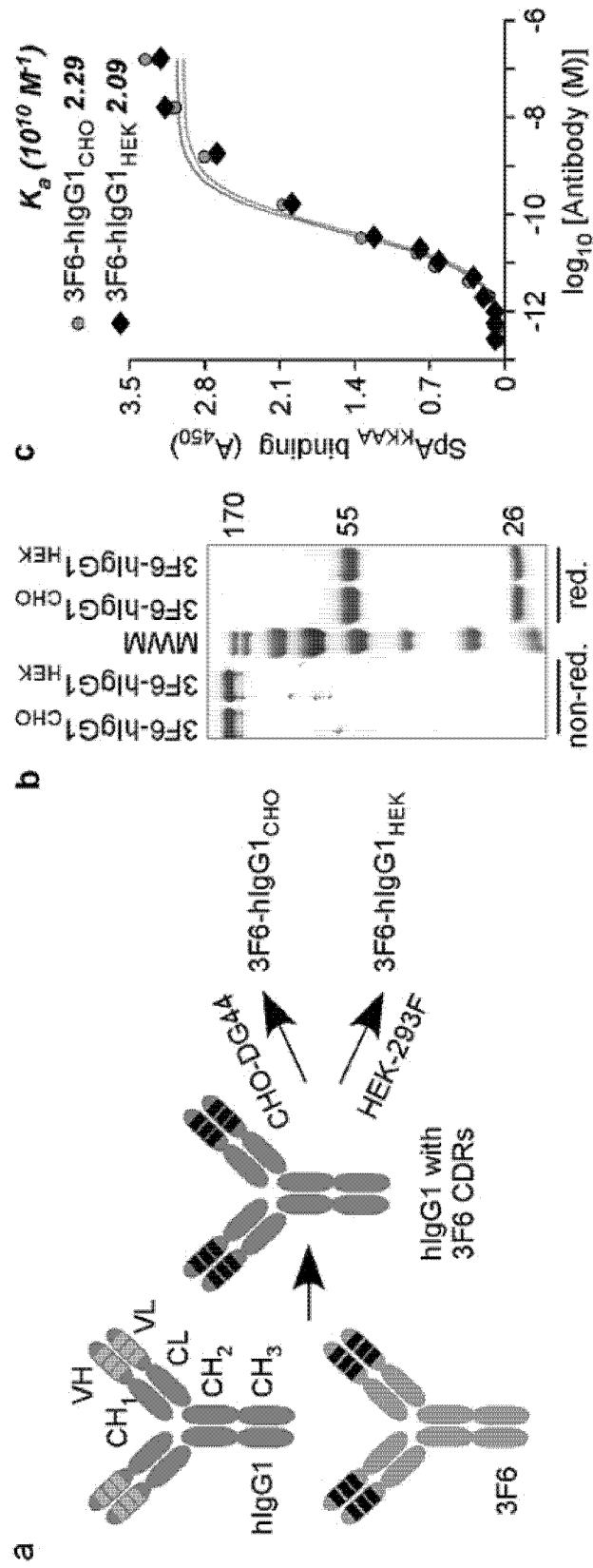
FIG. 7A-C

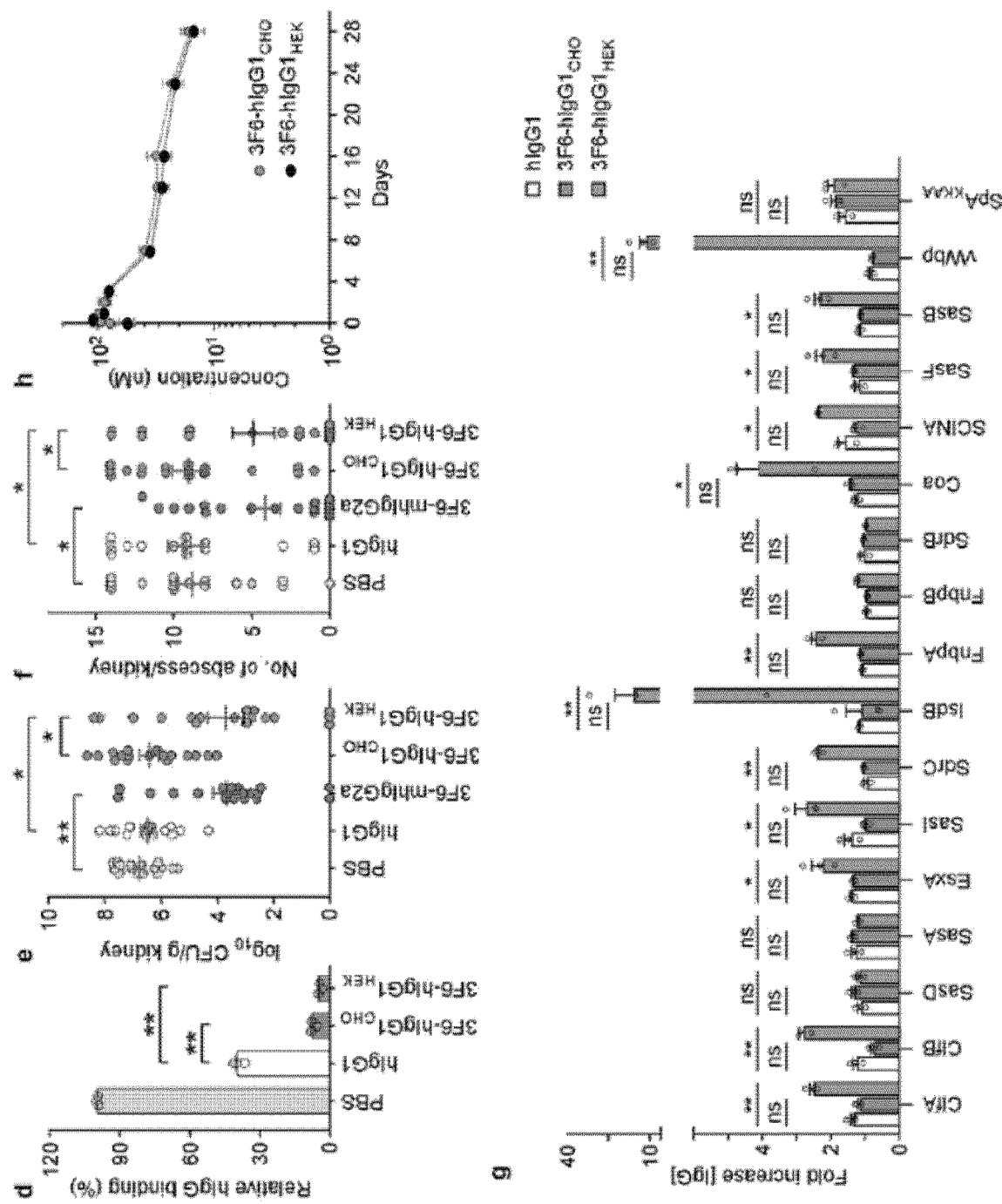
FIG. 7D-H

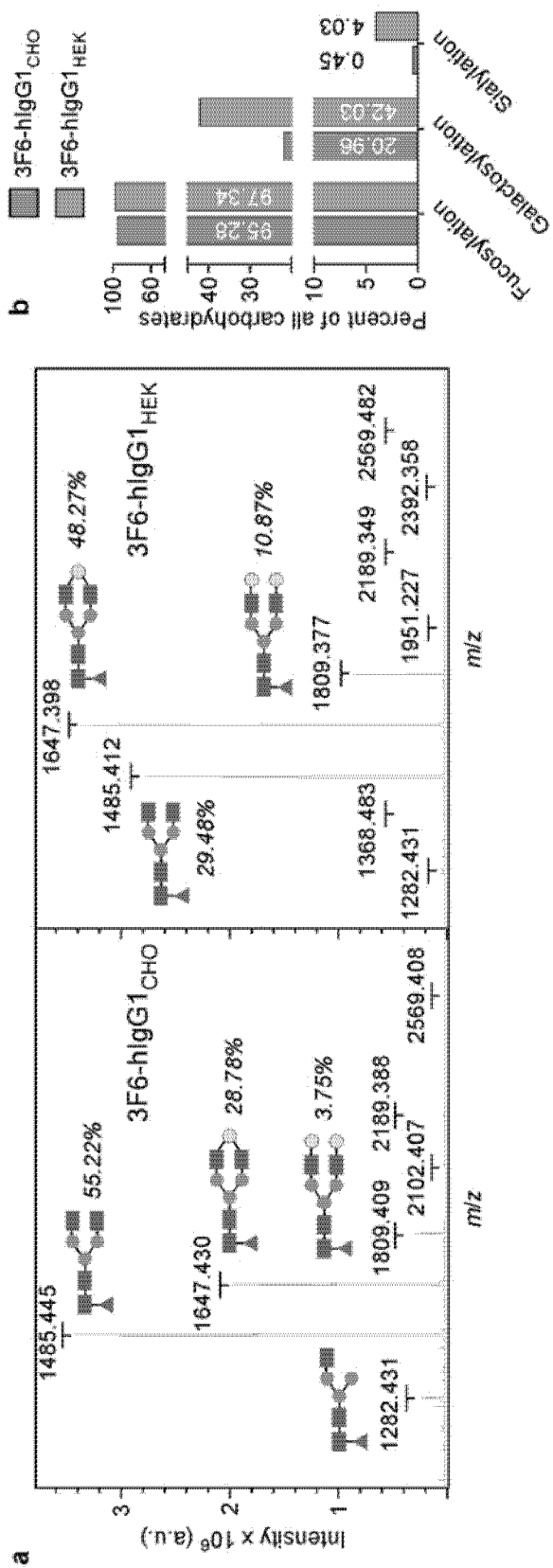
FIG. 8A-B

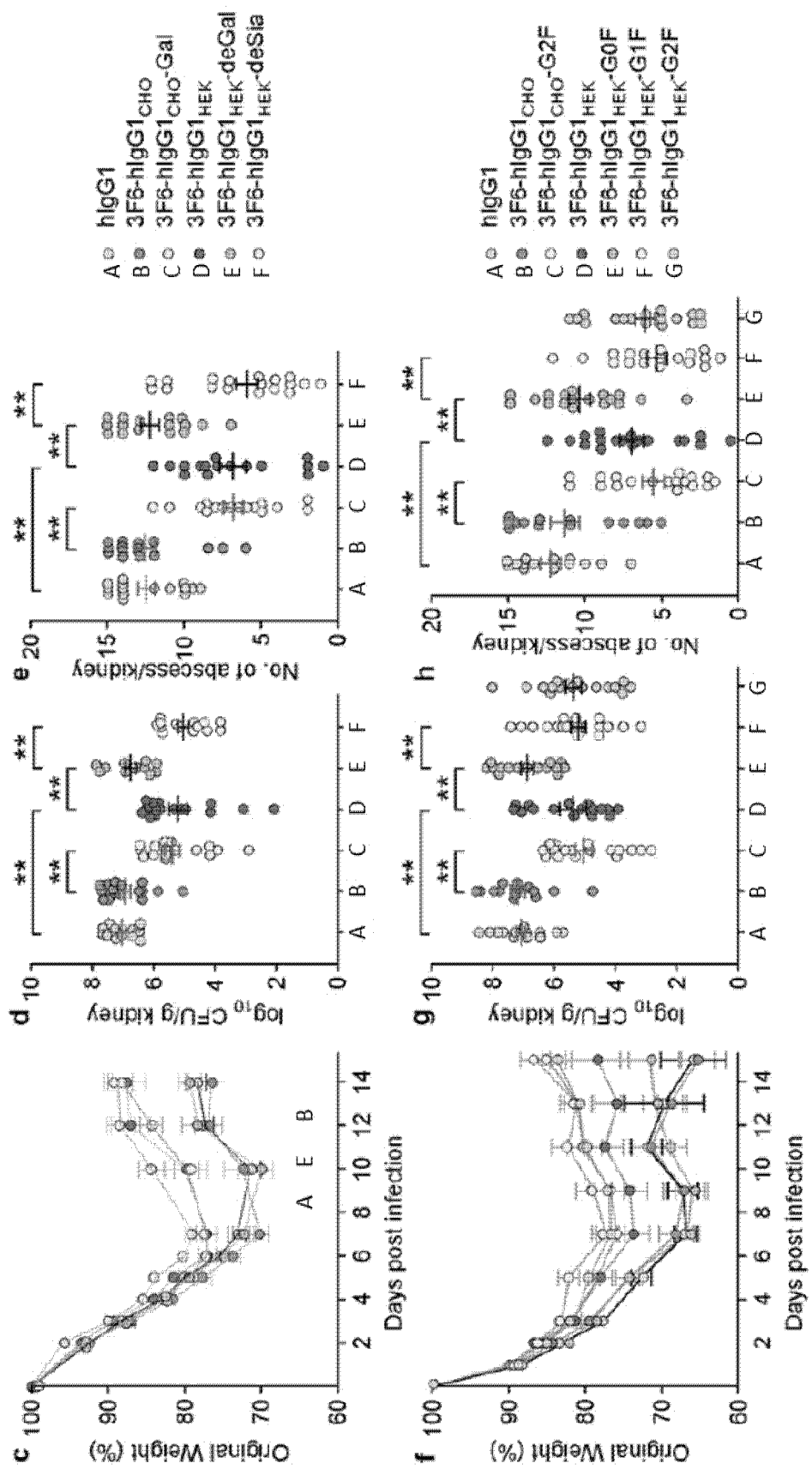
FIG. 8C-H

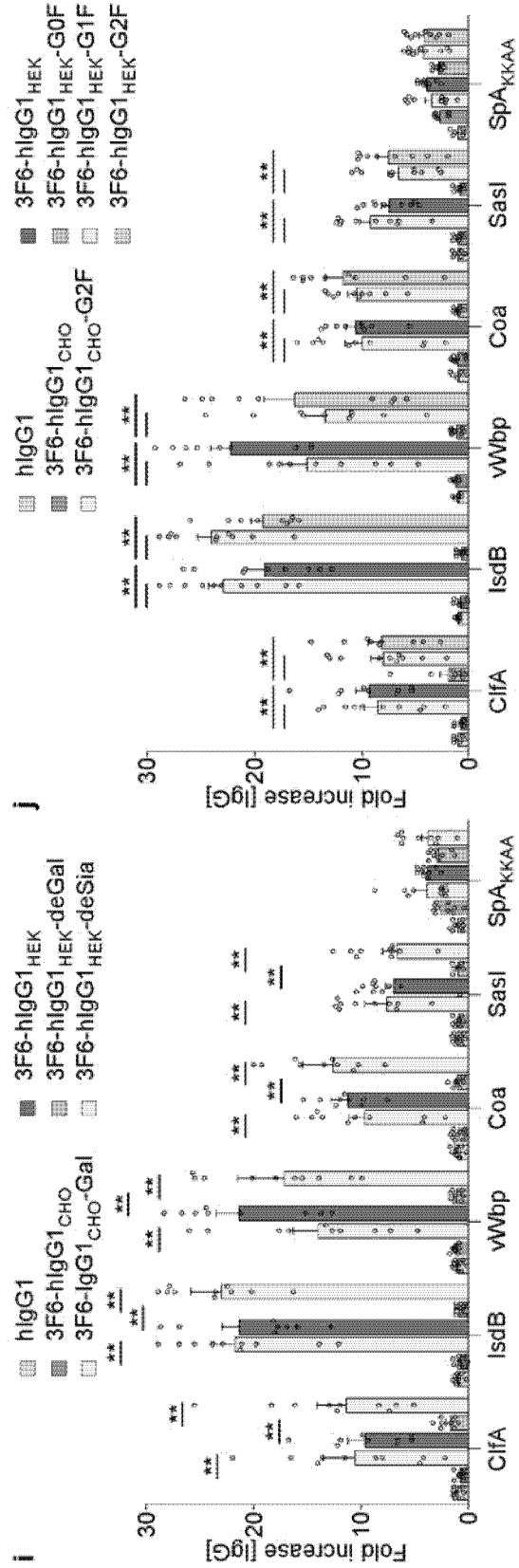
FIG. 8I-J

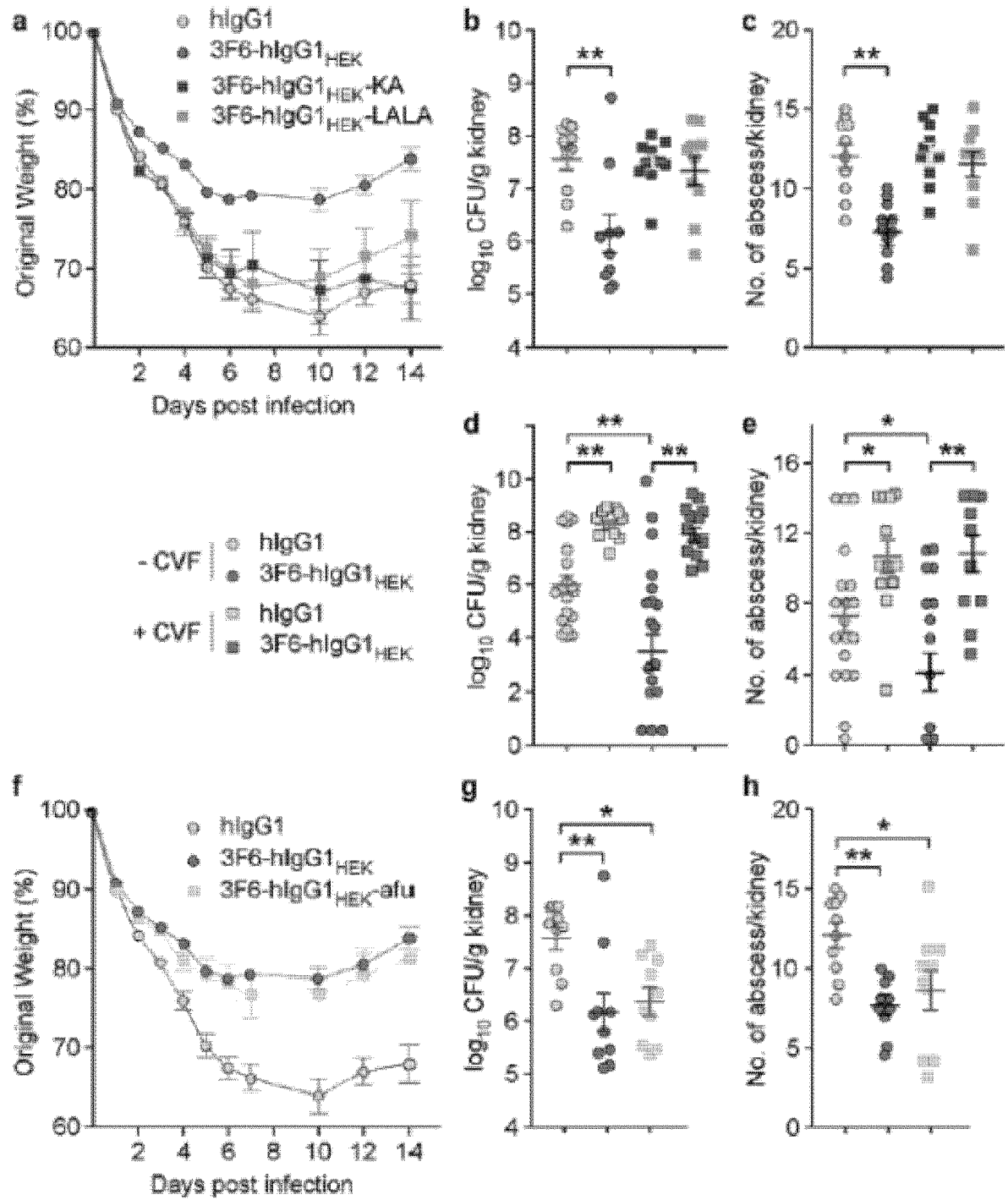
FIG. 9A-H

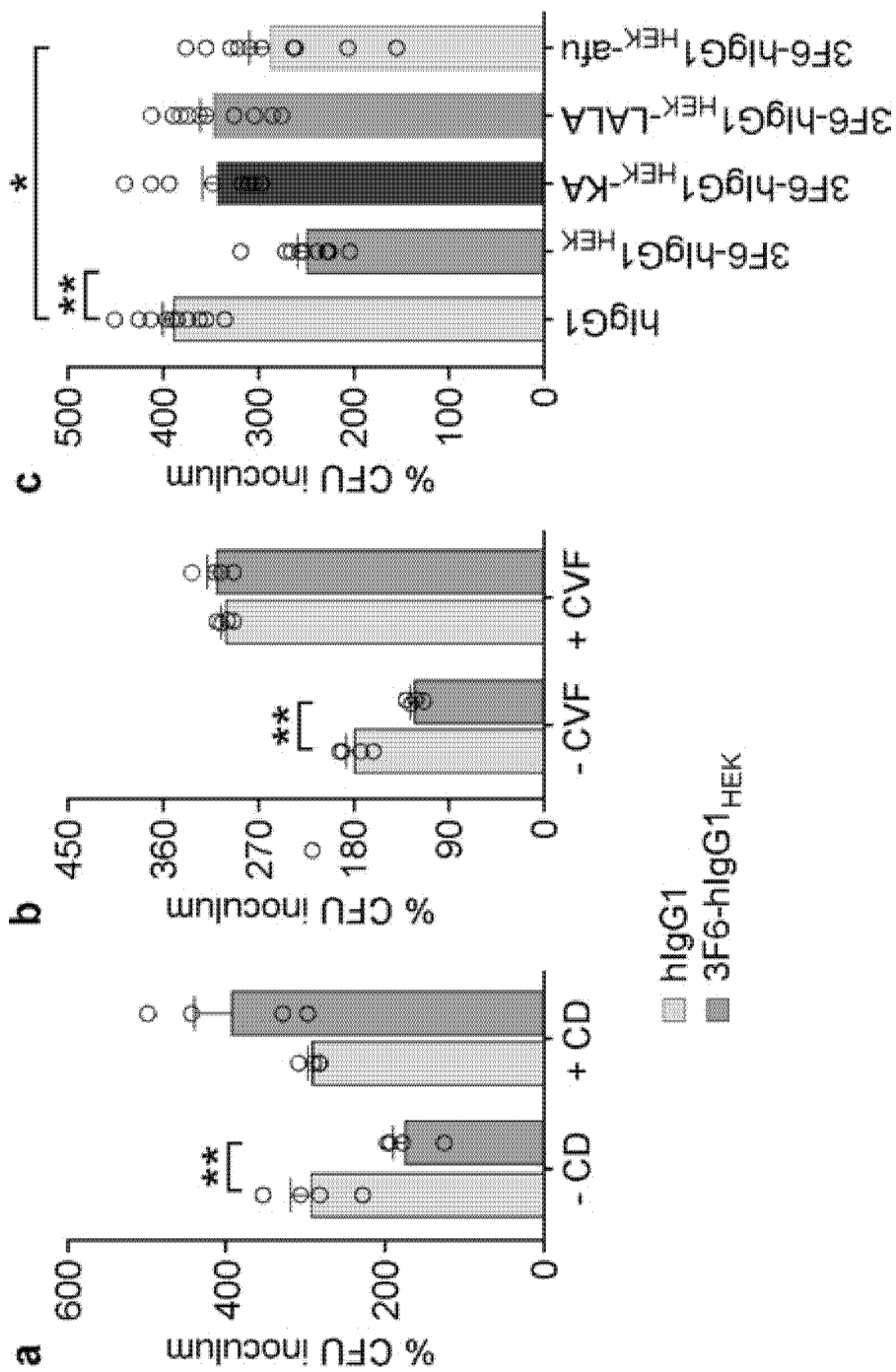
FIG. 10A-C

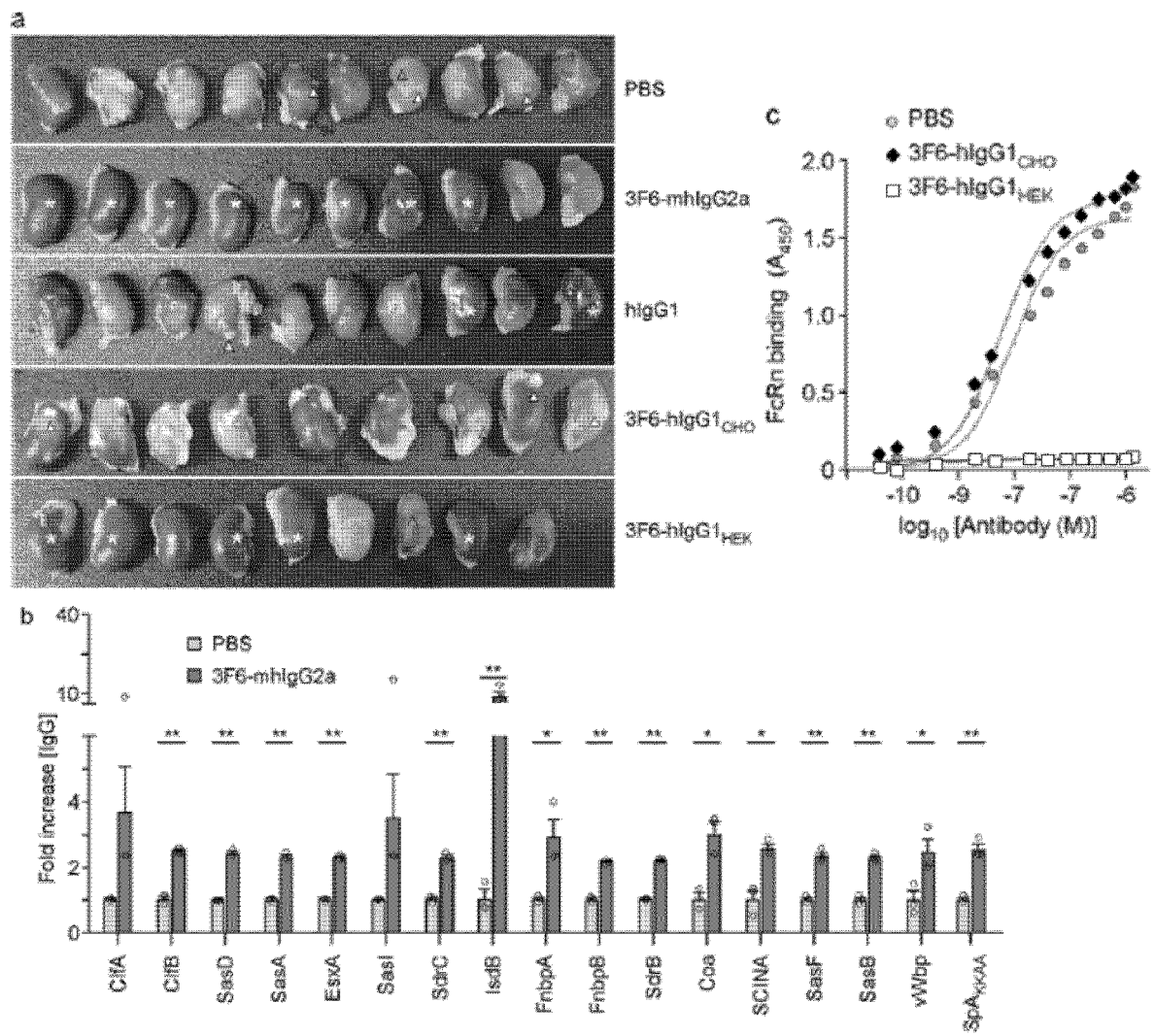
FIG. 11A-C

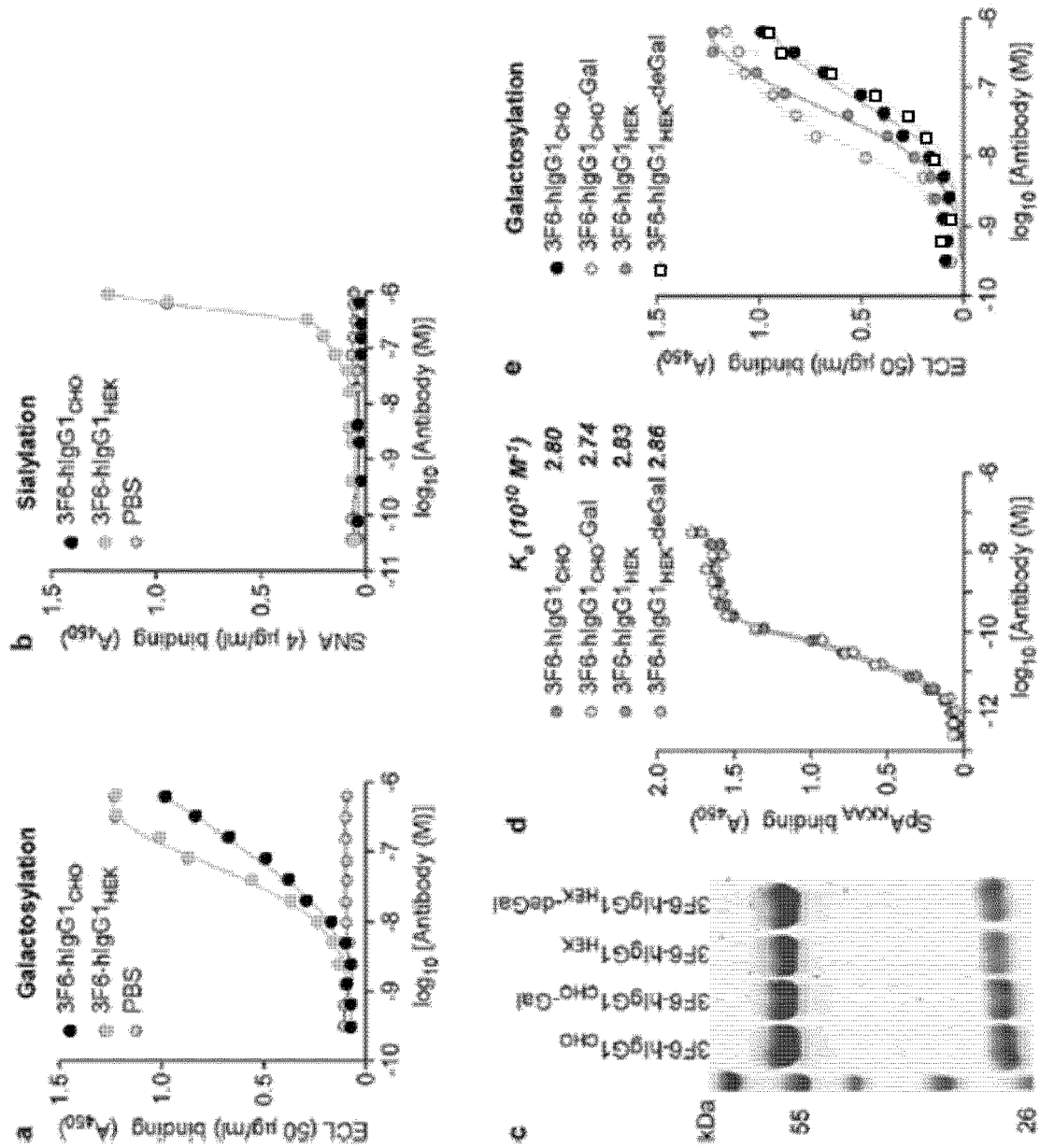
FIG. 12A-E

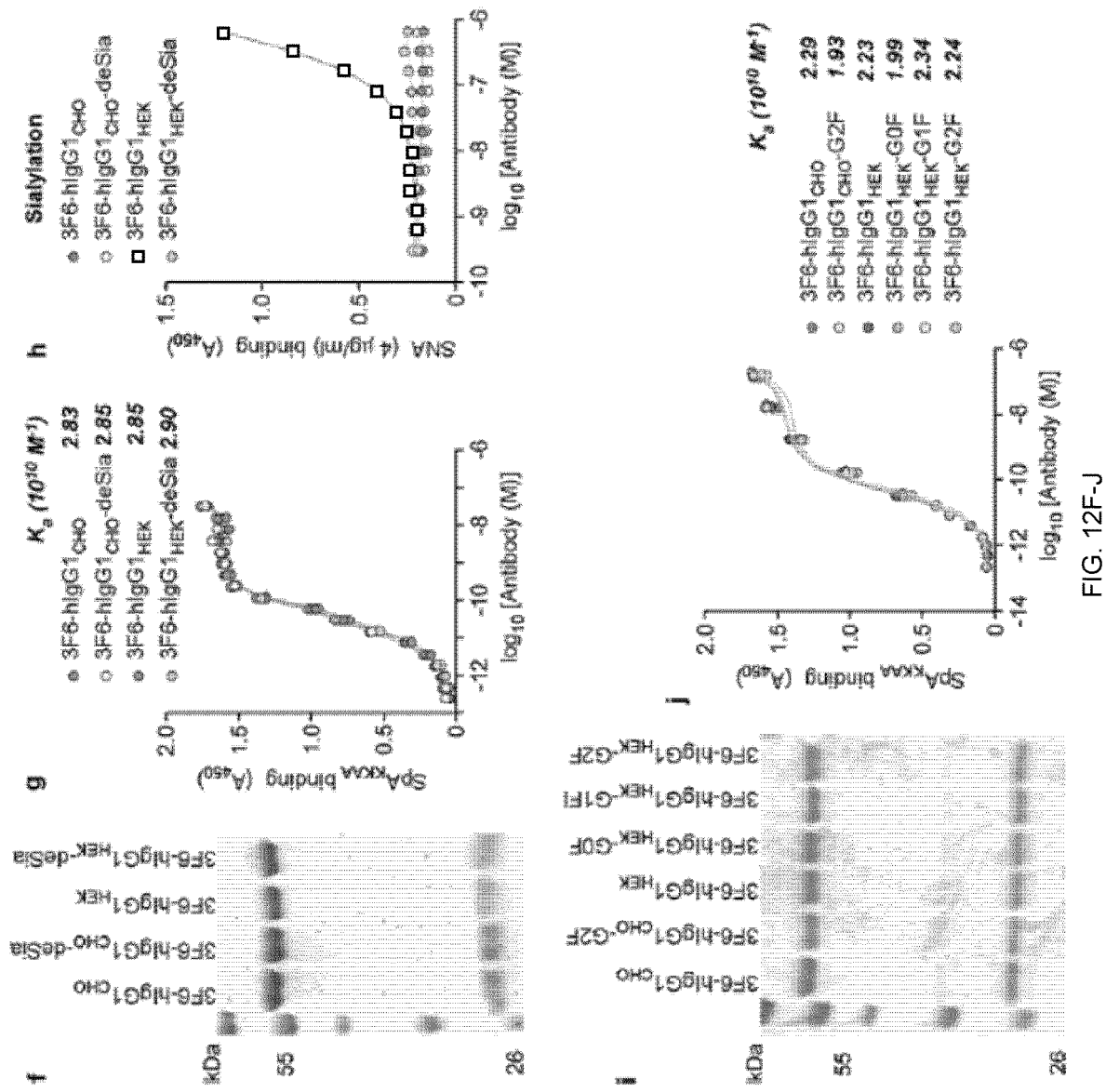
FIG. 12F-J

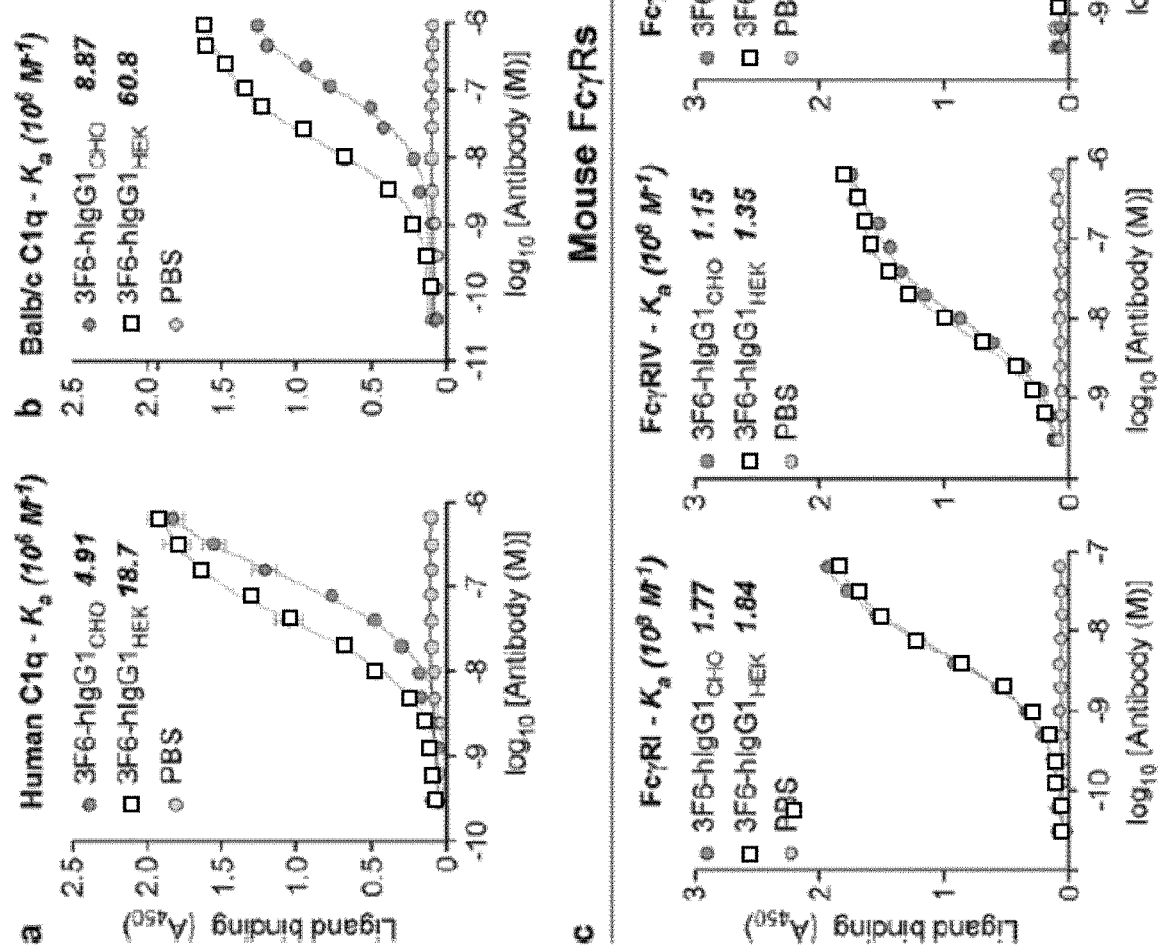
FIG. 13A-C

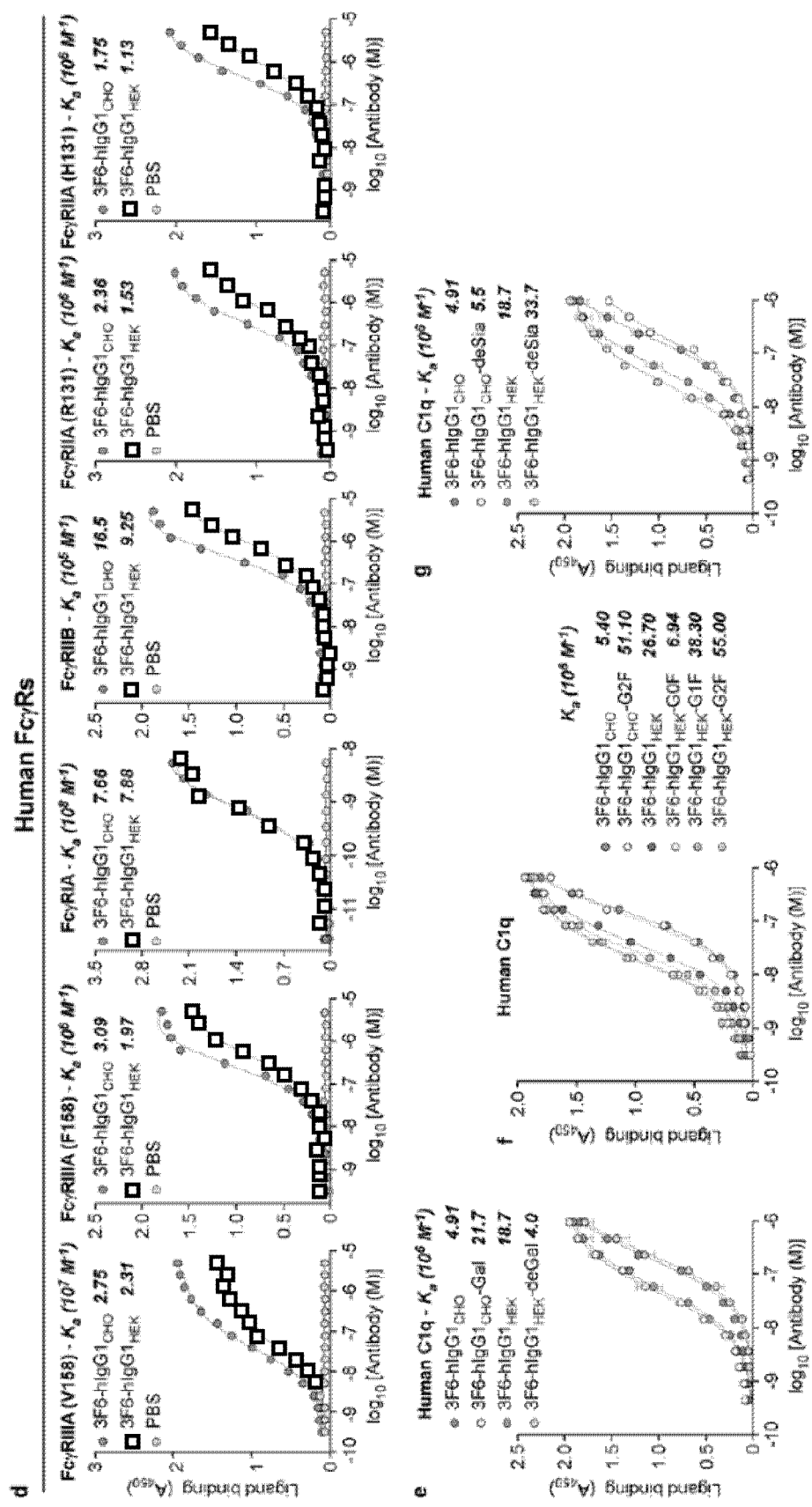
FIG. 13D-G

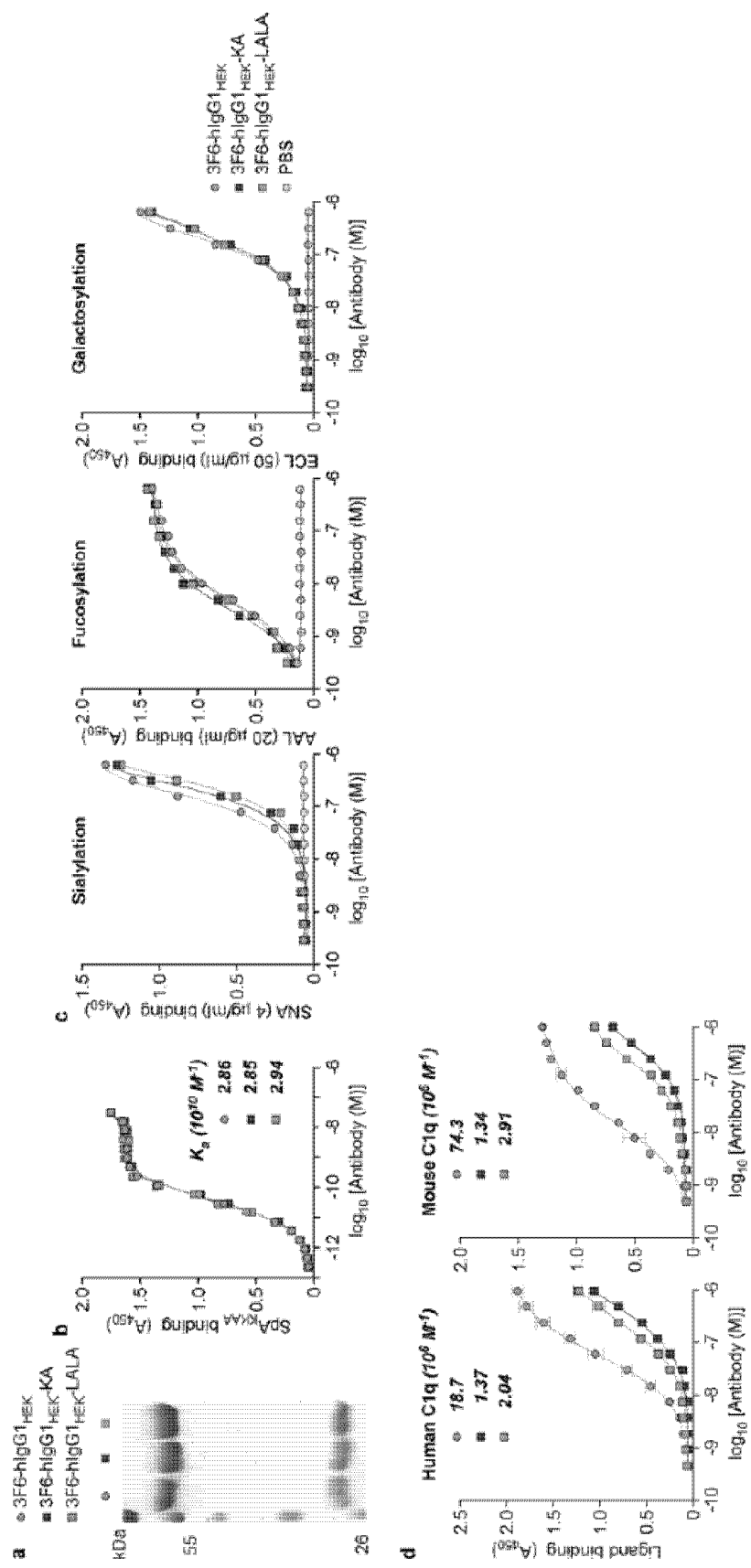
FIG. 14A-D

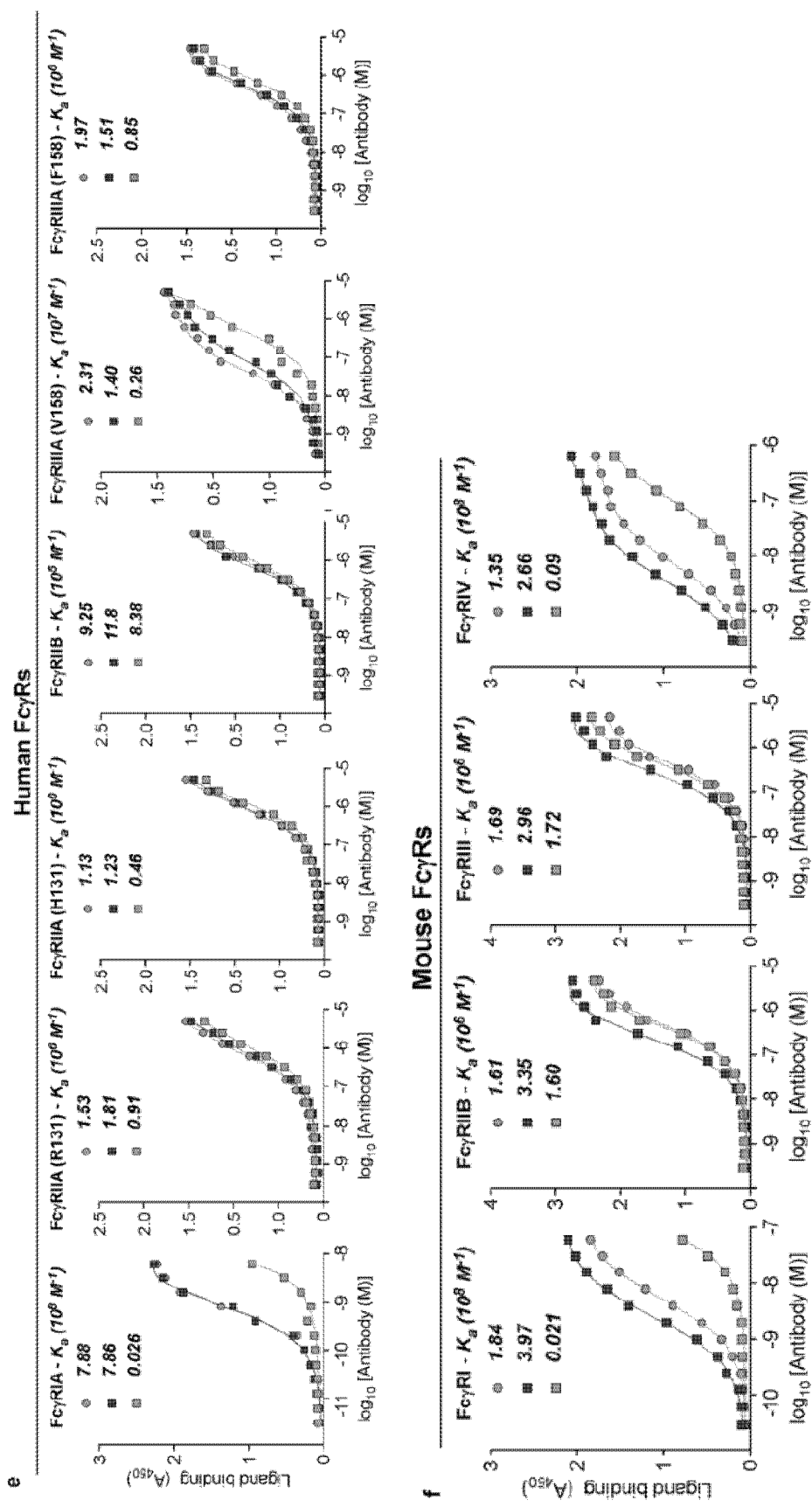
FIG. 14E-F

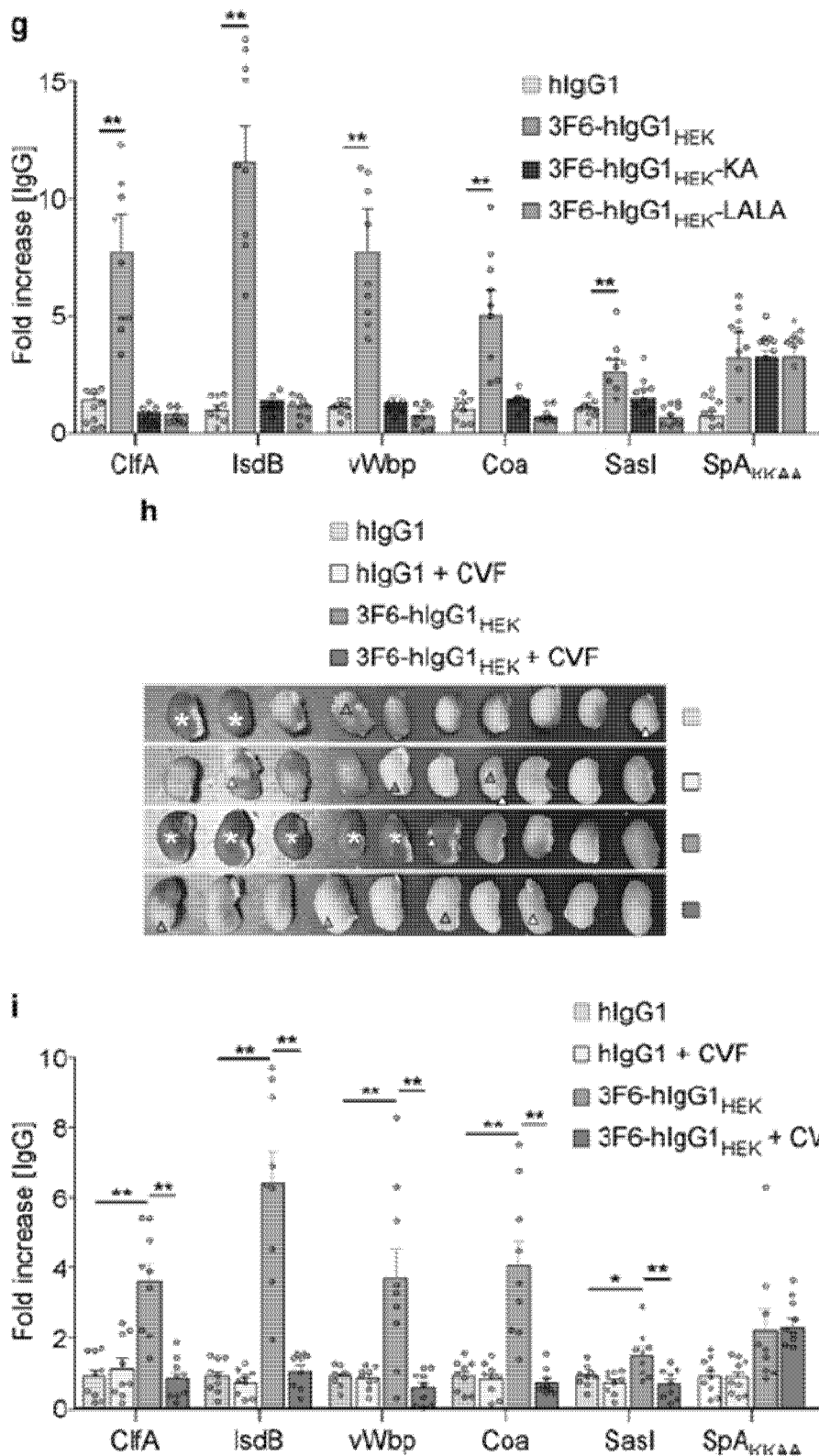
FIG. 14G-I

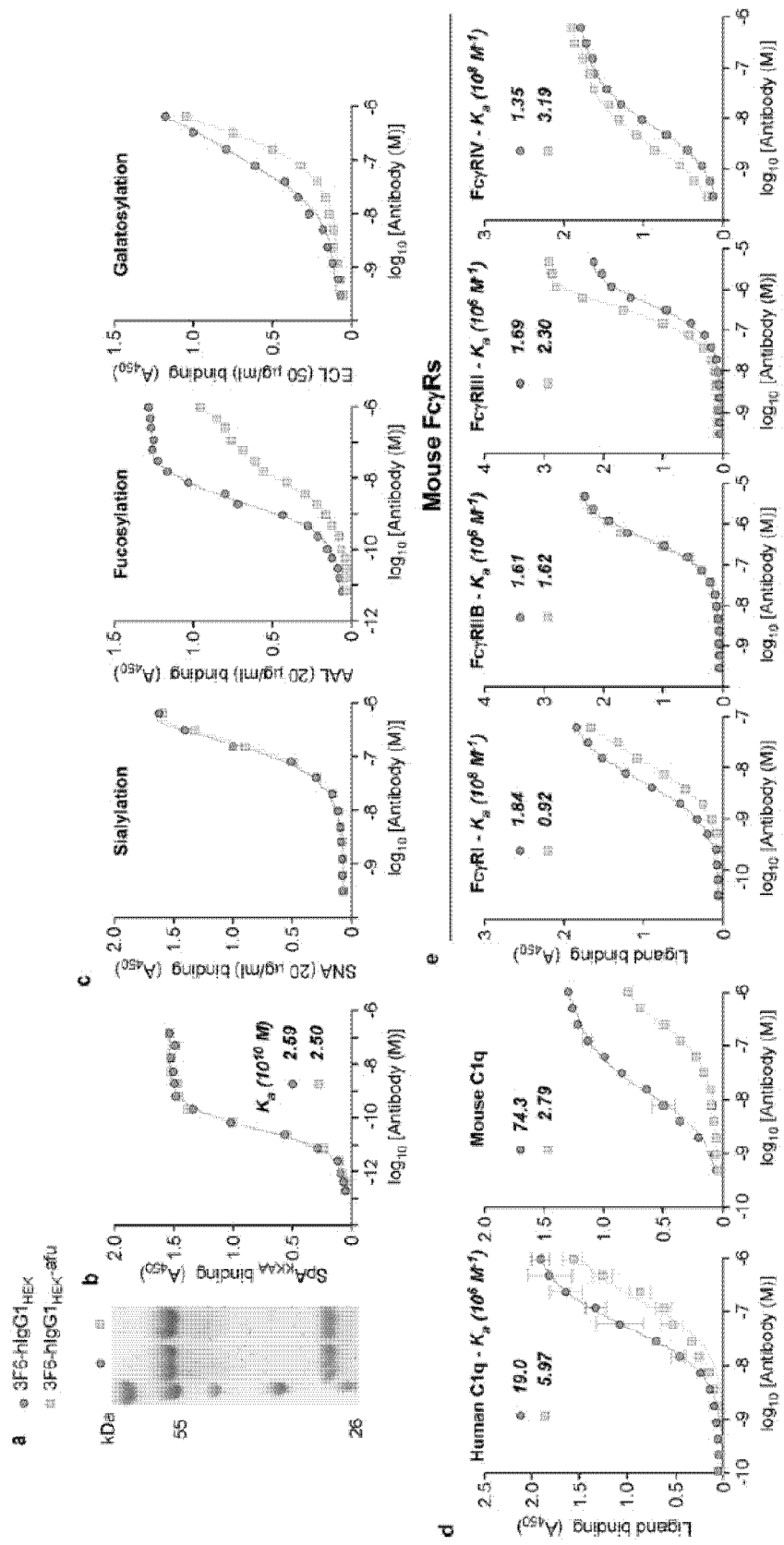
FIG. 15A-E

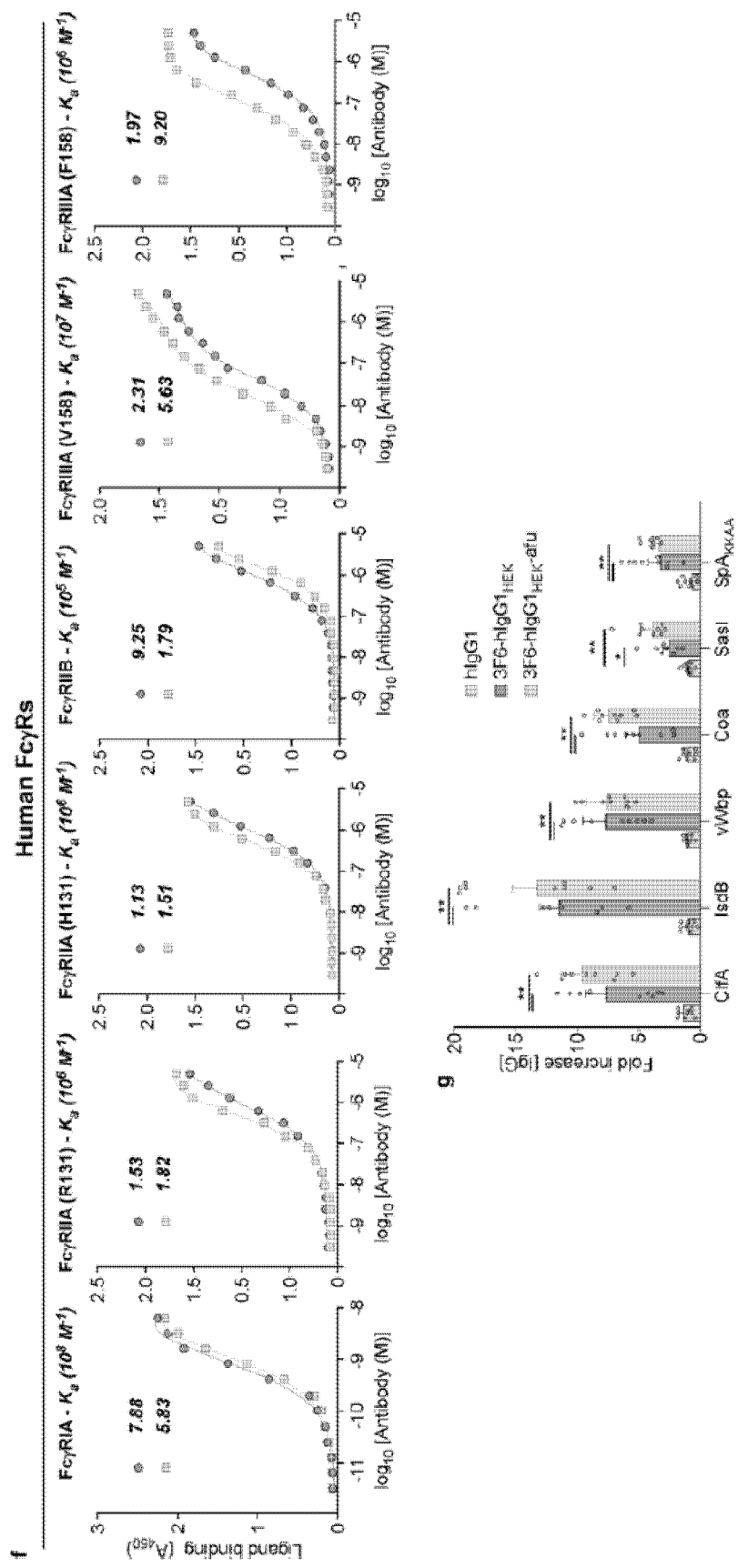
FIG. 15F-G

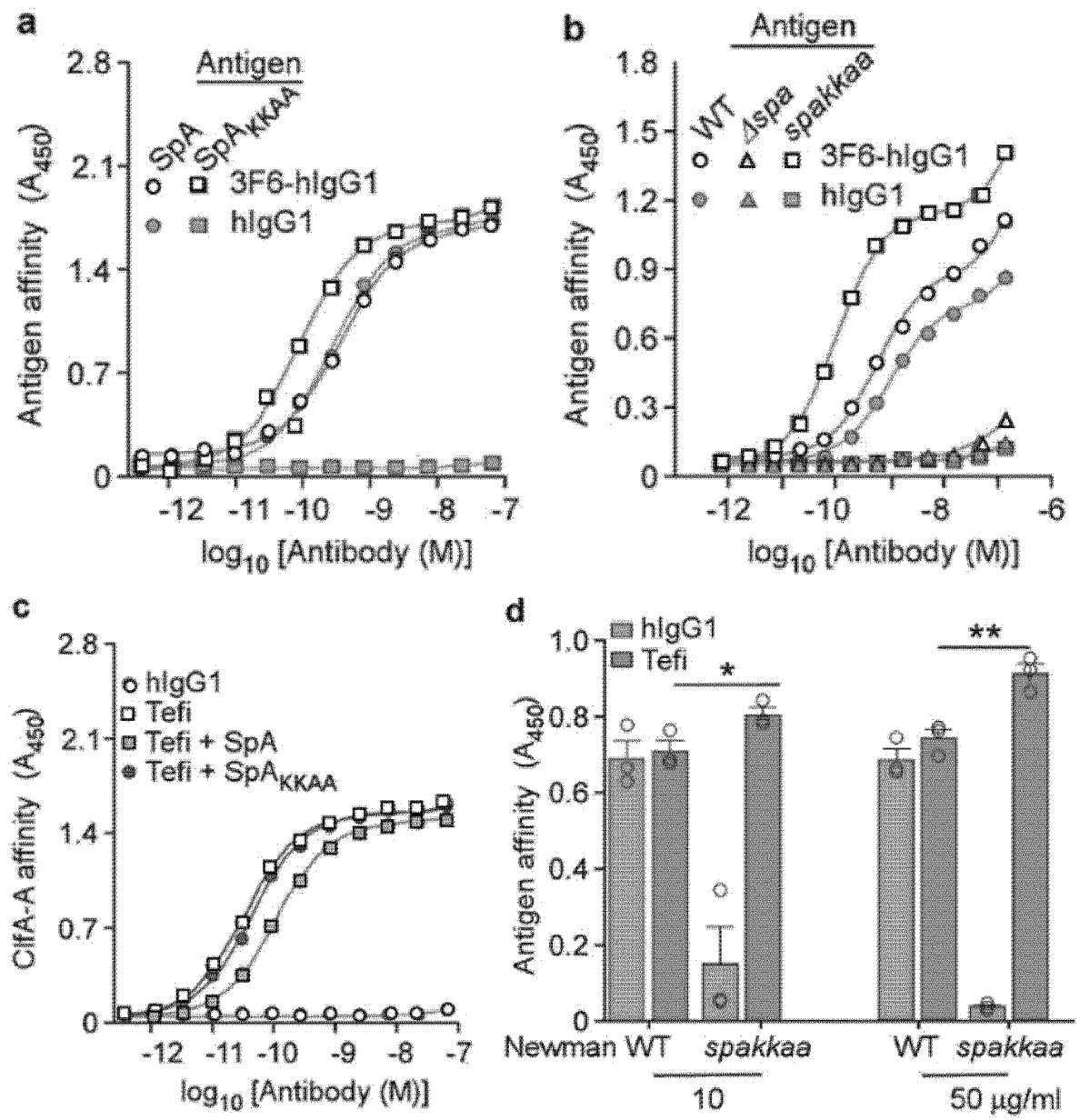
FIG. 17A-D

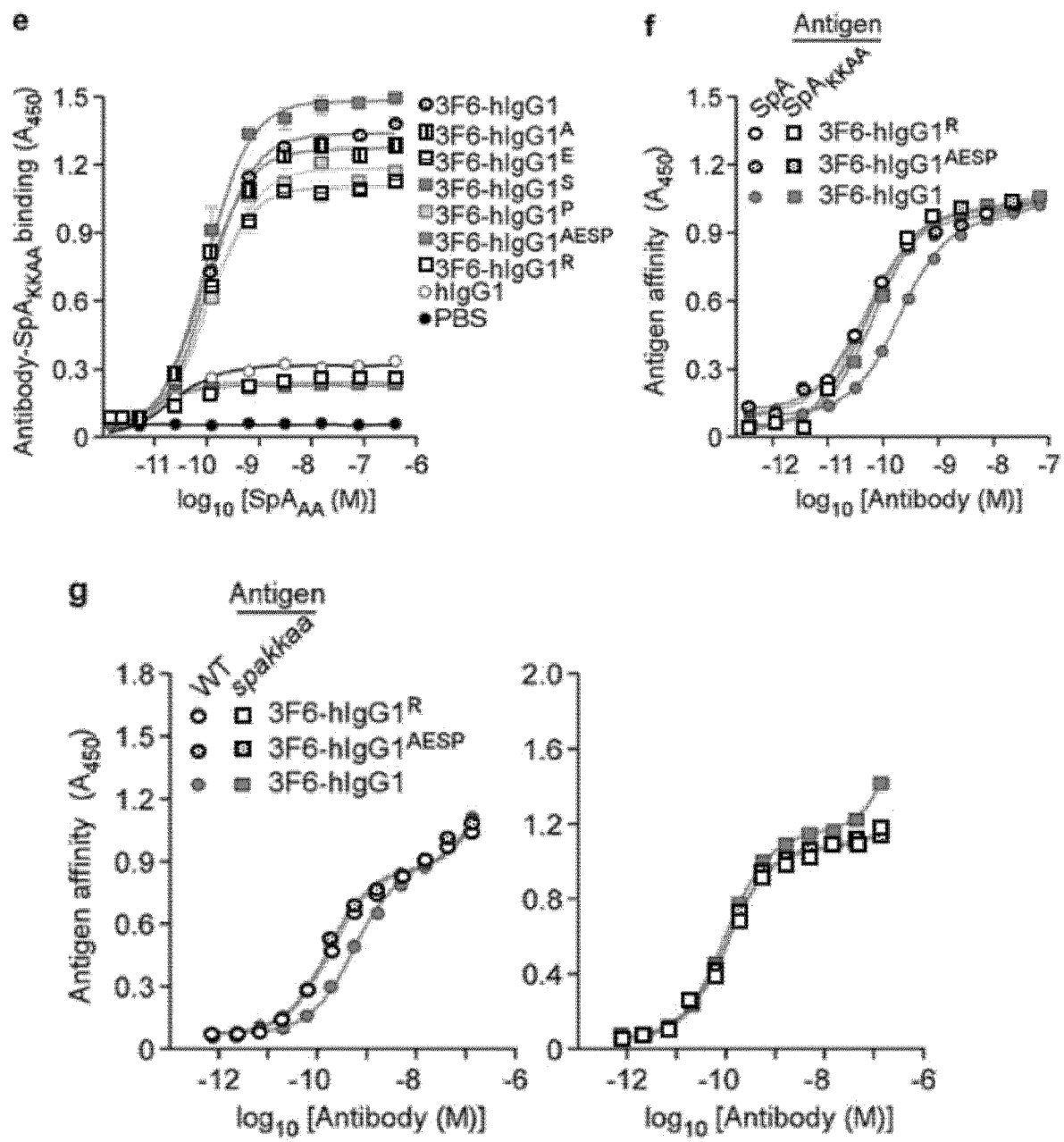
FIG. 17E-G

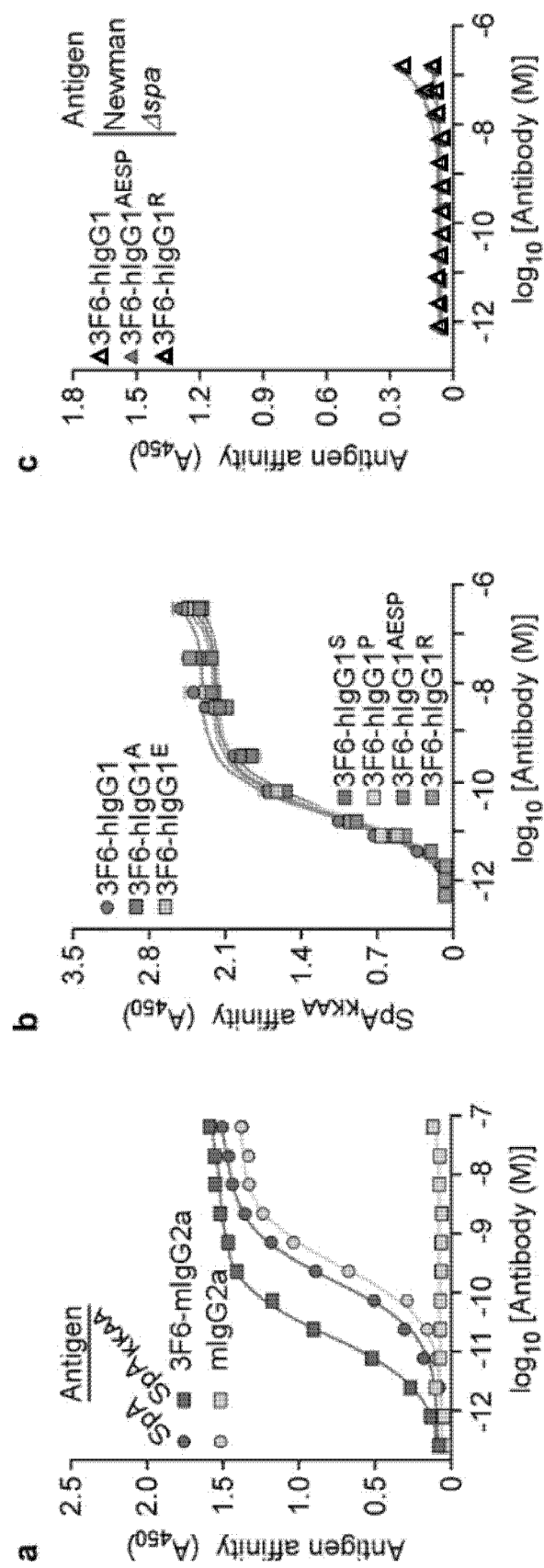
FIG. 18A-C

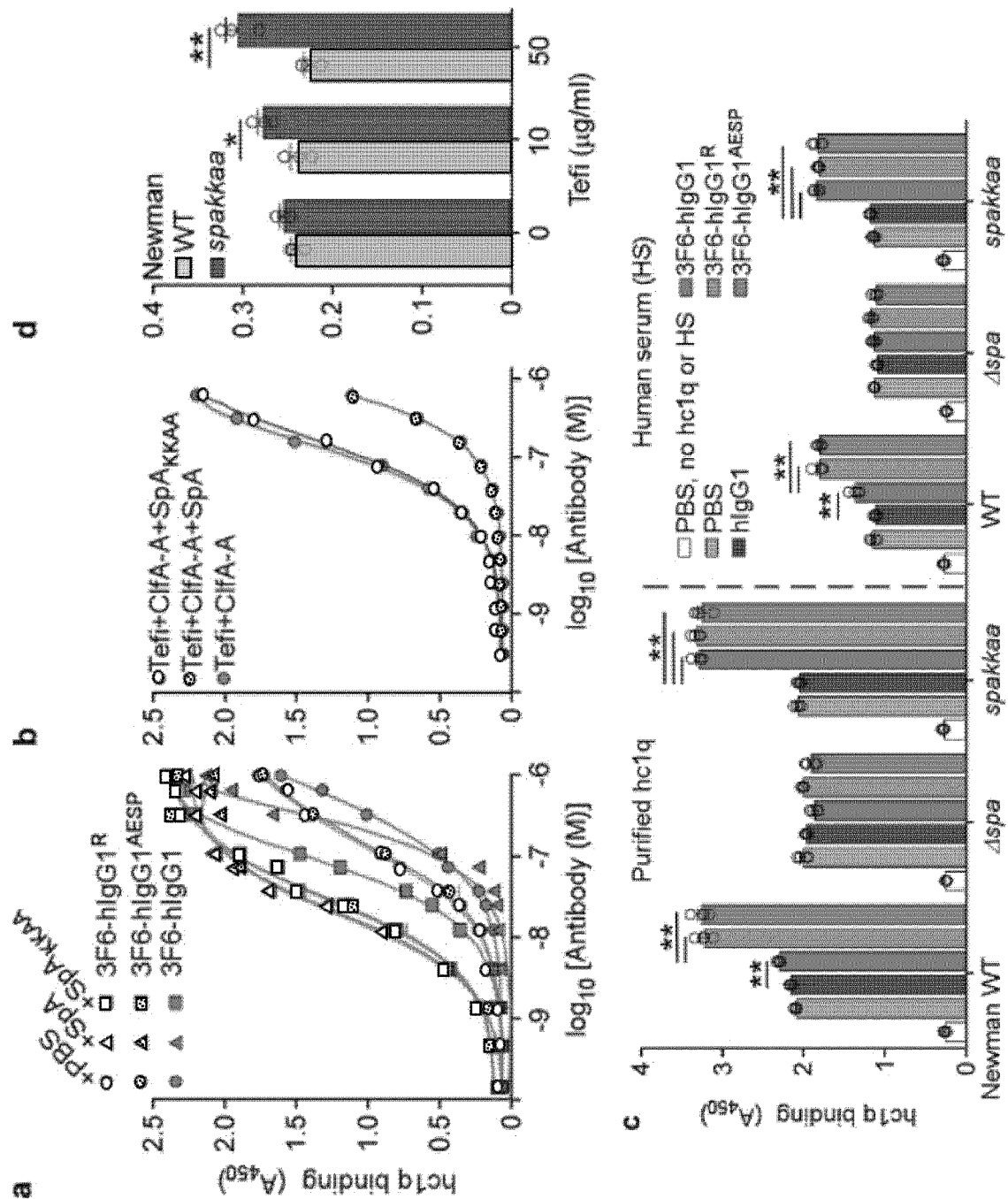
FIG. 19A-D

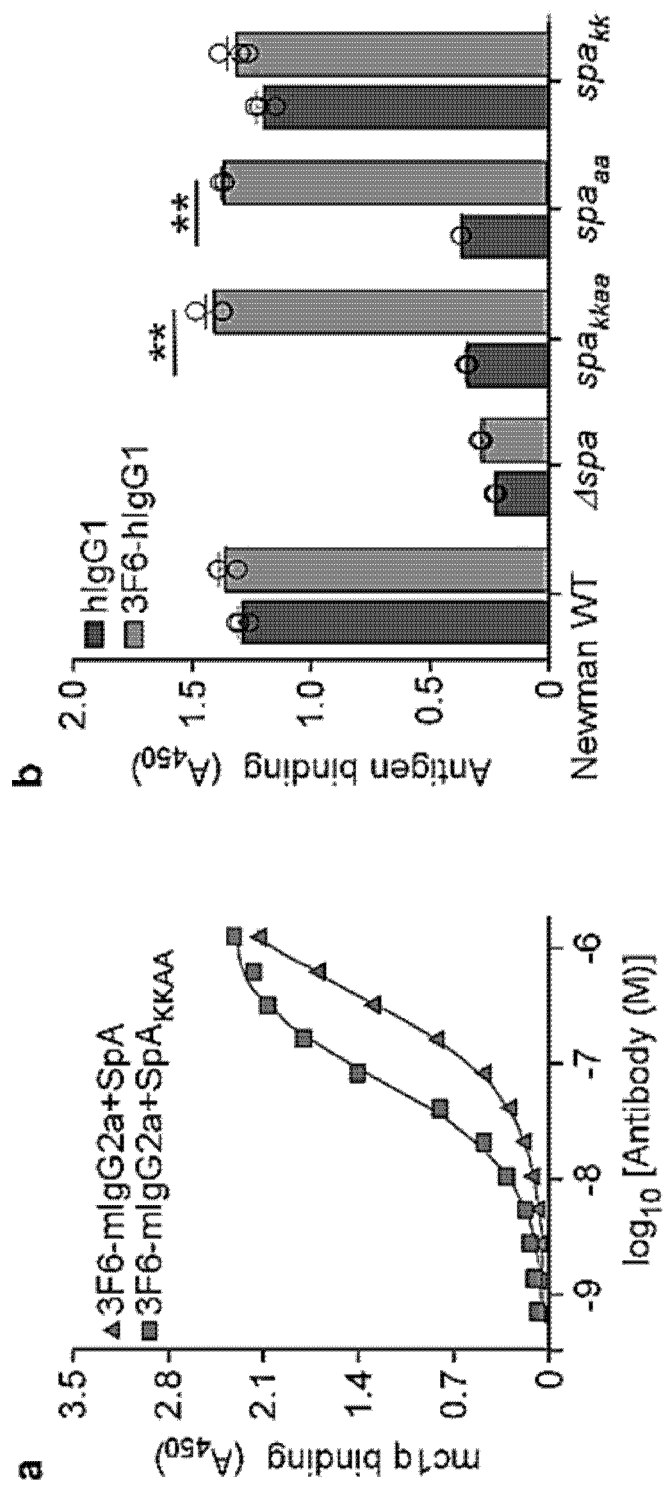
FIG. 20A-B

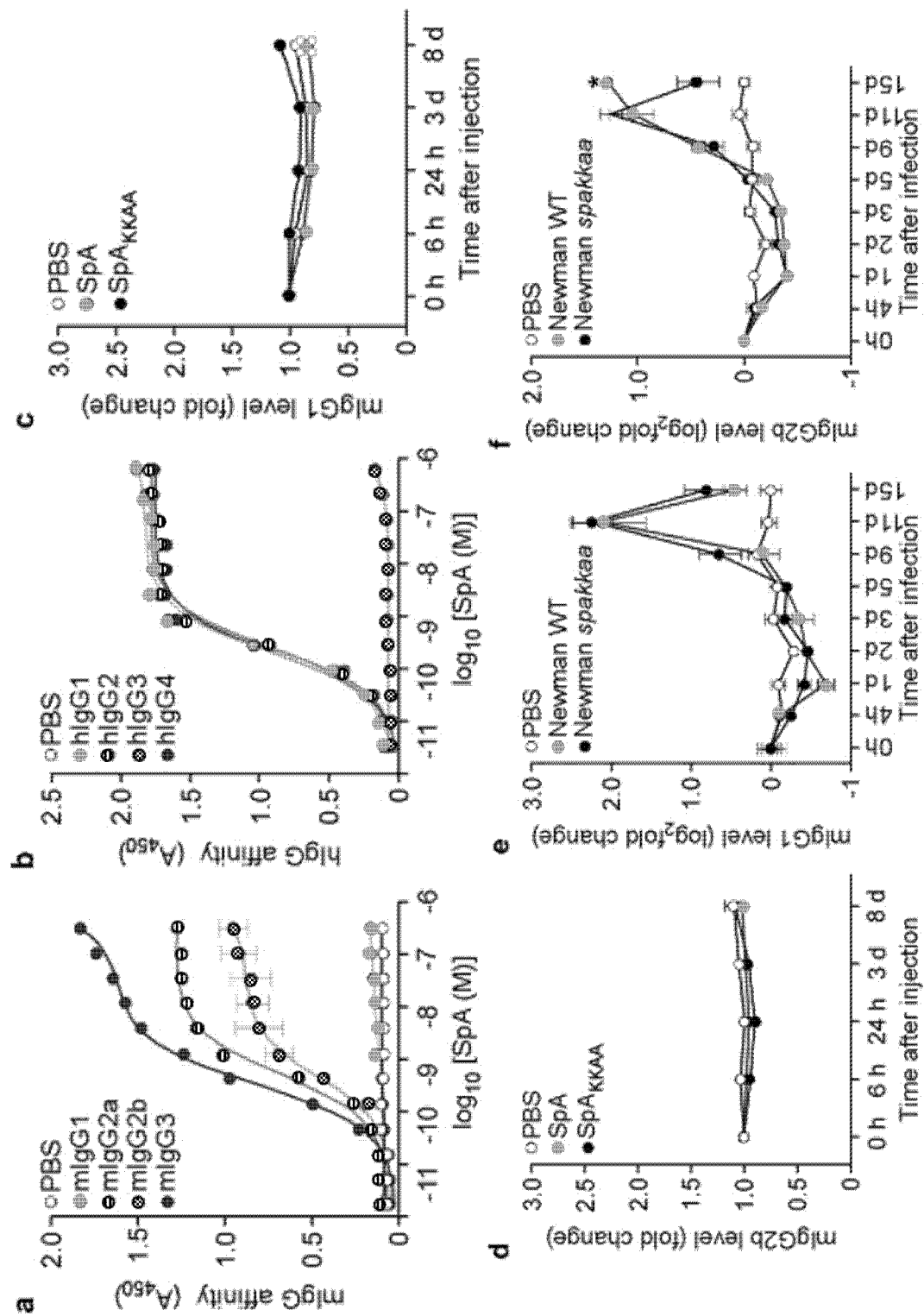
FIG. 21A-F

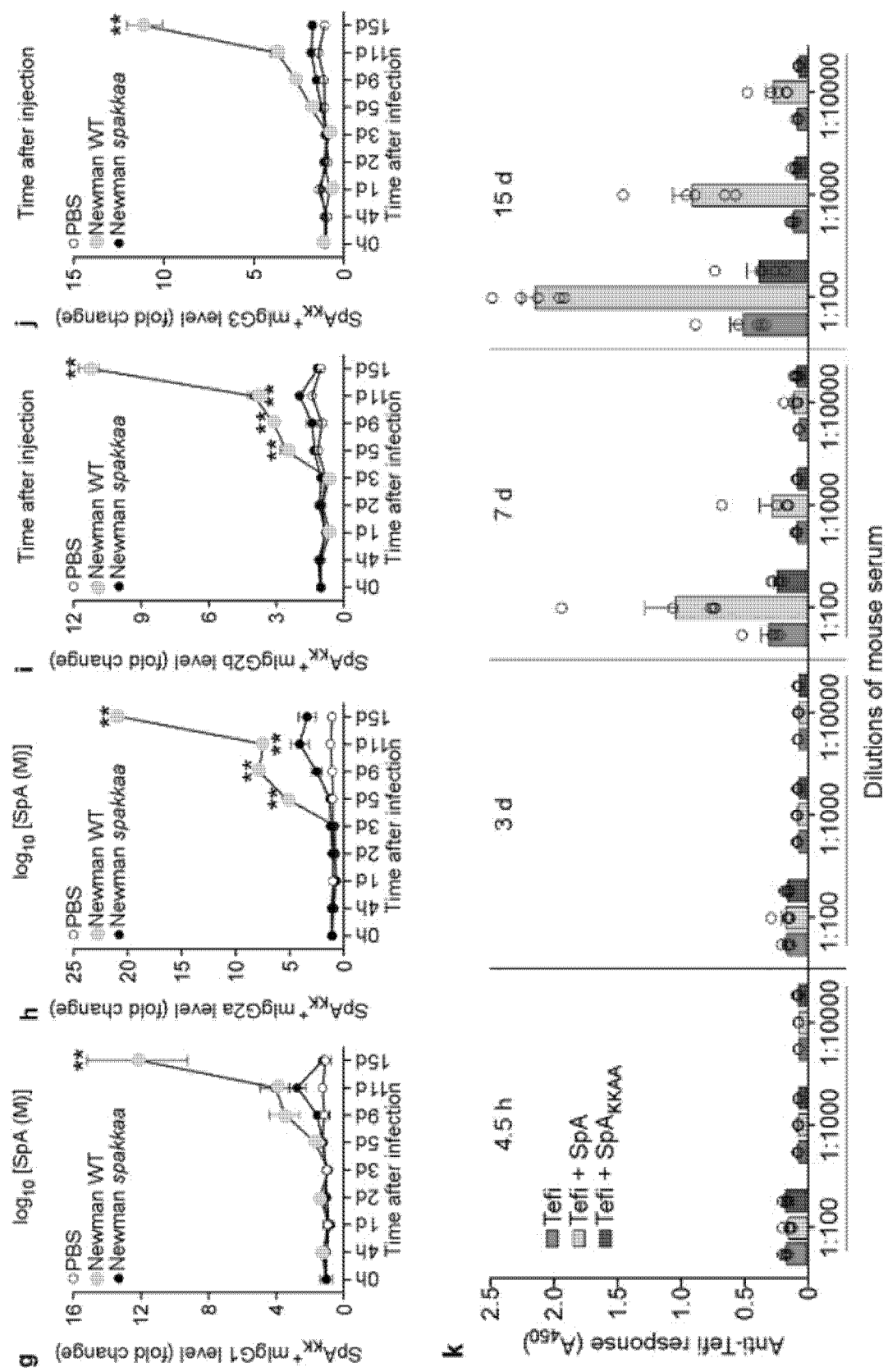
FIG. 21G-K

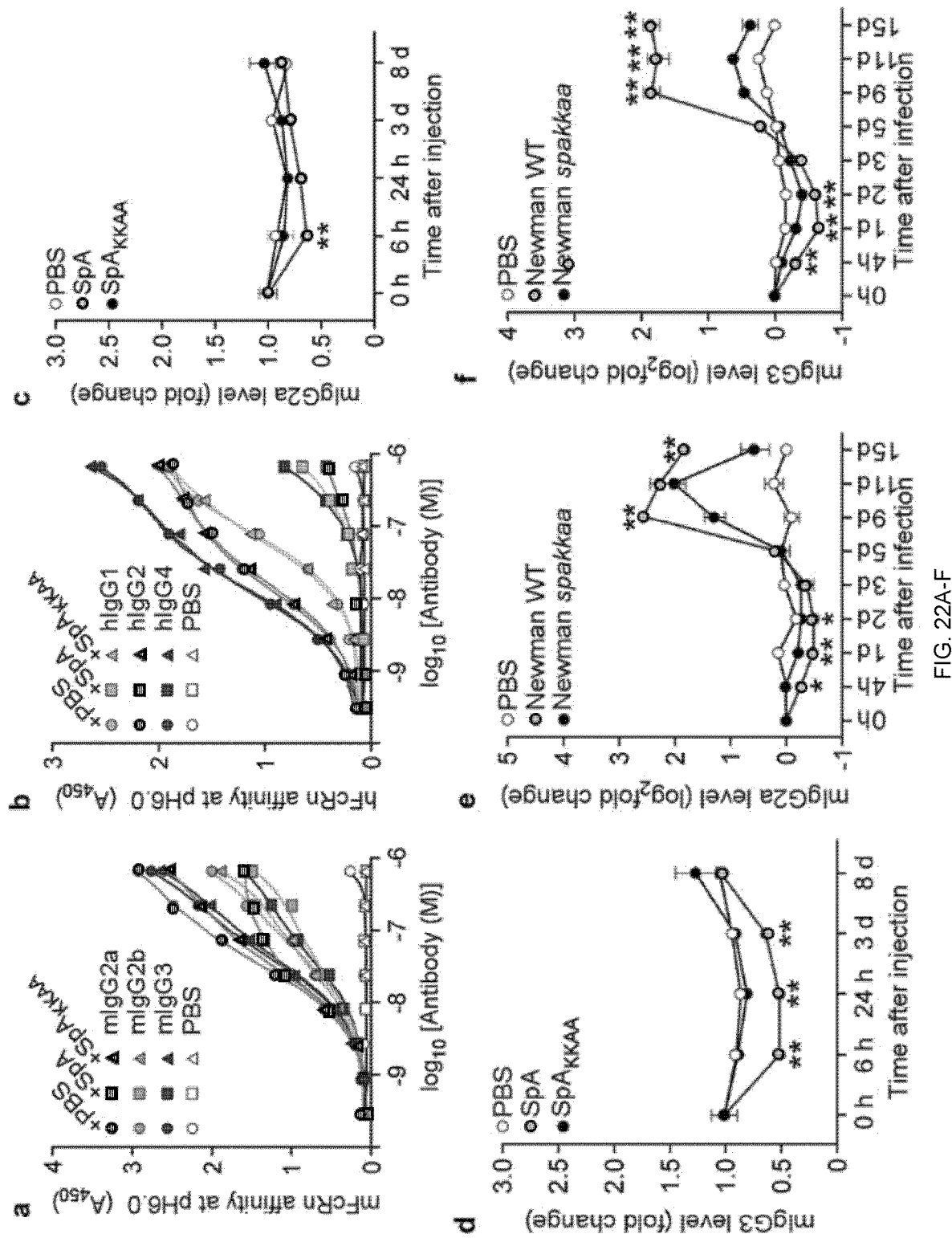
FIG. 22A-F

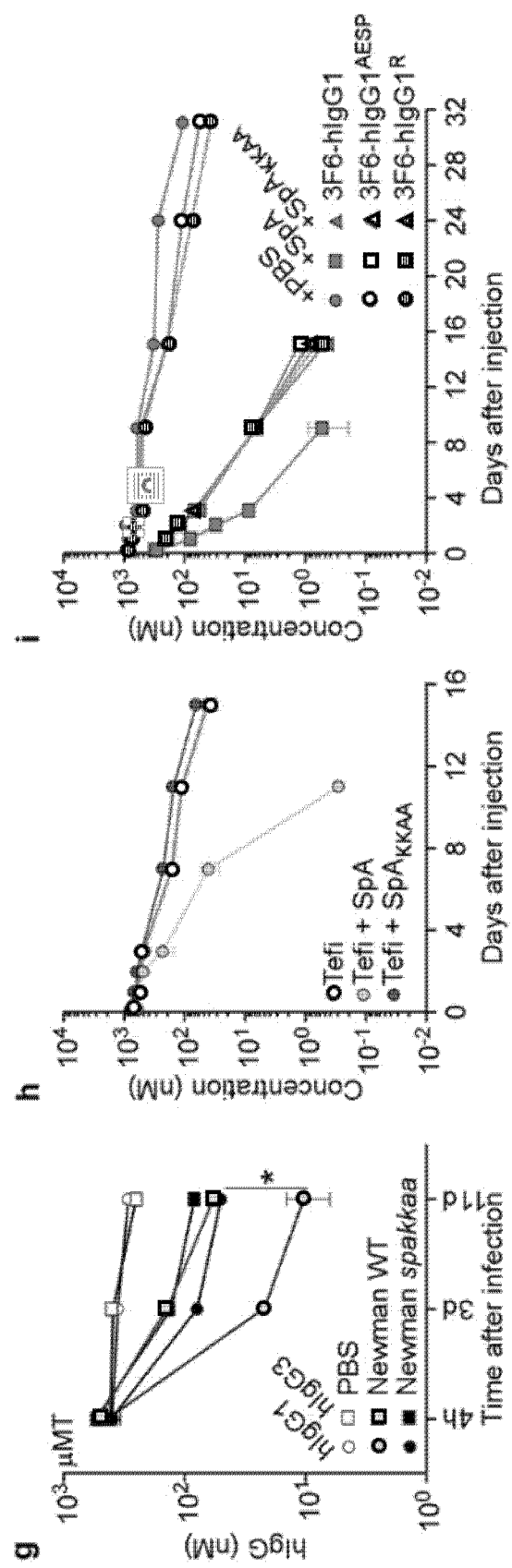
FIG. 22G-I

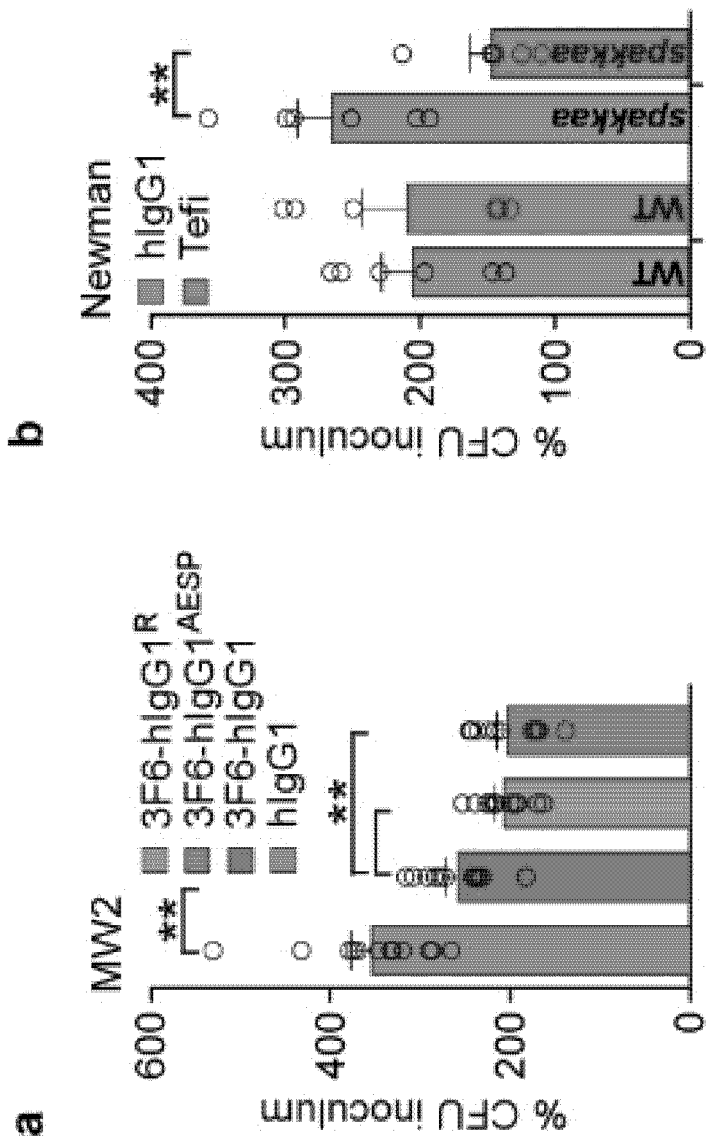
FIG. 23A-B

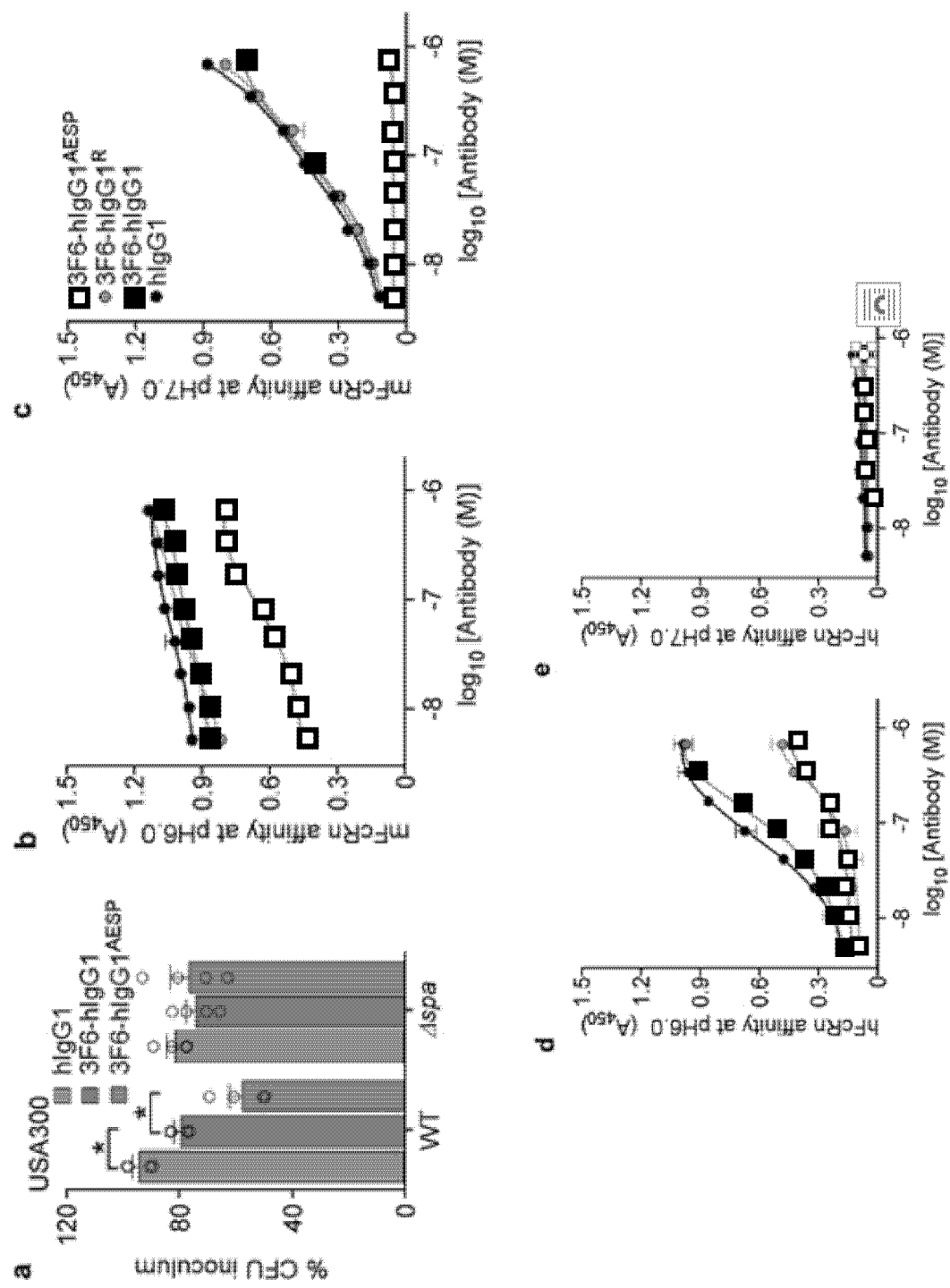
FIG. 24A-E

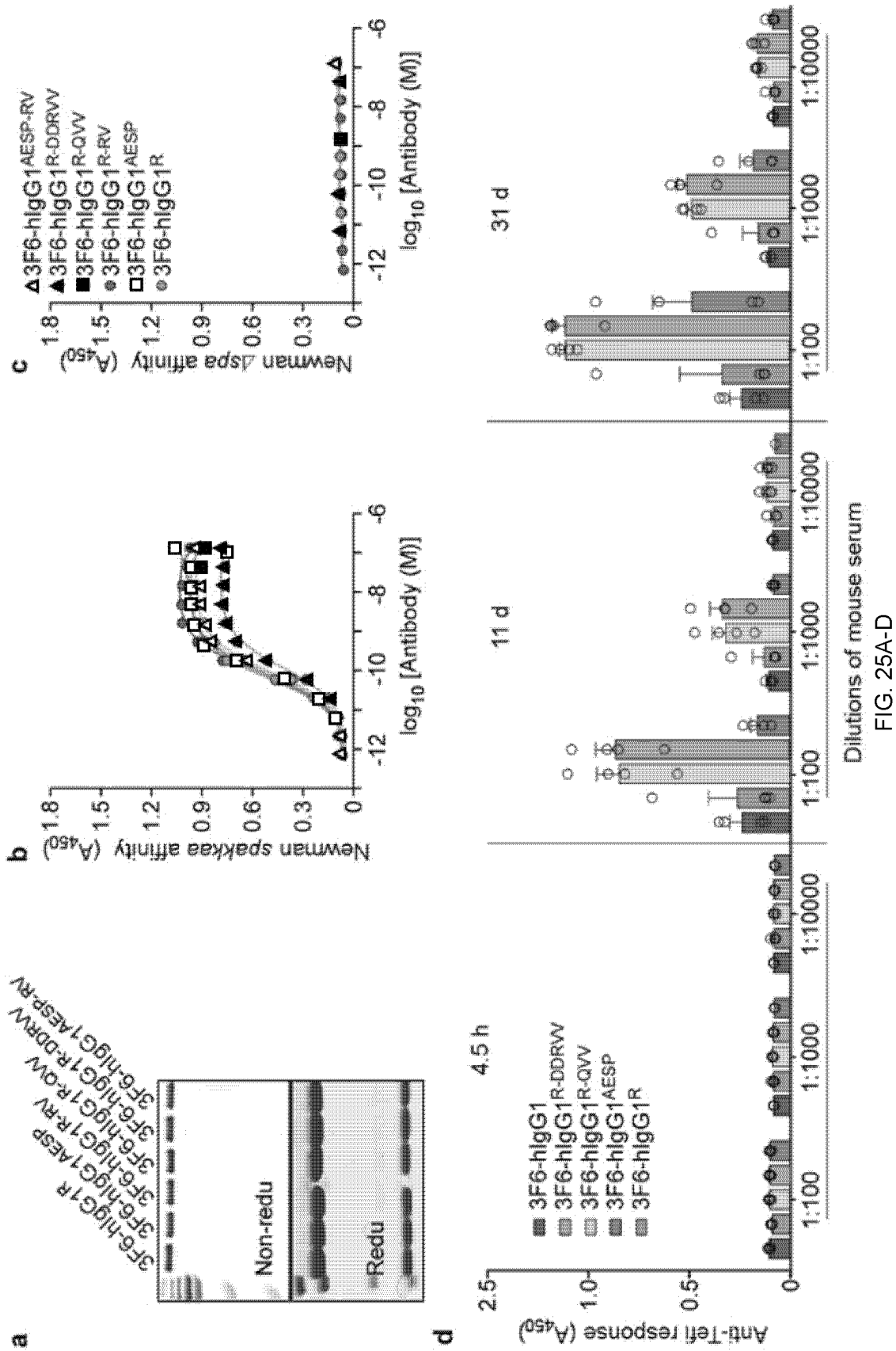
FIG. 25A-D

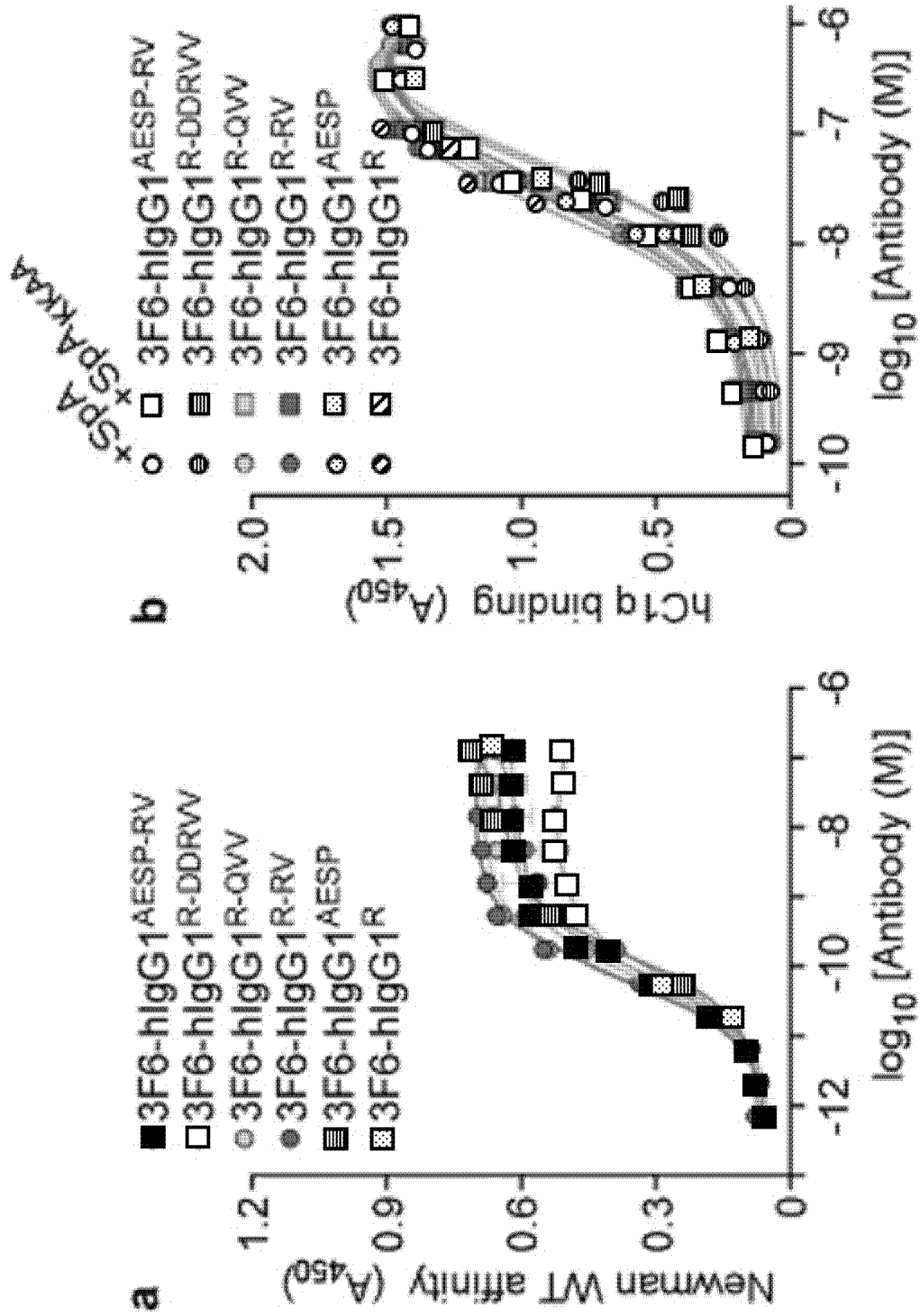
FIG. 26A-B

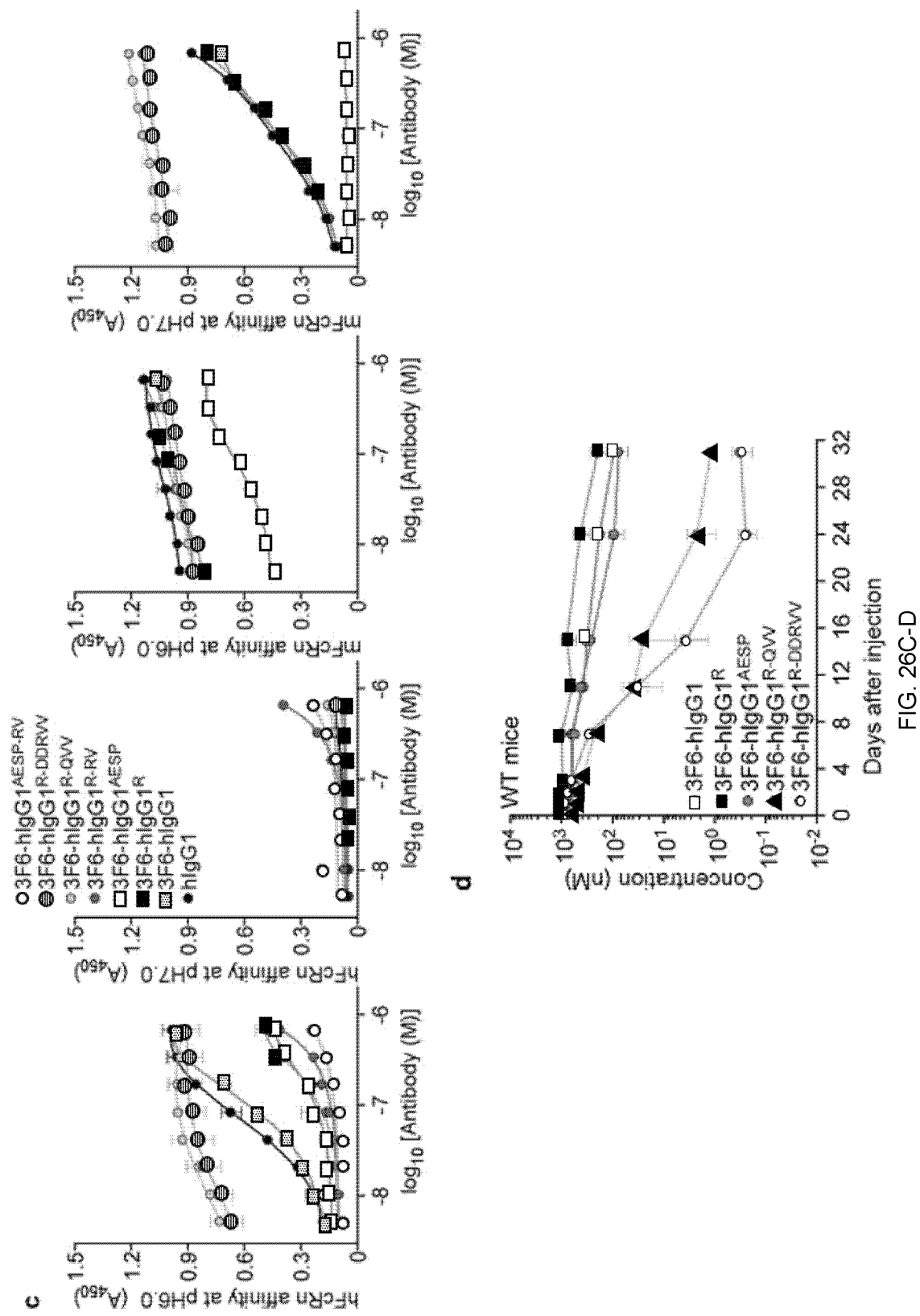
FIG. 26C-D

METHODS AND COMPOSITIONS FOR TREATING STAPHYLOCOCCAL INFECTIONS

CROSS-REFERENCE TO RELATED APPLICATIONS

This application is a national phase application under 35 U.S.C. § 371 of International Application No. PCT/US2020/070530 filed Sep. 11, 2020, which claims the benefit of priority of U.S. Provisional Patent Application No. 62/900,170 filed Sep. 13, 2019, and U.S. Provisional Patent Application No. 62/992,457 filed Mar. 20, 2020, all of which are hereby incorporated by reference in their entirety.

STATEMENT OF GOVERNMENT SUPPORT

This invention was made with government support under AI052474 and AI148543 awarded by The National Institutes of Health. The government has certain rights in the invention.

BACKGROUND

I. Field of the Invention

The present invention relates generally to the fields of immunology, microbiology, and pathology. More particularly, it concerns methods and compositions involving modified antibodies, which can be used to treat bacterial infections.

II. Background

The number of both community acquired and hospital acquired infections have increased over recent years with the increased use of intravascular devices. Hospital acquired (nosocomial) infections are a major cause of morbidity and mortality, more particularly in the United States, where it affects more than 2 million patients annually. The most frequent infections are urinary tract infections (33% of the infections), followed by pneumonia (15.5%), surgical site infections (14.8%) and primary bloodstream infections (13%) (Emorl and Gaynes, 1993).

The major nosocomial pathogens include *Staphylococcus aureus*, coagulase-negative Staphylococci (mostly *Staphylococcus epidermidis*), enterococcus spp., *Escherichia coli* and *Pseudomonas aeruginosa*. Although these pathogens cause approximately the same number of infections, the severity of the disorders they can produce combined with the frequency of antibiotic resistant isolates balance this ranking towards *S. aureus* and *S. epidermidis* as being the most significant nosocomial pathogens.

Staphylococci can cause a wide variety of diseases in humans and other animals through either toxin production or invasion. Staphylococcal toxins are also a common cause of food poisoning, as the bacteria can grow in improperly-stored food.

*Staphylococcus epidermidis* is a normal skin commensal which is also an important opportunistic pathogen responsible for infections of impaired medical devices and infections at sites of surgery. Medical devices infected by *S. epidermidis* include cardiac pacemakers, cerebrospinal fluid shunts, continuous ambulatory peritoneal dialysis catheters, orthopedic devices and prosthetic heart valves.

*Staphylococcus aureus* is the most common cause of nosocomial infections with a significant morbidity and mortality. It is the cause of some cases of osteomyelitis, endocarditis, septic arthritis, pneumonia, abscesses, and toxic shock syndrome. *S. aureus* can survive on dry surfaces, increasing the chance of transmission. Any *S. aureus* infection can cause the staphylococcal scalded skin syndrome, a cutaneous reaction to exotoxin absorbed into the bloodstream. It can also cause a type of septicemia called pyaemia that can be life-threatening. Problematically, Methicillin-resistant *Staphylococcus aureus* (MRSA) has become a major cause of hospital-acquired infections.

*S. aureus* and *S. epidermidis* infections are typically treated with antibiotics, with penicillin being the drug of choice, whereas vancomycin is used for methicillin resistant isolates. The percentage of staphylococcal strains exhibiting wide-spectrum resistance to antibiotics has become increasingly prevalent, posing a threat for effective antimicrobial therapy. In addition, the recent emergence of vancomycin resistant *S. aureus* strain has aroused fear that MRSA strains are emerging and spreading for which no effective therapy is available.

An alternative to antibiotic treatment for staphylococcal infections is under investigation that uses antibodies directed against staphylococcal antigens. This therapy involves administration of polyclonal antisera (WO00/15238, WO00/12132) or treatment with monoclonal antibodies against lipoteichoic acid (WO98/57994).

An alternative approach would be the use of active vaccination to generate an immune response against staphylococci. The *S. aureus* genome has been sequenced and many of the coding sequences have been identified (WO02/094868, EP0786519), which can lead to the identification of potential antigens. The same is true for *S. epidermidis* (WO01/34809). As a refinement of this approach, others have identified proteins that are recognized by hyperimmune sera from patients who have suffered staphylococcal infection (WO01/98499, WO02/059148).

*S. aureus* secretes a plethora of virulence factors into the extracellular milieu (Archer, 1998; Dinges et al., 2000; Foster, 2005; Shaw et al., 2004; Sibbald et al., 2006). Like most secreted proteins, these virulence factors are translocated by the Sec machinery across the plasma membrane. Proteins secreted by the Sec machinery bear an N-terminal leader peptide that is removed by leader peptidase once the pre-protein is engaged in the Sec translocon (Dalbey and Wickner, 1985; van Wely et al., 2001). Recent genome analysis suggests that Actinobacteria and members of the Firmicutes encode an additional secretion system that recognizes a subset of proteins in a Sec-independent manner (Pallen, 2002). ESAT-6 (early secreted antigen target 6 kDa) and CFP-10 (culture filtrate antigen 10 kDa) of *Mycobacterium tuberculosis* represent the first substrates of this novel secretion system termed ESX-1 or Snm in *M. tuberculosis* (Andersen et al., 1995; Hsu et al., 2003; Pym et al., 2003; Stanley et al., 2003). In *S. aureus*, two ESAT-6 like factors designated EsxA and EsxB are secreted by the Ess pathway (ESAT-6 secretion system) (Burts et al., 2005).

The first generation of vaccines targeted against *S. aureus* or against the exoproteins it produces have met with limited success (Lee, 1996). There remains a need to develop effective vaccines against staphylococcal infections. Additional compositions for treating staphylococcal infections are also needed.

SUMMARY OF THE INVENTION

The current disclosure fulfills a need in the art by providing novel compositions for treating bacterial infections.

Accordingly, aspects of the disclosure relate to an engineered antibody comprising: LCDR1, LCDR2, and LCDR3 of the light chain variable region of the 3F6 antibody and HCDR1, HCDR2, and HCDR3 of the heavy chain variable region of the 3F6 antibody. Further aspects relate to an engineered antibody comprising a light chain and heavy chain variable region comprising: LCDR1, LCDR2, and LCDR3 of the light chain variable region of the 3F6 antibody and HCDR1, HCDR2, and HCDR3 of the heavy chain variable region of the 3F6 antibody and wherein the antibody comprises an Fc region comprising at least one glycosylation-modified amino acid(s). Also provided are compositions comprising the antibodies and nucleic acids encoding either the heavy chain or light chain (or both) of the antibodies. Further aspects relate to vectors comprising the nucleic acids of the disclosure. Other aspects relate to host cells comprising the antibodies and/or nucleic acids of the disclosure. Further aspects relate to a method of preventing or treating staphylococcal infection and/or colonization comprising the step of administering the antibody of the disclosure to a subject in need thereof. Yet further aspects relate to a method of making the antibody comprising expressing the nucleic acid(s) of the disclosure in a cell and isolating the expressed protein. Further embodiments relate to the use of the antibody of the disclosure in the manufacture of a medicament for the treatment or prevention of staphylococcal infection.

Further embodiments relate to an antibody heavy chain comprising a heavy chain variable region comprising HCDR1, HCDR2, and HCDR3 of the heavy chain variable region of the 3F6 antibody and a Fc region comprising at least one glycosylation-modified amino acid(s).

The term "engineered antibody" relates to an antibody that comprises at least one substitution from the naturally occurring sequence of the antibody or an antibody that comprises secondary modifications, such as N-acetylglucosamine, mannose, galactose, fucose, or N-acetylneuramic (sialic) acid, that is different from that found in nature. In embodiments of the disclosure, the antibodies described herein comprise a Fc region. In certain embodiments, the Fc region is modified with non-conservative amino acid substitutions. In some embodiments, the antibody is a humanized or chimeric antibody. In some embodiments, the engineered antibody is a humanized 3F6 antibody. Accordingly, a humanized 3F6 antibody comprises the 6 CDRs of the 3F6 antibody grafted onto a human framework.

In certain aspects, the CDRs of the 3F6 are as shown below:

|       | Sequence      | SEQ ID NO: |
|-------|---------------|------------|
| HCDR1 | GFTFNTNA      | 2          |
| HCDR2 | IRSKSNNYAT    | 3          |
| HCDR3 | VTEHYDYDYYVMDY| 4          |
| LCDR1 | ESVEYSGASL    | 5          |
| LCDR2 | AAS           | 6          |
| LCDR3 | QQSRKVPST     | 7          |

In some embodiments, the HCDR1, HCDR2, and HCDR3 comprises an amino acid sequence with at least 70% sequence identity to SEQ ID NOS:2, 3, and 4, respectively and wherein the LCDR1, LCDR2, and LCDR3 comprises an amino acid sequence with at least 70% sequence identity to SEQ ID NOS:5, 6, and 7, respectively. In some embodiments, the HCDR1, HCDR2, and HCDR3 comprises the amino acid sequence of SEQ ID NOS:2, 3, and 4, respectively and wherein the LCDR1, LCDR2, and LCDR3 comprises an amino acid sequence of SEQ ID NOS:5, 6, and 7, respectively. In some embodiments, the antibody may comprise a CDR that is at least 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100% identical (or any range derivable therein) in sequence to SEQ ID NOS: 2-7.

In certain aspects, a polypeptide can comprise 1, 2, and/or 3 CDRs from the variable heavy chain of MAb 3F6, for example, SEQ ID NO:2, SEQ ID NO:3, and/or SEQ ID NO:4. In further embodiments, a polypeptide may have CDRs that have 1, 2, and/or 3 amino acid changes (addition of 1 or 2 amino acids, deletions or 1 or 2 amino acids or substitution) with respect to these 1, 2, or 3 CDRs. In further embodiments, an antibody may be alternatively or additionally humanized in regions outside the CDR(s) and/or variable region(s). In some aspects, a polypeptide comprises additionally or alternatively, an amino acid sequence that is at least 60, 65, 70, 75, 80, 85, 90, 95, 96, 97, 98, 99, or 100% identical or homologous to the amino acid sequence of the variable region that is not a CDR sequence, i.e., the variable region framework.

From amino to carboxy terminus the CDRs are CDR1, CDR2, and CDR3. In certain aspects, a polypeptide can comprise 1, 2, and/or 3 CDRs from the variable light chain of MAb 3F6, for example, SEQ ID NO:5, SEQ ID NO:6, and/or SEQ ID NO:7. In further embodiments, a polypeptide may have CDRs that have 1, 2, and/or 3 amino acid changes (addition of 1 or 2 amino acids, deletions or 1 or 2 amino acids or substitution) with respect to these 1, 2, or 3 CDRs. In some embodiments, the CDRs of SEQ ID NOS:2-7 may further comprise 1, 2, 3, 4, 5, or 6 additional amino acids at the amino or carboxy terminus of the CDR, The additional amino acids may be from the heavy and/or light chain framework regions of SEQ ID NO:9 and 10, respectively, that are shown as immediately adjacent to the CDRs. Accordingly, embodiments relate to antibodies comprising an HCDR1, HCDR2, HCDR3, LCDR1, LCDR2, and/or LCDR3 with at least or at most or exactly 1, 2, 3, 4, 5, 6 or 7 amino acids at the amino end of the CDR or at the carboxy end of the CDR, wherein the additional amino acids are the 1, 2, 3, 4, 5, 6, or 7 amino acids of SEQ ID NOS:9 and 10 that are shown as immediately adjacent to the CDRs. Other embodiments relate to antibodies comprising one or more CDRs, wherein the CDR is a fragment of SEQ ID NO:2-7 and wherein the fragment lacks 1, 2, 3, 4, or 5 amino acids from the amino or carboxy end of the CDR. In some embodiments, the CDR may lack one, 2, 3, 4, 5, 6, or 7 amino acids from the carboxy end and may further comprise 1, 2, 3, 4, 5, 6, 7, or 8 amino acids from the framework region of the amino end of the CDR. In some embodiments, the CDR may lack one, 2, 3, 4, 5, 6, or 7 amino acids from the amino end and may further comprise 1, 2, 3, 4, 5, 6, 7, or 8 amino acids from the framework region of the carboxy end of the CDR. In further embodiments, an antibody may be alternatively or additionally humanized in regions outside the CDR(s) and/or variable region(s). In some aspects, a polypeptide comprises additionally or alternatively, an amino acid sequence that is at least 60, 65, 70, 75, 80, 85, 90, 95, 96, 97, 98, 99, or 100% identical or homologous to the amino acid sequence of the variable region that is not a CDR sequence, i.e., the variable region framework.

In other embodiments, a polypeptide or protein comprises 1, 2, 3, 4, 5, or 6 CDRs from the either or both of the light and heavy variable regions of mAb 3F6, and 1, 2, 3, 4, 5, or 6 CDRs may have 1, 2, and/or 3 amino acid changes with respect to these CDRs. In some embodiments, parts or all of the antibody sequence outside the variable region have been humanized. A protein may comprise one or more polypeptides. In some aspects, a protein may contain one or two polypeptides similar to a heavy chain polypeptide and/or 1 or 2 polypeptides similar to a light chain polypeptide. In further embodiments, a polypeptide may be a single chain antibody or other antibody discussed herein so long as it at least 70% sequence identity or homology to 1, 2, 3, 4, 5, or 6 CDRs of mAb 3F6.

In some embodiments, the heavy chain of the humanized 3F6 antibody comprises the following sequence:

(SEQ ID NO: 9)
MDLRLTYVFIVAILKGVLCEVQLVESGGGLVQPGGSLRLSCAASGFTFNT

NAMNWVRQAPGKGLEWVARIRSKSNNYATYYADSVKGRFTISRDDSKNTL

YLQMNSLKTEDTAIYYCVTEHYDYDYYVMDYWGQGTLVTVSSASTKGPSV

FPLAPSSKSTSGGTAALGCLVKDYFPEPVTVSWNSGALTSGVHTFPAVLQ

SSGLYSLSSVVTVPSSSLGTQTYICNVNHKPSNTKVDKKVEPKSCDKTHT

CPPCPAPELLGGPSVFLFPPKPKDTLMISRTPEVTCVVVDVSHEDPEVKF

NWYVDGVEVHNAKTKPREEQYNSTYRVVSVLTVLHQDWLNGKEYKCKVSN

KALPAPIEKTISKAKGQPREPQVYTLPPSRDELTKNQVSLTCLVKGFYPS

DIAVEWESNGQPENNYKTTPPVLDSDGSFFLYSKLTVDKSRWQQGNVFSC

SVMHEALHNHYTQKSLSLSPGK.

In some embodiments, the light chain of the humanized 3F6 antibody comprises the following sequence:

(SEQ ID NO: 10)
MAWMMLLLGLLAYGSGVDSQSALTQPPSMETDTLLLWVLLLWVPGSTGDI

VLTQSPDSLAVSLGERATINCRASESVEYSGASLMQWYQHKPGQPPKLLI

YAASNRESGVPDRFSGSGSGTDFTLTISPVQAEDVAMYFCQQSRKVPSTF

GGGTKLEIKRTVAAPSVFIFPPSDEQLKSGTASVVCLLNNFYPREAKVQW

KVDNALQSGNSQESVTEQDSKDSTYSLSSTLTLSKADYEKHKVYACEVTH

QGLSSPVTKSFNRGEC.

In some embodiments, the antibody is humanized. In some embodiments, the antibody is chimeric. In some embodiments, the antibody comprises at least one or at least two glycosylation-modified amino acid(s). In some embodiments, the antibody comprises fragment crystallizable region gamma (Fcγ). In some embodiments, the Fc region of the antibody comprises one or more substitutions and wherein the one or more substitutions comprise S254A, Q311E, L432S, N434P and/or H435R. In some embodiments, the Fc region of the antibody comprises S254A, Q311E, L432S and N434P substitutions. In some embodiments, the Fc region of the antibody comprises H435R substitution. In some embodiments, the antibody comprises at least one, at least two, or at least 3 substitutions at one or more amino acids at positions 226-447 in the Fc region of the antibody. In some embodiments, the antibody comprises at least one, at least two, or at least 3 substitutions at one or more amino acids at positions 109-330 of SEQ ID NO:1 or at one or more amino acid positions 6-227 of SEQ ID NO:8

An exemplary human Immunoglobulin heavy constant gamma 1 region comprises the following amino acid sequence:

(SEQ ID NO: 1)
ASTKGPSVFPLAPSSKSTSGGTAALGCLVKDYFPEPVTVSWNSGALTSGV

HTFPAVLQSSGLYSLSSVVTVPSSSLGTQTYICNVNHKPSNTKVDKKVEP

KSCDKTHTCPPCPAPELLGGPSVFLFPPKPKDTLMISRTPEVTCVVVDVS

HEDPEVKFNWYVDGVEVHNAKTKPREEQYNSTYRVVSVLTVLHQDWLNGK

EYKCKVSNKALPAPIEKTISKAKGQPREPQVYTLPPSRDELTKNQVSLTC

LVKGFYPSDIAVEWESNGQPENNYKTTPPVLDSDGSFFLYSKLTVDKSRW

QQGNVFSCSVMHEALHNHYTQKSLSLSPELQLEESCAEAQDGELDGLWTT

ITIFITLFLLSVCYSATVTFFKVKWIFSSVVDLKQTIIPDYRNMIGQGA.

The antibody positions corresponding to position 297, 254, 311, 432, 434, and 435 are underlined in SEQ ID NO:1 and correspond to position 180, 137, 194, 315, 317, and 318 of SEQ ID NO:1, respectively.

In some embodiments, the constant region comprises the following:

(SEQ ID NO: 8)
DKTHTCPPCPAPELLGGPSVFLFPPKPKDTLMISRTPEVTCVVVDVSHED

PEVKFNWYVDGVEVHNAKTKPREEQYNSTYRVVSVLTVLHQDWLNGKEYK

CKVSNKALPAPIEKTISKAKGQPREPQVYTLPPSRDELTKNQVSLTCLVK

GFYPSDIAVEWESNGQPENNYKTTPPVLDSDGSFFLYSKLTVDKSRWQQG

NVFSCSVMHEALHNHYTQKSLSLSPGK.

The antibody positions corresponding to position 297, 254, 311, 432, 434, and 435 are underlined in SEQ ID NO:8 and correspond to position 77, 34, 91, 212, 214, and 215 of SEQ ID NO:8, respectively.

In some embodiments, the Fc region of the antibody comprises the four substitutions (S254A, Q311E, L432S, N434P) combined with one or more substitutions and wherein the one or more substitutions comprise T307R, T307Q, A378V, alone or in combinations. In some embodiments, the Fc region of the antibody comprises the H435R substitutions combined with one or more substitutions and wherein the one or more substitutions comprise T256D, N286D, T307R, T307Q, Q311V, A378V, alone or in combinations. In some embodiments, the antibody comprises at least 1, 2, 3, 4, 5, or 6 substitutions, or any range derivable therein, selected from T256D, N286D, T307R, T307Q, Q311V, A378V. The antibody positions corresponding to position 256, 286, 307, 311, and 378 are underlined in SEQ ID NO:8 and correspond to position 36, 66, 87, 91, and 158 of SEQ ID NO:8, respectively.

In some embodiments, the antibody comprises at least 1, 2, 3, 4, 5, 6, 7, 8, 9, 10, 11, 12, 13, 14, 15, 16, 17, 18, 19, or 20 substitutions (or any derivable range therein at amino acid position 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, or 460 or any derivable range therein, of the Fc region of the antibody or of SEQ ID NO:1, or 8, in the CDR regions of SEQ ID NOS:2-7, or in the heavy or light chain of SEQ ID NO:9 or 10, respectively. In some embodiments, the amino acid at position 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331,332, 333, 334, 335, 336,337, 338, 339, 340, 341,342, 343, 344, 345,346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, or 460 or the Fc region of the antibody of SEQ ID NO:1, or 8, in the CDR regions of SEQ ID NOS:2-7, or in the heavy or light chain of SEQ ID NO:9 or 10 is substituted with an alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, or valine.

In some embodiments, the amino acid at position 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, or 460 or the Fc region of the antibody of SEQ ID NO:1, or 8, in the CDR regions of SEQ ID NOS:2-7, or in the heavy or light chain of SEQ ID NO:9 or 10 is substituted with a conservative amino acid.

In some embodiments, the amino acid at position 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, or 460 or the Fc region of the antibody of SEQ ID NO:1, or 8, in the CDR regions of SEQ ID NOS:2-7, or in the heavy or light chain of SEQ ID NO:9 or 10 is substituted with a non-conservative amino acid.

In some embodiments, the antibody is capable of increasing OPK activity in a subject, as compared to tefibazumab. In some embodiments, the glycosylation-modified amino acid comprises a galactosylated amino acid. In some embodiments, the amino acid is mon-galactosylated. In some embodiments, the amino acid is di-galactosylated. In some embodiments, the antibody is galactosylated at $Asn^{297}$ of the Fc region of the antibody. In some embodiments, $Asn^{297}$ corresponds to amino acid at position 180 of SEQ ID NO:1. In some embodiments, $Asn^{297}$ corresponds to amino acid at position 77 of SEQ ID NO:8. In some embodiments, the antibody is afucosylated. The term afucosylated refers to one that lacks a fucosyl modification. Afucosylation may result from removing an existing fucosyl group or from producing the antibody under conditions that do not support fucosylation. In some embodiments, the antibody is afucosylated at $Asn^{297}$. In some embodiments, the antibody is de-sialylated. The term de-sialylated refers to one that lacks a sialyl modification. De-sialylated may result from removing an existing sialyl group or from producing the antibody under conditions that do not support sialylation. In some embodiments, the antibody is de-sialylated at $Asn^{297}$ or at amino acid at position 180 of SEQ ID NO:1. In some embodiments, the antibody is de-sialylated at $Asn^{297}$ or at amino acid at position 77 of SEQ ID NO:8. In some embodiments, the antibody is further defined as having a modification structure of G2S2F, G2F, G1F, G2 or G1. These structures are exemplified in FIG. 16.

In some embodiments, the cell of the disclosure comprises expression of a heterologous glycosyltransferase. The term "heterologous" relates to a protein that is expressed from a nucleic acid transferred into the cell by gene transfer. The nucleic acid may be expressed from a transferred nucleic acid that is integrated or edited into the genome or is separate from the host genome. In some embodiments, the glycosyltransferase is modified. In some embodiments, the cell is modified to reduce or eliminate expression of one or more fucosylation and/or sialyation enzymes. In some embodiments, the cell is modified to reduce or eliminate expression of Fut8 and/or 23 STGa14/6. In some embodiments, the cell comprises a mammalian cell. In some embodiments, the cell comprises a human cell. In some embodiments, the cell comprises endogenous glycosyltransferase activity. In some embodiments, the cell comprises a CHO cell.

In some embodiments, the method comprises culturing the cell in media supplemented with galactose alone or galactose in combination with manganese chloride and/or uridine. In some embodiments, the method comprises culturing the cell in media supplemented with N-acetylmannosamine (ManNAc) and/or butyrated ManNAc.

In some embodiments, the method comprises culturing the cell in afucosylated-enrichment medium. The term afucosylation-enrichment medium refers to a culture medium that inhibits fucosylation of polypeptides so as to enrich for afucosylated polypeptides. In some embodiments, the afucosylated-enrichment medium comprises kifunensine. In some embodiments, the method comprises culturing the cell in de-sialylation-enrichment medium. The term de-sialylation-enrichment medium refers to a culture medium that inhibits fucosylation of polypeptides so as to enrich for de-sialylated polypeptides. In some embodiments, the de-sialylation-enrichment medium comprises neuraminidase.

In some embodiments, treating or preventing comprises one or more of promoting *S. aureus* decolonization, preventing invasive MRSA disease, and improving the outcome of MRSA bloodstream infections in the subject. In some embodiments, the staphylococcal infection and/or colonization comprises infection and/or colonization of a *staphylococcus* bacterium and wherein the bacterium comprises *S. aureus* bacterium. In some embodiments, the *staphylococcus* bacterium is resistant to one or more treatments. In some embodiments, the bacterium is methicillin resistant. In some embodiments, the subject does not exhibit any signs of toxicity from the isolated polypeptide or composition. In some embodiments, the subject does not exhibit any signs of anaphylactic shock from the isolated polypeptide or composition. In some embodiments, the subject is a human. In some embodiments, the antibody is administered intravenously.

Use of the one or more sequences or compositions may be employed based on any of the methods described herein. Other embodiments are discussed throughout this application. Any embodiment discussed with respect to one aspect of the disclosure applies to other aspects of the disclosure as well and vice versa. For example, any step in a method described herein can apply to any other method. Moreover, any method described herein may have an exclusion of any step or combination of steps. The embodiments in the Example section are understood to be embodiments that are applicable to all aspects of the technology described herein.

Throughout this application, the term "about" is used according to its plain and ordinary meaning in the area of cell and molecular biology to indicate that a value includes the standard deviation of error for the device or method being employed to determine the value.

The use of the word "a" or "an" when used in conjunction with the term "comprising" may mean "one," but it is also consistent with the meaning of "one or more," "at least one," and "one or more than one."

As used herein, the terms "or" and "and/or" are utilized to describe multiple components in combination or exclusive of one another. For example, "x, y, and/or z" can refer to "x" alone, "y" alone, "z" alone, "x, y, and z," "(x and y) or z," "x or (y and z)," or "x or y or z." It is specifically contemplated that x, y, or z may be specifically excluded from an embodiment.

The words "comprising" (and any form of comprising, such as "comprise" and "comprises"), "having" (and any form of having, such as "have" and "has"), "including" (and any form of including, such as "includes" and "include"), "characterized by" (and any form of including, such as "characterized as"), or "containing" (and any form of containing, such as "contains" and "contain") are inclusive or open-ended and do not exclude additional, unrecited elements or method steps.

The compositions and methods for their use can "comprise," "consist essentially of," or "consist of" any of the ingredients or steps disclosed throughout the specification. The phrase "consisting of" excludes any element, step, or ingredient not specified. The phrase "consisting essentially of" limits the scope of described subject matter to the specified materials or steps and those that do not materially affect its basic and novel characteristics. It is contemplated that embodiments described in the context of the term "comprising" may also be implemented in the context of the term "consisting of" or "consisting essentially of."

It is specifically contemplated that any limitation discussed with respect to one embodiment of the invention may apply to any other embodiment of the invention. Furthermore, any composition of the invention may be used in any method of the invention, and any method of the invention may be used to produce or to utilize any composition of the invention. Aspects of an embodiment set forth in the Examples are also embodiments that may be implemented in the context of embodiments discussed elsewhere in a different Example or elsewhere in the application, such as in the Summary of Invention, Detailed Description of the Embodiments, Claims, and description of Figure Legends.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

So that the matter in which the above-recited features, advantages and objects of the invention as well as others which will become clear are attained and can be understood in detail, more particular descriptions and certain embodiments of the invention briefly summarized above are illustrated in the appended drawings. These drawings form a part of the specification. It is to be noted, however, that the appended drawings illustrate certain embodiments of the invention and therefore are not to be considered limiting in their scope.

FIG. 1A-B. Staphylococcal immunoglobulin binding proteins (IBPs) block opsonophagocytic killing (OPK) of MRSA. MRSA secrete three IBPs, staphylococcal protein A (SpA), staphylococcal binder of immunoglobulin (Sbi) and staphylococcal superantigen-like protein 10 (SSL 10). IBPs bind to the hinge region of IgG (comprised of CH2 and CH3), thereby blocking the effector functions of Fcγ in activating C1q. (A) IBP binding to IgG blocks MRSA opsonization and OPK of MRSA in phagocytes. (B) Structure of human IgG with its heavy (VH-CH1-CH2-CH3) and light chains (VL-CL) and antigen binding paratope (CDR1-2-3).

FIG. 2A-B. B cell superantigen activity (BCSA) of staphylococcal protein A (SpA) blocks adaptive immune responses during MRSA infection. (A) MRSA secrete SpA, which crosslinks $V_H3$ B cell receptors (BCR), thereby activating B cell proliferation and secretion of $V_H3$ IgG that cannot bind MRSA antigens. Together with the Fcγ-binding activities of IBPs, the BCSA of SpA ensures that MRSA cannot be opsonized and killed in phagocytes. (B) Structure of the BCR before and after SpA crosslinking.

FIG. 3A-G. Staphylococcal protein A (SpA) is a key virulence factor and target for therapeutic antibody. (A) Primary structure of SpA and its $SpA_{KK}$ (no binding to Fcγ), $SpA_{AA}$ (no binding to $V_H3$ Fab), and $SpA_{KKAA}$ (no binding to human IgG). (B) Fluorescence microscopy of S. aureus with anti-$SpA_{KKAA}$ and flow cytometry of staphylococci incubated with labeled human IgG F(ab)$_2$ or Fcγ. (C) Survival of mice with MRSA bacteremia and either no prior infection (none) or prior infection with wild-type or spa$_{KKA}$ mutant S. aureus and daptomycin therapy. (D) Serum IgG responses of mice in (C) prior to MRSA challenge. (E) Disease phenotypes associated with S. aureus bacteremia after challenge with wild-type and spa mutant strains. (F) $SpA_{KKAA}$-mediated vaccine protection against MRSA bacteremia. (G) MAb 3F6-IgG2a mediated protection against MRSA bacteremia. (H) MAb 3F6-IgG2a induced MRSA OPK in mouse blood as compared with isotype control (IgG2a). Giemsa stained blood shows 3F6-IgG2a induced uptake of MRSA into granulocytes.

FIG. 4A-F. SpA-IgG1 glycoforms are determinants of therapeutic efficacy against MRSA. (A) N-linked glycan types of IgG therapeutics. (B) Structure of 3F6-hIgG1, which binds and neutralizes SpA; Asn297 is highlighted in red. When purified from CHO cells or HEK293 F cells, SpA-IgG1 differs only in the relative abundance of specific glycoforms. Protective efficacy of 3F6-hIgG1$_{CHO}$ and 3F6-hIgG1$_{HEK}$ injected into mice 24 hours prior to MRSA bacteremia challenge; MRSA load in renal tissues (C) and MRSA abscess lesions (D) were quantified. (E) 3F6-hIgG1$_{HEK}$ binds with higher affinity to human C1q than 3F6-hIgG1$_{CHO}$. 3F6-hIgG1$_{HEK}$ and 3F6-hIgG1$_{CHO}$ were used to synthesize antibodies with uniform glycoforms (G0F, G1F and G2F), which were analyzed for efficacy in preventing MRSA replication (F) and renal abscess lesions in mice (G). The G2F glycoform of 3F6-hIgG1 provided the best protection against MRSA.

FIG. 5A-M. IgG1 Fcγ variants refractory to interference by staphylococcal IBPs. (A) Diagram illustrating the binding sites of 3F6 MAb on SpA and Sbi and of 2A12 MAb on C1fA. (B) SpA and Sbi expression protects MRSA USA300 LAC against opsonophagocytic killing in human blood over 60 min. Cytochalasin-D blocks phagocytosis and ensures survival of the ΔspaΔsbi mutant in human blood. The first data bar of each group represents USA300, and the second data bar of each group represents ΔspaΔsbi. (C) Structure of 3F6-1gG1$^{ASEP}$ with four amino acid substitutions ($S^{254}A$, $Q^{311}E$, $L^{432}S$ and $N^{434}P$) in Fcγ. (D) 3F6-hIgG1 and 2A12-hIgG1 induced MRSA OPK in human blood. Compared to 3F6-hIgG1, 3F6-1gG1$^{ASEP}$ promotes enhanced OPK of MRSA USA300 LAC. 3F6-hIgG1 and 3F6-hIgG1$^{ASEP}$ affinity for (E) $SpA_{AA}$ (SpA variant that binds Fcγ but not $V_H3$ heavy chains), C1q (F) and FcRn (G) were measured. (J) Diagram illustrating the deposition of pIII at the tip of M13KO7 bacteriophage carrying either empty phagemid of the pIII-Fcγ phagemid, which leads to the deposition of pIII-Fcγ at the tip of filamentous phage. Immunoblot with anti-hIgG HRP-conjugate identifies pIII-Fcγ and pIII-Fcγ dimer. (K) M13KO7 pIII and M13KO7 pIII-Fcγ particles were isolated and binding to SpA measured. The coding sequence of Fcγ in pIII-Fcγ was subjected mutagenesis with error prone PCR and M13KO7 pIII-Fcγ particles that cannot bind SpA but retain the ability to bind FcRn were isolated and sequenced. The best six pIII-Fcγ variants were analyzed for binding to (L) SpA and (M) FcRn.

FIG. 6A-B. 3F6 MAb promotes clearance of S. aureus from the nasopharynx and GI tract of colonized mice. (A) C57BL/6 mice (n=10) were inoculated with S. aureus WU1 and naso-pharyngeal colonization measured via swab; each symbol represents log$_{10}$ CFU/swab from one animal (n=10). Median values are indicated by horizontal bars. Animals were treated with IgG2a control antibody or with 3F6-mIgG2a and analyzed in weekly intervals for colonization. (B) Serum IgG against purified S. aureus antigens were measured by ELISA and analyzed by pairwise comparison with naïve, colonized or cleared animals. for binding to S. aureus antigens and analyzed by pairwise comparison with colonized or cleared animals.

FIG. 7A-H. 3F6-hIgG1 produced by HEK 293F cells protects mice against MRSA bloodstream infection. a, Schematic of recombinant antibodies generated by swapping the complementarity determining regions (CDRs) of human $V_H1$-idiotypic IgG1 with the CDRs of mouse hybridoma 3F6-mhIgG2a. Production in CHO-DG44 and HEK 293F cells yielded 3F6-hIgG1$_{CHO}$ and 3F6-hIgG1$_{HEK}$, respectively. b, Coomassie stained gel of antibodies. non-red., red.: non-reducing and reducing conditions. c, Antibody binding to $SpA_{KKAA}$ measured by enzyme-linked immunosorbent assay (ELISA) and reported as association constants ($K_a$) (n=3); $A_{450}$, absorbance at 450 nm. d, Antibodies 3F6-hIgG1$_{CHO}$ and 3F6-hIgG1$_{HEK}$ prevent the association of SpA to human IgG better than human IgG1 (hIgG1). Values were normalized to SpA interaction with human IgG in PBS (n=3). The bars in d represent, from left to right, hIgG1, 3F6-hIgG1$_{CHO}$, and 3F6-hIgG1$_{HEK}$, for each set of three bars. e-f, Animals (Balb/c) received PBS, human IgG1 (hIgG1), mouse hybridoma monoclonal antibody 3F6-mhIgG2a, 3F6-hIgG1$_{CHO}$ or 3F6-hIgG1$_{HEK}$ prior to challenge with S. aureus MW2. Fifteen days post infection, kidneys (n=16-20, from two independent experiments) were removed and either ground for enumeration of CFU/g tissue (e) or fixed and stained for enumeration of internal abscesses (f). g, Administration of 3F6-hIgG1$_{HEK}$ prior to infection promotes enhanced antistaphylococcal serum immunoglobulin G responses. Sera (n=3) of animals shown in e were tested for antibodies against the indicated S. aureus antigens. The data bars of each set represent, from left to right, hIgG1, 3F6-hIgG1$_{CHO}$, and 3F6-hIgG1$_{HIK}$; h, Plasma concentration-time profile of antibodies following intraperitoneal administration into Balb/c mice (n=5). Data are represented as mean±s.e.m. (c-h). Significant differences were identified with the two-tailed Student's t-test (d, g), and one-way ANOVA with Kruskal-Wallis test (e, f): **, P<0.01; *, P<0.05; ns=not significant.

FIG. 8A-J. 3F6-hIgG1 glycoforms are determinants of therapeutic efficacy against MRSA. a, MALDI-TOF mass spectra of 3F6-hIgG1$_{CHO}$ (left) and 3F6-hIgG1$_{HEK}$ (right) with glycan structures: fucose (brown), N-acetylglucosamine, mannose, and galactose. b, Quantification of glycoforms from mass spectra shown in a. c-j, Animals (Balb/c) received test antibodies as indicated before challenge with S. aureus MW2. Weight (n=10) was recorded daily and reported as % of initial weight; the data bars of each set represent, from left to right, 3F6-hIgG1$_{CHO}$ and 3F6-hIgG1$_{HIK}$, respectively; (c, f). Fifteen days post infection, kidneys and sera were obtained during necropsy as described in FIG. 1; kidneys (n=16-20; from two independent) were examined for CFU (d, g), and internal abscesses (e, h), and animal sera (n=6-10) were tested for antibodies against the indicated *S. aureus* antigens (i, j). Data are represented as mean±s.e.m. (c-j). Significant differences were identified with the one-way ANOVA with Kruskal-Wallis test (d, e, g, f) and the two-tailed Student's t-test (i-j), and: **, P<0.01; *, P<0.05; ns=not significant. In i, the bars in each set of six data bars represent, from left to right, hIgG1, 3F6-hIgG1$_{CHO}$, 3F6-IgG1$_{CHO}^{-Gal}$, 3F6-hIgG1$_{HEK}$, 3F6-hIgG1$_{HEK}^{deGal}$ and 3F6-hIgG1$_{HEK}^{deSia}$, respectively. In j, the bars in each set of seven data bars represent, from left to right, hIgG1, 3F6-hIgG1$_{CHO}$, 3F6-IgG1$_{CHO}^{-G2F}$, 3F6-hIgG1$_{HEK}$, 3F6-hIgG1$_{HEK}^{-G0F}$ 3F6-hIgG1$_{HEK}^{-G1F}$, and 3F6-hIgG1$_{HEK}^{-G2F}$, respectively.

FIG. 9A-H. Contribution of complement and FcγRs to 3F6-hIgG1$_{HEK}$-mediated protection against MRSA bloodstream infection. a-c, Animals (Balb/c, n=10, two independent experiments) received control hIgG1, 3F6-hIgG1$_{HEK}$, 3F6-hIgG1$_{HEK}$-KA or 3F6-hIgG1$_{HEK}$-LALA before challenge with *S. aureus* MW2. Disease was assessed as described in FIG. 1. d-e, Animals (Balb/c, n=16-20, from two independent experiments) were treated with or without CVF along with control hIgG1 or 3F6-hIgG1$_{HEK}$ prior to challenge with *S. aureus* MW2. Disease was assessed by measuring bacterial loads and abscess lesions in kidneys 15 days post challenge. f-h, Animals (Balb/c, n=10, two independent experiments) were treated with control hIgG1, 3F6-hIgG1$_{HEK}$ or 3F6-hIgG1$_{HEK}$-afu antibodies prior to challenge with *S. aureus* MW2. Disease was assessed as described in FIG. 1. Data are represented as mean±s.e.m. Significant differences were identified with the one-way ANOVA with Kruskal-Wallis test: **, P<0.01; *, P<0.05. One of two repeats is shown.

FIG. 10A-C. 3F6-hIgG1$_{HEK}$ employs both complement and FcγRs to promote opsonophagocytic killing in human blood. a-b, Opsonophagocytic killing of *S. aureus* MW2 in human blood (n=4) in the absence of Cytochalasin D (CD), and in the absence of CVF. c, Opsonophagocytic killing activities of antibody variants as compared to hIgG1 and 3F6-hIgG1$_{HEK}$ toward *S. aureus* MW2 in human blood (n=10). Data was plotted as the average ±s.e.m. of CFU after 60 min incubation in blood as compared to CFU of inoculum (set as 100%). Significant differences were identified with the two-tailed Student's t test: *P<0.05; **P<0.01.

FIG. 11A-C. 3F6-hIgG1 produced by HEK 293F cells protects mice against MRSA bloodstream infection. a, Whole kidneys of animals from FIG. 1e. Examples of discoloration and abscesses are indicated with grey and white arrows, respectively. b, Sera (n=3) of animals passively immunized with PBS or 3F6-mhIgG2a, were tested for antibodies against the indicated *S. aureus* antigens. c, ELISA examining 3F6-hIgG1$_{CHO}$ and 3F6-hIgG1$_{HEK}$ affinity for the human neonatal Fc receptor FcRn (n=3). Data are represented as mean±s.e.m. (b-c). Significant differences were identified with the two-tailed Student's t-test (b): **, P<0.01; *, P<0.05.

FIG. 12A-J. Biochemical characterization of 3F6-hIgG1 glycoforms. Antibodies were serially diluted across ELISA plates coated with ECL (a, e) and SNA (b, h) to compare galactosylation and sialylation contents, respectively. c, f, i, Coomassie stained SDS-PAGE of purified antibodies. Number to the left of gel indicate molecular weight markers in kDa. d, g, j, Antibodies were serially diluted across ELISA plates coated with SpA$_{KKAA}$ to calculate the association constants shown in bold. Data are represented as mean s.e.m. (a, b, d, e, g, h, j). Experiments were performed in triplicate and affinity measurements are reported on the figure and in Table 1.

FIG. 13A-G. Impact of antibody glycosylation on C1q and FcγRs binding. Antibodies were serially diluted across ELISA plates coated with ligands as follows: C1q (a, b, e-g), mouse FcγRs (c), and human FcγRs (d). Data are represented as mean±s.e.m. Experiments were performed in triplicate and affinity measurements are reported on the figure and in Table 2.

FIG. 14A-I. Characterization of 3F6-hIgG1$_{HEK}$-KA or 3F6-hIgG1$_{HEK}$-LALA variants as compared to wild type 3F6-hIgG1$_{HEK}$. a, Coomassie stained SDS-PAGE of purified antibodies. Number to the left of gel indicate molecular weight markers in kDa. b-f, Antibodies were serially diluted across ELISA plates coated with SpA$_{KKAA}$ (b), lectins SNA, AAL, and ECL (c), human and mouse C1q (d), human FcγRs (e), and mouse FcγRs (f). g, i, Sera (n=8-10) of animals from FIG. 3a (g), and FIG. 3b (i) were tested for antibodies against the indicated *S. aureus* antigens. Significant differences were identified with the two-tailed Student's t-test: **, P<0.01; *, P<0.05. h, Whole kidneys of animals from FIG. 3b. Examples of discoloration and abscesses are indicated with grey and white arrows, respectively. Data are represented as mean±s.e.m. Experiments were performed in triplicate (b-f) and duplicate (g, i) and affinity measurements are reported on the figure and in Table 2.

FIG. 15A-G. Characterization of 3F6-hIgG1$_{HEK}$ and 3F6-hIgG1$_{HEK}$-afu antibodies. a, Coomassie stained SDS-PAGE of purified antibodies. Number to the left of gel indicate molecular weight markers in kDa. b-f, Antibodies were serially diluted across ELISA plates coated with SpA$_{KKAA}$ (b), lectins SNA, AAL, and ECL (c), human and mouse C1q (d), mouse FcγRs (e), and human FcγRs (f). g, Sera (n=8-10) of animals from FIG. 3c were tested for antibodies against the indicated *S. aureus* antigens. Significant differences were identified with the two-tailed Student's t-test (g): **, P<0.01; *, P<0.05. Data are represented as mean±s.e.m. Experiments were performed in triplicate (b-f) and duplicate (g) and affinity measurements are reported on the figure and in Table 2.

FIG. 17A-G. Amino acid substitutions in the Fc domain of 3F6-hIgG1 were generated to block the interaction between SpA and Fc. (a, f) Affinity of candidate antibodies for purified SpA and SpA$_{KKAA}$ was measured using ELISA. The control antibody hIgG1 only had high affinity for SpA. (b, g) Affinity of candidate antibodies for *S. aureus* Newman wild type (WT) and a variant isogenic spakkaa strain was measured using ELISA. The control antibody hIgG1 only bound to WT strain; as expected none of the antibodies interacted with bacteria of the Δspa strain which lacks the spa gene. (c) The addition of SpA, but not SpA$_{KKAA}$, reduced the binding between Tefibazumab (Tefi) and its ligand C1fA-A. (d) Tefibazumab displayed greater binding toward *S. aureus* Newman spakkaa strain as compared to the WT strain. The bars represent, from left to right, hIgG1 and Tefi, respectively, in each group of two bars for each set of data. (e) Displacement of immunocomplexes (IC) between candidate antibody variants and SpA$_{KKAA}$ by increasing concentrations of SpA$_{AA}$ (a SpA protein mutant that can only bind the Fc region of antibodies not the Fab).

FIG. 18A-C. (a) The mouse antibody 3F6-mIGg2a had a higher affinity for SpA$_{KKAA}$ compared to SpA, while mIgG2a only had high affinity for SpA. (b) All antibody variants had comparable affinity for SpA$_{KKAA}$. (c) Newman Δspa strain could not be recognized by 3F6-hIgG1 and its variants.

FIG. 19A-E. SpA no longer blocks binding between human c1q (hc1q) and 3F6-hIgG1$^{AESP}$ or 3F6-hIgG1$^R$. (a) 3F6-hIgG1 interaction with hc1q was greatly reduced in the presence of SpA and to less extend in the presence of SpA$_{KKAA}$. This was not the case for 3F6-hIgG1$^{AESP}$ and 3F6-hIgG1$^R$ which displayed similar binding with hc1q regardless of the presence of SpA or SpA$_{KKAA}$. (b) SpA blocked the association of ICs formed between Tefi and ClfA-A with hc1q. (c) 3F6-hIgG1$^{AESP}$ or 3F6-hIgG1$^R$ had higher hc1q binding in Newman WT strain and similar hc1q binding in Newman spakkaa strain as compared to 3F6-hIgG1. (d) Increasing Tefi gradually enhanced the hc1q binding to S. aureus Neman spakkaa, but not to the WT strain. (e) SpA did not block the binding of antibodies to human FcγRs and amino acid substitutions in antibody variants had no impact on human FcγRs interactions. The bars in c represent, from left to right, PBS, no hc1q or HS; PBS; hIgG1; 3F6-hIgG1; 3F6-hIgG1$^R$; and 3F6-hIgG1$^{AESP}$, respectively, for each set of bars. The bars in e represent, from left to right, PBS, no ligand; PBS; hIgG1; 3F6-hIgG1; 3F6-hIgG1$^R$; and 3F6-hIgG1$^{AESP}$, respectively, for each set of bars.

FIG. 20A-B. (a) SpA disrupts the interaction between 3F6-mIgG2a and mouse c1q (mc1q). (b) hIgG1 retains binding to mutant bacteria spa$_{aa}$ a variant strain that produces SpA$_{AA}$ that can no longer bind V$_H$3 antibodies suggesting that hIgG1 used in this assay is a non-V$_H$3 antibody.

FIG. 21A-K. (a) SpA interacts with mIgG2a, mIgG2b, and mIgG3 but not mIgG1. (b) SpA interacts with hIgG1, hIgG2, and hIgG4 but not hIgG3. (c, d) Injection of SpA in mice (n=5) does not alter the levels of mIgG1 (c) and mIgG2b (d) in serum. (e, f) Newman WT- and spakkaa-infected mice (n=5) display comparable mIgG1 (e) and mIgG2b (f) levels in serum. (g-j) Newman WT strain infection caused the expansions of V$_H$3 clonal mIgG1 (g), mIgG2a (h), mIgG2b (i), and mIgG3 (j). (k) Injection of SpA but not of SpA$_{KKAA}$ enhanced the immunogenicity of Tefibazumab (tefi) in mice (n=5). The bars in k represent, from left to right, Tefi, Tefi+SpA, and Tefi+SpA$_{KKAA}$, respectively, for each set of bars.

FIG. 22A-I. SpA interferes with FcRn-antibody interactions and affects antibody stability in animals, unless antibodies carry Fc substitutions such as 3F6-hIgG1$^{AESP}$ and 3F6-hIgG1$^R$. (a) mIgG2a, mIgG2b, and mIgG3 interactions with mouse FcRn (mFcRn) at pH 6.0 are displaced by SpA but not SpA$_{KKAA}$. (b) hIgG1, hIgG2, and hIgG4 interactions with human FcRn (hFcRn) at pH 6.0 are displaced by SpA but not SpA$_{KKAA}$. (c, d) Injection of SpA but not of SpA$_{KKAA}$ leads to reduced mIgG2a (c) and mIgG3 (d) levels in mouse serum as soon as 6 hours (h), and 6 h, 24 h, 3 days (d), respectively post SpA injection. (e, f) Compared to mice infected with Newman spakkaa, mice that infected with WT strain Newman display lower mIgG2a (e) and mIgG3 (f) levels in serum at early stage post infection (n=5 mice per groups). (g) hIgG1 or hIgG3 were intraperitoneally injected into MT mice (100 μg antibody/mouse) prior to staphylococcal infection. Subsequent infection with S. aureus Newman WT, but not mutant spakkaa strain, caused lower levels of hIgG1, but not hIgG3, in MT mice (n=5). (h) SpA decreased the stability of Tefi in WT mice. SpA (4 μg) or SpA$_{KKAA}$ (4 μg) was mixed with Tefi (100 μg) and the mixture was then intraperitoneally injected into WT mice. (i) Antibody half-life in animals. Compared to 3F6-hIgG1$^{AESP}$ and 3F6-hIgG1$^R$, the half-life of 3F6-hIgG1 was greatly reduced when animals were injected with SpA. All antibodies had comparable half-life in PBS- and SpA$_{KKAA}$-injected mice although their stability was greater following PBS inoculation.

FIG. 23A-B. 3F6-hIgG1$^{AESP}$ and 3F6-hIgG1$^R$ promote anti-staphylococcal activity in vitro and in vivo. (a) 3F6-hIgG1$^{AESP}$ (fourth bar) and 3F6-hIgG1$^R$ (third bar) had better killing of MW2 than original 3F6-hIgG1 (second bar). The first bar is hIgG1 control. (b) Tefi uniquely increased the killing of S. aureus Newman spakkaa strain.

FIG. 24A-E. (a) 3F6-hIgG1$^{AESP}$ (third bar of each data set) enhanced the killing of USA300 in human blood. The first bar of each data set is hIgG1 and the second bar of each data set is 3F6-hIgG1. (b and c) 3F6-hIgG1$^R$ had comparable affinity for mFcRn at pH 6.0 (b) and pH 7.0 (c) as compared to 3F6-hIgG1, and the mFcRn affinity at pH 6.0 and pH 7.0 was lower in 3F6-hIgG1$^{AESP}$. (d) 3F6-hIgG1$^{AESP}$ and 3F6-hIgG1$^R$ exhibited lower affinity for hFcRn at pH 6.0 as compared to 3F6-hIgG1. (e) All antibodies showed no affinity for hFcRn at pH 7.0.

FIG. 25A-D. (a) The new variants of 3F6-hIgG1 were shown in SDS-PAGE under non-reduction and reduction condition. Non-redu, non-reduction; Redu, reduction. (b) All new variants displayed similar affinity for Newman spakkaa strain. (c) No affinity for Newman zspa strain was shown by all variants. (d) 3F6-hIgG1$^{R-QVV}$ (third bar of each set) and 3F6-hIgG1$^{R-DDRVV}$ (fourth bar of each set) had high immunogenicity in WT mice. On day 11 and 31 post antibody injection, the secondary antibodies against 3F6-hIgG1$^{R-QVV}$ and 3F6-hIgG1$^{R-DDRVV}$ were detected in WT mice. The first, second, and fifth bar of each set represent 3F6-hIgG1, 3F6-hIgG1$^R$, and 3F6-hIgG1$^{AESP}$, respectively.

FIG. 26A-D. New 3F6-hIgG1 variants with improve affinity toward human FcRn at pH6. (a) New antibody variants had comparable affinity for Newman WT strain. (b) New antibody variants exhibited similar affinity toward hc1q as compared to 3F6-hIgG1$^{AESP}$ and 3F6-hIgG1$^R$. (c) Binding affinities of new variants against human and mouse FcRn (hFcRn, mFcRn) were examined at pH6 and pH7. Antibody with greater stability in vivo are expected to display high affinity at pH6 and low affinity at pH7 toward FcRn. (d) The half-life of 3F6-hIgG1$^{R-QVV}$ and 3F6-hIgG1$^{R-DDRVV}$ was dramatically reduced as compared to that of 3F6-hIgG1, 3F6-hIgG1$^{AESP}$ and 3F6-hIgG1$^R$ in mice. This was not unexpected given the high affinity of these antibodies for mFcRn at pH7. Thus, the stability of these human antibody variants cannot be accurately assessed in wild type mice and should be assessed in transgenic mouse model of human FcRn.

DETAILED DESCRIPTION

Figure 16:
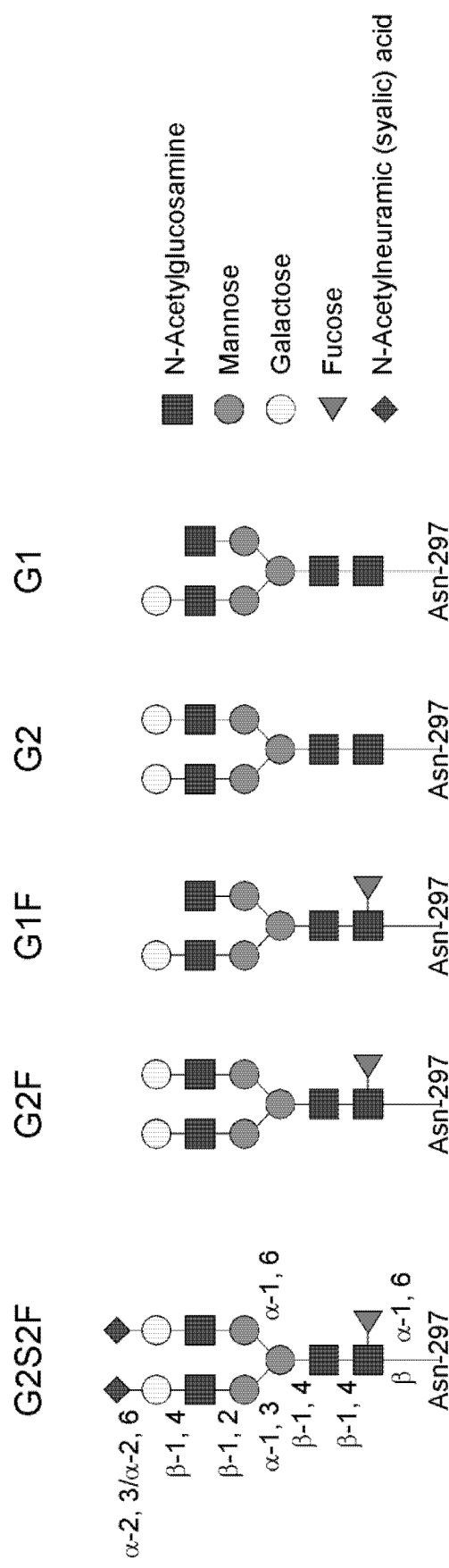
FIG. 16 shows the schematic G2S2F, G1F, G2F, G2 and G1 structures of the antibody.

Methicillin-resistant *Staphylococcus aureus* (MRSA) colonize the nasopharynx and GI tract of healthy individuals and of patients admitted to hospitals. Colonization is the key risk factor for community-acquired and hospital-acquired MRSA invasive diseases. MRSA infection is associated with treatment failure, increased morbidity, and increased mortality. Prior attempts to develop vaccines or immune therapeutics that can prevent MRSA colonization or invasive disease or that improve the outcome of MRSA infections have failed. Infected individuals cannot develop protective antibody responses (immunity), which enables MRSA to persist within host tissues and to cause recurrent disease. MRSA immune escape is based on immunoglobulin-binding proteins, specifically staphylococcal protein A (SpA) and staphylococcal binder of immunoglobulin (Sbi). SpA and Sbi block effector functions of human IgG by binding to the Fcγ domain of antibodies. SpA also binds to the variant heavy chains of $V_H3$-idiotypic immunoglobulin and cross-links IgM B cell receptors, thereby activating B cell proliferation and the secretion of $V_H3$-clonal antibodies that fail to recognize MRSA. This B cell superantigen activity (BCSA) of SpA is essential for the diversion of antibody responses during MRSA colonization and invasive disease. This disclosure relates to antibodies that bind and neutralizes SpA and Sbi. The inventors show that MAb 3F6 galactosylation at Fcγ promotes C1q binding, MAb 3F6-dependent opsonophagocytic killing (OPK) of MRSA and protection of mice against MRSA bloodstream infection. Further, the inventors isolated amino acid substitutions in Fcγ that abolish SpA and Sbi binding and enhance the OPK activity of variant MAb 3F6. The inventors also report that SpA is essential for suppression of antibody responses (BCSA) against bacterial colonization factors, thereby enabling *S. aureus* persistence in the nasopharynx and GI tract. Intravenous administration of MAb 3F6 into mice neutralizes circulating SpA and blocks its BCSA, thereby promoting antibody responses against bacterial surface antigens and the removal of *S. aureus* from the nasopharynx and GI tract. Here, the inventors will test the hypotheses that intravenous administration of glyco- and Fcγ-engineered human 3F6-IgG1 in preclinical models a) elicits broad spectrum antibody responses against *S. aureus, b*) promotes decolonization of MSSA and MRSA, c) induces immunity to prevent re-colonization as well as invasive MSSA and MRSA disease, and d) improves the outcome of MRSA bloodstream infections. Glyco- and Fcγ-engineered 3F6 antibodies that achieve such product profile can be developed further for clinical testing to prevent and treat MRSA infections in American hospitals.

I. Antibodies

Aspects of the disclosure relate to antibodies comprising a heavy or light chain of monoclonal antibody clone 3F6, respectively, or fragments thereof. The term "antibody" refers to an intact immunoglobulin of any isotype, or a fragment thereof that can compete with the intact antibody for specific binding to the target antigen, and includes chimeric, humanized, fully human, and bispecific antibodies. As used herein, the terms "antibody" or "immunoglobulin" are used interchangeably and refer to any of several classes of structurally related proteins that function as part of the immune response of an animal, including IgG, IgD, IgE, IgA, IgM, and related proteins, as well as polypeptides comprising antibody CDR domains that retain antigen-binding activity.

The term "antigen" refers to a molecule or a portion of a molecule capable of being bound by a selective binding agent, such as an antibody. An antigen may possess one or more epitopes that are capable of interacting with different antibodies.

The term "epitope" includes any region or portion of molecule capable eliciting an immune response by binding to an immunoglobulin or to a T-cell receptor. Epitope determinants may include chemically active surface groups such as amino acids, sugar side chains, phosphoryl or sulfonyl groups, and may have specific three-dimensional structural characteristics and/or specific charge characteristics. Generally, antibodies specific for a particular target antigen will preferentially recognize an epitope on the target antigen within a complex mixture.

The epitope regions of a given polypeptide can be identified using many different epitope mapping techniques are well known in the art, including: x-ray crystallography, nuclear magnetic resonance spectroscopy, site-directed mutagenesis mapping, protein display arrays, see, e.g., Epitope Mapping Protocols, (Johan Rockberg and Johan Nilvebrant, Ed., 2018) Humana Press, New York, N.Y. Such techniques are known in the art and described in, e.g., U.S. Pat. No. 4,708,871; Geysen et al. Proc. Natl. Acad. Sci. USA 81:3998-4002 (1984); Geysen et al. Proc. Natl. Acad. Sci. USA 82:178-182 (1985); Geysen et al. Molec. Immunol. 23:709-715 (1986). Additionally, antigenic regions of proteins can also be predicted and identified using standard antigenicity and hydropathy plots.

The term "immunogenic sequence" means a molecule that includes an amino acid sequence of at least one epitope such that the molecule is capable of stimulating the production of antibodies in an appropriate host. The term "immunogenic composition" means a composition that comprises at least one immunogenic molecule (e.g., an antigen or carbohydrate).

An intact antibody is generally composed of two full-length heavy chains and two full-length light chains, but in some instances may include fewer chains, such as antibodies naturally occurring in camelids that may comprise only heavy chains. Antibodies as disclosed herein may be derived solely from a single source or may be "chimeric," that is, different portions of the antibody may be derived from two different antibodies. For example, the variable or CDR regions may be derived from a rat or murine source, while the constant region is derived from a different animal source, such as a human. The antibodies or binding fragments may be produced in hybridomas, by recombinant DNA techniques, or by enzymatic or chemical cleavage of intact antibodies. Unless otherwise indicated, the term "antibody" includes derivatives, variants, fragments, and muteins thereof, examples of which are described below (Sela-Culang et al., Front Immunol. 2013; 4: 302; 2013).

The term "light chain" includes a full-length light chain and fragments thereof having sufficient variable region sequence to confer binding specificity. A full-length light chain has a molecular weight of around 25,000 Daltons and includes a variable region domain (abbreviated herein as VL), and a constant region domain (abbreviated herein as CL). There are two classifications of light chains, identified as kappa (κ) and lambda (λ). The term "VL fragment" means a fragment of the light chain of a monoclonal antibody that includes all or part of the light chain variable region, including CDRs. A VL fragment can further include light chain constant region sequences. The variable region domain of the light chain is at the amino-terminus of the polypeptide.

The term "heavy chain" includes a full-length heavy chain and fragments thereof having sufficient variable region sequence to confer binding specificity. A full-length heavy chain has a molecular weight of around 50,000 Daltons and includes a variable region domain (abbreviated herein as VH), and three constant region domains (abbreviated herein as CH1, CH2, and CH3). The term "VH fragment" means a fragment of the heavy chain of a monoclonal antibody that includes all or part of the heavy chain variable region, including CDRs. A VH fragment can further include heavy chain constant region sequences. The number of heavy chain constant region domains will depend on the isotype. The VH domain is at the amino-terminus of the polypeptide, and the CH domains are at the carboxy-terminus, with the CH3 being closest to the —COOH end. The isotype of an antibody can be IgM, IgD, IgG, IgA, or IgE and is defined by the heavy chains present of which there are five classifications: mu (µ), delta (d), gamma (γ), alpha (α), or epsilon (e) chains, respectively. IgG has several subtypes, including, but not limited to, IgG1, IgG2, IgG3, and IgG4. IgM subtypes include IgM1 and IgM2. IgA subtypes include IgA1 and IgA2.

Antibodies can be whole immunoglobulins of any isotype or classification, chimeric antibodies, or hybrid antibodies with specificity to two or more antigens. They may also be fragments (e.g., F(ab')2, Fab', Fab, Fv, and the like), including hybrid fragments. An immunoglobulin also includes natural, synthetic, or genetically engineered proteins that act like an antibody by binding to specific antigens to form a complex. The term antibody includes genetically engineered or otherwise modified forms of immunoglobulins, such as the following:

The term "monomer" means an antibody containing only one Ig unit. Monomers are the basic functional units of antibodies. The term "dimer" means an antibody containing two Ig units attached to one another via constant domains of the antibody heavy chains (the Fc, or fragment crystallizable, region). The complex may be stabilized by a joining (J) chain protein. The term "multimer" means an antibody containing more than two Ig units attached to one another via constant domains of the antibody heavy chains (the Fc region). The complex may be stabilized by a joining (J) chain protein.

The term "bivalent antibody" means an antibody that comprises two antigen-binding sites. The two binding sites may have the same antigen specificities or they may be bispecific, meaning the two antigen-binding sites have different antigen specificities.

Bispecific antibodies are a class of antibodies that have two paratopes with different binding sites for two or more distinct epitopes. In some embodiments, bispecific antibodies can be biparatopic, wherein a bispecific antibody may specifically recognize a different epitope from the same antigen. In some embodiments, bispecific antibodies can be constructed from a pair of different single domain antibodies termed "nanobodies". Single domain antibodies are sourced and modified from cartilaginous fish and camelids. Nanobodies can be joined together by a linker using techniques typical to a person skilled in the art; such methods for selection and joining of nanobodies are described in PCT Publication No. WO2015044386A1, No. WO2010037838A2, and Bever et al., Anal Chem. 86:7875-7882 (2014), each of which are specifically incorporated herein by reference in their entirety.

Bispecific antibodies can be constructed as: a whole IgG, Fab'2, Fab'PEG, a diabody, or alternatively as scFv. Diabodies and scFvs can be constructed without an Fc region, using only variable domains, potentially reducing the effects of anti-idiotypic reaction. Bispecific antibodies may be produced by a variety of methods including, but not limited to, fusion of hybridomas or linking of Fab' fragments. See, e.g., Songsivilai and Lachmann, Clin. Exp. Immunol. 79:315-321 (1990); Kostelny et al., J. Immunol. 148:1547-1553 (1992), each of which are specifically incorporated by reference in their entirety.

In certain aspects, the antigen-binding domain may be multispecific or heterospecific by multimerizing with VH and VL region pairs that bind a different antigen. For example, the antibody may bind to, or interact with, (a) a cell surface antigen, (b) an Fc receptor on the surface of an effector cell, or (c) at least one other component. Accordingly, aspects may include, but are not limited to, bispecific, trispecific, tetraspecific, and other multispecific antibodies or antigen-binding fragments thereof that are directed to epitopes and to other targets, such as Fc receptors on effector cells.

In some embodiments, multispecific antibodies can be used and directly linked via a short flexible polypeptide chain, using routine methods known in the art. One such example is diabodies that are bivalent, bispecific antibodies in which the VH and VL domains are expressed on a single polypeptide chain, and utilize a linker that is too short to allow for pairing between domains on the same chain, thereby forcing the domains to pair with complementary domains of another chain creating two antigen binding sites. The linker functionality is applicable for embodiments of triabodies, tetrabodies, and higher order antibody multimers. (see, e.g., Hollinger et al., Proc Natl. Acad. Sci. USA 90:6444-6448 (1993); Polijak et al., Structure 2:1121-1123 (1994); Todorovska et al., J. Immunol. Methods 248:47-66 (2001)).

Bispecific diabodies, as opposed to bispecific whole antibodies, may also be advantageous because they can be readily constructed and expressed in *E. coli*. Diabodies (and other polypeptides such as antibody fragments) of appropriate binding specificities can be readily selected using phage display (WO94/13804) from libraries. If one arm of the diabody is kept constant, for instance, with a specificity directed against a protein, then a library can be made where the other arm is varied and an antibody of appropriate specificity selected. Bispecific whole antibodies may be made by alternative engineering methods as described in Ridgeway et al., (Protein Eng., 9:616-621, 1996) and Krah et al., (N Biotechnol. 39:167-173, 2017), each of which is hereby incorporated by reference in their entirety.

Heteroconjugate antibodies are composed of two covalently linked monoclonal antibodies with different specificities. See, e.g., U.S. Pat. No. 6,010,902, incorporated herein by reference in its entirety.

The part of the Fv fragment of an antibody molecule that binds with high specificity to the epitope of the antigen is referred to herein as the "paratope." The paratope consists of the amino acid residues that make contact with the epitope of an antigen to facilitate antigen recognition. Each of the two Fv fragments of an antibody is composed of the two variable domains, VH and VL, in dimerized configuration. The primary structure of each of the variable domains includes three hypervariable loops separated by, and flanked by, Framework Regions (FR). The hypervariable loops are the regions of highest primary sequences variability among the antibody molecules from any mammal. The term hypervariable loop is sometimes used interchangeably with the term "Complementarity Determining Region (CDR)." The length of the hypervariable loops (or CDRs) varies between antibody molecules. The framework regions of all antibody molecules from a given mammal have high primary sequence similarity/consensus. The consensus of framework regions can be used by one skilled in the art to identify both the framework regions and the hypervariable loops (or CDRs) which are interspersed among the framework regions. The hypervariable loops are given identifying names which distinguish their position within the polypeptide, and on which domain they occur. CDRs in the VL domain are identified as L1, L2, and L3, with L1 occurring at the most distal end and L3 occurring closest to the CL domain. The CDRs may also be given the names CDR-1, CDR-2, and CDR-3. The L3 (CDR-3) is generally the region of highest variability among all antibody molecules produced by a given organism. The CDRs are regions of the polypeptide chain arranged linearly in the primary structure, and separated from each other by Framework Regions. The amino terminal (N-terminal) end of the VL chain is named FR1. The region identified as FR2 occurs between L1 and L2 hypervariable loops. FR3 occurs between L2 and L3 hypervariable loops, and the FR4 region is closest to the CL domain. This structure and nomenclature is repeated for the VH chain, which includes three CDRs identified as H1, H2 and H3. The majority of amino acid residues in the variable domains, or Fv fragments (VH and VL), are part of the framework regions (approximately 85%). The three dimensional, or tertiary, structure of an antibody molecule is such that the framework regions are more internal to the molecule and provide the majority of the structure, with the CDRs on the external surface of the molecule.

Several methods have been developed and can be used by one skilled in the art to identify the exact amino acids that constitute each of these regions. This can be done using any of a number of multiple sequence alignment methods and algorithms, which identify the conserved amino acid residues that make up the framework regions, therefore identifying the CDRs that may vary in length but are located between framework regions. Three commonly used methods have been developed for identification of the CDRs of antibodies: Kabat (as described in T. T. Wu and E. A. Kabat, "AN ANALYSIS OF THE SEQUENCES OF THE VARIABLE REGIONS OF BENCE JONES PROTEINS AND MYELOMA LIGHT CHAINS AND THEIR IMPLICATIONS FOR ANTIBODY COMPLEMENTARITY," *J Exp Med*, vol. 132, no. 2, pp. 211-250, Aug. 1970); Chothia (as described in C. Chothia et al., "Conformations of immunoglobulin hypervariable regions," *Nature*, vol. 342, no. 6252, pp. 877-883, December 1989); and IMGT (as described in M. P. Lefranc et al., "IMGT unique numbering for immunoglobulin and T cell receptor variable domains and Ig superfamily V-like domains," *Developmental & Comparative Immunology*, vol. 27, no. 1, pp. 55-77, January 2003). These methods each include unique numbering systems for the identification of the amino acid residues that constitute the variable regions. In most antibody molecules, the amino acid residues that actually contact the epitope of the antigen occur in the CDRs, although in some cases, residues within the framework regions contribute to antigen binding.

One skilled in the art can use any of several methods to determine the paratope of an antibody. These methods include: 1) Computational predictions of the tertiary structure of the antibody/epitope binding interactions based on the chemical nature of the amino acid sequence of the antibody variable region and composition of the epitope; 2) Hydrogen-deuterium exchange and mass spectroscopy; 3) Polypeptide fragmentation and peptide mapping approaches in which one generates multiple overlapping peptide fragments from the full length of the polypeptide and evaluates the binding affinity of these peptides for the epitope; 4) Antibody Phage Display Library analysis in which the antibody Fab fragment encoding genes of the mammal are expressed by bacteriophage in such a way as to be incorporated into the coat of the phage. This population of Fab expressing phage are then allowed to interact with the antigen which has been immobilized or may be expressed in by a different exogenous expression system. Non-binding Fab fragments are washed away, thereby leaving only the specific binding Fab fragments attached to the antigen. The binding Fab fragments can be readily isolated and the genes which encode them determined. This approach can also be used for smaller regions of the Fab fragment including Fv fragments or specific VH and VL domains as appropriate.

In certain aspects, affinity matured antibodies are enhanced with one or more modifications in one or more CDRs thereof that result in an improvement in the affinity of the antibody for a target antigen as compared to a parent antibody that does not possess those alteration(s). Certain affinity matured antibodies will have nanomolar or picomolar affinities for the target antigen. Affinity matured antibodies are produced by procedures known in the art, e.g., Marks et al., Bio/Technology 10:779 (1992) describes affinity maturation by VH and VL domain shuffling, random mutagenesis of CDR and/or framework residues employed in phage display is described by Rajpal et al., PNAS. 24: 8466-8471 (2005) and Thie et al., Methods Mol Biol. 525:309-22 (2009) in conjugation with computation methods as demonstrated in Tiller et al., Front. Immunol. 8:986 (2017).

Chimeric immunoglobulins are the products of fused genes derived from different species; "humanized" chimeras generally have the framework region (FR) from human immunoglobulins and one or more CDRs are from a non-human source.

In certain aspects, portions of the heavy and/or light chain are identical or homologous to corresponding sequences from another particular species or belonging to a particular antibody class or subclass, while the remainder of the chain(s) is identical or homologous to corresponding sequences in antibodies derived from another species or belonging to another antibody class or subclass, as well as fragments of such antibodies, so long as they exhibit the desired biological activity. U.S. Pat. No. 4,816,567; and Morrison et al., Proc. Natl. Acad. Sci. USA 81:6851 (1984). For methods relating to chimeric antibodies, see, e.g., U.S. Pat. No. 4,816,567; and Morrison et al., Proc. Natl. Acad. Sci. USA 81:6851-6855 (1985), each of which are specifically incorporated herein by reference in their entirety. CDR grafting is described, for example, in U.S. Pat. Nos. 6,180, 370, 5,693,762, 5,693,761, 5,585,089, and 5,530,101, which are all hereby incorporated by reference for all purposes.

In some embodiments, minimizing the antibody polypeptide sequence from the non-human species optimizes chimeric antibody function and reduces immunogenicity. Specific amino acid residues from non-antigen recognizing regions of the non-human antibody are modified to be homologous to corresponding residues in a human antibody or isotype. One example is the "CDR-grafted" antibody, in which an antibody comprises one or more CDRs from a particular species or belonging to a specific antibody class or subclass, while the remainder of the antibody chain(s) is identical or homologous to a corresponding sequence in antibodies derived from another species or belonging to another antibody class or subclass. For use in humans, the V region composed of CDR1, CDR2, and partial CDR3 for both the light and heavy chain variance region from a non-human immunoglobulin, are grafted with a human antibody framework region, replacing the naturally occurring antigen receptors of the human antibody with the non-human CDRs. In some instances, corresponding non-human residues replace framework region residues of the human immunoglobulin. Furthermore, humanized antibodies may comprise residues that are not found in the recipient antibody or in the donor antibody to further refine performance. The humanized antibody may also comprise at least a portion of an immunoglobulin constant region (Fc), typically that of a human immunoglobulin. See, e.g., Jones et al., Nature 321:522 (1986); Riechmann et al., Nature 332:323 (1988); Presta, Curr. Op. Struct. Biol. 2:593 (1992); Vaswani and Hamilton, Ann. Allergy, Asthma and Immunol. 1:105 (1998); Harris, Biochem. Soc. Transactions 23; 1035 (1995); Hurle and Gross, Curr. Op. Biotech. 5:428 (1994); Verhoeyen et al., Science 239:1534-36 (1988).

Intrabodies are intracellularly localized immunoglobulins that bind to intracellular antigens as opposed to secreted antibodies, which bind antigens in the extracellular space.

Polyclonal antibody preparations typically include different antibodies against different determinants (epitopes). In order to produce polyclonal antibodies, a host, such as a rabbit or goat, is immunized with the antigen or antigen fragment, generally with an adjuvant and, if necessary, coupled to a carrier. Antibodies to the antigen are subsequently collected from the sera of the host. The polyclonal antibody can be affinity purified against the antigen rendering it monospecific.

Monoclonal antibodies or "mAb" refer to an antibody obtained from a population of homogeneous antibodies from an exclusive parental cell, e.g., the population is identical except for naturally occurring mutations that may be present in minor amounts. Each monoclonal antibody is directed against a single antigenic determinant.

A. Functional Antibody Fragments and Antigen-Binding Fragments

1. Antigen-Binding Fragments

Certain aspects relate to antibody fragments, such as antibody fragments that bind to and/or neutralize inflammatory mediators. The term functional antibody fragment includes antigen-binding fragments of an antibody that retain the ability to specifically bind to an antigen. These fragments are constituted of various arrangements of the variable region heavy chain (VH) and/or light chain (VL); and in some embodiments, include constant region heavy chain 1 (CH1) and light chain (CL). In some embodiments, they lack the Fc region constituted of heavy chain 2 (CH2) and 3 (CH3) domains. Embodiments of antigen binding fragments and the modifications thereof may include: (i) the Fab fragment type constituted with the VL, VH, CL, and CH1 domains; (ii) the Fd fragment type constituted with the VH and CH1 domains; (iii) the Fv fragment type constituted with the VH and VL domains; (iv) the single domain fragment type, dAb, (Ward, 1989; McCafferty et al., 1990; Holt et al., 2003) constituted with a single VH or VL domain; (v) isolated complementarity determining region (CDR) regions. Such terms are described, for example, in Harlow and Lane, Antibodies: A Laboratory Manual, Cold Spring Harbor Laboratory, N Y (1989); Molec. Biology and Biotechnology: A Comprehensive Desk Reference (Myers, R. A. (ed.), New York: VCH Publisher, Inc.); Huston et al., Cell Biophysics, 22:189-224 (1993); Pluckthun and Skerra, Meth. Enzymol., 178:497-515 (1989) and in Day, E. D., Advanced Immunochemistry, 2d ed., Wiley-Liss, Inc. New York, N.Y. (1990); Antibodies, 4:259-277 (2015). The citations in this paragraph are all incorporated by reference.

Antigen-binding fragments also include fragments of an antibody that retain exactly, at least, or at most 1, 2, or 3 complementarity determining regions (CDRs) from a light chain variable region. Fusions of CDR-containing sequences to an Fc region (or a CH2 or CH3 region thereof) are included within the scope of this definition including, for example, scFv fused, directly or indirectly, to an Fc region are included herein.

The term Fab fragment means a monovalent antigen-binding fragment of an antibody containing the VL, VH, CL and CH1 domains. The term Fab' fragment means a monovalent antigen-binding fragment of a monoclonal antibody that is larger than a Fab fragment. For example, a Fab' fragment includes the VL, VH, CL and CH1 domains and all or part of the hinge region. The term F(ab')2 fragment means a bivalent antigen-binding fragment of a monoclonal antibody comprising two Fab' fragments linked by a disulfide bridge at the hinge region. An F(ab')2 fragment includes, for example, all or part of the two VH and VL domains, and can further include all or part of the two CL and CH1 domains.

The term Fd fragment means a fragment of the heavy chain of a monoclonal antibody, which includes all or part of the VH, including the CDRs. An Fd fragment can further include CH1 region sequences.

The term Fv fragment means a monovalent antigen-binding fragment of a monoclonal antibody, including all or part of the VL and VH, and absent of the CL and CH1 domains. The VL and VH include, for example, the CDRs. Single-chain antibodies (sFv or scFv) are Fv molecules in which the VL and VH regions have been connected by a flexible linker to form a single polypeptide chain, which forms an antigen-binding fragment. Single chain antibodies are discussed in detail in International Patent Application Publication No. WO 88/01649 and U.S. Pat. Nos. 4,946,778 and 5,260,203, the disclosures of which are herein incorporated by reference. The term (scFv)2 means bivalent or bispecific sFv polypeptide chains that include oligomerization domains at their C-termini, separated from the sFv by a hinge region (Pack et al. 1992). The oligomerization domain comprises self-associating a-helices, e.g., leucine zippers, which can be further stabilized by additional disulfide bonds. (scFv)2 fragments are also known as "miniantibodies" or "minibodies."

A single domain antibody is an antigen-binding fragment containing only a VH or the VL domain. In some instances, two or more VH regions are covalently joined with a peptide linker to create a bivalent domain antibody. The two VH regions of a bivalent domain antibody may target the same or different antigens.

2. Fragment Crystallizable Region, Fc

An Fc region contains two heavy chain fragments comprising the CH2 and CH3 domains of an antibody. The two heavy chain fragments are held together by two or more disulfide bonds and by hydrophobic interactions of the CH3 domains. The term "Fc polypeptide" as used herein includes native and mutein forms of polypeptides derived from the Fc region of an antibody. Truncated forms of such polypeptides containing the hinge region that promotes dimerization are included.

B. Polypeptides with Antibody CDRs & Scaffolding Domains that Display the CDRs

Antigen-binding peptide scaffolds, such as complementarity-determining regions (CDRs), are used to generate protein-binding molecules in accordance with the embodiments. Generally, a person skilled in the art can determine the type of protein scaffold on which to graft at least one of the CDRs. It is known that scaffolds, optimally, must meet a number of criteria such as: good phylogenetic conservation; known three-dimensional structure; small size; few or no post-transcriptional modifications; and/or be easy to produce, express, and purify. Skerra, J Mol Recognit, 13:167-87 (2000).

The protein scaffolds can be sourced from, but not limited to: fibronectin type III FN3 domain (known as "monobodies"), fibronectin type III domain 10, lipocalin, anticalin, Z-domain of protein A of *Staphylococcus aureus*, thioredoxin A or proteins with a repeated motif such as the "ankyrin repeat", the "armadillo repeat", the "leucine-rich repeat" and the "tetratricopeptide repeat". Such proteins are described in US Patent Publication Nos. 2010/0285564, 2006/0058510, 2006/0088908, 2005/0106660, and PCT Publication No. WO2006/056464, each of which are specifically incorporated herein by reference in their entirety. Scaffolds derived from toxins from scorpions, insects, plants, mollusks, etc., and the protein inhibiters of neuronal NO synthase (PIN) may also be used.

C. Types of Antibodies

Antibodies can be whole immunoglobulins of any isotype or classification, chimeric antibodies, or hybrid antibodies with specificity to two or more antigens. They may also be fragments (e.g., F(ab')2, Fab', Fab, Fv, and the like), including hybrid fragments. An immunoglobulin also includes natural, synthetic, or genetically engineered proteins that act like an antibody by binding to specific antigens to form a complex. The term antibody includes genetically engineered or otherwise modified forms of immunoglobulins.

The term "monomer" means an antibody containing only one Ig unit. Monomers are the basic functional units of antibodies. The term "dimer" means an antibody containing two Ig units attached to one another via constant domains of the antibody heavy chains (the Fc, or fragment crystallizable, region). The complex may be stabilized by a joining (J) chain protein. The term "multimer" means an antibody containing more than two Ig units attached to one another via constant domains of the antibody heavy chains (the Fc region). The complex may be stabilized by a joining (J) chain protein.

The term "bivalent antibody" means an antibody that comprises two antigen-binding sites. The two binding sites may have the same antigen specificities or they may be bispecific, meaning the two antigen-binding sites have different antigen specificities.

Bispecific antibodies are a class of antibodies that have two paratopes with different binding sites for two or more distinct epitopes. In some embodiments, bispecific antibodies can be biparatopic, wherein a bispecific antibody may specifically recognize a different epitope from the same antigen. In some embodiments, bispecific antibodies can be constructed from a pair of different single domain antibodies termed "nanobodies". Single domain antibodies are sourced and modified from cartilaginous fish and camelids. Nanobodies can be joined together by a linker using techniques typical to a person skilled in the art; such methods for selection and joining of nanobodies are described in PCT Publication No. WO2015044386A1, No. WO2010037838A2, and Bever et al., Anal Chem. 86:7875-7882 (2014), each of which are specifically incorporated herein by reference in their entirety.

Bispecific antibodies can be constructed as: a whole IgG, Fab'2, Fab'PEG, a diabody, or alternatively as scFv. Diabodies and scFvs can be constructed without an Fc region, using only variable domains, potentially reducing the effects of anti-idiotypic reaction. Bispecific antibodies may be produced by a variety of methods including, but not limited to, fusion of hybridomas or linking of Fab' fragments. See, e.g., Songsivilai and Lachmann, Clin. Exp. Immunol. 79:315-321 (1990); Kostelny et al., J. Immunol. 148:1547-1553 (1992), each of which are specifically incorporated by reference in their entirety.

In certain aspects, the antigen-binding domain may be multispecific or heterospecific by multimerizing with VH and VL region pairs that bind a different antigen. For example, the antibody may bind to, or interact with, (a) a cell surface antigen, (b) an Fc receptor on the surface of an effector cell, or (c) at least one other component. Accordingly, aspects may include, but are not limited to, bispecific, trispecific, tetraspecific, and other multispecific antibodies or antigen-binding fragments thereof that are directed to epitopes and to other targets, such as Fc receptors on effector cells.

In some embodiments, multispecific antibodies can be used and directly linked via a short flexible polypeptide chain, using routine methods known in the art. One such example is diabodies that are bivalent, bispecific antibodies in which the VH and VL domains are expressed on a single polypeptide chain, and utilize a linker that is too short to allow for pairing between domains on the same chain, thereby forcing the domains to pair with complementary domains of another chain creating two antigen binding sites. The linker functionality is applicable for embodiments of triabodies, tetrabodies, and higher order antibody multimers. (see, e.g., Hollinger et al., Proc Natl. Acad. Sci. USA 90:6444-6448 (1993); Polijak et al., Structure 2:1121-1123 (1994); Todorovska et al., J. Immunol. Methods 248:47-66 (2001)).

Bispecific diabodies, as opposed to bispecific whole antibodies, may also be advantageous because they can be readily constructed and expressed in $E.$ $coli$. Diabodies (and other polypeptides such as antibody fragments) of appropriate binding specificities can be readily selected using phage display (WO94/13804) from libraries. If one arm of the diabody is kept constant, for instance, with a specificity directed against a protein, then a library can be made where the other arm is varied and an antibody of appropriate specificity selected. Bispecific whole antibodies may be made by alternative engineering methods as described in Ridgeway et al., (Protein Eng., 9:616-621, 1996) and Krah et al., (N Biotechnol. 39:167-173, 2017), each of which is hereby incorporated by reference in their entirety.

Heteroconjugate antibodies are composed of two covalently linked monoclonal antibodies with different specificities. See, e.g., U.S. Pat. No. 6,010,902, incorporated herein by reference in its entirety.

The part of the Fv fragment of an antibody molecule that binds with high specificity to the epitope of the antigen is referred to herein as the "paratope." The paratope consists of the amino acid residues that make contact with the epitope of an antigen to facilitate antigen recognition. Each of the two Fv fragments of an antibody is composed of the two variable domains, VH and VL, in dimerized configuration. The primary structure of each of the variable domains includes three hypervariable loops separated by, and flanked by, Framework Regions (FR). The hypervariable loops are the regions of highest primary sequences variability among the antibody molecules from any mammal. The term hypervariable loop is sometimes used interchangeably with the term "Complementarity Determining Region (CDR)." The length of the hypervariable loops (or CDRs) varies between antibody molecules. The framework regions of all antibody molecules from a given mammal have high primary sequence similarity/consensus. The consensus of framework regions can be used by one skilled in the art to identify both the framework regions and the hypervariable loops (or CDRs) which are interspersed among the framework regions. The hypervariable loops are given identifying names which distinguish their position within the polypeptide, and on which domain they occur. CDRs in the VL domain are identified as L1, L2, and L3, with L1 occurring at the most distal end and L3 occurring closest to the CL domain. The CDRs may also be given the names CDR-1, CDR-2, and CDR-3. The L3 (CDR-3) is generally the region of highest variability among all antibody molecules produced by a given organism. The CDRs are regions of the polypeptide chain arranged linearly in the primary structure, and separated from each other by Framework Regions. The amino terminal (N-terminal) end of the VL chain is named FR1. The region identified as FR2 occurs between L1 and L2 hypervariable loops. FR3 occurs between L2 and L3 hypervariable loops, and the FR4 region is closest to the CL domain. This structure and nomenclature is repeated for the VH chain, which includes three CDRs identified as H1, H2 and H3. The majority of amino acid residues in the variable domains, or Fv fragments (VH and VL), are part of the framework regions (approximately 85%). The three dimensional, or tertiary, structure of an antibody molecule is such that the framework regions are more internal to the molecule and provide the majority of the structure, with the CDRs on the external surface of the molecule.

Several methods have been developed and can be used by one skilled in the art to identify the exact amino acids that constitute each of these regions. This can be done using any of a number of multiple sequence alignment methods and algorithms, which identify the conserved amino acid residues that make up the framework regions, therefore identifying the CDRs that may vary in length but are located between framework regions. Three commonly used methods have been developed for identification of the CDRs of antibodies: Kabat (as described in T. T. Wu and E. A. Kabat, "AN ANALYSIS OF THE SEQUENCES OF THE VARIABLE REGIONS OF BENCE JONES PROTEINS AND MYELOMA LIGHT CHAINS AND THEIR IMPLICATIONS FOR ANTIBODY COMPLEMENTARITY," J Exp Med, vol. 132, no. 2, pp. 211-250, August 1970); Chothia (as described in C. Chothia et al., "Conformations of immunoglobulin hypervariable regions," Nature, vol. 342, no. 6252, pp. 877-883, December 1989); and IMGT (as described in M. P. Lefranc et al., "IMGT unique numbering for immunoglobulin and T cell receptor variable domains and Ig superfamily V-like domains," Developmental & Comparative Immunology, vol. 27, no. 1, pp. 55-77, January 2003). These methods each include unique numbering systems for the identification of the amino acid residues that constitute the variable regions. In most antibody molecules, the amino acid residues that actually contact the epitope of the antigen occur in the CDRs, although in some cases, residues within the framework regions contribute to antigen binding.

One skilled in the art can use any of several methods to determine the paratope of an antibody. These methods include: 1) Computational predictions of the tertiary structure of the antibody/epitope binding interactions based on the chemical nature of the amino acid sequence of the antibody variable region and composition of the epitope. 2) Hydrogen-deuterium exchange and mass spectroscopy 3) Polypeptide fragmentation and peptide mapping approaches in which one generates multiple overlapping peptide fragments from the full length of the polypeptide and evaluates the binding affinity of these peptides for the epitope. 4) Antibody Phage Display Library analysis in which the antibody Fab fragment encoding genes of the mammal are expressed by bacteriophage in such a way as to be incorporated into the coat of the phage. This population of Fab expressing phage are then allowed to interact with the antigen which has been immobilized or may be expressed in by a different exogenous expression system. Non-binding Fab fragments are washed away, thereby leaving only the specific binding Fab fragments attached to the antigen. The binding Fab fragments can be readily isolated and the genes which encode them determined. This approach can also be used for smaller regions of the Fab fragment including Fv fragments or specific VH and VL domains as appropriate.

In certain aspects, affinity matured antibodies are enhanced with one or more modifications in one or more CDRs thereof that result in an improvement in the affinity of the antibody for a target antigen as compared to a parent antibody that does not possess those alteration(s). Certain affinity matured antibodies will have nanomolar or picomolar affinities for the target antigen. Affinity matured antibodies are produced by procedures known in the art, e.g., Marks et al., Bio/Technology 10:779 (1992) describes affinity maturation by VH and VL domain shuffling, random mutagenesis of CDR and/or framework residues employed in phage display is described by Rajpal et al., PNAS. 24: 8466-8471 (2005) and Thie et al., Methods Mol Biol. 525:309-22 (2009) in conjugation with computation methods as demonstrated in Tiller et al., Front. Immunol. 8:986 (2017).

Chimeric immunoglobulins are the products of fused genes derived from different species; "humanized" chimeras generally have the framework region (FR) from human immunoglobulins and one or more CDRs are from a non-human source.

In certain aspects, portions of the heavy and/or light chain are identical or homologous to corresponding sequences from another particular species or belonging to a particular antibody class or subclass, while the remainder of the chain(s) is identical or homologous to corresponding sequences in antibodies derived from another species or belonging to another antibody class or subclass, as well as fragments of such antibodies, so long as they exhibit the desired biological activity. U.S. Pat. No. 4,816,567; and Morrison et al., Proc. Natl. Acad. Sci. USA 81:6851 (1984). For methods relating to chimeric antibodies, see, e.g., U.S. Pat. No. 4,816,567; and Morrison et al., Proc. Natl. Acad. Sci. USA 81:6851-6855 (1985), each of which are specifically incorporated herein by reference in their entirety. CDR grafting is described, for example, in U.S. Pat. Nos. 6,180,370, 5,693,762, 5,693,761, 5,585,089, and 5,530,101, which are all hereby incorporated by reference for all purposes.

In some embodiments, minimizing the antibody polypeptide sequence from the non-human species optimizes chimeric antibody function and reduces immunogenicity. Specific amino acid residues from non-antigen recognizing regions of the non-human antibody are modified to be homologous to corresponding residues in a human antibody or isotype. One example is the "CDR-grafted" antibody, in which an antibody comprises one or more CDRs from a particular species or belonging to a specific antibody class or subclass, while the remainder of the antibody chain(s) is identical or homologous to a corresponding sequence in antibodies derived from another species or belonging to another antibody class or subclass. For use in humans, the V region composed of CDR1, CDR2, and partial CDR3 for both the light and heavy chain variance region from a non-human immunoglobulin, are grafted with a human antibody framework region, replacing the naturally occurring antigen receptors of the human antibody with the non-human CDRs. In some instances, corresponding non-human residues replace framework region residues of the human immunoglobulin. Furthermore, humanized antibodies may comprise residues that are not found in the recipient antibody or in the donor antibody to further refine performance. The humanized antibody may also comprise at least a portion of an immunoglobulin constant region (Fc), typically that of a human immunoglobulin. See, e.g., Jones et al., Nature 321:522 (1986); Riechmann et al., Nature 332:323

(1988); Presta, Curr. Op. Struct. Biol. 2:593 (1992); Vaswani and Hamilton, Ann. Allergy, Asthma and Immunol. 1:105 (1998); Harris, Biochem. Soc. Transactions 23; 1035 (1995); Hurle and Gross, Curr. Op. Biotech. 5:428 (1994); Verhoeyen et al., Science 239:1534-36 (1988).

Intrabodies are intracellularly localized immunoglobulins that bind to intracellular antigens as opposed to secreted antibodies, which bind antigens in the extracellular space.

Polyclonal antibody preparations typically include different antibodies against different determinants (epitopes). In order to produce polyclonal antibodies, a host, such as a rabbit or goat, is immunized with the antigen or antigen fragment, generally with an adjuvant and, if necessary, coupled to a carrier. Antibodies to the antigen are subsequently collected from the sera of the host. The polyclonal antibody can be affinity purified against the antigen rendering it monospecific.

Monoclonal antibodies or "mAb" refer to an antibody obtained from a population of homogeneous antibodies from an exclusive parental cell, e.g., the population is identical except for naturally occurring mutations that may be present in minor amounts. Each monoclonal antibody is directed against a single antigenic determinant.

D. Antibody Binding

The term "selective binding agent" refers to a molecule that binds to an antigen. Non-limiting examples include antibodies, antigen-binding fragments, scFv, Fab, Fab', F(ab')2, single chain antibodies, peptides, peptide fragments and proteins.

The term "binding" refers to a direct association between two molecules, due to, for example, covalent, electrostatic, hydrophobic, and ionic and/or hydrogen-bond interactions, including interactions such as salt bridges and water bridges. "Immunologically reactive" means that the selective binding agent or antibody of interest will bind with antigens present in a biological sample. The term "immune complex" refers the combination formed when an antibody or selective binding agent binds to an epitope on an antigen.

1. Affinity/Avidity

The term "affinity" refers the strength with which an antibody or selective binding agent binds an epitope. In antibody binding reactions, this is expressed as the affinity constant (Ka or ka sometimes referred to as the association constant) for any given antibody or selective binding agent. Affinity is measured as a comparison of the binding strength of the antibody to its antigen relative to the binding strength of the antibody to an unrelated amino acid sequence. Affinity can be expressed as, for example, 20-fold greater binding ability of the antibody to its antigen then to an unrelated amino acid sequence. As used herein, the term "avidity" refers to the resistance of a complex of two or more agents to dissociation after dilution. The terms "immunoreactive" and "preferentially binds" are used interchangeably herein with respect to antibodies and/or selective binding agent.

There are several experimental methods that can be used by one skilled in the art to evaluate the binding affinity of any given antibody or selective binding agent for its antigen. This is generally done by measuring the equilibrium dissociation constant (KD or Kd), using the equation KD=koff/kon=[A][B]/[AB]. The term koff is the rate of dissociation between the antibody and antigen per unit time, and is related to the concentration of antibody and antigen present in solution in the unbound form at equilibrium. The term kon is the rate of antibody and antigen association per unit time, and is related to the concentration of the bound antigen-antibody complex at equilibrium. The units used for measuring the KD are mol/L (molarity, or M), or concentration.

The Ka of an antibody is the opposite of the KD, and is determined by the equation $K_a=1/KD$. Examples of some experimental methods that can be used to determine the KD value are: enzyme-linked immunosorbent assays (ELISA), isothermal titration calorimetry (ITC), fluorescence anisotropy, surface plasmon resonance (SPR), and affinity capillary electrophoresis (ACE). The affinity constant ($K_a$) of an antibody is the opposite of the KD, and is determined by the equation $K_a=1/KD$.

Antibodies deemed useful in certain embodiments may have an affinity constant ($K_a$) of about, at least about, or at most about $10^6$, $10^7$, $10^8$, $10^9$, or $10^{10}$ M or any range derivable therein. Similarly, in some embodiments, antibodies may have a dissociation constant of about, at least about or at most about $10^{-6}$, $10^{-7}$, $10^{-8}$, $10^{-9}$, $10^{-10}$ M, or any range derivable therein. These values are reported for antibodies discussed herein and the same assay may be used to evaluate the binding properties of such antibodies. An antibody of the invention is said to "specifically bind" its target antigen when the dissociation constant (KD) is about $10^{-8}$ M. The antibody specifically binds antigen with "high affinity" when the KD is about $5 \times 10^{-9}$ M, and with "very high affinity" when the KD is about $5 \times 10^{-10}$ M.

2. Epitope Specificity

The epitope of an antigen is the specific region of the antigen for which an antibody has binding affinity. In the case of protein or polypeptide antigens, the epitope is the specific residues (or specified amino acids or protein segment) that the antibody binds with high affinity. An antibody does not necessarily contact every residue within the protein. Nor does every single amino acid substitution or deletion within a protein necessarily affect binding affinity. For purposes of this specification and the accompanying claims, the terms "epitope" and "antigenic determinant" are used interchangeably to refer to the site on an antigen to which B and/or T cells respond or recognize. Polypeptide epitopes can be formed from both contiguous amino acids and noncontiguous amino acids juxtaposed by tertiary folding of a polypeptide. An epitope typically includes at least 3, and typically 5-10 amino acids in a unique spatial conformation.

Epitope specificity of an antibody can be determined in a variety of ways. One approach, for example, involves testing a collection of overlapping peptides of about 15 amino acids spanning the full sequence of the protein and differing in increments of a small number of amino acids (e.g., 3 to 30 amino acids). The peptides are immobilized in separate wells of a microtiter dish. Immobilization can be accomplished, for example, by biotinylating one terminus of the peptides. This process may affect the antibody affinity for the epitope, therefore different samples of the same peptide can be biotinylated at the N and C terminus and immobilized in separate wells for the purposes of comparison. This is useful for identifying end-specific antibodies. Optionally, additional peptides can be included terminating at a particular amino acid of interest. This approach is useful for identifying end-specific antibodies to internal fragments. An antibody or antigen-binding fragment is screened for binding to each of the various peptides. The epitope is defined as a segment of amino acids that is common to all peptides to which the antibody shows high affinity binding.

3. Modification of Antibody Antigen-Binding Domains

It is understood that the antibodies of the present invention may be modified, such that they are substantially identical to the antibody polypeptide sequences, or fragments thereof, and still bind the epitopes of the present invention. Polypeptide sequences are "substantially identical" when optimally aligned using such programs as Clustal Omega, IGBLAST, GAP or BESTFIT using default gap weights, they share at least 80% sequence identity, at least 90% sequence identity, at least 95% sequence identity, at least 96% sequence identity, at least 97% sequence identity, at least 98% sequence identity, or at least 99% sequence identity or any range therein.

As discussed herein, minor variations in the amino acid sequences of antibodies or antigen-binding regions thereof are contemplated as being encompassed by the present invention, providing that the variations in the amino acid sequence maintain at least 75%, more preferably at least 80%, at least 90%, at least 95%, at least 96%, at least 97%, at least 98% and most preferably at least 99% sequence identity. In particular, conservative amino acid replacements are contemplated.

Conservative replacements are those that take place within a family of amino acids that are related in their side chains. Genetically encoded amino acids are generally divided into families based on the chemical nature of the side chain; e.g., acidic (aspartate, glutamate), basic (lysine, arginine, histidine), nonpolar (alanine, valine, leucine, isoleucine, proline, phenylalanine, methionine, tryptophan), and uncharged polar (glycine, asparagine, glutamine, cysteine, serine, threonine, tyrosine). For example, it is reasonable to expect that an isolated replacement of a leucine moiety with an isoleucine or valine moiety, or a similar replacement of an amino acid with a structurally related amino acid in the same family, will not have a major effect on the binding or properties of the resulting molecule, especially if the replacement does not involve an amino acid within a framework site. Whether an amino acid change results in a functional peptide can readily be determined by assaying the specific activity of the polypeptide derivative. Standard ELISA, Surface Plasmon Resonance (SPR), or other antibody binding assays can be performed by one skilled in the art to make a quantitative comparison of antigen binging affinity between the unmodified antibody and any polypeptide derivatives with conservative substitutions generated through any of several methods available to one skilled in the art.

Fragments or analogs of antibodies or immunoglobulin molecules can be readily prepared by those skilled in the art. Preferred amino- and carboxy-termini of fragments or analogs occur near boundaries of functional domains. Structural and functional domains can be identified by comparison of the nucleotide and/or amino acid sequence data to public or proprietary sequence databases. Preferably, computerized comparison methods are used to identify sequence motifs or predicted protein conformation domains that occur in other proteins of known structure and/or function. Standard methods to identify protein sequences that fold into a known three-dimensional structure are available to those skilled in the art; Dill and McCallum, Science 338:1042-1046 (2012). Several algorithms for predicting protein structures and the gene sequences that encode these have been developed, and many of these algorithms can be found at the National Center for Biotechnology Information (on the World Wide Web at ncbi.nlm.nih.gov/guide/proteins/) and at the Bioinformatics Resource Portal (on the World Wide Web at expasy.org/proteomics). Thus, the foregoing examples demonstrate that those of skill in the art can recognize sequence motifs and structural conformations that may be used to define structural and functional domains in accordance with the invention.

Framework modifications can be made to antibodies to decrease immunogenicity, for example, by "backmutating" one or more framework residues to a corresponding germline sequence.

It is also contemplated that the antigen-binding domain may be multi-specific or multivalent by multimerizing the antigen-binding domain with VH and VL region pairs that bind either the same antigen (multi-valent) or a different antigen (multi-specific).

E. Chemical Modification of Antibodies

In some aspects, also contemplated are glycosylation variants of antibodies, wherein the number and/or type of glycosylation site(s) has been altered compared to the amino acid sequences of the parent polypeptide. Glycosylation of the polypeptides can be altered, for example, by modifying one or more sites of glycosylation within the polypeptide sequence to increase the affinity of the polypeptide for antigen (U.S. Pat. Nos. 5,714,350 and 6,350,861). In certain embodiments, antibody protein variants comprise a greater or a lesser number of N-linked glycosylation sites than the native antibody. An N-linked glycosylation site is characterized by the sequence: Asn-X-Ser or Asn-X-Thr, wherein the amino acid residue designated as X may be any amino acid residue except proline. The substitution of amino acid residues to create this sequence provides a potential new site for the addition of an N-linked carbohydrate chain. Alternatively, substitutions that eliminate or alter this sequence will prevent addition of an N-linked carbohydrate chain present in the native polypeptide. For example, the glycosylation can be reduced by the deletion of an Asn or by substituting the Asn with a different amino acid. In other embodiments, one or more new N-linked glycosylation sites are created. Antibodies typically have an N-linked glycosylation site in the Fc region.

Additional antibody variants include cysteine variants, wherein one or more cysteine residues in the parent or native amino acid sequence are deleted from or substituted with another amino acid (e.g., serine). Cysteine variants are useful, inter alia, when antibodies must be refolded into a biologically active conformation. Cysteine variants may have fewer cysteine residues than the native antibody and typically have an even number to minimize interactions resulting from unpaired cysteines.

In some aspects, the polypeptides can be pegylated to increase biological half-life by reacting the polypeptide with polyethylene glycol (PEG) or a reactive ester or aldehyde derivative of PEG, under conditions in which one or more PEG groups become attached to the polypeptide. Polypeptide pegylation may be carried out by an acylation reaction or an alkylation reaction with a reactive PEG molecule (or an analogous reactive water-soluble polymer). Methods for pegylating proteins are known in the art and can be applied to the polypeptides of the invention to obtain PEGylated derivatives of antibodies. See, e.g., EP 0 154 316 and EP 0 401 384. In some aspects, the antibody is conjugated or otherwise linked to transthyretin (TTR) or a TTR variant. The TTR or TTR variant can be chemically modified with, for example, a chemical selected from the group consisting of dextran, poly(n-vinyl pyrrolidone), polyethylene glycols, propropylene glycol homopolymers, polypropylene oxide/ethylene oxide co-polymers, polyoxyethylated polyols, and polyvinyl alcohols. As used herein, the term "polyethylene glycol" is intended to encompass any of the forms of PEG that have been used to derivatize other proteins.

1. Conjugation

Derivatives of the antibodies and antigen binding fragments that are described herein are also provided. The derivatized antibody or fragment thereof may comprise any molecule or substance that imparts a desired property to the antibody or fragment. The derivatized antibody can comprise, for example, a detectable (or labeling) moiety (e.g., a radioactive, colorimetric, antigenic, or enzymatic molecule, or a detectable bead), a molecule that binds to another molecule (e.g., biotin or streptavidin), a therapeutic or diagnostic moiety (e.g., a radioactive, cytotoxic, or pharmaceutically active moiety), or a molecule that increases the suitability of the antibody for a particular use (e.g., administration to a subject, such as a human subject, or other in vivo or in vitro uses).

Optionally, an antibody or an immunological portion of an antibody can be chemically conjugated to, or expressed as, a fusion protein with other proteins. In some aspects, polypeptides may be chemically modified by conjugating or fusing the polypeptide to serum protein, such as human serum albumin, to increase half-life of the resulting molecule. See, e.g., EP 0322094 and EP 0 486 525. In some aspects, the polypeptides may be conjugated to a diagnostic agent and used diagnostically, for example, to monitor the development or progression of a disease and determine the efficacy of a given treatment regimen. In some aspects, the polypeptides may also be conjugated to a therapeutic agent to provide a therapy in combination with the therapeutic effect of the polypeptide. Additional suitable conjugated molecules include ribonuclease (RNase), DNase I, an antisense nucleic acid, an inhibitory RNA molecule such as a siRNA molecule, an immunostimulatory nucleic acid, aptamers, ribozymes, triplex forming molecules, and external guide sequences. The functional nucleic acid molecules may act as effectors, inhibitors, modulators, and stimulators of a specific activity possessed by a target molecule, or the functional nucleic acid molecules may possess a de novo activity independent of any other molecules.

In some aspects, disclosed are antibodies and antibody-like molecules that are linked to at least one agent to form an antibody conjugate or payload. In order to increase the efficacy of antibody molecules as diagnostic or therapeutic agents, it is conventional to link or covalently bind or complex at least one desired molecule or moiety. Such a molecule or moiety may be, but is not limited to, at least one effector or reporter molecule. Effector molecules comprise molecules having a desired activity, e.g., cytotoxic activity. Non-limiting examples of effector molecules include toxins, therapeutic enzymes, antibiotics, radiolabeled nucleotides and the like. By contrast, a reporter molecule is defined as any moiety that may be detected using an assay. Non-limiting examples of reporter molecules that have been conjugated to antibodies include enzymes, radiolabels, haptens, fluorescent labels, phosphorescent molecules, chemiluminescent molecules, chromophores, luminescent molecules, photoaffinity molecules, colored particles, or ligands.

2. Conjugate Types

Certain examples of antibody conjugates are those conjugates in which the antibody is linked to a detectable label. "Detectable labels" are compounds and/or elements that can be detected due to their specific functional properties, and/or chemical characteristics, the use of which allows the antibody to be detected, and/or further quantified if desired. Examples of detectable labels include, but not limited to, radioactive isotopes, fluorescers, semiconductor nanocrystals, chemiluminescers, chromophores, enzymes, enzyme substrates, enzyme cofactors, enzyme inhibitors, dyes, metal ions, metal sols, ligands (e.g., biotin, streptavidin or haptens) and the like. Particular examples of labels are, but not limited to, horseradish peroxidase (HRP), fluorescein, FITC, rhodamine, dansyl, umbelliferone, dimethyl acridinium ester (DMAE), Texas red, luminol, NADPH and α- or β-galactosidase. Antibody conjugates include those intended primarily for use in vitro, where the antibody is linked to a secondary binding ligand and/or to an enzyme to generate a colored product upon contact with a chromogenic substrate. Examples of suitable enzymes include, but are not limited to, urease, alkaline phosphatase, (horseradish) hydrogen peroxidase, or glucose oxidase. Preferred secondary binding ligands are biotin and/or avidin and streptavidin compounds. The uses of such labels is well known to those of skill in the art and are described, for example, in U.S. Pat. Nos. 3,817,837; 3,850,752; 3,939,350; 3,996,345; 4,277,437; 4,275,149 and 4,366,241; each incorporated herein by reference. Molecules containing azido groups may also be used to form covalent bonds to proteins through reactive nitrene intermediates that are generated by low intensity ultraviolet light (Potter & Haley, 1983).

In some aspects, contemplated are immunoconjugates comprising an antibody or antigen-binding fragment thereof conjugated to a cytotoxic agent such as a chemotherapeutic agent, a drug, a growth inhibitory agent, a toxin (e.g., an enzymatically active toxin of bacterial, fungal, plant, or animal origin, or fragments thereof), or a radioactive isotope (i.e., a radioconjugate). In this way, the agent of interest can be targeted directly to cells bearing cell surface antigen. The antibody and agent may be associated through non-covalent interactions such as through electrostatic forces, or by covalent bonds. Various linkers, known in the art, can be employed in order to form the immunoconjugate. Additionally, the immunoconjugate can be provided in the form of a fusion protein. In one aspect, an antibody may be conjugated to various therapeutic substances in order to target the cell surface antigen. Examples of conjugated agents include, but are not limited to, metal chelate complexes, drugs, toxins and other effector molecules, such as cytokines, lymphokines, chemokines, immunomodulators, radiosensitizers, asparaginase, carboranes, and radioactive halogens.

In antibody drug conjugates (ADC), an antibody (Ab) is conjugated to one or more drug moieties (D) through a linker (L). The ADC may be prepared by several routes, employing organic chemistry reactions, conditions, and reagents known to those skilled in the art, including: (1) reaction of a nucleophilic group of an antibody with a bivalent linker reagent, to form Ab-L, via a covalent bond, followed by reaction with a drug moiety D; and (2) reaction of a nucleophilic group of a drug moiety with a bivalent linker reagent, to form D-L, via a covalent bond, followed by reaction with the nucleophilic group of an antibody. Antibody drug conjugates may also be produced by modification of the antibody to introduce electrophilic moieties, which can react with nucleophilic substituents on the linker reagent or drug. Alternatively, a fusion protein comprising the antibody and cytotoxic agent may be made, e.g., by recombinant techniques or peptide synthesis. The length of DNA may comprise respective regions encoding the two portions of the conjugate either adjacent one another or separated by a region encoding a linker peptide which does not destroy the desired properties of the conjugate. In yet another aspect, the antibody may be conjugated to a "receptor" (such as streptavidin) for utilization in tumor or cancer cell pre-targeting wherein the antibody-receptor conjugate is administered to the patient, followed by removal of unbound conjugate from the circulation using a clearing agent and then administration of a "ligand" (e.g., avidin) which is conjugated to a cytotoxic agent (e.g., a radionucleotide).

Examples of an antibody-drug conjugates known to a person skilled in the art are pro-drugs useful for the local delivery of cytotoxic or cytostatic agents, i.e. drugs to kill or inhibit tumor cells in the treatment of cancer (Syrigos and Epenetos, Anticancer Res. 19:605-614 (1999); Niculescu-Duvaz and Springer, Adv. Drg. Del. Rev. 26:151-172 (1997); U.S. Pat. No. 4,975,278). In contrast, systematic administration of these unconjugated drug agents may result in unacceptable levels of toxicity to normal cells as well as the target tumor cells (Baldwin et al., Lancet 1:603-5 (1986); Thorpe, (1985) "Antibody Carriers of Cytotoxic Agents in Cancer Therapy: A Review," In: Monoclonal Antibodies '84: Biological and Clinical Applications, A. Pincera et al., (eds.) pp. 475-506). Both polyclonal antibodies and monoclonal antibodies have been reported as useful in these strategies (Rowland et al., Cancer Immunol. Immunother. 21:183-87 (1986)).

In certain aspects, ADC include covalent or aggregative conjugates of antibodies, or antigen-binding fragments thereof, with other proteins or polypeptides, such as by expression of recombinant fusion proteins comprising heterologous polypeptides fused to the N-terminus or C-terminus of an antibody polypeptide. For example, the conjugated peptide may be a heterologous signal (or leader) polypeptide, e.g., the yeast alpha-factor leader, or a peptide such as an epitope tag (e.g., V5-His). Antibody-containing fusion proteins may comprise peptides added to facilitate purification or identification of the antibody (e.g., poly-His). An antibody polypeptide also can be linked to the FLAG® (Sigma-Aldrich, St. Louis, Mo.) peptide as described in Hopp et al., Bio/Technology 6:1204 (1988), and U.S. Pat. No. 5,011,912. Oligomers that contain one or more antibody polypeptides may be employed as antagonists. Oligomers may be in the form of covalently linked or non-covalently linked dimers, trimers, or higher oligomers. Oligomers comprising two or more antibody polypeptides are contemplated for use. Other oligomers include heterodimers, homotrimers, heterotrimers, homotetramers, heterotetramers, etc. In certain aspects, oligomers comprise multiple antibody polypeptides joined via covalent or non-covalent interactions between peptide moieties fused to the antibody polypeptides. Such peptides may be peptide linkers (spacers), or peptides that have the property of promoting oligomerization. Leucine zippers and certain polypeptides derived from antibodies are among the peptides that can promote oligomerization of antibody polypeptides attached thereto, as described in more detail below.

3. Conjugation Methodology

Several methods are known in the art for the attachment or conjugation of an antibody to its conjugate moiety. Some attachment methods involve the use of a metal chelate complex employing, for example, an organic chelating agent such a diethylenetriaminepentaacetic acid anhydride (DTPA); ethylenetriaminetetraacetic acid; N-chloro-p-toluenesulfonamide; and/or tetrachloro-3-6-diphenylglycouril-3 attached to the antibody (U.S. Pat. Nos. 4,472,509 and 4,938,948, each incorporated herein by reference). Monoclonal antibodies may also be reacted with an enzyme in the presence of a coupling agent such as glutaraldehyde or periodate. Conjugates may also be made using a variety of bifunctional protein-coupling agents such as N-succinimidyl-3-(2-pyridyldithiol) propionate (SPDP), iminothiolane (IT), bifunctional derivatives of imidoesters (such as dimethyl adipimidate HCl), active esters (such as disuccinimidyl suberate), aldehydes (such as glutaraldehyde), bis-azido compounds (such as bis(p-azidobenzoyl)hexanediamine), bis-diazonium derivatives (such as bos(p-diazoniumbenzoyl)-ethylenediamine), diisocyanates (such as toluene 2,6-diisocyanate), and bis-active fluorine compounds (such as 1,5-difluoro-2,4-dinitrobenzene). In some aspects, derivatization of immunoglobulins by selectively introducing sulfhydryl groups in the Fc region of an immunoglobulin, using reaction conditions that do not alter the antibody combining site, are contemplated. Antibody conjugates produced according to this methodology are disclosed to exhibit improved longevity, specificity, and sensitivity (U.S. Pat. No. 5,196,066, incorporated herein by reference). Site-specific attachment of effector or reporter molecules, wherein the reporter or effector molecule is conjugated to a carbohydrate residue in the Fc region has also been disclosed in the literature (O'Shannessy et al., 1987).

II. Proteins

As used herein, a "protein" or "polypeptide" refers to a molecule comprising at least five amino acid residues. As used herein, the term "wild-type" refers to the endogenous version of a molecule that occurs naturally in an organism. In some embodiments, wild-type versions of a protein or polypeptide are employed, however, in many embodiments of the disclosure, a modified protein or polypeptide is employed to generate an immune response. The terms described above may be used interchangeably. A "modified protein" or "modified polypeptide" or a "variant" refers to a protein or polypeptide whose chemical structure, particularly its amino acid sequence, is altered with respect to the wild-type protein or polypeptide. In some embodiments, a modified/variant protein or polypeptide has at least one modified activity or function (recognizing that proteins or polypeptides may have multiple activities or functions). It is specifically contemplated that a modified/variant protein or polypeptide may be altered with respect to one activity or function yet retain a wild-type activity or function in other respects, such as immunogenicity.

Where a protein is specifically mentioned herein, it is in general a reference to a native (wild-type) or recombinant (modified) protein or, optionally, a protein in which any signal sequence has been removed. The protein may be isolated directly from the organism of which it is native, produced by recombinant DNA/exogenous expression methods, or produced by solid-phase peptide synthesis (SPPS) or other in vitro methods. In particular embodiments, there are isolated nucleic acid segments and recombinant vectors incorporating nucleic acid sequences that encode a polypeptide (e.g., an antibody or fragment thereof). The term "recombinant" may be used in conjunction with a polypeptide or the name of a specific polypeptide, and this generally refers to a polypeptide produced from a nucleic acid molecule that has been manipulated in vitro or that is a replication product of such a molecule.

In certain embodiments the size of a protein or polypeptide (wild-type or modified) may comprise, but is not limited to, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 220, 230, 240, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1100, 1200, 1300, 1400, 1500, 1750, 2000, 2250, 2500 amino acid residues or greater, and any range derivable therein, or derivative of a corresponding amino sequence described or referenced herein. It is contemplated that polypeptides may be mutated by truncation, rendering them shorter than their corresponding wild-type form, also, they might be altered by fusing or conjugating a heterologous protein or polypeptide sequence with a particular function (e.g., for targeting or localization, for enhanced immunogenicity, for purification purposes, etc.). As used herein, the term "domain" refers to any distinct functional or structural unit of a protein or polypeptide, and generally refers to a sequence of amino acids with a structure or function recognizable by one skilled in the art.

In some embodiments, the protein, polypeptide, or nucleic acid may comprise 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 577, 578, 579, 580, 581, 582, 583, 584, 585, 586, 587, 588, 589, 590, 591, 592, 593, 594, 595, 596, 597, 598, 599, 600, 601, 602, 603, 604, 605, 606, 607, 608, 609, 610, 611, 612, 613, 614, 615, 616, 617, 618, 619, 620, 621, 622, 623, 624, 625, 626, 627, 628, 629, 630, 631, 632, 633, 634, 635, 636, 637, 638, 639, 640, 641, 642, 643, 644, 645, 646, 647, 648, 649, 650, 651, 652, 653, 654, 655, 656, 657, 658, 659, 660, 661, 662, 663, 664, 665, 666, 667, 668, 669, 670, 671, 672, 673, 674, 675, 676, 677, 678, 679, 680, 681, 682, 683, 684, 685, 686, 687, 688, 689, 690, 691, 692, 693, 694, 695, 696, 697, 698, 699, 700, 701, 702, 703, 704, 705, 706, 707, 708, 709, 710, 711, 712, 713, 714, 715, 716, 717, 718, 719, 720, 721, 722, 723, 724, 725, 726, 727, 728, 729, 730, 731, 732, 733, 734, 735, 736, 737, 738, 739, 740, 741, 742, 743, 744, 745, 746, 747, 748, 749, 750, 751, 752, 753, 754, 755, 756, 757, 758, 759, 760, 761, 762, 763, 764, 765, 766, 767, 768, 769, 770, 771, 772, 773, 774, 775, 776, 777, 778, 779, 780, 781, 782, 783, 784, 785, 786, 787, 788, 789, 790, 791, 792, 793, 794, 795, 796, 797, 798, 799, 800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839, 840, 841, 842, 843, 844, 845, 846, 847, 848, 849, 850, 851, 852, 853, 854, 855, 856, 857, 858, 859, 860, 861, 862, 863, 864, 865, 866, 867, 868, 869, 870, 871, 872, 873, 874, 875, 876, 877, 878, 879, 880, 881, 882, 883, 884, 885, 886, 887, 888, 889, 890, 891, 892, 893, 894, 895, 896, 897, 898, 899, 900, 901, 902, 903, 904, 905, 906, 907, 908, 909, 910, 911, 912, 913, 914, 915, 916, 917, 918, 919, 920, 921, 922, 923, 924, 925, 926, 927, 928, 929, 930, 931, 932, 933, 934, 935, 936, 937, 938, 939, 940, 941, 942, 943, 944, 945, 946, 947, 948, 949, 950, 951, 952, 953, 954, 955, 956, 957, 958, 959, 960, 961, 962, 963, 964, 965, 966, 967, 968, 969, 970, 971, 972, 973, 974, 975, 976, 977, 978, 979, 980, 981, 982, 983, 984, 985, 986, 987, 988, 989, 990, 991, 992, 993, 994, 995, 996, 997, 998, 999, or 1000, (or any derivable range therein) contiguous amino acids of Fcγ or of the monoclonal antibody 3F6 or of any of SEQ ID NOS:1-10.

In some embodiments, the polypeptide, protein, or nucleic acid may comprise at least, at most, or about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 577, 578, 579, 580, 581, 582, 583, 584, 585, 586, 587, 588, 589, 590, 591, 592, 593, 594, 595, 596, 597, 598, 599, 600, 601, 602, 603, 604, 605, 606, 607, 608, 609, 610, 611, 612, 613, 614, 615, 616, 617, 618, 619, 620, 621, 622, 623, 624, 625, 626, 627, 628, 629, 630, 631, 632, 633, 634, 635, 636, 637, 638, 639, 640, 641, 642, 643, 644, 645, 646, 647, 648, 649, 650, 651, 652, 653, 654, 655, 656, 657, 658, 659, 660, 661, 662, 663, 664, 665, 666, 667, 668, 669, 670, 671, 672, 673, 674, 675, 676, 677, 678, 679, 680, 681, 682, 683, 684, 685, 686, 687, 688, 689, 690, 691, 692, 693, 694, 695, 696, 697, 698, 699, 700, 701, 702, 703, 704, 705, 706, 707, 708, 709, 710, 711, 712, 713, 714, 715, 716, 717, 718, 719, 720, 721, 722, 723, 724, 725, 726, 727, 728, 729, 730, 731, 732, 733, 734, 735, 736, 737, 738, 739, 740, 741, 742, 743, 744, 745, 746, 747, 748, 749, 750, 751, 752, 753, 754, 755, 756, 757, 758, 759, 760, 761, 762, 763, 764, 765, 766, 767, 768, 769, 770, 771, 772, 773, 774, 775, 776, 777, 778, 779, 780, 781, 782, 783, 784, 785, 786, 787, 788, 789, 790, 791, 792, 793, 794, 795, 796, 797, 798, 799, 800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839, 840, 841, 842, 843, 844, 845, 846, 847, 848, 849, 850, 851, 852, 853, 854, 855, 856, 857, 858, 859, 860, 861, 862, 863, 864, 865, 866, 867, 868, 869, 870, 871, 872, 873, 874, 875, 876, 877, 878, 879, 880, 881, 882, 883, 884, 885, 886, 887, 888, 889, 890, 891, 892, 893, 894, 895, 896, 897, 898, 899, 900, 901, 902, 903, 904, 905, 906, 907, 908, 909, 910, 911, 912, 913, 914, 915, 916, 917, 918, 919, 920, 921, 922, 923, 924, 925, 926, 927, 928, 929, 930, 931, 932, 933, 934, 935, 936, 937, 938, 939, 940, 941, 942, 943, 944, 945, 946, 947, 948, 949, 950, 951, 952, 953, 954, 955, 956, 957, 958, 959, 960, 961, 962, 963, 964, 965, 966, 967, 968, 969, 970, 971, 972, 973, 974, 975, 976, 977, 978, 979, 980, 981, 982, 983, 984, 985, 986, 987, 988, 989, 990, 991, 992, 993, 994, 995, 996, 997, 998, 999, or 1000 (or any derivable range therein) contiguous amino acids of Fcγ, of the monoclonal antibody 3F6, or of any of SEQ ID NOS: 1-10 that are at least, at most, or about 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% (or any derivable range therein) similar, identical, or homologous with one of Fcγ, of the monoclonal antibody 3F6 or of any of SEQ ID NOS:1-10.

In some aspects there is a nucleic acid molecule or polypeptide starting at position 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332,333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 577, 578, 579, 580, 581, 582, 583, 584, 585, 586, 587, 588, 589, 590, 591, 592, 593, 594, 595, 596, 597, 598, 599, 600, 601, 602, 603, 604, 605, 606, 607, 608, 609, 610, 611, 612, 613, 614, 615, 616, 617, 618, 619, 620, 621, 622, 623, 624, 625, 626, 627, 628, 629, 630, 631, 632, 633, 634, 635, 636, 637, 638, 639, 640, 641, 642, 643, 644, 645, 646, 647, 648, 649, 650, 651, 652, 653, 654, 655, 656, 657, 658, 659, 660, 661, 662, 663, 664, 665, 666, 667, 668, 669, 670, 671, 672, 673, 674, 675, 676, 677, 678, 679, 680, 681, 682, 683, 684, 685, 686, 687, 688, 689, 690, 691, 692, 693, 694, 695, 696, 697, 698, 699, 700, 701, 702, 703, 704, 705, 706, 707, 708, 709, 710, 711, 712, 713, 714, 715, 716, 717, 718, 719, 720, 721, 722, 723, 724, 725, 726, 727, 728, 729, 730, 731, 732, 733, 734, 735, 736, 737, 738, 739, 740, 741, 742, 743, 744, 745, 746, 747, 748, 749, 750, 751, 752, 753, 754, 755, 756, 757, 758, 759, 760, 761, 762, 763, 764, 765, 766, 767, 768, 769, 770, 771, 772, 773, 774, 775, 776, 777, 778, 779, 780, 781, 782, 783, 784, 785, 786, 787, 788, 789, 790, 791, 792, 793, 794, 795, 796, 797, 798, 799, 800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839, 840, 841, 842, 843, 844, 845, 846, 847, 848, 849, 850, 851, 852, 853, 854, 855, 856, 857, 858, 859, 860, 861, 862, 863, 864, 865, 866, 867, 868, 869, 870, 871, 872, 873, 874, 875, 876, 877, 878, 879, 880, 881, 882, 883, 884, 885, 886, 887, 888, 889, 890, 891, 892, 893, 894, 895, 896, 897, 898, 899, 900, 901, 902, 903, 904, 905, 906, 907, 908, 909, 910, 911, 912, 913, 914, 915, 916, 917, 918, 919, 920, 921, 922, 923, 924, 925, 926, 927, 928, 929, 930, 931, 932, 933, 934, 935, 936, 937, 938, 939, 940, 941, 942, 943, 944, 945, 946, 947, 948, 949, 950, 951, 952, 953, 954, 955, 956, 957, 958, 959, 960, 961, 962, 963, 964, 965, 966, 967, 968, 969, 970, 971, 972, 973, 974, 975, 976, 977, 978, 979, 980, 981, 982, 983, 984, 985, 986, 987, 988, 989, 990, 991, 992, 993, 994, 995, 996, 997, 998, 999, or 1000 of any of SEQ ID NOS:1-10 and comprising at least, at most, or about 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 577, 578, 579, 580, 581, 582, 583, 584, 585, 586, 587, 588, 589, 590, 591, 592, 593, 594, 595, 596, 597, 598, 599, 600, 601, 602, 603, 604, 605, 606, 607, 608, 609, 610, 611, 612, 613, 614, 615, 616,617, 618, 619, 620, 621, 622, 623, 624, 625, 626, 627, 628, 629, 630, 631, 632, 633, 634, 635, 636, 637, 638, 639, 640, 641, 642, 643, 644, 645, 646, 647, 648, 649, 650, 651, 652, 653, 654, 655, 656, 657, 658, 659, 660, 661, 662, 663, 664, 665, 666, 667, 668, 669, 670, 671, 672, 673, 674, 675, 676, 677, 678, 679, 680, 681, 682, 683, 684, 685, 686, 687, 688, 689, 690, 691, 692, 693, 694, 695, 696, 697, 698, 699, 700, 701, 702, 703, 704, 705, 706, 707, 708, 709, 710, 711, 712, 713, 714, 715, 716, 717, 718, 719, 720, 721, 722, 723, 724, 725, 726, 727, 728, 729, 730, 731, 732, 733, 734, 735, 736, 737, 738, 739, 740, 741, 742, 743, 744, 745, 746, 747, 748, 749, 750, 751, 752, 753, 754, 755, 756, 757, 758, 759, 760, 761, 762, 763, 764, 765, 766, 767, 768, 769, 770, 771, 772, 773, 774, 775, 776, 777, 778, 779, 780, 781, 782, 783, 784, 785, 786, 787, 788, 789, 790, 791, 792, 793, 794, 795, 796, 797, 798, 799, 800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839, 840, 841, 842, 843, 844, 845, 846, 847, 848, 849, 850, 851, 852, 853, 854, 855, 856, 857, 858, 859, 860, 861, 862, 863, 864, 865, 866, 867, 868, 869, 870, 871, 872, 873, 874, 875, 876, 877, 878, 879, 880, 881, 882, 883, 884, 885, 886, 887, 888, 889, 890, 891, 892, 893, 894, 895, 896, 897, 898, 899, 900, 901, 902, 903, 904, 905, 906, 907, 908, 909, 910, 911, 912, 913, 914, 915, 916, 917, 918, 919, 920, 921, 922, 923, 924, 925, 926, 927, 928, 929, 930, 931, 932, 933, 934, 935, 936, 937, 938, 939, 940, 941, 942, 943, 944, 945, 946, 947, 948, 949, 950, 951, 952, 953, 954, 955, 956, 957, 958, 959, 960, 961, 962, 963, 964, 965, 966, 967, 968, 969, 970, 971, 972, 973, 974, 975, 976, 977, 978, 979, 980, 981, 982, 983, 984, 985, 986, 987, 988, 989, 990, 991, 992, 993, 994, 995, 996, 997, 998, 999, or 1000 (or any derivable range therein) contiguous amino acids or nucleotides of any of Fcγ, of the monoclonal antibody 3F6 or of any of SEQ ID NOS:1-10.

The nucleotide as well as the protein, polypeptide, and peptide sequences for various genes have been previously disclosed, and may be found in the recognized computerized databases. Two commonly used databases are the National Center for Biotechnology Information's Genbank and GenPept databases (on the World Wide Web at ncbi.nlm.nih.gov/) and The Universal Protein Resource (UniProt; on the World Wide Web at uniprot.org). The coding regions for these genes may be amplified and/or expressed using the techniques disclosed herein or as would be known to those of ordinary skill in the art.

It is contemplated that in compositions of the disclosure, there is between about 0.001 mg and about 10 mg of total polypeptide, peptide, and/or protein per ml. The concentration of protein in a composition can be about, at least about or at most about 0.001, 0.010, 0.050, 0.1, 0.2, 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0 mg/ml or more (or any range derivable therein).

1. Variant Polypeptides

The following is a discussion of changing the amino acid subunits of a protein to create an equivalent, or even improved, second-generation variant polypeptide or peptide. For example, certain amino acids may be substituted for other amino acids in a protein or polypeptide sequence with or without appreciable loss of interactive binding capacity with structures such as, for example, antigen-binding regions of antibodies or binding sites on substrate molecules. Since it is the interactive capacity and nature of a protein that defines that protein's functional activity, certain amino acid substitutions can be made in a protein sequence and in its corresponding DNA coding sequence, and nevertheless produce a protein with similar or desirable properties. It is thus contemplated by the inventors that various changes may be made in the DNA sequences of genes which encode proteins without appreciable loss of their biological utility or activity.

The term "functionally equivalent codon" is used herein to refer to codons that encode the same amino acid, such as the six different codons for arginine. Also considered are "neutral substitutions" or "neutral mutations" which refers to a change in the codon or codons that encode biologically equivalent amino acids.

Amino acid sequence variants of the disclosure can be substitutional, insertional, or deletion variants. A variation in a polypeptide of the disclosure may affect 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or more non-contiguous or contiguous amino acids of the protein or polypeptide, as compared to wild-type. A variant can comprise an amino acid sequence that is at least 50%, 60%, 70%, 80%, or 90%, including all values and ranges there between, identical to any sequence provided or referenced herein. A variant can include 2, 3, 4, 5, 6, 7, 8, 9, 10, 11, 12, 13, 14, 15, 16, 17, 18, 19, 20, or more substitute amino acids.

It also will be understood that amino acid and nucleic acid sequences may include additional residues, such as additional N- or C-terminal amino acids, or 5' or 3' sequences, respectively, and yet still be essentially identical as set forth in one of the sequences disclosed herein, so long as the sequence meets the criteria set forth above, including the maintenance of biological protein activity where protein expression is concerned. The addition of terminal sequences particularly applies to nucleic acid sequences that may, for example, include various non-coding sequences flanking either of the 5' or 3' portions of the coding region.

Deletion variants typically lack one or more residues of the native or wild type protein. Individual residues can be deleted or a number of contiguous amino acids can be deleted. A stop codon may be introduced (by substitution or insertion) into an encoding nucleic acid sequence to generate a truncated protein.

Insertional mutants typically involve the addition of amino acid residues at a non-terminal point in the polypeptide. This may include the insertion of one or more amino acid residues. Terminal additions may also be generated and can include fusion proteins which are multimers or concatemers of one or more peptides or polypeptides described or referenced herein.

Substitutional variants typically contain the exchange of one amino acid for another at one or more sites within the protein or polypeptide, and may be designed to modulate one or more properties of the polypeptide, with or without the loss of other functions or properties. Substitutions may be conservative, that is, one amino acid is replaced with one of similar chemical properties. "Conservative amino acid substitutions" may involve exchange of a member of one amino acid class with another member of the same class. Conservative substitutions are well known in the art and include, for example, the changes of: alanine to serine; arginine to lysine; asparagine to glutamine or histidine; aspartate to glutamate; cysteine to serine; glutamine to asparagine; glutamate to aspartate; glycine to proline; histidine to asparagine or glutamine; isoleucine to leucine or valine; leucine to valine or isoleucine; lysine to arginine; methionine to leucine or isoleucine; phenylalanine to tyrosine, leucine or methionine; serine to threonine; threonine to serine; tryptophan to tyrosine; tyrosine to tryptophan or phenylalanine; and valine to isoleucine or leucine. Conservative amino acid substitutions may encompass non-naturally occurring amino acid residues, which are typically incorporated by chemical peptide synthesis rather than by synthesis in biological systems. These include peptidomimetics or other reversed or inverted forms of amino acid moieties.

Alternatively, substitutions may be "non-conservative", such that a function or activity of the polypeptide is affected. Non-conservative changes typically involve substituting an amino acid residue with one that is chemically dissimilar, such as a polar or charged amino acid for a nonpolar or uncharged amino acid, and vice versa. Non-conservative substitutions may involve the exchange of a member of one of the amino acid classes for a member from another class.

2. Considerations for Substitutions

One skilled in the art can determine suitable variants of polypeptides as set forth herein using well-known techniques. One skilled in the art may identify suitable areas of the molecule that may be changed without destroying activity by targeting regions not believed to be important for activity. The skilled artisan will also be able to identify amino acid residues and portions of the molecules that are conserved among similar proteins or polypeptides. In further embodiments, areas that may be important for biological activity or for structure may be subject to conservative amino acid substitutions without significantly altering the biological activity or without adversely affecting the protein or polypeptide structure.

In making such changes, the hydropathy index of amino acids may be considered. The hydropathy profile of a protein is calculated by assigning each amino acid a numerical value ("hydropathy index") and then repetitively averaging these values along the peptide chain. Each amino acid has been assigned a value based on its hydrophobicity and charge characteristics. They are: isoleucine (+4.5); valine (+4.2); leucine (+3.8); phenylalanine (+2.8); cysteine/cysteine (+2.5); methionine (+1.9); alanine (+1.8); glycine (−0.4); threonine (−0.7); serine (−0.8); tryptophan (−0.9); tyrosine (−1.3); proline (1.6); histidine (−3.2); glutamate (−3.5); glutamine (−3.5); aspartate (−3.5); asparagine (−3.5); lysine (−3.9); and arginine (−4.5). The importance of the hydropathy amino acid index in conferring interactive biologic function on a protein is generally understood in the art (Kyte et al., J. Mol. Biol. 157:105-131 (1982)). It is accepted that the relative hydropathic character of the amino acid contributes to the secondary structure of the resultant protein or polypeptide, which in turn defines the interaction of the protein or polypeptide with other molecules, for example, enzymes, substrates, receptors, DNA, antibodies, antigens, and others. It is also known that certain amino acids may be substituted for other amino acids having a similar hydropathy index or score, and still retain a similar biological activity. In making changes based upon the hydropathy index, in certain embodiments, the substitution of amino acids whose hydropathy indices are within ±2 is included. In some aspects of the invention, those that are within ±1 are included, and in other aspects of the invention, those within ±0.5 are included.

It also is understood in the art that the substitution of like amino acids can be effectively made based on hydrophilicity. U.S. Pat. No. 4,554,101, incorporated herein by reference, states that the greatest local average hydrophilicity of a protein, as governed by the hydrophilicity of its adjacent amino acids, correlates with a biological property of the protein. In certain embodiments, the greatest local average hydrophilicity of a protein, as governed by the hydrophilicity of its adjacent amino acids, correlates with its immunogenicity and antigen binding, that is, as a biological property of the protein. The following hydrophilicity values have been assigned to these amino acid residues: arginine (+3.0); lysine (+3.0); aspartate (+3.0±1); glutamate (+3.0±1); serine (+0.3); asparagine (+0.2); glutamine (+0.2); glycine (0); threonine (−0.4); proline (−0.5±1); alanine (−0.5); histidine (−0.5); cysteine (−1.0); methionine (−1.3); valine (−1.5); leucine (−1.8); isoleucine (−1.8); tyrosine (−2.3); phenylalanine (−2.5); and tryptophan (−3.4). In making changes based upon similar hydrophilicity values, in certain embodiments, the substitution of amino acids whose hydrophilicity values are within ±2 are included, in other embodiments, those which are within ±1 are included, and in still other embodiments, those within ±0.5 are included. In some instances, one may also identify epitopes from primary amino acid sequences based on hydrophilicity. These regions are also referred to as "epitopic core regions." It is understood that an amino acid can be substituted for another having a similar hydrophilicity value and still produce a biologically equivalent and immunologically equivalent protein.

Additionally, one skilled in the art can review structure-function studies identifying residues in similar polypeptides or proteins that are important for activity or structure. In view of such a comparison, one can predict the importance of amino acid residues in a protein that correspond to amino acid residues important for activity or structure in similar proteins. One skilled in the art may opt for chemically similar amino acid substitutions for such predicted important amino acid residues.

One skilled in the art can also analyze the three-dimensional structure and amino acid sequence in relation to that structure in similar proteins or polypeptides. In view of such information, one skilled in the art may predict the alignment of amino acid residues of an antibody with respect to its three-dimensional structure. One skilled in the art may choose not to make changes to amino acid residues predicted to be on the surface of the protein, since such residues may be involved in important interactions with other molecules. Moreover, one skilled in the art may generate test variants containing a single amino acid substitution at each desired amino acid residue. These variants can then be screened using standard assays for binding and/or activity, thus yielding information gathered from such routine experiments, which may allow one skilled in the art to determine the amino acid positions where further substitutions should be avoided either alone or in combination with other mutations. Various tools available to determine secondary structure can be found on the world wide web at expasy.org/proteomics/protein_structure.

In some embodiments of the invention, amino acid substitutions are made that: (1) reduce susceptibility to proteolysis, (2) reduce susceptibility to oxidation, (3) alter binding affinity for forming protein complexes, (4) alter ligand or antigen binding affinities, and/or (5) confer or modify other physicochemical or functional properties on such polypeptides. For example, single or multiple amino acid substitutions (in certain embodiments, conservative amino acid substitutions) may be made in the naturally occurring sequence. Substitutions can be made in that portion of the antibody that lies outside the domain(s) forming intermolecular contacts. In such embodiments, conservative amino acid substitutions can be used that do not substantially change the structural characteristics of the protein or polypeptide (e.g., one or more replacement amino acids that do not disrupt the secondary structure that characterizes the native antibody).

III. Nucleic Acids

In certain embodiments, nucleic acid sequences can exist in a variety of instances such as: isolated segments and recombinant vectors of incorporated sequences or recombinant polynucleotides encoding one or both chains of an antibody, or a fragment, derivative, mutein, or variant thereof, polynucleotides sufficient for use as hybridization probes, PCR primers or sequencing primers for identifying, analyzing, mutating or amplifying a polynucleotide encoding a polypeptide, anti-sense nucleic acids for inhibiting expression of a polynucleotide, and complementary sequences of the foregoing described herein. Nucleic acids that encode the epitope to which certain of the antibodies provided herein are also provided. Nucleic acids encoding fusion proteins that include these peptides are also provided. The nucleic acids can be single-stranded or double-stranded and can comprise RNA and/or DNA nucleotides and artificial variants thereof (e.g., peptide nucleic acids).

The term "polynucleotide" refers to a nucleic acid molecule that either is recombinant or has been isolated from total genomic nucleic acid. Included within the term "polynucleotide" are oligonucleotides (nucleic acids 100 residues or less in length), recombinant vectors, including, for example, plasmids, cosmids, phage, viruses, and the like. Polynucleotides include, in certain aspects, regulatory sequences, isolated substantially away from their naturally occurring genes or protein encoding sequences. Polynucleotides may be single-stranded (coding or antisense) or double-stranded, and may be RNA, DNA (genomic, cDNA or synthetic), analogs thereof, or a combination thereof. Additional coding or non-coding sequences may, but need not, be present within a polynucleotide.

In this respect, the term "gene," "polynucleotide," or "nucleic acid" is used to refer to a nucleic acid that encodes a protein, polypeptide, or peptide (including any sequences required for proper transcription, post-translational modification, or localization). As will be understood by those in the art, this term encompasses genomic sequences, expression cassettes, cDNA sequences, and smaller engineered nucleic acid segments that express, or may be adapted to express, proteins, polypeptides, domains, peptides, fusion proteins, and mutants. A nucleic acid encoding all or part of a polypeptide may contain a contiguous nucleic acid sequence encoding all or a portion of such a polypeptide. It also is contemplated that a particular polypeptide may be encoded by nucleic acids containing variations having slightly different nucleic acid sequences but, nonetheless, encode the same or substantially similar protein.

In certain embodiments, there are polynucleotide variants having substantial identity to the sequences disclosed herein; those comprising at least 70%, 75%, 80%, 85%, 90%, 95%, 96%, 97%, 98%, or 99% or higher sequence identity, including all values and ranges there between, compared to a polynucleotide sequence provided herein using the methods described herein (e.g., BLAST analysis using standard parameters). In certain aspects, the isolated polynucleotide will comprise a nucleotide sequence encoding a polypeptide that has at least 90%, preferably 95% and above, identity to an amino acid sequence described herein, over the entire length of the sequence; or a nucleotide sequence complementary to said isolated polynucleotide.

The nucleic acid segments, regardless of the length of the coding sequence itself, may be combined with other nucleic acid sequences, such as promoters, polyadenylation signals, additional restriction enzyme sites, multiple cloning sites, other coding segments, and the like, such that their overall length may vary considerably. The nucleic acids can be any length. They can be, for example, 5, 10, 15, 20, 25, 30, 35, 40, 45, 50, 75, 100, 125, 175, 200, 250, 300, 350, 400, 450, 500, 750, 1000, 1500, 3000, 5000 or more nucleotides in length, and/or can comprise one or more additional sequences, for example, regulatory sequences, and/or be a part of a larger nucleic acid, for example, a vector. It is therefore contemplated that a nucleic acid fragment of almost any length may be employed, with the total length preferably being limited by the ease of preparation and use in the intended recombinant nucleic acid protocol. In some cases, a nucleic acid sequence may encode a polypeptide sequence with additional heterologous coding sequences, for example to allow for purification of the polypeptide, transport, secretion, post-translational modification, or for therapeutic benefits such as targeting or efficacy. As discussed above, a tag or other heterologous polypeptide may be added to the modified polypeptide-encoding sequence, wherein "heterologous" refers to a polypeptide that is not the same as the modified polypeptide.

1. Hybridization

The nucleic acids that hybridize to other nucleic acids under particular hybridization conditions. Methods for hybridizing nucleic acids are well known in the art. See, e.g., Current Protocols in Molecular Biology, John Wiley and Sons, N.Y. (1989), 6.3.1-6.3.6. As defined herein, a moderately stringent hybridization condition uses a prewashing solution containing 5× sodium chloride/sodium citrate (SSC), 0.5% SDS, 1.0 mM EDTA (pH 8.0), hybridization buffer of about 50% formamide, 6×SSC, and a hybridization temperature of 55° C. (or other similar hybridization solutions, such as one containing about 50% formamide, with a hybridization temperature of 42° C.), and washing conditions of 60° C. in 0.5×SSC, 0.1% SDS. A stringent hybridization condition hybridizes in 6×SSC at 45° C., followed by one or more washes in 0.1×SSC, 0.2% SDS at 68° C. Furthermore, one of skill in the art can manipulate the hybridization and/or washing conditions to increase or decrease the stringency of hybridization such that nucleic acids comprising nucleotide sequence that are at least 65%, at least 70%, at least 75%, at least 80%, at least 85%, at least 90%, at least 95%, at least 96%, at least 97%, at least 98% or at least 99% identical to each other typically remain hybridized to each other.

The parameters affecting the choice of hybridization conditions and guidance for devising suitable conditions are set forth by, for example, Sambrook, Fritsch, and Maniatis (Molecular Cloning: A Laboratory Manual, Cold Spring Harbor Laboratory Press, Cold Spring Harbor, N.Y., chapters 9 and 11 (1989); Current Protocols in Molecular Biology, Ausubel et al., eds., John Wiley and Sons, Inc., sections 2.10 and 6.3-6.4 (1995), both of which are herein incorporated by reference in their entirety for all purposes) and can be readily determined by those having ordinary skill in the art based on, for example, the length and/or base composition of the DNA.

2. Mutation

Changes can be introduced by mutation into a nucleic acid, thereby leading to changes in the amino acid sequence of a polypeptide (e.g., an antibody or antibody derivative) that it encodes. Mutations can be introduced using any technique known in the art. In one embodiment, one or more particular amino acid residues are changed using, for example, a site-directed mutagenesis protocol. In another embodiment, one or more randomly selected residues are changed using, for example, a random mutagenesis protocol. However it is made, a mutant polypeptide can be expressed and screened for a desired property.

Mutations can be introduced into a nucleic acid without significantly altering the biological activity of a polypeptide that it encodes. For example, one can make nucleotide substitutions leading to amino acid substitutions at non-essential amino acid residues. Alternatively, one or more mutations can be introduced into a nucleic acid that selectively changes the biological activity of a polypeptide that it encodes. See, eg., Romain Studer et al., Biochem. J. 449: 581-594 (2013). For example, the mutation can quantitatively or qualitatively change the biological activity. Examples of quantitative changes include increasing, reducing or eliminating the activity. Examples of qualitative changes include altering the antigen specificity of an antibody.

3. Probes

In another aspect, nucleic acid molecules are suitable for use as primers or hybridization probes for the detection of nucleic acid sequences. A nucleic acid molecule can comprise only a portion of a nucleic acid sequence encoding a full-length polypeptide, for example, a fragment that can be used as a probe or primer or a fragment encoding an active portion of a given polypeptide.

In another embodiment, the nucleic acid molecules may be used as probes or PCR primers for specific antibody sequences. For instance, a nucleic acid molecule probe may be used in diagnostic methods or a nucleic acid molecule PCR primer may be used to amplify regions of DNA that could be used, inter alia, to isolate nucleic acid sequences for use in producing variable domains of antibodies. See, eg., Gaily Kivi et al., BMC Biotechnol. 16:2 (2016). In a preferred embodiment, the nucleic acid molecules are oligonucleotides. In a more preferred embodiment, the oligonucleotides are from highly variable regions of the heavy and light chains of the antibody of interest. In an even more preferred embodiment, the oligonucleotides encode all or part of one or more of the CDRs.

Probes based on the desired sequence of a nucleic acid can be used to detect the nucleic acid or similar nucleic acids, for example, transcripts encoding a polypeptide of interest. The probe can comprise a label group, e.g., a radioisotope, a fluorescent compound, an enzyme, or an enzyme co-factor. Such probes can be used to identify a cell that expresses the polypeptide.

IV. Antibody Production

A. Antibody Production Embodiments.

Methods for preparing and characterizing antibodies for use in diagnostic and detection assays, for purification, and for use as therapeutics are well known in the art as disclosed in, for example, U.S. Pat. Nos. 4,011,308; 4,722,890; 4,016,043; 3,876,504; 3,770,380; and 4,372,745 (see, e.g., Antibodies: A Laboratory Manual, Cold Spring Harbor Laboratory, 1988; incorporated herein by reference). These antibodies may be polyclonal or monoclonal antibody preparations, monospecific antisera, human antibodies, hybrid or chimeric antibodies, such as humanized antibodies, altered antibodies, F(ab')2 fragments, Fab fragments, Fv fragments, single-domain antibodies, dimeric or trimeric antibody fragment constructs, minibodies, or functional fragments thereof which bind to the antigen in question. In certain aspects, polypeptides, peptides, and proteins and immunogenic fragments thereof for use in various embodiments can also be synthesized in solution or on a solid support in accordance with conventional techniques. See, for example, Stewart and Young, (1984); Tarn et al, (1983); Merrifield, (1986); and Barany and Merrifield (1979), each incorporated herein by reference.

Briefly, a polyclonal antibody is prepared by immunizing an animal with an antigen or a portion thereof and collecting antisera from that immunized animal. The antigen may be altered compared to an antigen sequence found in nature. In some embodiments, a variant or altered antigenic peptide or polypeptide is employed to generate antibodies. Inocula are typically prepared by dispersing the antigenic composition in a physiologically tolerable diluent to form an aqueous composition. Antisera is subsequently collected by methods known in the arts, and the serum may be used as-is for various applications or else the desired antibody fraction may be purified by well-known methods, such as affinity chromatography (Harlow and Lane, Antibodies: A Laboratory Manual 1988).

Methods of making monoclonal antibodies are also well known in the art (Kohler and Milstein, 1975; Harlow and Lane, 1988, U.S. Pat. No. 4,196,265, herein incorporated by reference in its entirety for all purposes). Typically, this technique involves immunizing a suitable animal with a selected immunogenic composition, e.g., a purified or partially purified protein, polypeptide, peptide or domain. Resulting antibody-producing B-cells from the immunized animal, or all dissociated splenocytes, are then induced to fuse with cells from an immortalized cell line to form hybridomas. Myeloma cell lines suited for use in hybridoma-producing fusion procedures preferably are non-antibody-producing and have high fusion efficiency and enzyme deficiencies that render then incapable of growing in certain selective media that support the growth of only the desired fused cells (hybridomas). Typically, the fusion partner includes a property that allows selection of the resulting hybridomas using specific media. For example, fusion partners can be hypoxanthine/aminopterin/thymidine (HAT)-sensitive. Methods for generating hybrids of antibody-producing spleen or lymph node cells and myeloma cells usually comprise mixing somatic cells with myeloma cells in the presence of an agent or agents (chemical or electrical) that promote the fusion of cell membranes. Next, selection of hybridomas can be performed by culturing the cells by single-clone dilution in microtiter plates, followed by testing the individual clonal supernatants (after about two to three weeks) for the desired reactivity. Fusion procedures for making hybridomas, immunization protocols, and techniques for isolation of immunized splenocytes for fusion are known in the art.

Other techniques for producing monoclonal antibodies include the viral or oncogenic transformation of B-lymphocytes, a molecular cloning approach may be used to generate a nucleic acid or polypeptide, the selected lymphocyte antibody method (SLAM) (see, e.g., Babcook et al., Proc. Natl. Acad. Sci. USA 93:7843-7848 (1996), the preparation of combinatorial immunoglobulin phagemid libraries from RNA isolated from the spleen of the immunized animal and selection of phagemids expressing appropriate antibodies, or producing a cell expressing an antibody from a genomic sequence of the cell comprising a modified immunoglobulin locus using Cre-mediated site-specific recombination (see, e.g., U.S. Pat. No. 6,091,001).

Monoclonal antibodies may be further purified using filtration, centrifugation, and various chromatographic methods such as HPLC or affinity chromatography. Monoclonal antibodies may be further screened or optimized for properties relating to specificity, avidity, half-life, immunogenicity, binding association, binding disassociation, or overall functional properties relative to being a treatment for infection. Thus, monoclonal antibodies may have alterations in the amino acid sequence of CDRs, including insertions, deletions, or substitutions with a conserved or non-conserved amino acid.

The immunogenicity of a particular immunogen composition can be enhanced by the use of non-specific stimulators of the immune response, known as adjuvants. Adjuvants that may be used in accordance with embodiments include, but are not limited to, IL-1, IL-2, IL-4, IL-7, IL-12, -interferon, GMCSP, BCG, aluminum hydroxide, MDP compounds, such as thur-MDP and nor-MDP, CGP (MTP-PE), lipid A, and monophosphoryl lipid A (MPL). Exemplary adjuvants may include complete Freund's adjuvant (a non-specific stimulator of the immune response containing killed *Mycobacterium tuberculosis*), incomplete Freund's adjuvants, and/or aluminum hydroxide adjuvant. In addition to adjuvants, it may be desirable to co-administer biologic response modifiers (BRM), such as but not limited to, Cimetidine (CIM; 1200 mg/d) (Smith/Kline, Pa.); low-dose Cyclophosphamide (CYP; 300 mg/m2) (Johnson/Mead, N.J.), cytokines such as ß-interferon, IL-2, or IL-12, or genes encoding proteins involved in immune helper functions, such as B-7.A phage-display system can be used to expand antibody molecule populations in vitro. Saiki, et al., Nature 324:163 (1986); Scharf et al., Science 233:1076 (1986); U.S. Pat. Nos. 4,683,195 and 4,683,202; Yang et al., J Mol Biol. 254:392 (1995); Barbas, I I I et al., Methods: Comp. Meth Enzymol. (1995) 8:94; Barbas, I I I et al., Proc Natl Acad Sci USA 88:7978 (1991).

B. Fully Human Antibody Production

Methods are available for making fully human antibodies. Using fully human antibodies can minimize the immunogenic and allergic responses that may be caused by administering non-human monoclonal antibodies to humans as therapeutic agents. In one embodiment, human antibodies may be produced in a non-human transgenic animal, e.g., a transgenic mouse capable of producing multiple isotypes of human antibodies to protein (e.g., IgG, IgA, and/or IgE) by undergoing V-D-J recombination and isotype switching. Accordingly, this aspect applies to antibodies, antibody fragments, and pharmaceutical compositions thereof, but also non-human transgenic animals, B-cells, host cells, and hybridomas that produce monoclonal antibodies. Applications of humanized antibodies include, but are not limited to, detect a cell expressing an anticipated protein, either in vivo or in vitro, pharmaceutical preparations containing the antibodies of the present invention, and methods of treating disorders by administering the antibodies.

Fully human antibodies can be produced by immunizing transgenic animals (usually mice) that are capable of producing a repertoire of human antibodies in the absence of endogenous immunoglobulin production. Antigens for this purpose typically have six or more contiguous amino acids, and optionally are conjugated to a carrier, such as a hapten. See, for example, Jakobovits et al., Proc. Natl. Acad. Sci. USA 90:2551-2555 (1993); Jakobovits et al., Nature 362: 255-258 (1993); Bruggermann et al., Year in Immunol. 7:33 (1993). In one example, transgenic animals are produced by incapacitating the endogenous mouse immunoglobulin loci encoding the mouse heavy and light immunoglobulin chains therein, and inserting into the mouse genome large fragments of human genome DNA containing loci that encode human heavy and light chain proteins. Partially modified animals, which have less than the full complement of human immunoglobulin loci, are then crossbred to obtain an animal having all of the desired immune system modifications. When administered an immunogen, these transgenic animals produce antibodies that are immunospecific for the immunogen but have human rather than murine amino acid sequences, including the variable regions. For further details of such methods, see, for example, International Patent Application Publication Nos. WO 96/33735 and WO 94/02602, which are hereby incorporated by reference in their entirety. Additional methods relating to transgenic mice for making human antibodies are described in U.S. Pat. Nos. 5,545,807; 6,713,610; 6,673,986; 6,162,963; 6,300,129; 6,255,458; 5,877,397; 5,874,299 and 5,545,806; in International Patent Application Publication Nos. WO 91/10741 and WO 90/04036; and in European Patent Nos. EP 546073B1 and EP 546073A1, all of which are hereby incorporated by reference in their entirety for all purposes.

The transgenic mice described above, referred to herein as "HuMAb" mice, contain a human immunoglobulin gene minilocus that encodes unrearranged human heavy light chain immunoglobulin sequences, together with targeted mutations that inactivate the endogenous loci (Lonberg et al., Nature 368:856-859 (1994)). Accordingly, the mice exhibit reduced expression of mouse IgM or ? chains and in response to immunization, the introduced human heavy and light chain transgenes undergo class switching and somatic mutation to generate high affinity human IgG? monoclonal antibodies (Lonberg et al., supra; Lonberg and Huszar, Intern. Ref. Immunol. 13:65-93 (1995); Harding and Lonberg, Ann. N.Y. Acad. Sci. 764:536-546 (1995)). The preparation of HuMAb mice is described in detail in Taylor et al., Nucl. Acids Res. 20:6287-6295 (1992); Chen et al., Int. Immunol. 5:647-656 (1993); Tuaillon et al., J. Immunol. 152:2912-2920 (1994); Lonberg et al., supra; Lonberg, Handbook of Exp. Pharmacol. 113:49-101 (1994); Taylor et al., Int. Immunol. 6:579-591 (1994); Lonberg and Huszar, Intern. Ref. Immunol. 13:65-93 (1995); Harding and Lonberg, Ann. N.Y. Acad. Sci. 764:536-546 (1995); Fishwild et al., Nat. Biotechnol. 14:845-851 (1996); the foregoing references are herein incorporated by reference in their entirety for all purposes. See further, U.S. Pat. Nos. 5,545,806; 5,569,825; 5,625,126; 5,633,425; 5,789,650; 5,877,397; 5,661,016; 5,814,318; 5,874,299; 5,770,429; and 5,545,807; as well as International Patent Application Publication Nos. WO 93/1227; WO 92/22646; and WO 92/03918, the disclosures of all of which are hereby incorporated by reference in their entirety for all purposes. Technologies utilized for producing human antibodies in these transgenic mice are disclosed also in WO 98/24893, and Mendez et al., Nat. Genetics 15:146-156 (1997), which are herein incorporated by reference. For example, the HCo7 and HCo12 transgenic mice strains can be used to generate human antibodies.

Using hybridoma technology, antigen-specific humanized monoclonal antibodies with the desired specificity can be produced and selected from the transgenic mice such as those described above. Such antibodies may be cloned and expressed using a suitable vector and host cell, or the antibodies can be harvested from cultured hybridoma cells. Fully human antibodies can also be derived from phage-display libraries (as disclosed in Hoogenboom et al., J. Mol. Biol. 227:381 (1991); and Marks et al., J. Mol. Biol. 222:581 (1991)). One such technique is described in International Patent Application Publication No. WO 99/10494 (herein incorporated by reference), which describes the isolation of high affinity and functional agonistic antibodies for MPL- and msk-receptors using such an approach.

C. Antibody Fragments Production

Antibody fragments that retain the ability to recognize the antigen of interest will also find use herein. A number of antibody fragments are known in the art that comprise antigen-binding sites capable of exhibiting immunological binding properties of an intact antibody molecule and can be subsequently modified by methods known in the arts. Functional fragments, including only the variable regions of the heavy and light chains, can also be produced using standard techniques such as recombinant production or preferential proteolytic cleavage of immunoglobulin molecules. These fragments are known as Fv. See, e.g., Inbar et al., Proc. Nat. Acad. Sci. USA 69:2659-2662 (1972); Hochman et al., Biochem. 15:2706-2710 (1976); and Ehrlich et al., Biochem. 19:4091-4096 (1980).

Single-chain variable fragments (scFvs) may be prepared by fusing DNA encoding a peptide linker between DNAs encoding the two variable domain polypeptides (VL and VH). scFvs can form antigen-binding monomers, or they can form multimers (e.g., dimers, trimers, or tetramers), depending on the length of a flexible linker between the two variable domains (Kortt et al., Prot. Eng. 10:423 (1997); Kort et al., Biomol. Eng. 18:95-108 (2001)). By combining different VL- and VH-comprising polypeptides, one can form multimeric scFvs that bind to different epitopes (Kriangkum et al., Biomol. Eng. 18:31-40 (2001)). Antigen-binding fragments are typically produced by recombinant DNA methods known to those skilled in the art. Although the two domains of the Fv fragment, VL and VH, are coded for by separate genes, they can be joined using recombinant methods by a synthetic linker that enables them to be made as a single chain polypeptide (known as single chain Fv (sFv or scFv); see e.g., Bird et al., Science 242:423-426 (1988); and Huston et al., Proc. Natl. Acad. Sci. USA 85:5879-5883 (1988). Design criteria include determining the appropriate length to span the distance between the C-terminus of one chain and the N-terminus of the other, wherein the linker is generally formed from small hydrophilic amino acid residues that do not tend to coil or form secondary structures. Suitable linkers generally comprise polypeptide chains of alternating sets of glycine and serine residues, and may include glutamic acid and lysine residues inserted to enhance solubility. Antigen-binding fragments are screened for utility in the same manner as intact antibodies. Such fragments include those obtained by amino-terminal and/or carboxy-terminal deletions, where the remaining amino acid sequence is substantially identical to the corresponding positions in the naturally occurring sequence deduced, for example, from a full-length cDNA sequence.

Antibodies may also be generated using peptide analogs of the epitopic determinants disclosed herein, which may consist of non-peptide compounds having properties analogous to those of the template peptide. These types of non-peptide compound are termed "peptide mimetics" or "peptidomimetics". Fauchere, J. Adv. Drug Res. 15:29 (1986); Veber and Freidinger TINS p. 392 (1985); and Evans et al., J. Med. Chem. 30:1229 (1987). Liu et al. (2003) also describe "antibody like binding peptidomimetics" (ABiPs), which are peptides that act as pared-down antibodies and have certain advantages of longer serum half-life as well as less cumbersome synthesis methods. These analogs can be peptides, non-peptides or combinations of peptide and non-peptide regions. Fauchere, Adv. Drug Res. 15:29 (1986); Veber and Freidiner, TINS p. 392 (1985); and Evans et al., J. Med. Chem. 30:1229 (1987), which are incorporated herein by reference in their entirety for any purpose. Peptide mimetics that are structurally similar to therapeutically useful peptides may be used to produce a similar therapeutic or prophylactic effect. Such compounds are often developed with the aid of computerized molecular modeling. Generally, peptidomimetics of the invention are proteins that are structurally similar to an antibody displaying a desired biological activity, such as the ability to bind a protein, but have one or more peptide linkages optionally replaced by a linkage selected from: —CH2NH—, —CH2S—, —CH2—CH2—, —CH═CH— (cis and trans), —COCH2—, —CH(OH)CH2—, and —CH2SO— by methods well known in the art. Systematic substitution of one or more amino acids of a consensus sequence with a D-amino acid of the same type (e.g., D-lysine in place of L-lysine) may be used in certain embodiments of the invention to generate more stable proteins. In addition, constrained peptides comprising a consensus sequence or a substantially identical consensus sequence variation may be generated by methods known in the art (Rizo and Gierasch, Ann. Rev. Biochem. 61:387 (1992), incorporated herein by reference), for example, by adding internal cysteine residues capable of forming intramolecular disulfide bridges which cyclize the peptide.

Once generated, a phage display library can be used to improve the immunological binding affinity of the Fab molecules using known techniques. See, e.g., Figini et al., J. Mol. Biol. 239:68 (1994). The coding sequences for the heavy and light chain portions of the Fab molecules selected from the phage display library can be isolated or synthesized and cloned into any suitable vector or replicon for expression. Any suitable expression system can be used.

V. Obtaining Encoded Antibodies

In some aspects, there are nucleic acid molecule encoding antibody polypeptides (e.g., heavy or light chain, variable domain only, or full-length). These may be generated by methods known in the art, e.g., isolated from B cells of mice that have been immunized and isolated, phage display, expressed in any suitable recombinant expression system and allowed to assemble to form antibody molecules.

A. Expression

The nucleic acid molecules may be used to express large quantities of recombinant antibodies or to produce chimeric antibodies, single chain antibodies, immunoadhesins, diabodies, mutated antibodies, and other antibody derivatives. If the nucleic acid molecules are derived from a non-human, non-transgenic animal, the nucleic acid molecules may be used for antibody humanization.

1. Vectors

In some aspects, contemplated are expression vectors comprising a nucleic acid molecule encoding a polypeptide of the desired sequence or a portion thereof (e.g., a fragment containing one or more CDRs or one or more variable region domains). Expression vectors comprising the nucleic acid molecules may encode the heavy chain, light chain, or the antigen-binding portion thereof. In some aspects, expression vectors comprising nucleic acid molecules may encode fusion proteins, modified antibodies, antibody fragments, and probes thereof. In addition to control sequences that govern transcription and translation, vectors and expression vectors may contain nucleic acid sequences that serve other functions as well.

To express the antibodies, or antigen-binding fragments thereof, DNAs encoding partial or full-length light and heavy chains are inserted into expression vectors such that the gene area is operatively linked to transcriptional and translational control sequences. In some aspects, a vector that encodes a functionally complete human CH or CL immunoglobulin sequence with appropriate restriction sites engineered so that any VH or VL sequence can be easily inserted and expressed. Typically, expression vectors used in any of the host cells contain sequences for plasmid or virus maintenance and for cloning and expression of exogenous nucleotide sequences. Such sequences, collectively referred to as "flanking sequences" typically include one or more of the following operatively linked nucleotide sequences: a promoter, one or more enhancer sequences, an origin of replication, a transcriptional termination sequence, a complete intron sequence containing a donor and acceptor splice site, a sequence encoding a leader sequence for polypeptide secretion, a ribosome binding site, a polyadenylation sequence, a polylinker region for inserting the nucleic acid encoding the polypeptide to be expressed, and a selectable marker element. Such sequences and methods of using the same are well known in the art.

2. Expression Systems

Numerous expression systems exist that comprise at least a part or all of the expression vectors discussed above. Prokaryote- and/or eukaryote-based systems can be employed for use with an embodiment to produce nucleic acid sequences, or their cognate polypeptides, proteins and peptides. Commercially and widely available systems include in but are not limited to bacterial, mammalian, yeast, and insect cell systems. Different host cells have characteristic and specific mechanisms for the post-translational processing and modification of proteins. Appropriate cell lines or host systems can be chosen to ensure the correct modification and processing of the foreign protein expressed. Those skilled in the art are able to express a vector to produce a nucleic acid sequence or its cognate polypeptide, protein, or peptide using an appropriate expression system.

3. Methods of Gene Transfer

Suitable methods for nucleic acid delivery to effect expression of compositions are anticipated to include virtually any method by which a nucleic acid (e.g., DNA, including viral and nonviral vectors) can be introduced into a cell, a tissue or an organism, as described herein or as would be known to one of ordinary skill in the art. Such methods include, but are not limited to, direct delivery of DNA such as by injection (U.S. Pat. Nos. 5,994,624, 5,981, 274, 5,945,100, 5,780,448, 5,736,524, 5,702,932, 5,656,610, 5,589,466 and 5,580,859, each incorporated herein by reference), including microinjection (Harland and Weintraub, 1985; U.S. Pat. No. 5,789,215, incorporated herein by reference); by electroporation (U.S. Pat. No. 5,384,253, incorporated herein by reference); by calcium phosphate precipitation (Graham and Van Der Eb, 1973; Chen and Okayama, 1987; Rippe et al., 1990); by using DEAE dextran followed by polyethylene glycol (Gopal, 1985); by direct sonic loading (Fechheimer et al., 1987); by liposome mediated transfection (Nicolau and Sene, 1982; Fraley et al., 1979; Nicolau et al., 1987; Wong et al., 1980; Kaneda et al., 1989; Kato et al., 1991); by microprojectile bombardment (PCT Application Nos. WO 94/09699 and 95/06128; U.S. Pat. Nos. 5,610,042; 5,322,783, 5,563,055, 5,550,318, 5,538,877 and 5,538,880, and each incorporated herein by reference); by agitation with silicon carbide fibers (Kaeppler et al., 1990; U.S. Pat. Nos. 5,302,523 and 5,464,765, each incorporated herein by reference); by *Agrobacterium* mediated transformation (U.S. Pat. Nos. 5,591,616 and 5,563, 055, each incorporated herein by reference); or by PEG mediated transformation of protoplasts (Omirulleh et al., 1993; U.S. Pat. Nos. 4,684,611 and 4,952,500, each incorporated herein by reference); by desiccation/inhibition mediated DNA uptake (Potrykus et al., 1985). Other methods include viral transduction, such as gene transfer by lentiviral or retroviral transduction.

B. Host Cells

In another aspect, contemplated are the use of host cells into which a recombinant expression vector has been introduced. Antibodies can be expressed in a variety of cell types. An expression construct encoding an antibody can be transfected into cells according to a variety of methods known in the art. Vector DNA can be introduced into prokaryotic or eukaryotic cells via conventional transformation or transfection techniques. Some vectors may employ control sequences that allow it to be replicated and/or expressed in both prokaryotic and eukaryotic cells. In certain aspects, the antibody expression construct can be placed under control of a promoter that is linked to T-cell activation, such as one that is controlled by NFAT-1 or NF-??, both of which are transcription factors that can be activated upon T-cell activation. Control of antibody expression allows T cells, such as tumor-targeting T cells, to sense their surroundings and perform real-time modulation of cytokine signaling, both in the T cells themselves and in surrounding endogenous immune cells. One of skill in the art would understand the conditions under which to incubate host cells to maintain them and to permit replication of a vector. Also understood and known are techniques and conditions that would allow large-scale production of vectors, as well as production of the nucleic acids encoded by vectors and their cognate polypeptides, proteins, or peptides.

For stable transfection of mammalian cells, it is known, depending upon the expression vector and transfection technique used, only a small fraction of cells may integrate the foreign DNA into their genome. In order to identify and select these integrants, a selectable marker (e.g., for resistance to antibiotics) is generally introduced into the host cells along with the gene of interest. Cells stably transfected with the introduced nucleic acid can be identified by drug selection (e.g., cells that have incorporated the selectable marker gene will survive, while the other cells die), among other methods known in the arts.

C. Isolation

The nucleic acid molecule encoding either or both of the entire heavy and light chains of an antibody or the variable regions thereof may be obtained from any source that produces antibodies. Methods of isolating mRNA encoding an antibody are well known in the art. See e.g., Sambrook et al., supra. The sequences of human heavy and light chain constant region genes are also known in the art. See, e.g., Kabat et al., 1991, supra. Nucleic acid molecules encoding the full-length heavy and/or light chains may then be expressed in a cell into which they have been introduced and the antibody isolated.

VI. Administration of Therapeutic Compositions

The therapy provided herein may comprise administration of a combination of therapeutic agents, such as a first cancer therapy and a second cancer therapy. The therapies may be administered in any suitable manner known in the art. For example, the first and second cancer treatment may be administered sequentially (at different times) or concurrently (at the same time). In some embodiments, the first and second cancer treatments are administered in a separate composition. In some embodiments, the first and second cancer treatments are in the same composition.

Embodiments of the disclosure relate to compositions and methods comprising therapeutic compositions. The different therapies may be administered in one composition or in more than one composition, such as 2 compositions, 3 compositions, or 4 compositions. Various combinations of the agents may be employed.

The therapeutic agents of the disclosure may be administered by the same route of administration or by different routes of administration. In some embodiments, the cancer therapy is administered intravenously, intramuscularly, subcutaneously, topically, orally, transdermally, intraperitoneally, intraorbitally, by implantation, by inhalation, intrathecally, intraventricularly, or intranasally. In some embodiments, the antibiotic is administered intravenously, intramuscularly, subcutaneously, topically, orally, transdermally, intraperitoneally, intraorbitally, by implantation, by inhalation, intrathecally, intraventricularly, or intranasally.

The appropriate dosage may be determined based on the type of disease to be treated, severity and course of the disease, the clinical condition of the individual, the individual's clinical history and response to the treatment, and the discretion of the attending physician.

The treatments may include various "unit doses." Unit dose is defined as containing a predetermined-quantity of the therapeutic composition. The quantity to be administered, and the particular route and formulation, is within the skill of determination of those in the clinical arts. A unit dose need not be administered as a single injection but may comprise continuous infusion over a set period of time. In some embodiments, a unit dose comprises a single administrable dose.

The quantity to be administered, both according to number of treatments and unit dose, depends on the treatment effect desired. An effective dose is understood to refer to an amount necessary to achieve a particular effect. In the practice in certain embodiments, it is contemplated that doses in the range from 10 mg/kg to 200 mg/kg can affect the protective capability of these agents. Thus, it is contemplated that doses include doses of about 0.1, 0.5, 1, 5, 10, 15, 20, 25, 30, 35, 40, 45, 50, 55, 60, 65, 70, 75, 80, 85, 90, 100, 105, 110, 115, 120, 125, 130, 135, 140, 145, 150, 155, 160, 165, 170, 175, 180, 185, 190, 195, and 200, 300, 400, 500, 1000 μg/kg, mg/kg, μg/day, or mg/day or any range derivable therein. Furthermore, such doses can be administered at multiple times during a day, and/or on multiple days, weeks, or months.

In certain embodiments, the effective dose of the pharmaceutical composition is one which can provide a blood level of about 1 μM to 150 μM. In another embodiment, the effective dose provides a blood level of about 4 μM to 100 μM; or about 1 μM to 100 μM; or about 1 μM to 50 μM; or about 1 μM to 40 μM; or about 1 μM to 30 μM; or about 1 μM to 20 μM; or about 1 μM to 10 μM; or about 10 μM to 150 μM; or about 10 μM to 100 μM; or about 10 μM to 50 μM; or about 25 μM to 150 μM; or about 25 μM to 100 μM; or about 25 μM to 50 μM; or about 50 μM to 150 μM; or about 50 μM to 100 μM (or any range derivable therein). In other embodiments, the dose can provide the following blood level of the agent that results from a therapeutic agent being administered to a subject: about, at least about, or at most about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 μM or any range derivable therein. In certain embodiments, the therapeutic agent that is administered to a subject is metabolized in the body to a metabolized therapeutic agent, in which case the blood levels may refer to the amount of that agent. Alternatively, to the extent the therapeutic agent is not metabolized by a subject, the blood levels discussed herein may refer to the unmetabolized therapeutic agent.

Precise amounts of the therapeutic composition also depend on the judgment of the practitioner and are peculiar to each individual. Factors affecting dose include physical and clinical state of the patient, the route of administration, the intended goal of treatment (alleviation of symptoms versus cure) and the potency, stability and toxicity of the particular therapeutic substance or other therapies a subject may be undergoing.

It will be understood by those skilled in the art and made aware that dosage units of μg/kg or mg/kg of body weight can be converted and expressed in comparable concentration units of µg/ml or mM (blood levels), such as 4 µM to 100 µM. It is also understood that uptake is species and organ/tissue dependent. The applicable conversion factors and physiological assumptions to be made concerning uptake and concentration measurement are well-known and would permit those of skill in the art to convert one concentration measurement to another and make reasonable comparisons and conclusions regarding the doses, efficacies and results described herein.

VII. Examples

The following examples are given for the purpose of illustrating various embodiments of the invention and are not meant to limit the present invention in any fashion. One skilled in the art will appreciate readily that the present invention is well adapted to carry out the objects and obtain the ends and advantages mentioned, as well as those objects, ends and advantages inherent herein. The present examples, along with the methods described herein are presently representative of preferred embodiments, are exemplary, and are not intended as limitations on the scope of the invention. Changes therein and other uses which are encompassed within the spirit of the invention as defined by the scope of the claims will occur to those skilled in the art.

Example 1: Antibody Therapy of MRSA Colonization and Infection

Methicillin-resistant *Staphylococcus aureus* (MRSA) colonize the nasopharynx and GI tract of healthy individuals and of patients admitted to hospitals (1). Colonization is the key risk factor for 238,000 cases of community-acquired (2, 3) and 101,000 cases of hospital-acquired MRSA invasive diseases (4-8). MRSA infection is associated with treatment failure, increased morbidity, and increased mortality (9). Although MRSA-specific antibiotics have been developed, the bacteria rapidly evolve resistance against new drugs (10). Prior attempts to develop vaccines or immune therapeutics that can prevent MRSA colonization or invasive disease or that improve the outcome of MRSA infections have failed (11-13). Infected individuals cannot develop protective antibody responses (immunity), which enables MRSA to persist within host tissues and to cause recurrent disease (14, 15).

Here the inventors describe a monoclonal antibody, MAb 3F6, that binds and neutralizes staphylococcal protein A (SpA) and staphylococcal binder of immunoglobulin (Sbi). The inventors show that MAb 3F6 galactosylation at Fcγ promotes C1q binding, opsonophagocytic killing (OPK) of MRSA and protection of mice against MRSA bloodstream infection. Further, the inventors isolated amino acid substitutions in Fcγ that abolish SpA and Sbi binding and enhance the OPK activity of variant MAb 3F6 hIgG1$_{Fc\gamma1\text{-}6}$. Intravenous administration of MAb 3F6 into mice neutralizes circulating SpA and blocks its B cell superantigen activity (BCSA), thereby promoting antibody responses against bacterial surface antigens and clearance of *S. aureus* from the nasopharynx and GI tract of mice. Here, the inventors will test the hypotheses that intravenous administration of glyco- and Fcγ-engineered human 3F6-hIgG1 promotes *S. aureus* decolonization, prevents invasive MRSA disease and improves the outcome of MRSA bloodstream infections in experimental animals. If so, glyco- and Fcγ-engineered 3F6 MAb may be developed for clinical testing to prevent and/or treat MRSA infections in American hospitals.

This proposal encompasses the following innovations. a) Establishment of a mouse model for persistent *S. aureus* colonization (27). b) Discovery that SpA BCSA is essential for *S. aureus* persistent colonization (27). c) Treatment of mice with SpA-neutralizing MAb promotes *S. aureus* decolonization (28). d) Isolation of IgG1 Fcγ-variants whose effector functions cannot be inactivated by SpA and Sbi. e) Demonstration that 3F6-IgG1 glycosylation provides increased efficacy for disease protection. f) Identification of 3F6-IgG1 glycoforms with enhanced MRSA OPK activity. g) Use of tefibazumab (anti-C1fA IgG1)(14) as a calibrating standard to quantify the impact of Fcγ amino acid sequence and glycosylation on effector binding, plasma half-life, in vitro MRSA opsonization, MRSA OPK, *S. aureus* colonization, *S. aureus* disease prevention and therapeutic efficacy of MRSA bloodstream infection. h) Use of genetically modified cells for large scale production of 3F6-IgG1 with unique Fcγ sequence and glycoforms that are useful for clinical efficacy.

Neutrophils play a central role in protecting humans against *S. aureus* infection (63). Staphylococcal entry and replication in host tissues leads to the release of bacterial products (formyl-peptides, lipoproteins or peptidoglycan) and to damaged tissues with inflammatory signals, i.e. chemoattractants and cytokines (16). Immune cells perceive staphylococcal products via Toll-like and G-protein coupled receptors while released cytokines activate cognate immune receptors (16). Neutrophils answer this call, extravasate from blood vessels, and migrate towards the site of infection to phagocytose and kill bacteria or to immobilize and damage the pathogen through NETosis—the release of neutrophil extracellular traps (NETs) comprising DNA and antimicrobial peptides (64, 65). The importance of neutrophils in controlling *S. aureus* infection has been documented through the study of immune defects. Mutations in genes encoding NADPH oxidase, the enzyme generating bactericidal superoxide in phagocytes, cause chronic granulomatous disease (CGD), which is associated with defects in phagocytic killing of *S. aureus* and frequent infection (66, 67). Individuals with inborn errors of STAT1/STAT3 signaling of immune cells are perturbed for IL-17 cytokine pathways, thereby diminishing mucocutaneous immunity and promoting *S. aureus* infection (68). IL-17-dependent T cell signaling is a key activator of neutrophils and of anti-staphylococcal defenses (69). Finally, cancer patients with diminished blood neutrophil counts are highly susceptible to *S. aureus* infection (70). Nevertheless, the vast majority of MSSA/MRSA disease occurs in immune-competent individuals without defects in phagocyte function, following traumatic breach of skin barrier defenses or sporadic entry into the bloodstream (71). To achieve this, *S. aureus* deploys an arsenal of immune evasive strategies that prevent immune cell extravasation, chemotaxis, complement activation and phagocytosis (71). Further, neutrophil-mediated killing of MRSA via the production of antimicrobial peptides, reactive nitrogen (NO), reactive oxygen species (ROS: hydrogen peroxide, superoxide, hydroxyl radicals), cell wall hydrolases, and proteolytic enzymes is countered by MRSA modification of the bacterial envelope and the production of proteases, staphyloxanthin, superoxide dismutases, catalase and alkylhydroperoxide reductase (16, 72). Thus, in the absence of opsonizing antibodies, neutrophils from immune competent mice or humans exhibit modest activity to kill MRSA (73-75)(FIG. 5B&D). As for all gram-positive bacteria, antibodies that bind to the staphylococcal surface and activate complement do not exhibit bactericidal effects in the absence of immune cells (13). In contrast, antibody-mediated phagocytosis of *S. aureus* into neutrophils or macrophages promote bacterial killing, designated opsonophagocytic killing (OPK)(13). However, MSSA/MRSA produce immunoglobulin-binding proteins to escape OPK. SpA and Sbi are displayed on the bacterial surface, bind IgG Fcγ and block the effector functions of antibodies by preventing the engagement of complement (C1q) and Fc receptors on immune cells (16)(FIG. 1). SpA encompasses five immunoglobulin-binding domains (IgBDs) that each bind to Fcγ of human IgG1, IgG2 and IgG4 (but not to IgG3) and to mouse IgG (IgG1, IgG2a, IgG2b, IgG2c and IgG3) (76, 77)(FIG. 5A). Sbi encompasses two IgBDs with high sequence homology to SpA IgBDs and binds human and mouse IgG Fcγ in the same manner (78, 79)(FIG. 5A). Staphylococcal superantigen-like protein 10 (SSL10), another secreted protein, binds Fcγ of human IgG1 but not mouse IgG (80). Of note, all MSSA/IRSA strains express spa and sbi, whereas ss110 is present only in a few clinical isolates (16). Thus, even though specific IgG may bind to the staphylococcal surface, SpA and Sbi provide MSSA and MRSA with protection against OPK (16)(FIG. 5B). Thus, any therapeutic strategy involving MRSA-specific antibody must address the SpA and Sbi defense of staphylococci.

MRSA evasion of adaptive immune responses. A key feature of MSSA/MRSA disease is its recurrence, which for SSTI and bloodstream infections, occurs at frequencies raging from 8-33% (81, 82). Recovery from MSSA/MRSA disease does not elicit protection against subsequent infection (83). The pathogen's ability to cause recurrent disease implies the presence of mechanisms that effectively block the development of adaptive immune responses (84). *S. aureus* manipulates adaptive B cell responses via the BCSA of SpA, which binds the variant heavy chain of VH3 idiotypic IgM, IgG, IgD and IgE (85-87)(FIG. 2). SpA is initially deposited in the staphylococcal envelope via its C-terminal sorting signal (LPXTG motif) and subsequently released by cell wall hydrolases into the extracellular milieu (88-90). Released SpA with C-terminal peptidoglycan fragments crosslinks the variant heavy chains of VH3 clan B cell receptors (IgM) and triggers B cell proliferation and the secretion of VH3 clonal antibodies (91). During infection of humans or mice, MSSA/MRSA released SpA causes massive expansion of VH3 clonal plasma cells and secretion of VH3 clonal IgM and IgG antibodies that do not recognize staphylococcal antigens (92). Thus, released SpA diverts B cell development to block the production of pathogen-specific IgG (91). The suppressive effects of MRSA/MSSA on host adaptive B cell responses are alleviated during colonization or invasive disease with Δspa or spaKKAA strains, which elicit pathogen-specific IgG responses that lead to decolonization and protection against recurrent MSSA/MRSA disease (27, 76)(FIG. 3A-E).

MAb 3F6, a novel MRSA therapeutic. Humans, guinea pigs and mice cannot generate antibodies that bind to and neutralize the IgBDs of SpA and Sbi (76, 85, 92, 93). SpAKKAA is an engineered, non-toxigenic recombinant variant that cannot bind IgG Fcγ or VH3-clonal variant heavy chains (85)(FIG. 3AB). When used as a vaccine antigen, SpAKKAA elicits SpA-neutralizing antibodies in guinea pigs and in mice (85, 93)(FIG. 3F). SpAKKAA -vaccinated animals neutralize *S. aureus* BCSA during colonization and infection and mount broad spectrum antibody responses against secreted staphylococcal antigens (85, 93). Splenocytes of SpAKKAA-immunized mice were fused with myeloma cells and hybridomas screened for mAbs that bind SpAKKAA (79). Mouse hybridoma mAb 3F6 (hy-3F6) displayed the highest affinity for SpAKKAA (Ka=22.97×10$^9$ M$^{-1}$). hy-3F6 also binds to the IgBDs of SpA and Sbi and blocks their association with IgG Fcγ and VH3-clonal variant heavy chains (SpA and Sbi neutralizing activity)(79). hy-3F6 is a VH1-idiotypic mouse IgG2a antibody whose VH domain does not bind SpA (79, 94). When injected intravenously into mice (5 mg MAb kg-1 body weight), hy-3F6, but not IgG2a control, protects animals against MRSA bloodstream challenge, reducing the bacterial load and the abundance of abscess lesions (79)(FIG. 3G). When administered to 1-day-old mouse pups, hy-3F6 protects against MRSA sepsis/meningitis following subcutaneous challenge (95). The inventors used the CDR1-3 amino acid sequences of hy-3F6 heavy and light chains to generate plasmid-borne, recombinant human VH1-idiotypic 3F6 IgG1 (3F6-hIgG1) and recombinant mouse VH1-idiotypic 3F6 IgG1 (3F6-mIgG1), IgG2a (3F6-mIgG2a), IgG2b (3F6-mIgG2b), and IgG3 (3F6-mIgG3). All antibodies were produced in HEK293 F cells. Similar to hybridoma-3F6, recombinant antibodies bind SpAKKAA, bind and neutralize wild-type SpA and Sbi, protect adult mice against MRSA bloodstream infection and protect newborn pups against MRSA sepsis (28, 79, 94, 95). The inventors sought to explore the mechanism whereby MAb 3F6 triggers OPK of MRSA in blood and protects against invasive disease (FIG. 3H). Mice produce different subclasses of IgG antibodies—IgG1, IgG2a, IgG2b, (IgG2c) and IgG3—that each retain the ability to bind C1q and activate complement (96). However, each IgG subclass engages a discrete spectrum of FcγR receptors, which are differentially expressed on immune effector cells (97). The affinity for distinct FcγRs by specific IgGs differs by several orders of magnitude for each subclass (98). Thus, if MAb 3F6 requires specific FcγR receptors for activation of immune effector cells and protection against *S. aureus*, one would anticipate that protection occurs in an IgG subclass specific manner (98, 99). On the other hand, if MAb 3F6 activates immune effectors via C1q binding, disease protection would occur in a manner that is dependent on complement but independent of IgG subclass. This was tested and all four mouse subclass IgG antibodies (m3F6-IgG1, m3F6-IgG2a, m3F6-IgG2b and m3F6 IgG3) exhibited similar efficacy in protecting BALB/c mice against MRSA bloodstream infection. Treatment of mouse blood with C3 complement inhibitor blocked m3F6-IgG2a OPK activity and mouse disease protection. Thus, complement activation (C1q binding and C3 convertase) is required for MAb 3F6 mediated protection against invasive MRSA disease.

MAb-3F6 glycosylation is a determinant of MRSA OPK. Plasmid p3F6-hIgG1 was stably transfected into CHO cells, and research cell banks were developed for large scale purification of 3F6-hIgG1CHO. When compared to the same antibody expressed in HEK293 F cells (3F6-hIgG1HEK), administration of 3F6-hIgG1CHO into BALB/c mice did not protect against MRSA bloodstream infection (FIG. 4CD). The inventors therefore subjected 3F6-hIgG1HEK and 3F6-hIgG1CHO to liquid chromatography-electrospray ionization mass spectrometry. The data in FIG. 4AB demonstrate that the two antibodies have the identical protein sequence and differ in the structure of their Fc glycans. The 3F6-hIgG1HEK antibody has significantly higher content of the G1F and G2F glycoforms than 3F6-hIgG1CHO. Interestingly, the HEK293 produced antibody also showed enhanced affinity for C1q (FIG. 4E). To determine whether Fc glycan structure is a key determinant for MRSA OPK and protection against MRSA bloodstream infection, the inventors used a chemoenzymatic method for glycan remodeling by first deglycosylating 3F6-hIgG1CHO and 3F6-hIgG1HEK with Endo-S2 and, second, transferring pre-synthesized glycan en bloc from activated glycan oxazoline in a transferase reaction catalyzed by EndoS2-D184M (100-102). In this manner, four antibodies—3F6-hIgGHEK-G0F, 3F6-hIgGHEK-G1F, 3F6-hIgGHEK-G2F and 3F6-hIgGCHO-G2F—were synthesized. Cohorts of mice (n=10) were injected intraperitoneally with purified antibodies (5 mg×kg$^{-1}$ body weight) and then challenged by intravenous inoculation of MRSA while monitoring body weight changes and survival over 14 days. After 14 days, animals were euthanized and renal tissues examined for bacterial load and abscess formation. As controls, human IgG1 and 3F6-hIgG1CHO did not protect mice against MRSA bloodstream infection, whereas treatment with 3F6-hIgG1HEK reduced MRSA load as well as abscess formation (FIG. 4FG). Three antibodies with uniform glycan structure, 3F6-hIgGHEK -G1F, 3F6-hIgG1HEK-G2F and 3F6-hIgG1CHO-G2F protected against MRSA bloodstream infection, whereas 3F6-hIgGHEK-G0F did not. The G2F glycoform of 3F6-hIgG1 provides the best protection against MRSA (FIG. 4FG).

MAb-3F6 promotes *S. aureus* decolonization. Earlier work identified *S. aureus* colonization factors, bacterial surface proteins that bind host ligands on nasal and pharyngeal epithelia or that promote bacterial aggregation. Although the sum of these molecular interactions is essential for *S. aureus* colonization, each individual factor (i.e. surface proteins ClfA, ClfB, IsdA, IsdB, or SasG) is not. The inventors isolated *S. aureus* WU1 (ST88) as the causative agent of SSTI outbreaks in a mouse breeding facility. *S. aureus* WU1 persistently colonizes the nasopharynx and GI tract of C57BL/6 mice and causes SSTI disease in colonized animals with attack rates of 2-4% (27). SpA is dispensable for initial *S. aureus* WU1 colonization of the nasopharynx and GI tract, however Δspa strains cannot persist and are cleared from mucosal surfaces starting 21 days after the initial colonization event (27). *S. aureus* Δspa decolonization is associated with increased serum IgG and mucosal IgA responses against bacterial surface molecules, including antibodies against ClfA, ClfB, IsdA, IsdB, and SasG. However, SpA is not required for persistent colonization of mice lacking immunoglobulin or adaptive immune responses (μMT mice). Immunization of mice with SpAKKAA elicits SpA neutralizing antibodies and boosts secondary antibody responses to bacterial surface determinants during *S. aureus* colonization (27). Together these IgG and IgA antibodies promote decolonization of *S. aureus* from the nasopharynx and GI tract of mice (27). Of note, treatment of colonized mice with SpA-neutralizing MAb (m3F6 IgG2a) has a similar effect (28). Increased serum IgG and mucosal IgA responses against *S. aureus* surface molecules promote decolonization of *S. aureus* WU1 from the nasopharynx and GI tract of mice (28)(FIG. 6). Thus, SpA release from the bacterial envelope exerts local and systemic BCSA to divert host adaptive B cell responses, thereby enabling *S. aureus* to persistently colonize humans and mice. Treating *S. aureus* colonized individuals with SpA-neutralizing monoclonal antibody blocks the BCSA of SpA and promotes the development of antibody responses that block colonization. The inventors hypothesize that treating MSSA and MRSA colonized individuals admitted to American hospitals promotes decolonization and immunity, eliminating a key risk factor of hospital-acquired infection.

Engineering the Fcγ domain of human 3F6-hIgG1 for enhanced opsonophagocytic killing (OPK) of MRSA. The X-ray structure of the IgBD-B domain of SpA bound to human Fcγ revealed four hydrogen bonds that promote interactions between the two molecules: $Q^9$ (IgG $S^{254}$), $Q^{10}$ (IgG $Q^{311}$), $N^{11}$ (IgG $N^{434}$) and $Y^{14}$ (IgG $L^{432}$)(103). Another four residues establish hydrophobic or ion-bond interactions: $F^{13}$, $N^{28}$, $I^{31}$, $Q^{32}$ and $K^{35}$ (50). All eight residues are conserved in the IgBDs of SpA and Sbi (85). The inventors generated amino acid substitutions in the Fcγ domain of 3F6-IgG1: $S^{254}A$, $Q^{311}E$, $L^{432}S$ and $N^{434}P$, designated 3F6-hIgG1$^{AESP}$. The inventors generated amino acid substitution in the Fcγ domain of 3F6-IgG1: $H^{435}R$, designated 3F6-hIgG1$^R$. 3F6-hIgG1$^{AESP}$ and 3F6-hIgG1$^R$ were expressed in HEK293 F cells, purified by affinity chromatography on protein L, Fcγ domains prepared and analyzed for binding to SpA$_{AA}$ (a variant that is defective for Fab but not Fcγ binding) and to FcRn (76)(FIG. 5DE). 3F6-hIgG1$^{AESP}$ is defective for both SpA$_{AA}$ and FcRn binding (FIG. 5G). When assayed for MRSA OPK activity in human blood and compared with 3F6-IgG1 and 2A12-IgG1 (an antibody developed by the inventors that binds ClfA another *S. aureus* protein, FIG. 5A), 3F6-IgG1$^{AESP}$ caused increased killing of MRSA (FIG. 5D). Thus, although 3F6-hIgG1 is capable of neutralizing SpA and Sbi via its 3F6 paratope, its Fcγ effector functions can be inhibited by staphylococcal IBPs. In contrast, 3F6-hIgG1$^{AESP}$ is refractory to SpA- and Sbi-mediated interference of Fcγ effector functions and exhibits increased MRSA OPK activity. However, Fcγ substitutions in 3F6-hIgG1$^{AESP}$ inactivate FcRn binding, which reduces the in vivo half-life of the antibody and precludes further development. The inventors used a forward genetic approach to isolate IgG1 Fcγ variants that a) cannot be inactivated by SpA and Sbi and b) retain the ability to bind FcRn. Earlier work used a phagemid for assembly of Fcγ at the tip protein (pIII) of filamentous phages and isolated Fcγ variants with enhanced FcRn binding and prolonged half-life in blood (104-106). Pursuing a similar strategy, the inventors cloned Fcγ, codons 226-447 (Kabat EU), into a phagemid to generate pFcγ-PIII (Amp$^r$), a translational hybrid between the PelB signal peptide, Fcγ and truncated pIII from bacteriophage M13 (107). pFcγ-PIII was transformed into *E. coli* XL-1 Blue (F-tet, recA$^-$) and ampicillin resistant colonies were isolated. When infected with M13KO7 helper phage, *E. coli* XL-1 Blue (pFcγ-PIII) generates filamentous particles that display Fcγ-PIII at the tip and also contain the single-stranded DNA genomes of M13KO7 and pFcγ-PIII. Fcγ-PIII particles were precipitated from culture supernatant with polyethylene-glycol, suspended in buffer and analyzed by SDS-PAGE and immunoblotting, revealing expression of Fcγ-PIII (107, 108)(FIG. 5J). Of note, N-linked glycan is absent when Fcγ-PIII is expressed in *E. coli* (103). However, Fcγ binding to FcRn (109-111), SpA or Sbi is not dependent on Fcγ N-linked glycosylation at Asn$^{297}$ (112)(FIG. 5K). To isolate pFcγ-PIII variants, the inventors conducted error prone PCR of Fcγcoding sequence. Mutant populations (10$^{10}$ PFU) of Fcγ-PIII particles were precipitated with heat-killed staphylococci to remove phage that retain the ability to bind SpA and Sbi. Fcγ-PIII particles that did not bind *S. aureus* were expanded overnight and sequenced to characterize mutations that abrogate SpA binding. The depletion procedure was repeated three times, selecting for Fcγ-PIII particles unable to bind SpA and Sbi. Variant Fcγ-PIII particles were then analyzed for binding to purified SpA and FcRn using an ELISA assay. The inventors isolated Fcγ-PIII phages that failed to bind SpA and Sbi but retained the ability to bind FcRn. By quantifying the binding properties of 550 phagemid Fcγ-PIII variants, the inventors selected the six candidates (hIgG1$_{Fcγ1-6}$) for future study (FIG. 5LM). DNA sequencing revealed that the Fcγ domains harbored between 2-8 amino acid substitutions. The inventors introduced hIgG1$_{Fc\gamma1-6}$ substitutions into human MAb 2A12-hIgG1 and expressed 2A12-hIgG1$_{Fc\gamma1-6}$ in HEK293 F cells. In earlier studies, the inventors immunized mice with purified recombinant C1fA and isolated mouse hybridoma MAb 2A12 (IgG1), which provides partial protection against MRSA in a mouse bacteremia model (FIG. 5HI). The inventors used the CDR1-3 sequences of 2A12 to generate plasmid-borne, human V$_H$1-idiotypic 2A12 hIgG1. 2A12-hIgG1 binds the A domain of clumping factor A (C1fA) and blocks its ability to associate with human or mouse fibrinogen of fibrin. Thus, similar to tefibazumab, 2A12-hIgG1 interferes with the assembly of an anti-phagocytic fibrin/fibrinogen shield (derived by the coagulases of MSSA/MRSA) to promote *S. aureus* OPK (73, 113) (FIG. 5D).

1.a. Analyzing 2A12-hIgG1$_{Fc\gamma1-6}$ variants for glycosylation, C1q and IBP binding and enhanced OPK of MRSA in blood. To evaluate hIgG1$_{Fc\gamma1-6}$ variants for MRSA OPK, the inventors chose antibodies whose paratopes do not recognize SpA or Sbi. In this manner, the inventors can reciprocally analyze the role of hIgG1$_{Fc\gamma1-6}$ mutations on SpA and Sbi binding to the Fcγ effector domain and the effect of spa and sbi deletion on antibody-mediated OPK of wild-type and ΔspaΔsbi mutant MRSA. To calibrate the activities of newly developed MAbs against an industry standard, the inventors selected tefibazumab. Tefibazumab is a humanized IgG1 antibody whose CDR1-3 sequences were derived from MAb 12-9, a mouse IgG1 hybridoma antibody that neutralizes C1fA (37, 114). Tefibazumab coding sequences will be cloned into the expression plasmid for heavy and light chains. The recombinant plasmid, ptefibazumab, will then be transfected into HEK293 F cells and recombinant MAb purified. Tefibazumab, 2A12-hIgG1, and 2A12-hIgG1$_{Fc\gamma1-6}$ will be subjected to mass spectrometry analysis to validate the amino acid sequences of each MAb. The inventors will perform mass spectrometry of enzymatically released Fc-glycans for each of the 8 MAbs to reveal whether amino acid substitutions in Fcγ impact the structure of biantennary glycans. The inventors will determine the affinity of tefibazumab, 2A12-hIgG1, and 2A12-hIgG1$_{Fc\gamma1-6}$ for human C1q, human FcRn, SpA, Sbi and SSL10. Last, the inventors will measure the OPK activity of tefibazumab and each 2A12-hIgG1 test article in human blood against MRSA USA300 LAC and its ΔspaΔsbi variant. The inventors expect to measure baseline OPK activity with tefibazumab and 2A12-hIgG1 against wild-type MRSA and increased OPK activity against the ΔspaΔsbi mutant. For 2A12-hIgG1$_{Fc\gamma1-6}$, the inventors expect to observe increased OPK activity against wild-type MRSA (as compared to tefibazumab or 2A12-hIgG1) and similar levels of OPK activity against the ΔspaΔsbi mutant. The two best performing antibodies from the hIgG1$_{Fc\gamma1-6}$ collection will be selected for further study.

1.b. Analyzing 3F6-hIgG1$_{Fc\gamma}$ variants for glycosylation, C1q and IBP binding and enhanced OPK of MRSA in blood. The inventors will introduce the substitutions from the best performing hIgG1$_{Fc\gamma1-6}$ variants into 3F6-hIgG1 to generate p3F6-hIgG1$_{Fc\gamma a}$ and p3F6-hIgG1$_{Fc\gamma b}$. Plasmids will be transfected into HEK293 F cells and MAbs purified. 3F6-hIgG1$_{Fc\gamma a}$ and 3F6-hIgG1$_{Fc\gamma b}$ will be analyzed by mass spectrometry to validate their amino acid sequence. The inventors will also perform mass spectrometry of enzymatically released Fc-glycans to reveal whether substitutions in Fcγ impact the structure of biantennary glycans. The inventors will measure binding of 3F6-hIgG1$_{HEK}$, 3F6-hIgG1$_{Fc\gamma a}$ and 3F6-hIgG1$_{Fc\gamma b}$ to human C1q, FcRn, FcγRIII, SpA, Sbi and SSL10. If Fc glycosylation is not affected by substitutions, the inventors anticipate that 3F6-hIgG1$_{Fc\gamma a}$ and 3F6-hIgG1$_{Fc\gamma b}$ will exhibit similar binding activities for human C1q and FcRn as 3F6-hIgG1$_{HEK}$ or 2A12-hIgG1 and 2A12-hIgG1$_{Fc\gamma}$ variants. Unlike 2A12-hIgG1$_{Fc\gamma1-6}$, 3F6-hIgG1$_{Fc\gamma a}$ and 3F6-hIgG1$_{Fc\gamma b}$ are expected to bind SpA and Sbi, but not SSL10, via their paratopes with high affinity (K$_a$=22.97× 10$^9$ M$^{-1}$). Last, the inventors will measure the OPK activity of tefibazumab and 3F6-hIgG1$_{HEK}$, 3F6-hIgG1$_{Fc\gamma a}$ and 3F6-hIgG1$_{Fc\gamma b}$ in human blood against wild-type MRSA and the ΔspaΔsbi mutant. The inventors expect to measure baseline activity with tefibazumab against wild-type and increased OPK against the ΔspaΔsbi mutant. For 3F6-hIgG1$_{HEK}$, the inventors expect higher OPK activity against wild-type MRSA (as compared to tefibazumab) and complete loss of OPK activity against the ΔspaΔsbi mutant (antibodies cannot bind to mutant bacteria). For 3F6-hIgG1$_{Fc\gamma a}$ and 3F6-hIgG1$_{Fc\gamma b}$, the inventors expect enhanced OPK activity against wild-type MRSA (compared to tefibazumab or 3F6-hIgG1$_{HEK}$) and complete loss of OPK against the ΔspaΔsbi mutant.

Synthesizing glycoforms (S2G2F, G2F, G1F, G0F, S2G2, G2, G1 and G0) of 3F6-IgG1$_{Fc\gamma}$ and analysis of C1q binding and enhanced OPK of MRSA in blood. Here the inventors will determine whether the OPK activity of 3F6-hIgG1$_{Fc\gamma a}$ and 3F6-hIgG1$_{Fc\gamma b}$ can be further enhanced by synthesizing homogeneous glycans. Preliminary data demonstrated feasibility by transferring three glycoforms (G0F, G1F, and G2F) onto 3F6-hIgG1 (FIG. 4FG). The inventors have shown that enzymatic glycan remodeling of the Fc glycan to terminal galactosylated glycoforms (such as G1F and G2F) could convert inactive 3F6-hIgG$_{CHO}$ to a fully active antibody. Here the inventors will expand the analysis to eight glycoforms: S2G2F, G2F, G1F, G0F, S2G2, G2, G1 and G0. The inventors have developed a highly convergent chemoenzymatic method for glycan remodeling of intact mAbs that consists of two enzymatic transformations: a single step deglycosylation using a wild type endoglycosidase such as Endo-S and Endo-S2, and subsequent enzymatic transfer of a large glycan en bloc from an activated glycan oxazoline to reconstitute a homogeneous glycoform of antibodies, using a glycosynthase mutant such as EndoS2-D184M (100-102). In particular, Endo-S2 and its mutant (D184M) showed remarkable enzymatic activity and efficiency for deglycosylation and transglycosylation of IgG antibodies, respectively (115). The inventors will use this strategy to construct eight homogeneous glycoforms each from 3F6-hIgG1, 3F6-hIgG1$_{Fc\gamma a}$ and 3F6-hIgG1$_{Fc\gamma b}$. MAbs will be analyzed by mass spectrometry to validate their amino acid sequence and determine the structure of released glycoforms. The inventors will measure binding of each glycoform linked to 3F6-hIgG1$_{HEK}$, 3F6-hIgG1$_{Fc\gamma a}$ or 3F6-hIgG1$_{Fc\gamma b}$ to human C1q, FcRn, FcγRIII, SpA, Sbi and SSL10. The inventors anticipate that specific glycoforms will increase or diminish the affinity of antibodies for human C1q and FcγRIII. As the binding of SpA, Sbi, SSL10 or FcRn is not known to be impacted by glycoform structure, the inventors anticipate similar association constants for glycoform- and parent MAbs. Last, the inventors will measure the OPK activity of tefibazumab, 3F6-hIgG1$_{HEK}$, 3F6-hIgG1$_{Fc\gamma a}$ and 3F6-hIgG1$_{Fc\gamma b}$ parent controls and 24 test articles (glycoform variants) in human blood against MRSA. The inventors expect enhanced OPK activity against MRSA (as compared to tefibazumab, 3F6-hIgG1$_{HEK}$, 3F6-hIgG1$_{Fc\gamma a}$ or 3F6-hIgG1$_{Fc\gamma b}$) for some of the glycovariants.

Analyzing 3F6-IgG1 Fcγ-variants for binding to murine Fc ligands and in vivo plasma half-life. Here the inventors will measure the affinity of MAbs for murine FcRn and their plasma half-life in mice. The inventors will analyze ten different antibodies: tefibazumab, 2A12-hIgG1, 2A12-hIgG1$_{Fc\gamma a}$, 2A12-hIgG1$_{Fc\gamma b}$, 3F6-hIgG1$_{HEK}$, 3F6-hIgG1$_{Fc\gamma a}$ and 3F6-hIgG1$_{Fc\gamma b}$ as well as their best three glycovariants. Each of these antibodies will be examined for pH dependent binding to mouse FcRn. In vivo pharmacodynamics of antibodies are critically dependent on the neonatal Fc receptor (FcRn), a heterodimer with MHC class-I like α-chain and β-2 microglobulin, which captures IgG phagocytosed into endosomes or within renal filtrates under acidic conditions (pH 6.0) for subsequent release at pH neutral conditions (51). The inventors' earlier work showed that at pH 6.0, the dissociation constant (Kd) of hybridoma 3F6-IgG2a and recombinant 3F6-mIgG2a was similar for mouse FcRn (28). Intraperitoneal injection of 3F6-mIgG2a into mice was associated with a bi-exponential plasma concentration-time profile including a short distribution phase followed by a long elimination phase (28). Plasma concentration of 3F6-mIgG2a peaked 6 hours post injection and after 28 days was 58 nM with a calculated half-life of 8.6 days. The inventors expect that the engineered MAbs exhibit similar in vivo half-lifes (8.6 days). Last, the inventors will measure binding of the 10 test articles to mouse C1q to determine whether MAbs display similar affinity for human and mouse C1q.

Production of Fcγ- and glyco-engineered 3F6 mAbs in cultured cells. Chinese Hamster Ovary (CHO) cells are the principal industrial production platform for large scale manufacturing of clinical grade antibody therapeutics with over 90% of all antibodies currently commercialized. Protein glycosylation on these antibodies is instrumental to therapeutic plasma half-life and efficacy. The N-glycan attached to Asn$^{297}$ of antibodies is composed of a heptasaccharide core (GlcNAc$_2$Man$_3$GlcNAc$_2$) with variable additions of fucose (F), galactose (G) and sialic acid (S). Glycoprofile analyses of recombinant antibodies indicate that G0F and G1F are the most abundant glycoforms of IgG produced in CHO cells alongside >20 other glycoforms with lower abundance (1-4). However, IgG G0F and G1F exhibit diminished binding to complement factor C1q and do not activate complement-mediated opsonophagocytic killing (OPK) of MRSA (116). Antibody glycoengineering strategies in CHO cells include a) overexpression of specific glycosyltransferases, b) CRISPR-Cas9/sgRNA mutations in glycosyltransferases (fucosylation and sialylation) and c) media supplementation for increased abundance of G2F. Given the importance of galactose on C1q binding for 3F6-hIgG1 function, the inventors will attempt to increase the G2F levels in Fc-glycans via overexpression of β1,4-galactosyltransferase 1 (B4 GALT1). This enzyme specifically transfers galactose from its UDP-galactose donor to a GlcNAc acceptor in the Golgi apparatus and can be overexpress by cloning under the control of a constitutive promoter and the generation of stable B4 GALT1-overproducing cell lines. A complementary strategy for improving overall galactosylation is to make more of the UDP-Gal substrate available in the Golgi apparatus. This is achieved by modifying the media to include galactose alone or in combination with supplements of manganese chloride and uridine in order to increase IgG galactosylation (117, 118). In addition, the sialylation depends on the level of the CMP-Neu5Ac nucleotide sugar substrate. Addition of N-acetylmannosamine (ManNAc) and other additives, including butyrated ManNAc can improve CMP-Neu5Ac and sialylation in CHO cells above what is achieved with sialyltransferase expression (119, 120). If these studies suggest that sialylation improvements are favorable for MRSA OPK, the inventors will modify the media through the addition of these supplements. The inventors will then test different concentrations of galactose, uridine, and manganese to improve galactosylation as desired for more G2F and G2 glycans, along with ManNAc and butyrated ManNAc to improve sialylation and generation of S2G2F and G2F glycans. If mass spectrometry analysis indicates an improvement in galactosylation and/or sialylation levels on 3F6-hIgG1, the inventors will also perform nucleotide sugar analysis to examine how much of an effect each nutrient supplement has on the intracellular UDP-Gal and CMP-Neu5Ac levels. The inventors will examine the effect of media modifications on product yields, C1q and Fc receptor binding, and ultimately MRSA killing. From this analysis, the inventors will deduce which combination of modifications, from galactosyltransferase overexpression, to knockouts of Fut8 (block in fucosylation) and 23 STGa14/6 (block in sialylation), to nutrient supplementation are helpful for generating the desired glycans. Engineered CHO cells will then be analyzed for the feasibility of large-scale production of 3F6-hIgG1 with the desired glycosylation pattern.

*S. aureus* decolonization of the mouse nasopharynx and GI tract with Fcγ- and glyco-engineered 3F6-IgG1. The inventors hypothesize that treatment of *S. aureus* colonized humans with 3F6-hIgG1 or its engineered variants will induce antibody responses against bacterial surface determinants and clearance of staphylococci from the nasopharynx and GI tract. As a preclinical test for this hypothesis, the inventors will analyze here the potency of humanized 3F6-hIgG1 or its variants in promoting *S. aureus* decolonization in mice.

Analyzing serum and mucosal antibody responses in *S. aureus* colonized mice treated with Fcγ- and glyco-engineered 3F6-IgG1. The inventors hypothesize that the decolonizing activity of 3F6-mIgG2a is based on its ability to neutralize the IgBDs of SpA (28). If so, the inventors expect humanized 3F6-IgG1 and its Fcγ- and glyco-engineered variants to functionally substitute for 3F6-mIgG2a, neutralize SpA BCSA, and elicit *S. aureus* specific IgG and IgA provided that the humanized antibodies exhibit similar plasma distribution and half-life as the mouse monoclonal antibody. These conjectures will be tested here. Cohorts of C57BL/6 mice (n=10) that have been colonized for one week by intranasal inoculation with 1×10$^8$ CFU *S. aureus* WU1 will be treated on days 7, 21, 35 and 49 with intraperitoneal injection of 5 mg×kg$^{-1}$ of either human hIgG1 (negative control), 3F6-mIgG2a (positive control), 3F6-hIgG1$_{HEK}$, 3F6-hIgG1$_{Fc\gamma a}$, 3F6-hIgG1$_{Fc\gamma b}$ or three glycovariant candidates. On day 63 (14 days after the final antibody dose), the inventors will collect fecal samples and bleed mice to derive serum samples from coagulated venous blood. Fecal samples, collected from mice on day 0 (prior to *S. aureus* inoculation) and day 63, will be suspended at 100 mg per ml of PBS+protease inhibitor cocktail, centrifuged at 16,000×g for 5 min and supernatant analyzed for IgA antibodies. Serum and fecal samples will be analyzed for mouse IgG and IgA responses against the matrix of 46 purified staphylococcal antigens (27). Briefly, 2 μg of each purified antigen will be spotted onto nitrocellulose, membranes blocked and incubated with diluted mouse sera (and IRDye 680-conjugated goat anti-mouse IgG) or with diluted mouse fecal samples (and Alexa Fluor 680-conjugated goat anti-mouse IgA). Signal intensities will be quantified using the Odyssey infrared imaging system (Li-cor)(85). Two-way ANOVA with Holm-Šidák multiple-comparison tests will be used to analyze differences in pathogen-specific IgG/IgA responses in the presence or absence of MAb treatment.

Analyzing mice treated with Fcγ- and glyco-engineered 3F6-IgG1 for *S. aureus* colonization. On day 7, cohorts of C57BL/6 mice (n=10) that had been colonized for one week by intranasal inoculation with $1\times10^8$ CFU *S. aureus* WU1 will be treated by intraperitoneal injection with 5 mg$\times$kg$^{-1}$ hIgG1 (negative control), 3F6-mIgG2a (positive control), 3F6-hIgG1$_{HEK}$, 3F6-hIgG1$_{Fc\gamma a}$, 3F6-hIgG1$_{Fc\gamma b}$ or three glycovariant candidates. Antibody treatments will be continued on days 21, 35 and 49. On day 7 following inoculation and in weekly intervals thereafter (14, 21, 28, 35, 42, 49, 56 and 63 days), the nasopharynx of mice will be swabbed, swabs spread on MSA and plates incubated for 16 hours at 37° C. for CFU enumeration. Further, fecal pellets (100 mg in 1 ml PBS) from each mouse will be suspended, aliquots inoculated on selective agar and plates incubated for 16 hours at 37° C. for CFU enumeration. Two-way ANOVA with Holm-Šídák multiple-comparison tests will be performed to analyze differences in mouse colonization data for statistical significance, comparing cohorts receiving different test article treatments with negative-(hIgG1) and positive-control (3F6-mIgG2a) cohorts.

Analyzing mice decolonized with Fcγ- and glyco-engineered 3F6-IgG1 for re-colonization with *S. aureus*. Mice that cleared *S. aureus* from their nasopharynx and GI tract following treatment with specific antibody (2.*b*.) will be transferred to clean cages without *S. aureus* colonized mice (who shed staphylococci with their fecal droppings). Decolonized animals and age-matched naïve control animals (who were never exposed to *S. aureus*) will be studied for *S. aureus* re-colonization. The inventors hypothesize that *S. aureus* specific antibody responses induced by treatment with SpA-neutralizing MAb confer immunity to re-colonization. If so, the inventors predict that age-matched naïve control mice, but not C57BL/6 animals who cleared staphylococci following SpA-MAb treatment, can be colonized following intranasal administration of $1\times10^8$ CFU *S. aureus* WU1. Cohorts of C57BL/6 mice (n=10)—decolonized or naïve—will be subjected to intranasal inoculation with $1\times10^8$ CFU *S. aureus* WU1. On day 7 following inoculation (and in weekly intervals thereafter—14, 21, 28, 35, 42, 49, 56 and 63 days), the nasopharynx of mice will be swabbed, swabs spread on selective agar and plates incubated for 16 hours at 37° C. for CFU enumeration. Further, fecal pellets (100 mg in 1 ml PBS) from each mouse will be suspended, aliquots inoculated on mannitol-salt agar (MSA) and plates incubated for 16 hours at 37° C. for CFU enumeration. Two-way ANOVA with Holm-Šídák multiple-comparison tests will be used to analyze differences in mouse colonization data in response to MAb treatment and specific IgG responses for statistical significance. On day 0 and day 49 of the experiment, fecal samples will be collected and mice will be bled to derive serum samples from coagulated venous blood. Mouse serum samples will be analyzed for IgG responses and fecal samples will be studied for IgA responses against the matrix of 46 purified staphylococcal antigens as described above.

Analyzing mice treated with Fcγ- and glyco-engineered 3F6-IgG1 for protective immunity against MRSA bloodstream infection. Mice that cleared *S. aureus* from their nasopharynx and GI tract following treatment with specific antibody will be isolated in clean cages. These animals and age-matched naïve control animals (never exposed to *S. aureus*), will be analyzed for protective immunity against MRSA bloodstream infection. Specifically, the inventors will test the hypothesis that *S. aureus* antibody responses, which are induced by treatment with SpA-neutralizing MAb, confer immunity in mice to invasive MRSA disease. If so, animals who cleared staphylococci from their nasopharynx and GI tract following 3F6-MAb treatment, but not age-matched naïve control mice, are expected to exhibit resistance to intravenous challenge with $1\times10^7$ CFU MRSA USA300 LAC (124). As described above, the inventors will analyze serum IgG and mucosal IgA in naïve and decolonized animals for pathogen-specific antibodies with the *S. aureus* antigen matrix. Cohorts of C57BL/6 mice (n=10)—decolonized or naïve—will be subjected to intravenous inoculation with $1\times10^7$ CFU MRSA USA300 LAC. Infected animals will be monitored daily for body weight changes (>25% drop in body weight identifies moribund mice) and survival over 14 days. Moribund animals will be necropsied, renal tissues removed and analyzed for bacterial load (MRSA CFU$\times$g$^{-1}$ tissue) as well as histopathology (reconstruction and enumeration of abscess lesions in HE-stained, thin-sectioned tissues). Animals that survive over 14 days will be euthanized and necropsied, again removing renal tissues for histopathology and bacterial load quantification. Data will be analyzed by comparing disease in naïve animals vs. cohorts of mice that had been cleared *S. aureus* by treatment with either mouse 3F6-mIgG2a, human 3F6-hIgG1$_{HEK}$, human 3F6-hIgG1$_{Fc\gamma a}$, human 3F6-hIgG1$_{Fc\gamma b}$ or three glycovariant human 3F6-hIgG1$_{Fc\gamma}$ antibodies. Further, the inventors will seek to correlate specific serum IgG responses in decolonized mice with protection against invasive MRSA disease.

Improving the outcome of MRSA bloodstream infections with Fcγ- and glyco-engineered human 3F6-IgG1. In the US, 120,000 patients with MRSA surgical site infections, 72,000 patients with MRSA bacteremia, 2,000 patients with MRSA ventilator-associated pneumonia and 600 VLBW neonates with MRSA sepsis would benefit from an antibody therapeutic that improves the outcome of MRSA infections. Earlier work demonstrated preclinical efficacy of tefibazumab and ASN100 as a preventive against MRSA (37, 38, 43, 114). However, these antibodies were not shown to exhibit therapeutic efficacy in animals with active MRSA disease. Here the inventors will develop a mouse model for MRSA bacteremia with relapse to analyze the therapeutic efficacy of antibodies in conjunction with antibiotic therapy (standard-of care).

Relapse and survival of mice with MRSA bloodstream infection under standard-of-care antibiotic therapy. To determine pathogen-specific IgG and IgA responses with the antigen matrix, the inventors will obtain blood and fecal samples from naïve mice (day 0) and from mice with MRSA bacteremia, i.e. from survivors of a 74-day experiment or from moribund animals immediately prior to euthanasia. BALB/c mice will be assigned to experimental cohorts (n=10) and infected by intravenous injection with $8\times10^6$ CFU MRSA USA300 LAC (day 0). To monitor disease, the body weight of mice will be determined in daily intervals. If mice were left without antibiotic therapy, MRSA bacteremia challenge would result in disseminated abscess lesions and in 100% mortality over the first 14-days (37, 38, 43, 114). On day 2, i.e. 48 hours after MRSA bloodstream challenge, mice will be treated with vancomycin for 10 days (intraperitoneal injection with 15 mg vancomycin/kg body weight in 12-hour intervals). [Vancomycin dosing reflects clinical guidelines for the treatment of MRSA bacteremia (10)]. The inventors expect that 80-100% of mice receiving vancomycin therapy will survive the first 14 days. Mice will then be observed for another 60 days for MRSA bloodstream infection relapses. Again, animals with relapse infections will be identified as a 20% or greater drop in body weight with positive blood culture (venous blood samples will be retrieved from the periorbital venous plexus and the LAC strain will be identified by MLST and spa typing). The inventors expect further that >50% mice will succumb to relapse MRSA bloodstream infections over the 74-day observational period. Moribund animals will be euthanized, necropsied and the histopathology of HE-stained thin-sectioned tissues (kidney, liver, spleen, lung, femur, and brain) analyzed. The inventors will also determine MRSA load in various organ tissues as $CFU \times g^{-1}$ tissue. At the end of the 74-day experiment, surviving animals will be euthanized and necropsied to determine whether vancomycin therapy eliminated MRSA from all tissues or whether survivors harbor residual infectious foci. The experiment will be repeated twice to ensure reproducibility and to generate average survival curves, average histopathology and bacterial load data for mice with MRSA bloodstream infection.

Relapse and survival of mice with MRSA bloodstream infection under tefibazumab therapy. Here the inventors will measure the impact of tefibazumab therapy on the overall survival of mice with MRSA bloodstream infection and on the incidence of relapse infections. Animal cohorts will be challenged and analyzed as described previously. On day 2 (i.e. 48 hours after the initial inoculum), mice will receive intravenous infusions of 5 mg/kg bodyweight human hIgG1 control or tefibazumab in addition to vancomycin therapy. Assuming a plasma half-life of 8 days for human IgG1 in mice, the inventors will administer repeat intravenous infusions of 5 mg/kg bodyweight IgG1 control or tefibazumab on days 16, 30, 44, and 58. Mice will be observed over 74-days for MRSA bloodstream infection relapses. Moribund animals will be euthanized, necropsied and histopathology of HE-stained thin-sectioned tissues analyzed. The inventors will also determine MRSA load in various organ tissues. At the end of the 74-day experiment, surviving animals will be euthanized and necropsied to determine whether vancomycin and antibody therapy eliminated MRSA. The experiment will be repeated to ensure reproducibility of the data. One-way ANOVA and Bonferroni Correction will be used to determine statistical significance for observed differences in disease parameters (body weight changes, number of abscess lesions, and MRSA load. Two-way ANOVA with Holm-Šídák multiple-comparison tests will be used to analyze S. aureus-specific antibody responses) for association with the antibody therapeutic (tefibazumab) vs. hIgG1. As tefibazumab failed its clinical test (lack of efficacy against MRSA bacteremia), the inventors expect the antibody will also fail the preclinical test as a therapeutic against MRSA bacteremia (38). Further, the inventors do not anticipate that tefibazumab can boost pathogen-specific IgG and IgA responses during MRSA bacteremia.

Relapse and survival of mice with MRSA bloodstream infection under therapy with 3F6-hIgG1 or its Fcγ- and glyco-engineered variants. Here the inventors will measure the therapeutic efficacy of 3F6-hIgG1 or its Fcγ- and glyco-engineered variants (6 test articles: 3F6-hIgG1$_{HEK}$, 3F6-hIgG1$_{Fc\gamma a}$, 3F6-hIgG1$_{Fc\gamma b}$ and three glycovariant candidates). Animal cohorts will be challenged and analyzed as described under 3.ab. On day 2 (i.e. 48 hours after the initial inoculum), mice will receive an intravenous infusions of 5 mg/kg body human IgG1 control antibody or one of six 3F6-hIgG1 test articles in addition to vancomycin therapy. Assuming a plasma half-life of 8 days for human IgG1 in mice, the inventors will administer repeat intravenous infusions of 5 mg/kg bodyweight IgG1 control or test article on days 16, 30, 44, and 58. Mice will be observed for MRSA bloodstream infection relapses. Moribund animals will be euthanized, necropsied and histopathology of HE-stained thin-sectioned tissues analyzed. The inventors will also determine MRSA load in various organ tissues. At the end of the 74-day experiment, surviving animals will be euthanized and necropsied to determine whether vancomycin and antibody therapy eliminated MRSA. The experiment will be repeated to ensure reproducibility and to generate average survival curves, average histopathology and MRSA load data for mice with MRSA USA300 LAC bloodstream infection. Statistical analysis of differences in disease parameters (body weight changes, animal survival, histopathology measured disease, MRSA load and S. aureus-specific antibody responses) will be examined for association with antibody therapeutics. The inventors presume that 3F6-hIgG1 and its engineered variants will promote MRSA OPK and eliminate the bacteria from host tissues, thereby diminishing the rate of MRSA relapse infections and increasing the survival of mice with bloodstream infection. The inventors also anticipate that 3F6-hIgG1 and its Fcγ- and glyco-engineered variants will boost mouse IgG and IgA responses against MRSA.

Immunity of mice against MRSA bloodstream infection following 3F6-hIgG1 therapy. Earlier work demonstrated that S. aureus bloodstream infection in mice led to the development of protective immunity for animals that were challenged with the spa$_{KKAA}$ mutant, but not wild-type staphylococci (76)(FIG. 3). Here the inventors will ask whether mice with MRSA bacteremia and SpA-neutralizing antibody treatment develop immunity against subsequent infection. In brief, mouse cohorts will be infected with MRSA, treated with vancomycin and control hIgG1 or 3F6-hIgG1 or its engineered variants and analyzed for disease parameters. At the end of the 74-day observation period, survivors of MRSA bloodstream infection or age-matched naïve control mice will be re-challenged by intravenous inoculation with $8 \times 10^6$ CFU MRSA. For naïve control mice, MRSA bloodstream challenge results in disseminated abscess lesions and 100% mortality over 14-days. However, the inventors expect that animals receiving 3F6-hIgG1 treatment will boost MRSA specific IgG and IgA responses and confer immunity to subsequent bloodstream infections. If so, serum IgG responses and mucosal IgA responses against the matrix of 46 purified staphylococcal antigens is expected to identify differences between naïve and immune mice that can be validated with two-way ANOVA and Holm-Šídák multiple-comparison tests for their statistical significance.

B. REFERENCES

The following references, to the extent that they provide exemplary procedural or other details supplementary to those set forth herein, are specifically incorporated herein by reference.

1. Kuehnert M J, Kruszon-Moran D, Hill H A, McQuillan G, McAllister S K, Fosheim G, McDougal L K, Chaitram J, Jensen B, Fridkin S K, Killgore G, Tenover F C. 2006. Prevalence of *Staphylococcus aureus* nasal colonization in the United States, 2001-2002. J Infect Dis 193:172-179.
2. Kluytmans J, van Belkum A, Verburgh H. 1997. Nasal carriage of *Staphylococcus aureus*: epidemiology, underlying mechanisms, and associated risks. Clin Microbiol Rev 10:505-520.

3. Wertheim H F, Melles D C, Vos M C, van Leeuwen W, van Belkum A, Verbrugh H A, Nouwen J L. 2005. The role of nasal carriage in *Staphylococcus aureus* infections. Lancet Infect Dis 5:751-62.
4. Kavanagh T, Abusalem S, Calderon L E. 2017. The incidence of MRSA infections in the United States: is a more comprehensive tracking system needed? Antimicrob Res Infect Control 6:34.
5. Gerber J S, Coffin S E, Smathers S A, Zaoutis T E. 2009. Trends in the Incidence of Methicillin-Resistant *Staphylococcus aureus* Infection in Children's Hospitals in the United States. Clin Infect Dis 49:65-71.
6. Dukic V M, Lauderdale D S, Wilder J, Daum R S, David M Z. 2013. Epidemics of community-associated methicillin-resistant *Staphylococcus aureus* in the United States: a meta-analysis. PLoS One 8:e52722.
7. Dantes R, Mu Y, Belflower R, Aragon D, Dumyati G, Harrison L, Lessa F, Lynfield R, Nadle J, Petit S, Ray S, Schaffner W, Townes J, Fridkin S, Investigators EIPABCSMS. 2013. National burden of invasive methicillin-resistant *Staphylococcus aureus* infections, United States, 2011. JAMA Intern Med 173:1970-1978.
8. Duffy J, Dumyati G, Bulens S, Namburi S, Gellert A, Fridkin S, K., Lessa F, C. 2013. Community-onset invasive methicillin-resistant *Staphylococcus aureus* infections following hospital discharge. Am J Infect Control 41:782-786.
9. Lessa F C, Mu Y, Ray S M, Dumyati G, Bulens S, Gorwitz R J, Fosheim G, DeVries A S, Schaffner W, Nadle J, Gershman K, Fridkin S K, Program. ABCsAMIotEI. 2012. Impact of USA300 methicillin-resistant *Staphylococcus aureus* on clinical outcomes of patients with pneumonia or central line-associated bloodstream infections. Clin Infect Dis 55:232-241.
10. Liu C, Bayer A S, Cosgrove S E, Daum R S, Fridkin S K, Gorwitz R J, Kaplan S L, Karchmer A W, Levine D P, Murray B E, Rybak M J, Talan D A, Chambers H F. 2011. Clinical practice guidelines by the Infectious Diseases Society of America for the treatment of methicillin-resistant *Staphylococcus aureus* infections in adults and children: executive summary. Clin Infect Dis 52:285-292.
11. Daum R S, Spellberg B. 2012. Progress toward a *Staphylococcus aureus* vaccine. Clin Infect Dis 54:560-567.
12. Otto M. 2010. Novel targeted immunotherapy approaches for staphylococcal infection. Expert Opin Biol Ther 10:1049-1059.
13. Missiakas D, Schneewind O. 2016. *Staphylococcus aureus* vaccines: deviating from the carol. J Exp Med 231:1645-1653.
14. Patti J M. 2004. A humanized monoclonal antibody targeting *Staphylococcus aureus*. Vaccine 22:S39-S43.
15. Kim H K, Thammavongsa V, Schneewind O, Missiakas D. 2012. Recurrent infections and immune evasion strategies of *Staphylococcus aureus*. Curr Opin Microbiol 15:92-99.
16. Thammavongsa V, Kim H K, Missiakas D M, Schneewind O. 2015. Staphylococcal manipulation of host immune responses. Nat Rev Microbiol 13:529-543.
17. van Belkum A, Melles D C, Nouwen J, van Leeuwen W B, van Wamel W, Vos M C, Wertheim H F, Verbrugh H A. 2009. Co-evolutionary aspects of human colonisation and infection by *Staphylococcus aureus*. Infect Genet Evol 9:32-47.
18. von Eiff C, Becker K, Machka K, Stammer H, Peters G. 2001. Nasal carriage as a source of *Staphylococcus aureus* bacteremia. N Engl J Med 344:11-16.
19. Daum R S, Miller L G, Immergluck L, Fritz S, Creech C B, Young D, Kumar N, Downing M, Pettibone S, Hoagland R, Eells S J, Boyle M G, Parker T C, Chambers H F, Team D-. 2017. A placebo-controlled trial of antibiotics for smaller skin abscesses. N Engl J Med 376:2545-2555.
20. Tong S Y, Davis J S, Eichenberger E, Holland T L, Fowler V G J. 2015. *Staphylococcus aureus* infections: epidemiology, pathophysiology, clinical manifestations, and management. Clin Microbiol Rev 28:603-661.
21. Klevens R M, Morrison M A, Nadle J, Petit S, Gershman K, Ray S, Harrison L H, Lynfield R, Dumyati G, Townes J M, Craig A S, Zell E R, Fosheim G E, McDougal L K, Carey R B, Fridkin S K. 2007. Invasive methicillin-resistant *Staphylococcus aureus* infections in the United States. JAMA 298:1763-1771.
22. Najjar P A, Smink D S. 2015. Prophylactic antibiotics and prevention of surgical site infections. Surg Clin North Am 95:269-283.
23. Neu H C. 1992. The crisis in antibiotic resistance. Science 257:1064-1073.
24. Holland T L, Arnold C, Fowler V G J. 2014. Clinical management of *Staphylococcus aureus* bacteremia: a review. JAMA 312:1330-1341.
25. Noskin G A, Rubin R J, Schentag J J, Kluytmans J, Hedblom E C, Smulders M, Lapetina E, Gemmen E. 2005. The burden of *Staphylococcus aureus* infections on hospitals in the United States: an analysis of the 2000 and 2001 Nationwide Inpatient Sample Database. Arch Intern Med 165:1756-1761.
26. Stone P W. 2009. Economic burden of healthcare-associated infections: an American perspective. Expert Rev Pharmacoecon Outcomes Res 9:417-422.
27. Sun Y, Emolo C E, Holtfreter S, Wiles S, Kreiswirth B, Missiakas D, Schneewind O. 2018. Staphylococcal protein A is required for persistent colonization of mice with *Staphylococcus aureus*. J Bacteriol 200:e00735-17.
28. Chen X, Sun Y, Missiakas D, Schneewind O. 2018. *Staphylococcus aureus* decolonization of mice with monoclonal antibody neutralizing protein A. J Infect Dis in press.
29. Fattom A, Matalon A, Buerkert J, Taylor K, Damaso S, Boutriau D. 2015. Efficacy profile of a bivalent *Staphylococcus aureus* glycoconjugated vaccine in adults on hemodialysis: Phase III randomized study. Hum Vaccin Immunother 11:632-641.
30. Fattom A I, Horwith G, Fuller S, Propst M, Naso R. 2004. Development of StaphVAX, a polysaccharide conjugate vaccine against *S. aureus* infection: from the lab bench to phase III clinical trials. Vaccine 22:880-887.
31. Fattom A I, Sarwar J, Ortiz A, Naso R. 1996. A *Staphylococcus aureus* capsular polysaccharide (CP) vaccine and CP-specific antibodies protect mice against bacterial challenge. Infect Immun 64:1659-1665.
32. Benjamin D K, Schelonka R, White R, Holley H P, Bifano E, Cummings J, Adcock K, Kaufman D, Puppala B, Riedel P, Hall B, White J, Cotton C M. 2006. A blinded, randomized, multicenter study of an intravenous *Staphylococcus aureus* immune globulin. J Perinatol 26:290-295.
33. Rupp M E, Holley H P, Lutz J, Dicpinigaitis P V, Woods C W, Levine D P, Veney N, Fowler V G. 2007. Phase II, randomized, multicenter, double-blind, placebo-controlled trial of a polyclonal anti-*Staphylococcus aureus* capsular polysaccharide immune globulin in treatment of *Staphylococcus aureus* bacteremia. Antimicrob Agents Chemother 51:4249-4254.

34. Shah P S, Kaufman D A. 2009. Antistaphylococcal immunoglobulins to prevent staphylococcal infection in very low birth weight infants. Cochrane Database Syst Rev 15:CD006449.
35. Schaffer A C, Lee J C. 2009. Staphylococcal vaccines and immunotherapies. Infect Dis Clin North Am 23:153-171.
36. DeJonge M, Burchfield D, Bloom B, Duenas M, Walker W, Polak M, Jung E, Millard D, Schelonka R, Eyal F, Morris A, Kapik B, Roberson D, Kesler K, Patti J, Hetherington S. 2007. Clinical trial of safety and efficacy of INH-A21 for the prevention of nosocomial staphylococcal bloodstream infection in premature infants. J Pediatr 151:260-265.
37. Domanski P J, Patel P R, Bayer A S, Zhang L, Hall A E, Syribeys P J, Gorovits E L, Bryant D, Vernachio J H, Hutchins J T, Patti J M. 2005. Characterization of a humanized monoclonal antibody recognizing clumping factor A expressed by Staphylococcus aureus. Infect Immun 73:5229-5232.
38. Weems Jr. J J, Steinberg J P, Filler S, Baddley J W, Corey G R, Sampathkumar P, Winston L, John J F, Kubin C J, Talwani R, Moore T, Patti J M, Hetherington S, Texter M, Wenzel E, Kelley V A, Fowler Jr V G. 2006. Phase II, randomized, double-blind, multicenter study comparing the safety and pharmacokinetics of Tefibazumab to placebo for treatment of Staphylococcus aureus bacteremia. Antimicrob Agents Chemother 50:2751-2755.
39. Patel M, Kaufman D A. 2015. Anti-lipoteichoic acid monoclonal antibody (pagibaximab) studies for the prevention of staphylococcal bloodstream infections in preterm infants. Expert Opin Biol Ther 15:595-600.
40. Weisman L E. 2007. Antibody for the prevention of neonatal nosocomial staphylococcal infection: a review of the literature. Arch Ped 14:S31-S34.
41. Weisman L E, Fischer G W, Thackray H M, Johnson K E, Schuman R F, Mandy G T, Stratton B E, Adams K M, Kramer W G, Mond J J. 2009. Safety and pharmacokinetics of a chimerized anti-lipoteichoic acid monoclonal antibody in healthy adults. Int Immunopharmacol 9:639-644.
42. Weisman L E, Thackray H M, Steinhorn R H, Walsh W F, Lassiter H A, Dhanireddy R, Brozanski B S, Palmer K G, Trautman M S, Escobedo M, Meissner H C, Sasidharan P, Fretz J, Kokai-Kun J F, Kramer W G, Fischer G W, Mond J J. 2011. A randomized study of a monoclonal antibody (pagibaximab) to prevent staphylococcal sepsis. Pediatrics 128:271-279.
43. Rouha H, Badarau A, Visram Z C, Battles M B, Prinz B, Magyaricsa Z, Nagy G, Mirkina I, Stulik L, Zerbs M, Jägerhofer M, Maierhofer B, Teubenbacher A, Dolezilkova I, Gross K, Banerjee S, Zauner G, Malafa S, Zmajkovic J, Maier S, Mabry R, Krauland E, Wittrup K D, Gerngross T U, Nagy E. 2015. Five birds, one stone: neutralization of alpha-hemolysin and four bi-component leukocidins of Staphylococcus aureus with a single human monoclonal antibody. mAbs 7:243-254.
44. Alonzo Fr, Torres V J. 2014. The bicomponent pore-forming leucocidins of Staphylococcus aureus. Microbiol Mol Biol Rev 78:199-230.
45. Kernodle D S. 2011. Expectations regarding vaccines and immune therapies directed against Staphylococcus aureus alpha-hemolysin. J Infect Dis 203:1692-1693.
46. Shinefield H, Black S, Fattom A, Horwith G, Rasgon S, Ordonez J, Yeoh H, Law D, Robbins J B, Schneerson R, Muenz L, Fuller S, Johnson J, Fireman B, Alcorn H, Naso R. 2002. Use of a Staphylococcus aureus conjugate vaccine in patients receiving hemodialysis. N Engl J Med 346:491-496.
47. Fowler V G, Allen K B, Moreira E D, Moustafa M, Isgro F, Boucher H W, Corey G R, Carmeli Y, Betts R, Hartzel J S, Chan I S, McNeely T B, Kartsonis N A, Guris D, Onorato M T, Smugar S S, DiNubile M J, Sobanjo-ter Meulen A. 2013. Effect of an investigational vaccine for preventing Staphylococcus aureus infections after cardiothoracic surgery: a randomized trial. JAMA 309:1368-1378.
48. Anderson A S, Miller A A, Donald R G, Scully I L, Nanra J S, Cooper D, Jansen K U. 2012. Development of a multicomponent Staphylococcus aureus vaccine designed to counter multiple bacterial virulence factors. Hum Vaccin Immunother 8:1585-94.
49. Varshney A K, Kuzmicheva G A, Lin J, Sunley K M, Bowling R A J, Kwan T Y, Mays H R, Rambhadran A, Zhang Y, Martin R L, Cavalier M C, Simard J, Shivaswamy S. 2017. A natural human monoclonal antibody targeting Staphylococcus Protein A protects against Staphylococcus aureus bacteremia. PLoS ONE 13:e0190537.
50. Graille M, Stura E A, Corper A L, Sutton B J, Taussig M J, Charbonnier J B, Silverman G J. 2000. Crystal structure of a Staphylococcus aureus protein A domain complexed with the Fab fragment of a human IgM antibody: structural basis for recognition of B-cell receptors and superantigen activity. Proc Nat Acad Sci USA 97:5399-5404.
51. Raghavan M, Bjorkman P J. 1996. Fc receptors and their interactions with immunoglobulins. Annu Rev Cell Dev Biol 12:181-220.
52. Hazenbos W L W, Kajihara K K, Vandlen R, Morisaki J H, Lehar S M, Kwakkenbos M J, Beaumont T, Bakker A Q, Phung Q, Swem L R, Ramakrishnan S, Kim J, Xu M, Shah I M, Diep B A, Sai T, Sebrell A, Khalfin Y, Oh A, Koth C, Lin S J, Lee B C, Strandh M, Koefoed K, Andersen P S, Spits H, Brown E J, Tan M W, Mariathasan S. 2013. Novel staphylococcal glycosyltransferases SdgA and SdgB mediate immunogenicity and protection of virulence-associated cell wall proteins PLoS Pathogens 9:e1003653.
53. Lehar S M, T. P, M. X, L. S, K. K. K, Vandlen R, DePalatis L, Raab H, Hazenbos W L, Morisaki J H, Kim J, Park S, Darwish M, Lee B, Hernandez H, Loyet K, Lupardus P, Fong R, Yan D, Chalouni C, Luis E, Khalfin Y, Plise E, Cheong J, Lyssikatos J P, Strandh M, Koefoed K, Andersen P S, Flygare J A, Wah Tan M, Brown E J, Mariathasan S. 2015. Novel antibody-antibiotic conjugate eliminates intracellular S. aureus. Nature 527:323-328.
54. Zhou C, Lehar S, Gutierrez J, Rosenberger C M, Ljumanovic N, Dinoso J, Koppada N, Hong K, Baruch A, Carrasco-Triguero M, Saad O, Mariathasan S, Kamath A V. 2016. Pharmacokinetics and pharmacodynamics of DSTA4637A: A novel THIOMAB™ antibody antibiotic conjugate against Staphylococcus aureus in mice. MAbs 8:1612-1619.
55. Mariathasan S, Tan M W. 2017. Antibody-Antibiotic Conjugates: a novel therapeutic platform against bacterial infections. Trends Mol Med 23:135-149.
56. Brown S, Xia G, Luhachack L G, Campbell J, Meredith T C, Chen C, Winstel V, Gekeler C, Irazoqui J E, Peschel A, Walker S. 2012. Methicillin resistance in Staphylococcus aureus requires glycosylated wall teichoic acids. Proc Natl Acad Sci USA 109:18909-18914.
57. Guérillot R, Gonçalves da Silva A, Monk I, Giulieri S, Tomita T, Alison E, Porter J, Pidot S, Gao W, Peleg A Y, Seemann T, Stinear T P, Howden B P. 2018. Convergent evolution driven by rifampin exacerbates the global burden of drug-resistant *Staphylococcus aureus*. mSphere 3:e00550-17.

58. Bubeck-Wardenburg J, Patel R, Schneewind O. 2007. Surface proteins and exotoxins are required for the pathogenesis of *Staphylococcus aureus* pneumonia. Infect Immun 74:1040-1044.

59. Bubeck Wardenburg J, Schneewind O. 2008. Vaccine protection against *Staphylococcus aureus* pneumonia. J Exp Med 205:287-294.

60. Ragle B E, Bubeck-Wardenburg J. 2009. Anti-alpha-hemolysin monoclonal antibodies mediate protection against *Staphylococcus aureus* pneumonia. Infect Immun 77:2712-2718.

61. DeLeo F R, Kennedy A D, Chen L, Bubeck-Wardenburg J, Kobayashi S D, Mathema B, Braughton K R, Whitney A R, Villaruz A E, Martens C A, Porcella S F, McGavin M J, Otto M, Musser J M, Kreiswirth B N. 2011. Molecular differentiation of historic phage-type 80/81 and contemporary epidemic *Staphylococcus aureus*. Proc Natl Acad Sci USA 108:18091-18096.

62. Sharma-Kuinkel B K, Wu Y, Tabor D E, Mok H, Sellman B R, Jenkins A, Yu L, Jafri H S, Rude T H, Ruffin F, Schell W A, Park L P, Yan Q, Thaden J T, Messina J A, Fowler V G J, Esser M T. 2015. Characterization of alpha-toxin hla gene variants, alpha-toxin expression levels, and levels of antibody to alpha-toxin in hemodialysis and postsurgical patients with *Staphylococcus aureus* bacteremia. J Clin Microbiol 53:227-236.

63. Spaan A N, Surewaard B G J, Nijland R, van Strijp J A G. 2013. Neutrophils versus *Staphylococcus aureus*: a biological tug of war. Annu Rev Microbiol 67:629-650.

64. Thammavongsa V, Missiakas D M, Schneewind O. 2013. *Staphylococcus aureus* conversion of neutrophil extracellular traps into deoxyadenosine promotes immune cell death Science 342:863-866.

65. Brinkmann V, Reichard U, Goosmann C, Fauler B, Uhlemann Y, Weiss D S, Weinrauch Y, Zychlinsky A. 2004. Neutrophil extracellular traps kill bacteria. Science 303:1532-1535.

66. Baehner R L, Nathan D G. 1967. Leukocyte oxidase defective activity in chronic granulomatous disease. Science 155:835.

67. Baehner R L. 1990. Chronic granulomatous disease of childhood: clinical, pathological, biochemical, molecular, and genetic aspects of the disease. Pediatr Pathol 10:143-153.

68. Puel A, Cypowyj S, Bustamante J, Wright J F, Liu L, Lim H K, Migaud M, Israel L, Chrabieh M, Audry M, Gumbleton M, Toulon A, Bodemer C, El-Baghdadi J, Whitters M, Paradis T, Brooks J, Collins M, Wolfman N M, Al-Muhsen S, Galicchio M, Abel L, Picard C, Casanova J L. 2011. Chronic mucocutaneous candidiasis in humans with inborn errors of interleukin-17 immunity. Science 332:65-68.

69. Casanova J L, Holland S M, Notarangelo L D. 2012. Inborn errors of human JAKs and STATs. Immunity 36:515-528.

70. Holland T, Fowler V G J, Shelburne S Ar. 2014. Invasive gram-positive bacterial infection in cancer patients. Clin Infect Dis 59:S331-S334.

71. Lowy F D. 1998. *Staphylococcus aureus* infections. New Engl J Med 339:520-532.

72. Thammavongsa V, Kern J W, Missiakas D M, Schneewind O. 2009. *Staphylococcus aureus* synthesizes adenosine to escape host immune responses. J Exp Med 206:2417-2427.

73. Thomer L, Emolo C, Thammavongsa V, Kim H K, McAdow M E, Yu W, Kieffer M, Schneewind O, Missiakas D. 2016. Antibodies against a secreted product of *Staphylococcus aureus* trigger phagocytic killing. J Exp Med 213:293-301.

74. Rogers D E, Tompsett R. 1952. The survival of staphylococci within human leukocytes. J Exp Med 95:209-230.

75. Gresham H D, Lowrance J H, Caver T E, Wilson B S, Cheung A L, Lindberg F P. 2000. Survival of *Staphylococcus aureus* inside neutrophils contributes to infection. J Immunol 164:3713-3722.

76. Falugi F, Kim H K, Missiakas D M, Schneewind O. 2013. The role of protein A in the evasion of host adaptive immune responses by *Staphylococcus aureus* mBio 4:e00575-13.

77. van Loghem E, Frangione B, Recht B, Franklin E C. 1982. Staphylococcal protein A and human IgG sub-classes and allotypes. Scand J Immunol 15:275-278.

78. Zhang L, Jacobsson K, Strom K, Lindberg M, Frykberg L. 1999. *Staphylococcus aureus* expresses a cell surface protein that binds both IgG and beta2-glycoprotein I. Microbiology 145:177-183.

79. Kim H K, Emolo C, DeDent A C, Falugi F, Missiakas D M, Schneewind O. 2012. Protein A-specific monoclonal antibodies and the prevention of *Staphylococcus aureus* disease in mice. Infect Immun 80:3460-3470.

80. Patel D, Wines B D, Langley R J, Fraser J D. 2010. Specificity of staphylococcal superantigen-like protein 10 toward human IgG1 Fc domain. J Immunol 184:6283-6292.

81. Creech C B, Al-Zubeidi D N, Fritz S A. 2015. Prevention of recurrent staphylococcal skin infections. Infect Dis Clin North Am 29:429-464.

82. Fowler Jr. V G, Kong L K, Corey G R, Gottlieb G S, McClelland R S, Sexton D J, Gesty-Palmer D, Harrell U. 1999. Recurrent *Staphylococcus aureus* bacteremia: pulsed-field gel electrophoresis findings in 29 patients. J Infect Dis 179:1157-1161.

83. Rogers D E, Melly M A. 1965. Speculation on the immunology of staphylococcal infections. Ann N Y Acad Sci 128:274-284.

84. Kim H K, Kim H Y, Schneewind O, Missiakas D M. 2011. Identifying protective antigens of *Staphylococcus aureus*, a pathogen that suppresses host immune responses. FASEB J 25:3605-3612.

85. Kim H K, Cheng A G, Kim H Y, Missiakas D M, Schneewind O. 2010. Non-toxigenic protein A vaccine for methicillin-resistant *Staphylococcus aureus* infections. J Exp Med 207:1863-1870.

86. Forsgren A, Nordström K. 1974. Protein A from *Staphylococcus aureus*: the biological significance of its interaction with IgG. Ann N Y Acad Sci 236:252-266.

87. Forsgren A, Svedjelund A, Wigzell H. 1976. Lymphocyte stimulation by protein A of *Staphylococcus aureus*. Eur J Immunol 6:207-213.

88. Schneewind O, Fowler A, Faull K F. 1995. Structure of the cell wall anchor of surface proteins in *Staphylococcus aureus*. Science 268:103-106.

89. Mazmanian S K, Liu G, Ton-That H, Schneewind O. 1999. *Staphylococcus aureus* sortase, an enzyme that anchors surface proteins to the cell wall. Science 285:760-763.

90. Becker S, Frankel M B, Schneewind O, Missiakas D M. 2014. Release of protein A from the cell wall envelope of *Staphylococcus aureus*. Proc Natl Acad Sci USA 111: 1574-1579.
91. Kim H K, Falugi F, Missiakas D, Schneewind O. 2016. Peptidoglycan-linked protein A promotes T-cell dependent antibody expansion during *Staphylococcus aureus* infection. Proc Natl Acad Sci USA 113:5718-5723.
92. Pauli N T, Kim H K, Falugi F, Huang M, Dulac J, Dunand C H, Zheng N Y, Kaur K, Andrews S, Huang Y, Dedent A, Frank K, Charnot-Katsikas A, Schneewind O, Wilson P C. 2014. *Staphylococcus aureus* infection induces protein A-mediated immune evasion in humans. J Exp Med 211:2331-2339.
93. Kim H K, Falugi F, Thomer L, Missiakas D M, Schneewind O. 2015. Protein A suppresses immune responses during *Staphylococcus aureus* bloodstream infection in guinea pigs. mBio 6:e02369-14.
94. Kim H K, Emolo C, Missiakas D M, Schneewind O. 2014. A monoclonal antibody that recognizes the E domain of staphylococcal protein A. Vaccine 32:464-469.
95. Thammavongsa V, Rauch S, Kim H K, Missiakas D M, Schneewind O. 2015. Protein A-neutralizing monoclonal antibody protects neonatal mice against *Staphylococcus aureus*.
Vaccine 33:523-526.
96. Leatherbarrow R J, Dwek R A. 1984. Binding of complement subcomponent C1q to mouse IgG1, IgG2a and IgG2b: a novel C1q binding assay. Mol Immunol 21:321-327.
97. Nimmerjahn F, Ravetch J V. 2008. Fc-gamma receptors as regulators of immune responses. Nat Rev Immunol 8:34-47.
98. Nimmerjahn F, Ravetch J V. 2005. Divergent immunoglobulin g subclass activity through selective Fc receptor binding. Science 310:1510-1512.
99. Abboud N, Chow S K, Saylor C, Janda A, Ravetch J V, Scharff M D, Casadevall A. 2010. A requirement for FcγR in antibody-mediated bacterial toxin neutralization. J Exp Med 207:2395-2405.
100. Wang L X, Lomino J V. 2012. Emerging technologies for making glycan-defined glycoproteins. ACS Chem Biol 7:110-22.
101. Wang L X, Amin M N. 2014. Chemical and chemoenzymatic synthesis of glycoproteins for deciphering functions. Chem Biol 21:51-66.
102. Huang W, Giddens J, Fan S Q, Toonstra C, Wang L X. 2012. Chemoenzymatic glycoengineering of intact IgG antibodies for gain of functions. J Am Chem Soc 134: 12308-18.
103. Deisenhofer J. 1981. Crystallographic refinement and atomic models of a human Fc fragment and its complex with fragment B of protein A from *Staphylococcus aureus* at 2.9- and 2.8-A resolution. Biochemistry 20:2361-2370.
104. Monnet C, Jorieux S, Urbain R, Fournier N, Bouayadi K, De Romeuf C, Behrens C K, Fontayne A, Mondon P. 2015. Selection of IgG variants with increased FcRn binding using random and directed mutagenesis: impact on effector functions. Front Immunol 6:39.
105. Monnet C, Jorieux S, Souyris N, Zaki O, Jacquet A, Fournier N, Crozet F, de Romeuf C, Bouayadi K, Urbain R, Behrens C K, Mondon P, Fontayne A. 2014. Combined glyco- and protein-Fc engineering simultaneously enhance cytotoxicity and half-life of a therapeutic antibody. MAbs 6:422-36.
106. Renaut L, Monnet C, Dubreuil O, Zaki O, Crozet F, Bouayadi K, Kharrat H, Mondon P. 2012. Affinity maturation of antibodies: optimized methods to generate high-quality ScFv libraries and isolate IgG candidates by high-throughput screening. Methods Mol Biol 907:451-61.
107. Winter G, Griffiths A D, Hawkins R E, Hoogenboom H R. 1994. Making antibodies by phage display technology. Annu Rev Immunol 12:433-455.
108. McCafferty J, Griffiths A D, Winter G, Chiswell D J. 1990. Phage antibodies: filamentous phage displaying antibody variable domains. Nature 348:552-554.
109. Burmeister W P, Gastinel L N, Simister N E, Blum M L, Bjorkman P J. 1994. Crystal structure at 2.2 A resolution of the MHC-related neonatal Fc receptor. Nature 372:336-343.
110. Martin W L, Bjorkman P J. 1999. Characterization of the 2:1 complex between the class I MHC-related Fc receptor and its Fc ligand in solution. Biochemistry 38:12639-12647.
111. Burmeister W P, Huber A H, Bjorkman P J. 1994. Crystal structure of the complex of rat neonatal Fc receptor with Fc. Nature 372:379-383.
112. Shah I S, Lovell S, Mehzabeen N, Battaile K P, Tolbert T J. 2017. Structural characterization of the $Man_5$ glycoform of human IgG3 Fc. Mol Immunol 92:28-37.
113. McAdow M, Kim H K, DeDenta A C, Hendrickx A P A, Schneewind O, Missiakas D M. 2011. Preventing *Staphylococcus aureus* sepsis through the inhibition of its agglutination in blood. PLoS Pathog 7:e1002307.
114. Hall A E, Domanski P J, Patel P R, Vernachio J H, Syribeys P J, Gorovits E L, Johnson M A, Ross J M, Hutchins J T, Patti J M. 2003. Characterization of a protective monoclonal antibody recognizing *Staphylococcus aureus* MSCRAMM protein clumping factor A. Infect Immun 71:6864-6870.
115. Li T, Tong X, Yang Q, Giddens J P, Wang L X. 2016. Glycosynthase mutants of endoglycosidase S2 show potent transglycosylation activity and remarkably relaxed substrate specificity for antibody glycosylation remodeling. J Biol Chem 291:in press.
116. Jefferis R. 2009. Glycosylation as a strategy to improve antibody-based therapeutics. Nat Rev Drug Discov 8:226-34.
117. Gramer M J, Eckblad J J, Donahue R, Brown J, Shultz C, Vickerman K, Priem P, van den Bremer E T, Gerritsen J, van Berkel P H. 2011. Modulation of antibody galactosylation through feeding of uridine, manganese chloride, and galactose. Biotechnol Bioeng 108:1591-602.
118. Hills A E, Patel A, Boyd P, James D C. 2001. Metabolic control of recombinant monoclonal antibody N-glycosylation in GS-NS0 cells. Biotechnol Bioeng 75:239-51.
119. Gu X, Wang D I. 1998. Improvement of interferon-gamma sialylation in Chinese hamster ovary cell culture by feeding of N-acetylmannosamine. Biotechnol Bioeng 58:642-8.
120. Yin B, Wang Q, Chung C Y, Ren X, Bhattacharya R, Yarema K J, Betenbaugh M J. Butyrated ManNAc analog improves protein expression in Chinese hamster ovary cells. Biotechnology and Bioengineering doi:10.1002/bit.26560:n/a-n/a.
121. Wang L X, Lomino J V. 2012. Emerging technologies for making glycan-defined glycoproteins. ACS Chem Biol 7:110-122.
122. Wang L X, Amin M N. 2014. Chemical and chemoenzymatic synthesis of glycoproteins for deciphering functions. Chem Biol 21:51-66.

123. Huang W, Giddens J, Fan S Q, Toonstra C, Wang L X. 2012. Chemoenzymatic glycoengineering of intact IgG antibodies for gain of functions. J Am Chem Soc 134: 12308-12318.
124. Diep B A, Gill S R, Chang R F, Phan T H, Chen J H, Davidson M G, Lin F, Lin J, Carleton H A, Mongodin E F, Sensabaugh G F, Perdreau-Remington F. 2006. Complete genome sequence of USA300, an epidemic clone of community-acquired meticillin-resistant *Staphylococcus aureus*. Lancet 367:731-739.
125. Cheng A G, McAdow M, Kim H K, Bae T, Missiakas D M, Schneewind O. 2010. Contribution of coagulases towards *Staphylococcus aureus* disease and protective immunity. PLoS Pathog 6:e1001036.
126. Cheng A G, Kim H K, Burts M L, Krausz T, Schneewind O, Missiakas D M. 2009. Genetic requirements for *Staphylococcus aureus* abscess formation and persistence in host tissues. FASEB J 23:3393-3404.

Example 2: Glycosylation-Dependent Opsonophagocytic Activity of Staphylococcal Protein A Antibodies

*Staphylococcus aureus* evades opsonophagocytic clearance by producing Staphylococcal protein A (SpA), a surface protein that binds the Fc region of immunoglobulin G (IgG). SpA also stunts the development of protective immunity by crosslinking IgM B cell receptors. This interaction triggers polyclonal B cell proliferation and results in the secretion of antibodies that fail to recognize *S. aureus*. 3F6 human IgG1 (3F6-hIgG1) is a monoclonal antibody that binds and neutralizes SpA. Here, the inventors show that galactosylation of 3F6-hIgG1 is indispensable for opsonophagocytic killing of bacteria and for protection of mice against *S. aureus* bloodstream infection. The inventors demonstrate that fucosylation of the antibody prevents engagement with FcγR while galactosylation promotes C1q recruitment and accounts for the therapeutic activity of 3F6-hIgG1.

*Staphylococcus aureus* (MSSA, methicillin-sensitive *S. aureus*) and its antibiotic-resistant isolates (MRSA, methicillin-resistant *S. aureus*) persistently colonize the nasopharynx of 31% (MSSA) and 2% (MRSA) of the US population, respectively, while the remainder population is intermittently colonized (1,2). Colonization is the key risk factor for invasive diseases which manifest as skin and soft tissue infections, osteomyelitis, pneumonia, septic arthritis, bacteremia and endocarditis (3). In the US, community-acquired disease is associated with 3.2 million (MSSA) and 238,000 (MRSA) clinical visits each year (4). Further, 359,000 MSSA and 101,000 MRSA cases of hospital-acquired infection occur for 37 million hospital admissions (5). MRSA infection is associated with treatment failure and increased mortality (6). Several attempts to develop vaccines or immune therapeutics that prevent disease or improve the outcome of *S. aureus* infections have failed (7).

*S. aureus* is a Gram-positive organism with a thick envelope which, unlike most Gram-negative bacteria, cannot be lysed by complement and the membrane attack complex (7). Secreted Sbi and cell wall-bound SpA capture the fragment crystallizable region of immunoglobulin G (Fcγ) and thwart opsonization with *S. aureus*-specific antibodies. Sbi and SpA encompass two and five immunoglobulin-binding domains (IgBDs), respectively. Each IgBD binds to Fcγ of human IgG1, IgG2 and IgG4 (but not to IgG3) and of mouse IgG (IgG1, IgG2a, IgG2b, IgG2c and IgG3) (8-11). SpA, but not Sbi, also binds the variant heavy chain of $V_H3$ idiotypic IgM, IgG, IgD and IgE[12-14] During infection, *S. aureus* releases SpA which crosslinks the variant heavy chains of $V_H3$ clan B cell receptors (IgM) and triggers B cell proliferation and the secretion of $V_H3$ clonal antibodies (15,16). Released SpA diverts B cell development and blocks the production of pathogen-specific IgG (15,16). Humans, guinea pigs and mice fail to generate SpA-neutralizing antibodies (12, 16, 17). Thus, any therapeutic strategy involving *S. aureus*-specific antibody must address the SpA and Sbi defenses of Staphylococci.

Earlier, the inventors developed non-toxicogenic $SpA_{KKAA}$ that no longer binds immunoglobulins (12), and isolated the mouse hybridoma monoclonal antibody 3F6 (3F6-mhIgG2a). This antibody binds the folded triple-helical structure of IgBDs and blocks ligand binding to SpA and Sbi. When administered to mice, 3F6-mhIgG2a protects animals against *S. aureus* bloodstream infection (11, 12, 18). In an effort to develop a therapeutic antibody, the complementarity-determining regions (CDRs) of 3F6-mhIgG2a were stitched into the $V_H$ and VL gene elements of a human IgG1 (hIgG1) antibody (18,19) (FIG. 7A). The new humanized 3F6 IgG1 antibody (3F6-hIgG1) improved the outcome of MRSA bloodstream infections in experimental animals (18,19). Here, the inventors use a combination of glycoengineering and site-directed mutagenesis to discern the effector functions of 3F6 therapeutic antibodies.

A. Results

1. $3F6\text{-hIgG1}_{HEK}$, but not $3F6\text{-hIgG1}_{CHO}$, Protects Mice Against *S. aureus* Bloodstream Infection Two cell lines, CHO-DG44 and HEK-293F, were used to produce humanized anti-SpA antibodies. The corresponding antibodies, designated $3F6\text{-hIgG1}_{CHO}$ and $3F6\text{-hIgG1}_{HEK}$ (FIG. 7A), were affinity purified, and their integrity and homogeneity were documented by Coomassie-stained sodium dodecyl sulfate-polyacrylamide gel electrophoresis (SDS-PAGE) under reducing and non-reducing conditions (FIG. 7B). Both antibodies exhibited a similar affinity for $SpA_{KKAA}$ (FIG. 7C) and displaced interactions between hIgG and SpA more effectively than hIgG1 (FIG. 7D). To assess their therapeutic activity, 3F6-hIgG1CHO and $3F6\text{-hIgG1}_{HEK}$ were injected into BALB/c mice prior to intravenous challenge with the methicillin resistant *S. aureus* isolate MW2, herein referred as MRSA (FIG. 7E, 7F). Animals treated with PBS and hIgG1, or with 3F6-mhIgG2a, served as negative and positive control groups, respectively. Animals were killed 15 days post challenge. Disease was assessed by visual inspection of intact kidneys for areas with pus collection (FIG. 11A), by enumeration of colony-forming units (CFU) following plating of kidney tissues (FIG. 7E) and enumeration of abscess lesion using H&E-stained kidney tissue sections (FIG. 7F). Animals that received 3F6-mhIgG2a or $3F6\text{-hIgG1}_{HEK}$ harbored fewer abscess lesions (FIG. 11A, FIG. 7F) and reduced bacterial loads in renal tissues (FIG. 7E) as compared to animals that received PBS or hIgG1. The protective activities of 3F6-mhIgG2a and $3F6\text{-hIgG1}_{HEK}$ were indistinguishable. Surprisingly, $3F6\text{-hIgG1}_{CHO}$ administration afforded no protection and behaved similarly to PBS and hIgG1 controls (FIG. 11A, FIG. 7E, 7F). Earlier reports demonstrate that successful neutralization of SpA blocks its B cell superantigen activity resulting in the production of polyclonal antibodies against staphylococcal antigens (12,18). Animal sera collected post-challenge were used to measure IgG titers against a staphylococcal antigen matrix encompassing 17 purified antigens (FIG. 7G). Immunization with $3F6\text{-hIgG1}_{HEK}$ or reference control 3F6-mhIgG2a elicited antibody production against the virulence determinants ClfA, IsdB, Coa, and vWbp as well as surface antigens ClfB, SasI, and FnBPA; this was not observed in animals treated with 3F6-hIgG1$_{CHO}$, PBS or hIgG1 (FIG. 7G; FIG. 11B). Intraperitoneal injection of 3F6-hIgG1$_{CHO}$ and 3F6-hIgG1$_{HEK}$ into mice was associated with a typical bi-exponential plasma concentration-time profile revealing similar half-lives (FIG. 1h). In agreement with this observation, 3F6-hIgG1$_{CHO}$ and 3F6-hIgG1$_{HEK}$ displayed similar binding affinities to the human neonatal Fc receptor (FcRn) in vitro (FIG. 11C). Together these data indicate that 3F6-hIgG1$_{HEK}$, but not 3F6-hIgG1$_{CHO}$, protects mice against MRSA infection, and the difference in protection is not caused by a reduced half-life of 3F6-hIgG1$_{CHO}$.

2. Fc-Galactosylation is Required for the Protective Activity of 3F6 Antibodies

Antibody-mediated effector functions are modulated by Fc N-glycosylation (20). Asn$^{297}$ is modified with a hepta-saccharide core (GlcNAc$_2$Man$_3$GlcNAc$_2$) and variable additions of fucose (F), galactose (G), and sialic acid (S). Binding to the immobilized *Erythrina cristagalli* lectin (ECL) and *Sambucus nigra* agglutinin (SNA) suggested that 3F6-hIgG1$_{HEK}$ has higher galactose and sialic acid contents than 3F6-hIgG1$_{CHO}$ (FIG. 12A-B). For a more thorough analysis, glycans were released from antibody preparations and subjected to matrix-assisted laser desorption/ionization time-of-flight (MALDI-TOF) mass spectrometry to reveal a complex carbohydrate content profile with peaks corresponding to the fucosylated non-galactosylated (G0F), mono-galactosylated (G1F), and di-galactosylated N-glycans (G2F) (FIG. 8A). The G1F and G2F glycoforms were more abundant in the 3F6-hIgG1$_{HEK}$ preparation as compared to the 3F6-hIgG1$_{CHO}$ preparation (FIG. 8A-Bb). Quantification of glycoforms revealed that 3F6-hIgG1$_{HEK}$ contains two times and nine times more galactosyl and sialic acid residues, respectively than 3F6-hIgG1$_{CHO}$ (FIG. 8B; Extended Data Table 1). To determine whether the Fc glycan structure is a key determinant for protection against *S. aureus* bloodstream infection, the inventors used enzymes to transfer or remove galactose, yielding 3F6-hIgG1$_{CHO}$-Gal or 3F6-hIgG1$_{HEK}$-deGal. Neuraminidase was used to generate 3F6-hIgG1$_{CHO}$-deSia and 3F6-hIgG1$_{HEK}$-deSia lacking sialic acid. None of these treatments altered the integrity of antibodies (FIG. 12C, 12F). The new glycoforms bound SpA$_{KKAA}$ with similar affinities (Table 1; FIG. 12D, 12G). Lectin binding assays confirmed the galactosylation, de-galactosylation or de-sialylation modifications of antibodies (FIG. 12E, 12H). Animals were injected intraperitoneally with the four test antibodies 3F6-hIgG1$_{CHO}^{-Gal}$, 3F6-hIgG1$_{HEK}$, 3F6-hIgG1$_{HEK}$-deGal, or 3F6-hIgG1$_{HEK}$-deSia, and then challenged by intravenous inoculation of MRSA while monitoring body weight changes over 14 days (FIG. 8C). On day 15, animals were euthanized and renal tissues examined for bacterial load and abscess formation (FIG. 8D, 8E). As shown earlier, treatment with 3F6-hIgG1$_{HEK}$ but not human IgG1 and 3F6-hIgG1$_{CHO}$, reduced MRSA load as well as abscess formation (FIG. 8D, E). Sialic acid modification (3F6-hIgG1$_{HEK}$-deSia) is not required for this protective activity while galactosylation is indispensable, as demonstrated by the loss of protection upon treatment of animals with 3F6-hIgG1$_{HEK}$-deGal and by the gain of protection upon passive administration with 3F6-hIgG1$_{CHO}$-Gal (FIG. 8C-E). To unambiguously identify the Fc glycan structure responsible for protection against MRSA bloodstream infection, the inventors used a chemoenzymatic method for glycan remodeling by first deglycosylating 3F6-hIgG1$_{CHO}$ and 3F6-hIgG1$_{HEK}$ with Endo-S2 and, second, transferring pre-synthesized glycan en bloc from activated glycan oxazoline in an EndoS2-D184M-dependent manner (21-24). Four antibodies 3F6-hIgG$_{HEK}$-G0F, 3F6-hIgG$_{HEK}$-G1F, 3F6-hIgG$_{HEK}$-G2F and 3F6-hIgGcHo-G2F, with highly homogeneous and well-defined glycan profiles, were synthesized and tested for integrity and binding to SpA$_{KKAA}$ (FIG. 12I, 12J; Table 1). When injected in animals, both di-galactosylated antibodies, 3F6-hIgG$_{HEK}$-G2F and 3F6-hIgGcHo-G2F, protected animals from MRSA challenge (FIG. 12F, 12H). Mono-galactosylated 3F6-hIgG$_{HEK}$-G1F protected equally well. However, no protection was observed for the G0F glycoform, 3F6-hIgG1$_{HEK}$-G0F (FIG. 8F, 8H). 3F6 antibody-mediated protection correlated with the development of a broader immune response against multiple bacterial molecules as monitored with the MRSA antigen matrix (FIG. 8I, 8J). In conclusion, galactosylation is key to the protective attribute of 3F6-hIgG1 in vivo.

3. Protection by 3F6-hIgG1$_{HEK}$ in Mice Requires Complement

3F6-hIgG1$_{HEK}$ Displayed a Greater Affinity for Both Human and Mouse C1q than 3F6-hIgG1$_{CHO}$ (FIG. 13A, B; Table 2). The differential glycosylation of CHO- and HEK-produced antibodies did not affect their binding affinities toward mouse FcγRs (FIG. 13C; Table 2). When examined using human FcγRs and their allotypes, 3F6-hIgG1$_{CHO}$ showed higher affinity toward activating receptors, FcγRIIA$_{R131}$, FcγRIIA$_{H131}$, FcγRIIIA$_{V158}$, FcγRIIIA$_{F158}$, and the inhibitory receptor, FcγRIIB as compared to 3F6-hIgG1$_{HEK}$ (FIG. 13D; Table 2). Both antibodies bound FcγRIA similarly (FIG. 13D; Table 2). Addition of galactose to CHO-produced antibody enhanced C1q binding, while removal of galactose from HEK-produced antibody reduced C1q binding (FIG. 13E; Table 2). 3F6-hIgG1$_{CHO}$-G2F displayed the highest affinity toward C1q comparable to that of 3F6-hIgG1$_{HEK}$-G2F (FIG. 13F; Table 2). Glycoforms 3F6-hIgG1$_{HEK}$-G1F and 3F6-hIgG1$_{HEK}$-G2F displayed high affinities toward C1q (FIG. 13F; Table 2). Lastly, removal of sialic acid from 3F6-hIgG1$_{HEK}$ improved C1q binding slightly but had no impact on 3F6-hIgG1$_{CHO}$ activity (FIG. 13F; Table 2). This is unsurprising since sialic acid is only added to galactose residues; thus, only 0.45% of all CHO-produced antibodies were modified with sialic acid as compared to ~4% of all HEK-produced antibodies (FIG. 8B).

Amino acids K322 and L233/L234 have been implicated in the interaction of antibody with C1q (27,28). To further delineate the C1q requirement for the therapeutic activity of 3F6-hIgG1$_{HEK}$ antibodies, the inventors generated variants 3F6-hIgG1$_{HEK}$-KA and 3F6-hIgG1$_{HEK}$-LALA with substitutions K322A and L233A/L234A, respectively (FIG. 14A). The new substitutions did not affect antigen-binding, sialylation, fucosylation or galactosylation (FIG. 14B, C; Table 2). Binding to C1q was significantly reduced for these two variants consistent with previous reports (27,28) (FIG. 14D; Table 2). 3F6-hIgG1$_{HEK}$ and the KA variant interacted similarly with recombinant human FcγRs but the LALA variant was impaired for interaction with human FcγRIA and FcγRIIIA$_{V158}$ (FIG. 14E; Table 2). The KA variant exhibited slightly higher affinity to all mouse FcγRs as compared to 3F6-hIgG1$_{HEK}$; the LALA variant interacted considerably less well with mouse FcγRI and FcγRIV (FIG. 14F; Table 2). When administered to animals, the KA and LALA variants failed to restore body weight, reduce bacterial burden and abscesses in tissues 15 days post-infection with MRSA, revealing an inability to clear bacteria (FIG. 9A-C). The KA and LALA variants also failed to neutralize the B cell superantigen activity of SpA as reflected by the lack of a broad neutralizing antibody response (FIG. 14G). C1q binding to antibody triggers the classical complement pathway which results in the activation of C3 and C5 (29). Cobra venom factor (CVF) consumes C3 and C5 in mice (30,31). When administered to animals, CVF abrogated the ability of 3F6-hIgG1$_{HEK}$ to protect against MRSA challenge (FIG. 9D, 9E; FIG. 14H, 14I). Of note, CVF treatment of hIgG1-control animals further exacerbated MRSA disease suggesting an intrinsic (antibody-independent) effect of complement (FIG. 9D, 9E). Collectively, these findings indicate that C1q recruitment may be key to the therapeutic activity of anti-MRSA antibodies.

4. FcγRs Contribute to the Therapeutic Activity of 3F6-hIgG1$_{HEK}$

Antibody interaction with FcγRs can be modulated by fucosylation. Loss of fucosylation results in weaker and higher binding toward inhibitory and activating FcγRs, respectively (32). 3F6-hIgG1$_{HEK}$ is extensively fucosylated (FIG. 8B), a modification that may not be optimal for FcγR-mediated activity. To test this possibility, afucosylated 3F6-hIgG1$_{HEK}$ (3F6-hIgG1$_{HEK}$-afu) was produced by adding kifunensine to the culture medium in an effort to enrich for low fucose glycoforms. 3F6-hIgG1$_{HEK}$-afu retained its integrity and SpA$_{KKAA}$ binding (FIG. 15A, 15B). Lectin-based assays confirm the low-level fucosylation and galactosylation of 3F6-hIgG1$_{HEK}$-afu compared to 3F6-hIgG1$_{HEK}$ (FIG. 15C). Binding to C1q and inhibitory receptor, human FcγRIIB, was reduced; binding to activating receptors, human FcγRIIIA (both alleles) and mouse FcγRIII and FcγRIV, was enhanced (FIG. 15D-F, Table 2), thus effectively altering the activating-to-inhibitory (A/I) ratio of FcγRs (33). When transferred to animals, 3F6-hIgG1$_{HEK}$-afu controlled MRSA infection as reflected by the reduced weight loss, bacterial loads, abscesses, and broad antibody responses against secreted antigens (FIG. 9F-H, FIG. 15G). These results suggest that the therapeutic activity of 3F6-hIgG1$_{HEK}$ may be achieved both in complement and FcγRs-dependent manners in vivo.

5. Both Complement and FcγRs Contribute to the OPK Activity of 3F6-hIgG1$_{HEK}$ in Human Blood In addition to capturing immunoglobulins in a SpA and Sbi-dependent manner, S. aureus also exploits the host factors prothrombin and fibrinogen to induce the formation of fibrin agglutinates that shield bacteria from phagocytes. Secreted coagulases, Coa and vWbp, and surface-displayed C1fA are key factors involved in this process (34). Correlates of protection for vaccines are typically measured as the concentration of antibody able to induce opsonophagocytosis of a given pathogen by HL60 cells, i.e. human promyelocytic leukemia cells (35). Because this assay lacks hemostasis factors (prothrombin and fibrinogen), it is not adequate to evaluate the opsonophagocytic activity of antibodies against S. aureus. Earlier work developed a whole blood assay whereby enumeration of S. aureus after one hour incubation in freshly drawn anticoagulated blood is achieved by releasing bacteria from agglutinates upon treatment with the plasminogen activator, streptokinase (34). Using this assay, 3F6-hIgG1$_{HEK}$ promoted killing of MRSA in human blood. Pre-treatment of blood with cytochalasin D, an inhibitor of actin polymerization and thus phagocytosis, or pre-treatment with CVF, abrogated 3F6-hIgG1$_{HEK}$-mediated killing of MRSA in human blood (FIG. 10A, 10B). Neither the KA nor the LALA variant of 3F6-hIgG1$_{HEK}$ promoted opsonophagocytic killing. However, afucosylated 3F6-hIgG1$_{HEK}$ with reduced C1q binding and enhanced FcγR binding activity, promoted the killing of MRSA in human blood (FIG. 10C).

B. Discussion

The discovery that serum from infected animals contains antibacterial activity was readily exploited in the early 20$^{th}$ century, principally against diphtheria toxin (36). Broader spectrum drugs and antibiotics soon eclipsed serum therapy. To date, only a handful of therapeutic antibodies have been licensed for the prevention of infectious diseases (37). This is unlike the expanding number of mAbs for immune-mediated disorders and cancer (38). While target selection through Fab recognition is critical for success, disease amelioration is governed by the deployment of effector mechanisms mediated by the Fc regions of antibodies. Effector functions have been best characterized for anti-cancer antibodies for which the specific destruction of tumor cells or the enhancement of tumor-specific T cell immunity can be readily measured (39,40). Interactions with FcγRs trigger antibody-dependent cell-mediated cytotoxicity (ADCC) and antibody-dependent cell mediated phagocytosis (ADCP) of tumor cells (39,40). Interaction with C1q activates the classical complement pathway to promote the direct lysis of tumor cells upon insertion of the membrane attack complex (i.e. complement-dependent cytotoxicity, CDC), or the covalent deposition of opsonins such as C3b onto the cell surface. Complement receptors on effector cells bind opsonized targets promoting complement-dependent cell-mediated cytotoxicity (CDCC) and complement-dependent cell-mediated phagocytosis (CDCP) (41,42). The mode of action required for antibody-mediated elimination of bacterial pathogens is not as well understood.

The inventors have shown earlier that protection against S. aureus disease by candidate 3F6-hIgG1 correlates with the ability of this antibody to bind multiple IgBDs of SpA and block further interactions with Fcγ and Fab V$_H$3 domains of Ig (11). However, CHO cell-produced 3F6-hIgG1$_{CHO}$ displayed no therapeutic activity in a mouse model of MRSA infection. This was unlike 3F6-hIgG1 produced in HEK 293F cells. CHO cell is a non-human mammalian cell line, often selected for the commercial production of therapeutic proteins owing to high productivity and low operating costs (43). Lack of antibody activity could not be attributed to a reduced half-life in vivo or an inability to form immune complexes with SpA. Rather, the defect correlated with the low abundance of galactosylated antibodies in CHO cells as compared to HEK 293 cells (~30% vs ~58% G0F, ~48% vs ~28% G1F, and ~11% vs ~4% G2F) (44-46) suggesting altered Fc-mediated effector activity (25, 26, 47). Enzymatic addition of galactosyl residues enhanced the therapeutic activity of 3F6-hIgG1$_{CHO}$ while enzymatic de-galactosylation reduced the therapeutic activity of 3F6-hIgG1$_{HEK}$. Chemoenzymatic glycoengineering further demonstrated therapeutic activity for G1F and G2F glycoforms of 3F6-hIgG1 but not for G0F.

Both the length and substitutions of N-glycans at Asn297 have been shown to affect the stability of the polypeptide loop containing Asn297 and influence binding with FcγRs and C1q (25, 26, 47). Increased galactosylation of 3F6-hIgG1 and removal of sialic acid residues enhanced both human and mouse C1q binding in vitro without altering binding to mouse FcγRs. Overall, the activating-to-inhibitory ratio (calculated by dividing the affinity of antibody for activating receptors by the affinity for inhibitory receptors) was similar between 3F6-hIgG1$_{CHO}$ and 3F6-hIgG1$_{HEK}$. These in vitro data support the notion that the therapeutic activity of galactosylated 3F6-hIgG1 is C1q-dependent. In agreement with this model, antibodies with amino acid substitutions L233A/L234A or K322A displayed reduced C1q binding and failed to protect animals from MRSA bloodstream infection. Of note substitution K322A did not affect interactions with FcγRs at all.

SpA is extremely abundant on the surface of S. aureus. It is thus reasonable to hypothesize that the proximal binding of multiple 3F6-hIgG1-G2K molecules recruits C1q to activate the classical pathway of complement which converges in the assembly of C3 convertase (C4b2a). C3 convertase cleaves C3 into C3a and C3b; C3b can be covalently linked to the staphylococcal surface (opsonization) while C3a acts as a chemoattractant for phagocytes. High local concentrations of C3b activates the C5 convertase resulting in the production of the C5a chemoattractant and C5b, whose surface deposition promotes membrane attack complex formation (48). The thick peptidoglycan of S. aureus provides intrinsic resistance against CDC. Thus, it is likely that C3a and C5a production promote immune cell recruitment and degranulation while C3b likely promotes CDCP. In agreement with this notion, depletion of complement or addition of cytochalasin D in whole human blood prevented killing of MRSA in the presence of 3F6-hIgG1. The depletion of complement in animals prevented further therapeutic activity by 3F6-hIgG1. Interestingly, S. aureus deploys a vast array of secreted factors to block complement activation (reviewed in 49). SpA and Sbi IgBDs capture antibodies in a manner that prevents further C1q but not FcγR binding (49). Sbi carries two additional domains that associate with C3 and factor H (fH) to inhibit the alternative pathway (49). In addition, staphylococcal complement inhibitor (SCIN) and homologs, SCIN-B and SCIN-C, inhibit C3 convertase (C3 bBb). SCIN factors are encoded by many, but not all, human clinical isolates, and associate with human C3 convertase but not with other vertebrate convertases (49). Extracellular fibrinogen-binding protein (Efb) and its less conserved homolog, extracellular complement-binding protein (Ecb), bind C3d, a cleavage product of C3b that activates innate and adaptive responses by binding to complement receptor 2 (CR2). Efb and Ecb also inhibit mouse and human C3 bBb and C5 convertases while Ecb facilitates fH's activity (49). Staphylokinase associates with human plasminogen to cleave many factors including C3b and iC3b on bacterial surfaces (49).

These findings suggest that 3F6-hIgG1$_{HEK}$ may also engage FcγRs as long as fucosylation of N-glycans is prevented. This is in agreement with the notion that fucosylation weakens interactions with C1q and activating FcγRs while favoring interactions with inhibitory FcγRs$^{32}$. CRs and FcγRs are co-expressed on immune cells and engage in cross-talk activities. For example, C5a-C5aR interaction upregulates the expression of activating FcγRs (FcγRIII and FcγRIV), and downregulates the expression of inhibitory FcγRIIB (50,51). Thus, in vivo, the immediate effect of 3F6-hIgG1$_{HEK}$ may be the rapid and strong activation of complement; subsequent C—CR interactions such as C5a-C5aR may lead to an increased A/I ratio that may tip the threshold activation of FcγRs by 3F6-hIgG1$_{HEK}$.

C. Methods

1. Bacterial Strains, Mammalian Cell Lines and Growth Media.

Community-acquired methicillin-resistant S. aureus USA400 (MW2) was grown in tryptic soy broth or agar at 37° C. Suspension serum-free adapted FreeStyle™ 293-F cells (herein referred as HEK-293F cells) were cultured in FreeStyle™ 293 Expression Medium (Life Technologies) and maintained in a 5% CO$_2$ humidified incubator at 37° C. Kifunensine (Abcam), a small molecule inhibitor of the enzyme α-mannosidase I, was added directly to FreeStyle™ 293 Expression Medium at a final concentration of 200 ng/ml (52-54).

2. Construction, Expression, and Purification of Recombinant 3F6-hIgG1 and Variant Antibodies.

The clone encoding 3F6-hIgG1 was as described earlier (18,19). Briefly, plasmid encoding 3F6-hIgG1 was generated by swapping the coding sequences of the heavy and light chain genes of the mouse monoclonal antibody 3F6-mhIgG2a (55) into the expression vector pVITRO1-102.1F10-IgG1/λ (Addgene, #50366). This construct served as a template for further mutagenesis. Primers 5' TGAAGCCGCCGGGGGACCGT CAGTCTTCCT 3' (SEQ ID NO:11) and 5' CCCGGCGGCTTCAGGTGCTGGGCACGGTG 3' (SEQ ID NO:12) were used to generate the LALA variant, and primers 5' TGCGCCGTCTCCAAC AAAGCCCTCCCA 3' (SEQ ID NO:13) and 5' GACGGCGCACTTGTACTCCTTGCCAT 3' (SEQ ID NO:14) were used to generate the KA variant by site-directed mutagenesis as described (27). All new plasmids were transfected into HEK-293F cells using polyethylenimine (56). Candidate transfectants were selected using hygromycin B (400 µg/ml) and expanded in TripleFlask Cell Culture Flasks (ThermoFischer). 3F6-hIgG1$_{CHO}$ was produced using the dihydrofolate reductase-deficient mutant Chinese hamster ovary cell line DG44 as described earlier (19). Antibodies were affinity purified from supernatants of expanded cultures on protein A-sepharose (Sigma), and dialyzed to PBS as described earlier (11).

3. Enzymatic Modifications of Antibodies

Enzymatic galactosylation, de-galactosylation, and de-sialylation were performed as described (57). For galactosylation, 3F6-hIgG1$_{CHO}$ was dialyzed against 0.2 mM MES buffer pH 6.5 and incubated for 48 hours at 37° C. in the presence of 5 µg β1,4 GalT per mg antibody, 10 mM UDP-galactose, and 20 mM MnCl$_2$ (ProZyme, GKT-GA14). For de-galactosylation, 3F6-hIgG1$_{HEK}$ was dialyzed against 50 mM sodium phosphate buffer pH 6.0 and incubated with 6 mU β1-4-galactosidase (Millipore) per 100 µg antibody for 6 hours at room temperature followed by 1 hour at 37° C. For de-sialylation, 3F6-hIgG1$_{HEK}$ was buffer-exchanged to 50 mM sodium citrate pH 6.0 and de-sialylated by the addition of 70 units neuraminidase (New England Biolabs) for 48 hours at 37° C. Following these treatments, antibodies were re-purified using protein A-sepharose and dialyzed against PBS, as described above. Acrylamide gel electrophoresis and Coomassie blue staining were performed to examine antibody integrity and purity, and lectin-based enzyme-linked immunosorbent assay was used to confirm glycan modifications.

4. Chemoenzymatic Modifications of Antibodies

First, antibodies were fully de-glycosylatyed as described earlier (23). Briefly, antibodies produced from CHO or HEK cells in Tris-HCl buffer (50 mM, pH 8.0) were incubated with wild-type Endo-S2 (500:1 w/w) for 30 min at 37° C. in PBS buffer at pH 7.4. Release of N-glycans was verified by purifying antibodies over protein-A sepharose followed by LC-MS analysis. A single peak with observed mass (m/z) of 50117 Da after deconvolution, identified the heavy chain (Fucα1,6)GlcNAc-3F6 (calculated m/z 50116 Da). Next, antibodies ((Fucα1,6)GlcNAc-3F6 10 mg/mL, 0.69 mM) and glycan oxazolines (13.8 mM, 20 equivalents) were incubated with Endo-S2 D184M at a final concentration of 0.05 mg/ml at 30° C. in 300 µL of 100 mM Tris-HCl buffer (pH 7.4) for 30 min. Reaction products were purified over protein-A sepharose and confirmed by LC-MS. The observed m/z for chemoenzymatically glycoengineered heavy chains were 515237 Da for 3F6-hIgG$_{HEK}$-G2F and 3F6-hIgGcHo-G2F, 51375 Da for 3F6-hIgG$_{HEK}$-G1F, and 51212 Da for 3F6-hIgG$_{HEK}$-G0F. These values are in-agreement with calculated m/z of 51538, 51376 Da and 51213 Da, respectively.

5. N-Glycan Analysis

N-linked glycosylation of antibody was examined essentially as described (58,59). Briefly, 2 mg of denatured 3F6-hIgG1$_{HEK}$ or 3F6-hIgG1$_{CHO}$ antibodies were mixed with 200 µl preconditioned Aminolink plus coupling resin (Thermo Scientific) at room temperature for 4 hours on a tube shaker for end-over-end mixing. 55 µl of 500 mM NaCNBH$_3$ in PBS was added to the antibody-resin mix for another 4 hours. The active aldehyde sites were blocked by adding 50 mM NaCNBH$_3$ prepared in 1 M Tris-HCl. Next, 465 µl of p-toluidine-EDC (400 µl 1 M p-toluidine, 40 µl EDC, and 25 µl HCl [36-38%, vol/vol]) was added to the resin to derivatize sialic acid. N-glycans were released by PNGase F (New England Biolabs) and purified over a Carbograph SPE column (Columbia). 1 µl of N-glycan sample was added to 1 µl 2,5-Dihydroxybenzoic acid (DHB)-N,N-Dimethylacetamide (DMA) matrix (4 µl of DMA in 200 µl of 100 µg/DHB dissolved in 50% acetonitrile and 0.1 mM NaCl) spotted onto the stainless steel MALDI plate and analyzed by a MALDI-TOF mass spectrometer (Bruker) in a positive mode. A total of 1000 laser shots were acquired for each sample spot. Data processing was performed with DataExplorer 4.0. The peak area of each glycoform was divided by the summed area of all glycoforms to derive a percentage value for each glycoform. From these percentages, the inventors calculated several derived traits using the following formulas: fucosylation (H3N2F1+H3N3F1+H4N3F1+H3N4F1+H4N4F1+H3N5F+H4N3F1S1+H4N5F1+H5N4F1S1+H5N5F1+H4N4F1S1+H5N4F1S1+H4N5F1S1+H5N5F1S1+H5N4F1S2), galactosylation [(H4N3F1+H4N4+H3N3S1+H6N3+H4N4F1+H4N3F1S1+H4N5F1+H4N4F1S1+H4N5F1S1)*0.5+H5N4+H5N4F1+H5N4F1S1+H5N5F1+H4N4F1S1+H5N5F1S1+H5N4F1S2], sialylation [(H3N3S1+H4N3F1S1+H5N4F1S1+H4N4F1S1+H5N4F1S1+H4N5F1S1+H5N5F1S1)*0.5+H5N4F1S2] (46).

6. Enzyme-Linked Immunosorbent Assays

Binding measurements to SpA$_{KKAA}$ was performed in microtiter plates (Nunc Maxisorp) coated with 1 µg/m SpA$_{KKAA}$ in 0.1 M carbonate buffer (pH 9.5) at 4° C. overnight. Wells were blocked before incubation with serial concentrations of test antibodies. Immune complexes were quantified following incubation with horseradish peroxidase (HRP)-conjugated human IgG (1:15,000, Bio-rad). To measure inhibition of SpA binding to human IgG, microtiter plates were coated overnight with SpA 10 µg/ml and blocked. Next, plates were incubated with 200 µg/ml of hIgG1 isotype control antibody (Fisher Scientific) or 3F6 test antibodies prior to incubation with HRP-conjugated human IgG (1 µg/ml, Jackson ImmunoResearch). To measure binding to human neonatal Fc receptor (FcRn), microtiter plates were coated with serial dilutions of purified 3F6-hIgG1$_{HEK}$ and 3F6-hIgG1$_{CHO}$ overnight. After blocking, wells were incubated with biotinylated FcRn (2 µg/ml, Immunitrack) for 2 hours at pH 6.0 prior to incubation with HRP-conjugated streptavidin (4 µg/ml, New England Biolabs). To measure binding to human and mouse C1q, microtiter plates were coated overnight with either 20 µg/ml human C1q (CompTech) or 100 µl of BALB/c (Jackson Laboratory) mouse serum, respectively. After blocking, plates were incubated for 2 hours at room temperature with serial dilutions of test antibodies prior to incubation with HRP-conjugated human IgG (1 µg/ml). To measure binding to Fcγ receptors (FcγRs), the recombinant His-tagged human or mouse FcγR proteins (2 µg/ml each) were captured on microtiter plates coated with an anti-poly-histidine antibody (4 µg/ml, Biolegend). After washing, serial dilutions of test antibodies were added and complexes were detected using HRP-labeled goat anti-human IgG F(ab')2 secondary antibody (Jackson). To measure glycan residues in test antibodies, recombinant biotinylated lectins (*Aleuria aurantia* lectin, AAL; *Lens culinaris* agglutinin, LCA; *Erythrina cristagalli* lectin, ECL; *Sambucus nigra* lectin, SNA) were obtained from Vector Laboratories. Microtiter plates were coated overnight with serial dilutions of test antibodies. After blocking, wells were incubated with indicated concentrations of biotinylated lectins prior to incubation with HRP-conjugated streptavidin. All plates were developed using OptEIA reagent (BD Biosciences). Experiments were performed in triplicate to calculate averages and standard error of the mean, and repeated for reproducibility.

7. Animal Experiments.

BALB/c mice (6-7 weeks of age) were obtained from Jackson Laboratory. For passive immunization studies, animals were injected into the peritoneum with 5 mg/kg of indicated antibody 16 hours before challenge. When indicated, animals were simultaneously injected with 0.375 mg/kg of cobra venom factor (CVF, CompTech). For challenge with *S. aureus*, animals were anesthetized with a cocktail of ketamine-xylazine (100 and 20 mg/kg). Cultures of USA400 (MW2) were grown to an absorbance at 600 nm of 0.42, and bacteria were washed in PBS once and adjusted to a suspension of $6.5 \times 10^7$ CFU/ml (Colony Forming Unit). 100 µl of this suspension was injected into the periorbital venous plexus of anesthetized animals (groups of $10^{-20}$). Animals were monitored for clinical signs of disease and weighed daily for 14 days. On day 15, mice were killed by carbon dioxide inhalation and necropsied to remove kidneys. Surface abscesses visible on intact kidneys were enumerated. One kidney per animal was fixed in 4% formalin for 24 h at room temperature; tissues were embedded in paraffin, thin sectioned, stained with hematoxylin-eosin, and inspected by light microscopy to visualize and enumerate internal abscess lesions. The second kidney was weighed, homogenized, serially diluted, and plated on agar to count bacterial burden in tissues (CFU/g of tissue). To measure the half-life of test antibodies, mice (groups of 5) were injected into the peritoneal cavity with antibodies (5 mg/kg of body weight). After 1 and 4 hours, and after 1, 2, 3, 7, 13, 16, 23, and 28 days, periorbital venous blood was obtained and plasma samples analyzed by ELISA. Plasma antibody concentrations were calculated using a standard curve of 3F6-hIgG1$_{HEK}$ and 3F6-hIgG1$_{CHO}$ diluted in mouse plasma at a range of 1-500 ng/ml. Half-lives were calculated using $N_t = N_0 (1/2)^{t/t1/2}$, where No is the highest concentration of 3F6 antibodies, N(t) is the non-decayed concentration at time t, and t½ is the half-life of the decaying concentration.

8. Staphylococcal Antigen Matrix.

Nitrocellulose membranes were blotted with 2 µg of affinity-purified recombinant His-tagged staphylococcal proteins. After blocking with 5% degranulated milk, membranes were incubated with diluted mouse sera (1:10,000 dilution) followed by IRDye 680-conjugated goat anti-mouse IgG (Li-Cor). Signal intensities were quantified using the Odyssey infrared imaging system (Li-Cor).

9. Staphylococcal Survival in Blood.

To measure staphylococcal survival in vitro, hIgG1 control antibody, 3F6-hIgG1$_{HEK}$, or other variants of 3F6-hIgG1$_{HEK}$ were added to 0.5 mL of freshly drawn human blood anticoagulated with 5 μg/mL desirudin. Where indicated, blood was pre-incubated for 10 minutes with cytochalasin D (CD, 0.04 mM) or 30 minutes with CVF (5 μg per milliliter of blood). At time 0, a 50 μL bacterial suspension in phosphate-buffered saline (PBS) (5×10$^6$ colony-forming units, CFU) was added to the blood. After incubation at 37° C. for 0 minutes or 60 minutes, PBS containing 0.5% saponin, 100 U streptokinase (SK), 50 μg trypsin, 1 μg DNase, and 5 μg RNase (termed SK lysis buffer) were added to each sample for 10 minutes at 37° C. prior to plating on agar for CFU enumeration. Assays were performed in duplicate and repeated for reproducibility.

10. Statistical Analyses.

Staphylococcal survival in blood and the statistical significance of ELISA data were analyzed with the two-tailed Student's t-test. Bacterial loads and abscess numbers in renal tissues were analyzed by the two-tailed Mann-Whitney test or one-way ANOVA with Kruskal-Wallis test. All statistical analyses were performed using GraphPad Prism, version 5.0 (GraphPad Software, Inc., La Jolla USA). Statistical significance was indicated as follows: ns, not significant; *, P<0.05; **, P<0.01.

D. Tables

TABLE 1

Association constants for the binding of glycoengineered 3F6-hIgG1 to ligands measured by ELISA.

| Antibody | | 3F6-hIgG1$_{CHO}$ | | | |
| --- | --- | --- | --- | --- | --- |
| Ligand | K$_a$ (M$^{-1}$) | WT[a] | Gal[b] | deSia[c] | G2F |
| SpA$_{KKAA}$ | 10$^{10}$ | 2.54 ± 0.46 | 2.74 ± 0.23 | 2.85 ± 0.33 | 1.93 ± 0.13 |
| Human C1q | 10$^6$ | 4.91 ± 0.24 | 21.7 ± 1.71 | 5.50 ± 0.15 | 51.1 ± 6.57 |
| Mouse C1q | 10$^6$ | 8.87 ± 0.59 | | | ND[d] |

| Antibody | | 3F6-hIgG1$_{HEK}$ | | | | | |
| --- | --- | --- | --- | --- | --- | --- | --- |
| Ligand | K$_a$ (M$^{-1}$) | WT[a] | deGal[e] | deSia[c] | G0F | G1F | G2F |
| SpA$_{KKAA}$ | 10$^{10}$ | 2.44 ± 0.52 | 2.86 ± 0.33 | 2.90 ± 0.32 | 2.34 ± 0.13 | 2.24 ± 0.16 | 1.93 ± 0.16 |
| Human C1q | 10$^6$ | 18.7 ± 4.0 | 4.0 ± 0.70 | 33.7 ± 3.74 | 6.94 ± 0.39 | 38.3 ± 3.58 | 55.0 ± 6.03 |
| Mouse C1q | 10$^6$ | 60.8 ± 7.44 | | | ND[d] | | |

[a]WT: wild-type;
[b]Gal: Galactosylated;
[c]deSia: deSialylated;
[d]ND: Not Determined;
[e]deGal: deGalactosylated

TABLE 2

Association constants for the binding of 3F6-hIgG1$_{CHO}$ or 3F6-hIgG1$_{HEK}$ variants to ligands measured by ELISA.

| | | | 3F6-hIgG1$_{CHO}$ | 3F6-hIgG1$_{HEK}$ | | | |
| --- | --- | --- | --- | --- | --- | --- | --- |
| | Ligands | Ka (M$^{-1}$) | WT[a] | WT | KA[b] | LALA[c] | afu[d] |
| Human | SpA$_{KKAA}$ | 10$^{10}$ | 2.54 ± 0.46 | 2.44 ± 0.52 | 2.85 ± 0.26 | 2.94 ± 032 | 2.50 ± 0.25 |
| | C1q | 10$^6$ | 4.91 ± 0.24 | 18.7 ± 4.0 | 1.37 ± 0.62 | 2.04 ± 1.18 | 5.97 ± 0.31 |
| | FcγRIA | 10$^8$ | 7.66 ± 1.35 | 7.88 ± 1.51 | 7.86 ± 1.89 | 0.026 ± 0.086 | 5.83 ± 4.15 |
| | FcγRIIA (R131) | 10$^6$ | 2.36 ± 0.39 | 1.53 ± 0.18 | 1.81 ± 0.18 | 0.99 ± 0.11 | 1.82 ± 0.25 |
| | FcγRIIA (H131) | 10$^6$ | 1.75 ± 0.30 | 1.13 ± 0.16 | 1.23 ± 0.28 | 0.46 ± 0.029 | 1.51 ± 0.46 |
| | FcγRIIB | 10$^5$ | 16.5 ± 1.92 | 9.25 ± 2.23 | 11.8 ± 1.55 | 8.38 ± 2.45 | 1.79 ± 0.88 |
| | FcγRIIIA (V158) | 10$^7$ | 2.75 ± 0.50 | 2.31 ± 0.44 | 1.40 ± 0.12 | 0.26 ± 0.14 | 5.63 ± 0.94 |
| | FcγRIIIA (F158) | 10$^6$ | 3.09 ± 0.33 | 1.97 ± 0.25 | 1.51 ± 0.34 | 0.85 ± 0.18 | 9.20 ± 0.14 |
| Mouse | C1q | 10$^6$ | 8.87 ± 0.59 | 60.8 ± 7.44 | 1.34 ± 0.30 | 2.91 ± 0.12 | 2.79 ± 0.16 |
| | FcγRI | 10$^8$ | 1.77 ± 0.44 | 1.84 ± 0.48 | 3.97 ± 0.34 | 0.021 ± 0.078 | 0.92 ± 0.094 |
| | FcγRIIB | 10$^6$ | 1.53 ± 0.26 | 1.61 ± 0.21 | 3.35 ± 0.48 | 1.60 ± 0.18 | 1.62 ± 0.12 |
| | FcγRIII | 10$^6$ | 1.49 ± 0.16 | 1.69 ± 0.19 | 2.96 ± 0.40 | 1.72 ± 0.21 | 2.30 ± 0.34 |
| | FcγRIV | 10$^8$ | 1.15 ± 0.20 | 1.35 ± 0.43 | 2.66 ± 0.88 | 0.09 ± 0.019 | 3.19 ± 0.38 |

[a]WT: wild-type;
[b]KA: K322A substitution;
[c]LALA: L233A/L234A substitutions;
[d]afu: afucosylated.

SUPPLEMENTARY TABLE 1

Supplementary Table 1: Abundance and composition of glycoforms for antibodies 3F6-hIgG1$_{CHO}$ and 3F6-hIgG1$_{HEK}$

| | m/z | Intensity | Relative intensity | Glycoform composition | Glycoform designation | Fucosylation (%) | Galacto-sylation (%) | Sialylation (%) | Terminal Galactosylation (%) |
|---|---|---|---|---|---|---|---|---|---|
| Antibody 3F6-MgG1$_{CHO}$ | 1180.46 | 48236 | 0.81 | H3N2F1 | G0F | 0.81 | | | |
| | 1257.40 | 94366 | 1.58 | H5N2 | G0 | | | | |
| | 1282.43 | 218423 | 3.67 | H3N3F1 | G0F | 3.67 | | | |
| | 1339.43 | 54270 | 0.91 | H3N4 | G0 | | | | |
| | 1419.40 | 20791 | 0.35 | H6N2 | G0 | | | | |
| | 1444.42 | 66752 | 1.12 | H4N3F1 | G1F | 1.12 | 0.56 | | 0.56 |
| | 1485.45 | 3289243 | 55.22 | H3N4F1 | G0F | 55.22 | | | |
| | 1501.43 | 51049 | 0.86 | H4N4 | G1 | | 0.43 | | 0.43 |
| | 1621.41 | 32779 | 0.55 | H6N3 | G1 | | 0.28 | | 0.28 |
| | 1647.43 | 1714307 | 28.78 | H4N4F1 | G1F | 28.78 | 14.39 | | 14.39 |
| | 1663.42 | 27762 | 0.47 | H5N4 | G2 | | 0.47 | | 0.47 |
| | 1688.45 | 26419 | 0.44 | H3N5F | G0F | 0.44 | | | |
| | 1809.41 | 223258 | 3.75 | H5N4F1 | G2F | 3.75 | 3.75 | | 3.75 |
| | 1824.43 | 17355 | 0.29 | H4N3F1S1 | G1FS1 | 0.29 | 0.15 | 0.15 | |
| | 1850.42 | 30333 | 0.51 | H4N5F1 | bG1F | 0.51 | 0.25 | | 0.25 |
| | 2012.41 | 17266 | 0.29 | H5N5F1 | bG2F | 0.29 | 0.29 | | 0.29 |
| | 2189.39 | 11014 | 0.18 | H5N4F1S1 | G2FS1 | 0.18 | 0.18 | 0.09 | |
| | 2569.41 | 12854 | 0.22 | H5N4F1S2 | G2FS2 | 0.22 | 0.22 | 0.22 | |
| Total intensity % | | 5956477 | 100.00 | | | 95.28 | 20.96 | 0.45 | 20.41 |
| Antibody 3F6-hIgG1$_{HEK}$ | 1180.47 | 44011 | 0.53 | H3N2F1 | G0F | 0.53 | | | |
| | 1257.37 | 26708 | 0.32 | H5N2 | G0 | | | | |
| | 1282.39 | 38257 | 0.46 | H3N3F1 | G0F | 0.46 | | | |
| | 1339.40 | 20127 | 0.24 | H3N4 | G0 | | | | |
| | 1444.40 | 49676 | 0.60 | H4N3F1 | G1F | 0.60 | 0.30 | | 0.30 |
| | 1485.41 | 2442112 | 29.48 | H3N4F1 | G0F | 29.48 | | | |
| | 1501.39 | 36362 | 0.44 | H4N4 | G1 | | 0.22 | | 0.22 |
| | 1517.92 | 65782 | 0.79 | H3N3S1 | G1S1 | | 0.40 | 0.40 | |
| | 1621.36 | 32430 | 0.39 | H6N3 | G1 | | 0.20 | | 0.20 |
| | 1647.40 | 3998875 | 48.27 | H4N4F1 | G1F | 48.27 | 24.14 | | 24.14 |
| | 1663.39 | 39340 | 0.47 | H5N4 | G2 | | 0.47 | | 0.47 |
| | 1688.42 | 24428 | 0.29 | H3N5F | G0F | 0.29 | | | |
| | 1809.38 | 900519 | 10.87 | H5N4F1 | G2F | 10.87 | 10.87 | | 10.87 |
| | 1824.36 | 49008 | 0.59 | H4N3F1S1 | G1FS1 | 0.59 | 0.30 | 0.30 | |
| | 1850.38 | 39902 | 0.48 | H4N5F1 | bGIF | 0.48 | 0.24 | | 0.24 |
| | 1986.36 | 59853 | 0.72 | H5N4F1S1 | G2FS1 | 0.72 | 0.72 | 0.36 | 0.36 |
| | 2012.34 | 22622 | 0.27 | H5N5F1 | bG2F | 0.27 | 0.27 | | 0.27 |
| | 2027.39 | 69477 | 0.84 | H4N4F1S1 | G1FS1 | 0.84 | 0.42 | 0.42 | |
| | 2189.35 | 73202 | 0.88 | H5N4F1S1 | G2FS1 | 0.88 | 0.88 | 0.44 | 0.44 |
| | 2230.37 | 72171 | 0.87 | H4N5F1S1 | G1FS1 | 0.87 | 0.44 | 0.44 | |
| | 2392.36 | 79908 | 0.96 | H5N5F1S1 | bG2FSl | 0.96 | 0.96 | 0.48 | 0.48 |
| | 2569.48 | 99044 | 1.20 | H5N4F1S2 | G2FS2 | 1.20 | 1.20 | 1.20 | |
| Total intensity % | | 8283814 | 100.00 | | | 97.34 | 42.03 | 4.03 | 38.00 |

E. REFERENCES FOR EXAMPLE 2

The following references, to the extent that they provide exemplary procedural or other details supplementary to those set forth herein, are specifically incorporated herein by reference.

1 Kuehnert, M. J. et al. Prevalence of Staphylococcus aureus nasal colonization in the United States, 2001-2002. J. Infect. Dis. 193, 172-179 (2006).
2 van Belkum, A. et al. Co-evolutionary aspects of human colonisation and infection by Staphylococcus aureus. Infect Genet Evol 9, 32-47, doi:10.1016/j.meegid.2008.09.012 (2009).
3 von Eiff, C., Becker, K., Machka, K., Stammer, H. & Peters, G. Nasal carriage as a source of Staphylococcus aureus bacteremia. Study Group. N Engl J Med 344, 11-16, doi:10.1056/NEJM200101043440102 (2001).
4 Daum, R. S. et al. A placebo-controlled trial of antibiotics for smaller skin abscesses. N. Engl. J. Med. 376, 2545-2555 (2017).
5 Tong, S. Y., Davis, J. S., Eichenberger, E., Holland, T. L. & Fowler, V. G. J. Staphylococcus aureus infections: epidemiology, pathophysiology, clinical manifestations, and management. Clin. Microbiol. Rev. 28, 603-661 (2015).
6 Lessa, F. C. et al. Impact of USA300 methicillin-resistant Staphylococcus aureus on clinical outcomes of patients with pneumonia or central line-associated bloodstream infections. Clin. Infect. Dis. 55, 232-241 (2012).
7 Missiakas, D. & Schneewind, O. Staphylococcus aureus vaccines: deviating from the carol. J. Exp. Med. 231, 1645-1653 (2016).
8 Falugi, F., Kim, H. K., Missiakas, D. M. & Schneewind, O. The role of protein A in the evasion of host adaptive immune responses by Staphylococcus aureus mBio 4, e00575-00513 (2013).
9 van Loghem, E., Frangione, B., Recht, B. & Franklin, E. C. Staphylococcal protein A and human IgG subclasses and allotypes. Scand. J. Immunol. 15, 275-278 (1982).

10 Zhang, L., Jacobsson, K., Strom, K., Lindberg, M. & Frykberg, L. *Staphylococcus aureus* expresses a cell surface protein that binds both IgG and beta2-glycoprotein I. Microbiology 145, 177-183 (1999).

11 Kim, H. K. et al. Protein A-specific monoclonal antibodies and prevention of *Staphylococcus aureus* disease in mice. Infection and immunity 80, 3460-3470, doi:10.1128/IAI.00230-12 (2012).

12 Kim, H. K., Cheng, A. G., Kim, H. Y., Missiakas, D. M. & Schneewind, O. Non-toxigenic protein A vaccine for methicillin-resistant *Staphylococcus aureus* infections. J. Exp. Med. 207, 1863-1870 (2010).

13 Forsgren, A. & Nordstrom, K. Protein A from *Staphylococcus aureus*: the biological significance of its interaction with IgG. Ann. N. Y. Acad. Sci. 236, 252-266 (1974).

14 Forsgren, A., Svedjelund, A. & Wigzell, H. Lymphocyte stimulation by protein A of *Staphylococcus aureus*. Eur. J. Immunol. 6, 207-213 (1976).

15 Kim, H. K., Falugi, F., Missiakas, D. & Schneewind, O. Peptidoglycan-linked protein A promotes T-cell dependent antibody expansion during *Staphylococcus aureus* infection. Proc. Natl. Acad. Sci. USA 113, 5718-5723 (2016).

16 Pauli, N. T. et al. *Staphylococcus aureus* infection induces protein A-mediated immune evasion in humans. The Journal of experimental medicine 211, 2331-2339, doi:10.1084/jem.20141404 (2014).

17 Kim, H. K., Falugi, F., Thomer, L., Missiakas, D. M. & Schneewind, O. Protein A suppresses immune responses during *Staphylococcus aureus* bloodstream infection in guinea pigs. MBio 6, doi:10.1128/mBio.02369-14 (2015).

18 Chen, X., Sun, Y., Missiakas, D. & Schneewind, O. *Staphylococcus aureus* Decolonization of Mice With Monoclonal Antibody Neutralizing Protein A. The Journal of infectious diseases 219, 884-888, doi:10.1093/infdis/jiy597 (2019).

19 Thammavongsa, V., Rauch, S., Kim, H. K., Missiakas, D. M. & Schneewind, O. Protein A-neutralizing monoclonal antibody protects neonatal mice against *Staphylococcus aureus*. Vaccine 33, 523-526, doi:10.1016/j.vaccine.2014.11.051 (2015).

20 Jefferis, R. Glycosylation as a strategy to improve antibody-based therapeutics. Nat Rev Drug Discov 8, 226-234, doi:10.1038/nrd2804 (2009).

21 Wang, L. X. & Lomino, J. V. Emerging technologies for making glycan-defined glycoproteins. ACS Chem. Biol. 7, 110-122, doi:10.1021/cb200429n (2012).

22 Wang, L. X. & Amin, M. N. Chemical and chemoenzymatic synthesis of glycoproteins for deciphering functions. Chemistry & biology 21, 51-66, doi:10.1016/j.chembiol.2014.01.001 (2014).

23 Huang, W., Giddens, J., Fan, S. Q., Toonstra, C. & Wang, L. X. Chemoenzymatic glycoengineering of intact IgG antibodies for gain of functions. J. Am. Chem. Soc. 134, 12308-12318, doi:10.1021/ja3051266 (2012).

24 Li, T., Tong, X., Yang, Q., Giddens, J. P. & Wang, L. X. Glycosynthase Mutants of Endoglycosidase S2 Show Potent Transglycosylation Activity and Remarkably Relaxed Substrate Specificity for Antibody Glycosylation Remodeling. The Journal of biological chemistry 291, 16508-16518, doi:10.1074/jbc.M116.738765 (2016).

25 Quast, I. et al. Sialylation of IgG Fc domain impairs complement-dependent cytotoxicity. The Journal of clinical investigation 125, 4160-4170 (2015).

26 Subedi, G. P. & Barb, A. W. in MAbs. 1512-1524 (Taylor & Francis).

27 Hezareh, M., Hessell, A. J., Jensen, R. C., van de Winkel, J. G. & Parren, P. W. Effector function activities of a panel of mutants of a broadly neutralizing antibody against human immunodeficiency virus type 1. Journal of Virology 75, 12161-12168 (2001).

28 Hessell, A. J. et al. Fc receptor but not complement binding is important in antibody protection against HIV. Nature 449, 101 (2007).

29 Rus, H., Cudrici, C. & Niculescu, F. The role of the complement system in innate immunity. Immunologic research 33, 103-112 (2005).

Vogel, C. W. & Fritzinger, D. C. Cobra venom factor: structure, function, and humanization for therapeutic complement depletion. Toxicon 56, 1198-1222 (2010).

31 Vogel, C. W. & Müller-Eberhand, H. J. Cobra venom factor: improved method for purification and biochemical characterization. Journal of immunological methods 73, 203-220 (1984).

32 Gasdaska, J. R., Sherwood, S., Regan, J. T. & Dickey, L. F. An afucosylated anti-CD20 monoclonal antibody with greater antibody-dependent cellular cytotoxicity and B-cell depletion and lower complement-dependent cytotoxicity than rituximab. Molecular immunology 50, 134-141 (2012).

33 Nimmerjahn, F., Bruhns, P., Horiuchi, K. & Ravetch, J. V. FcgammaRIV: a novel FcR with distinct IgG subclass specificity. Immunity 23, 41-51 (2005).

34 Thomer, L., Schneewind, O. & Missiakas, D. Pathogenesis of *Staphylococcus aureus* Bloodstream Infections. Annu Rev Pathol 11, 343-364, doi:10.1146/annurev-pathol-012615-044351 (2016).

35 Plotkin, S. A. Vaccines: correlates of vaccine-induced immunity. Clin Infect Dis 47, 401-409, doi:10.1086/589862 (2008).

36 Kaufmann, S. H. E. Immunology's Coming of Age. Front Immunol 10, 684, doi:10.3389/fimmu.2019.00684 (2019).

37 Lu, L. L., Suscovich, T. J., Fortune, S. M. & Alter, G. Beyond binding: antibody effector functions in infectious diseases. Nat Rev Immunol 18, 46-61, doi:10.1038/nri.2017.106 (2018).

38 Kaplon, H. & Reichert, J. M. Antibodies to watch in 2019. MAbs 11, 219-238, doi:10.1080/19420862.2018.1556465 (2019).

39 van de Donk, N. W. et al. Monoclonal antibodies targeting CD38 in hematological malignancies and beyond. Immunol Rev 270, 95-112, doi:10.1111/imr.12389 (2016).

40 Weiner, G. J. Building better monoclonal antibody-based therapeutics. Nat Rev Cancer 15, 361-370, doi:10.1038/nrc3930 (2015).

41 Ricklin, D., Hajishengallis, G., Yang, K. & Lambris, J. D. Complement: a key system for immune surveillance and homeostasis. Nat Immunol 11, 785-797, doi:10.1038/ni.1923 (2010).

42 Dunkelberger, J. R. & Song, W. C. Complement and its role in innate and adaptive immune responses. Cell Res 20, 34-50, doi:10.1038/cr.2009.139 (2010).

43 Butler, M. & Spearman, M. The choice of mammalian cell host and possibilities for glycosylation engineering. Current opinion in biotechnology 30, 107-112 (2014).

44 Ferrara, C. et al. Unique carbohydrate-carbohydrate interactions are required for high affinity binding between FcγRIII and antibodies lacking core fucose. Proceedings of the National Academy of Sciences 108, 12669-12674 (2011).

45 Malphettes, L. et al. Highly efficient deletion of FUT8 in CHO cell lines using zinc-finger nucleases yields cells that produce completely nonfucosylated antibodies. Biotechnology and bioengineering 106, 774-783 (2010).

46 Dekkers, G. et al. Decoding the human immunoglobulin G-glycan repertoire reveals a spectrum of Fc-receptor- and complement-mediated-effector activities. Frontiers in immunology 8, 877 (2017).

47 Kaneko, Y., Nimmerjahn, F. & Ravetch, J. V. Anti-inflammatory activity of immunoglobulin G resulting from Fc sialylation. science 313, 670-673 (2006).

48 Heesterbeek, D. A., Angelier, M. L., Harrison, R. A. & Rooijakkers, S. H. Complement and bacterial infections: from molecular mechanisms to therapeutic applications. Journal of innate immunity 10, 455-464 (2018).

49 Thammavongsa, V., Kim, H. K., Missiakas, D. & Schneewind, O. Staphylococcal manipulation of host immune responses. Nat Rev Microbiol 13, 529-543, doi:10.1038/nrmicro3521 (2015).

50 Shushakova, N. et al. C5a anaphylatoxin is a major regulator of activating versus inhibitory FcγRs in immune complex-induced lung disease. The Journal of clinical investigation 110, 1823-1830 (2002).

51 Syed, S. N. et al. Both FcγRIV and FcγRIII are essential receptors mediating type II and type III autoimmune responses via FcRγ-LAT-dependent generation of C5a. European journal of immunology 39, 3343-3356 (2009).

52 Zhou, Q. et al. Development of a simple and rapid method for producing nonfucosylated oligomannose containing antibodies with increased effector function. Biotechnology and bioengineering 99, 652-665 (2008).

53 Yu, M. et al. in MAbs. 475-487 (Taylor & Francis).

54 Wada, R., Matsui, M. & Kawasaki, N. in MAbs. 350-372 (Taylor & Francis).

55 Kim, H. K., Thammavongsa, V., Schneewind, O. & Missiakas, D. Recurrent infections and immune evasion strategies of *Staphylococcus aureus*. Curr. Opin. Microbiol. 15, 92-99 (2012).

56 Longo, P. A., Kavran, J. M., Kim, M. S. & Leahy, D. J. in Methods in enzymology Vol. 529 227-240 (Elsevier, 2013).

57 Quast, I., Maurer, M. A. & Lünemann, J. D. Generation of IgG-Fc glycovariants using recombinant glycosidases and glycosyltransferases. The Journal of clinical investigation (2015).

58 Yang, S. & Zhang, H. Glycomic analysis of glycans released from glycoproteins using chemical immobilization and mass spectrometry. Current protocols in chemical biology 6, 191-208 (2014).

59 Chung, C. y. et al. Combinatorial genome and protein engineering yields monoclonal antibodies with hypergalactosylation from CHO cells. Biotechnology and bioengineering 114, 2848-2856 (2017).

Example 3: IgG1 Fcγ Variants Refractory to Interference by *Staphylococcus aureus* Immunoglobulin Binding Proteins (IBPs)

*Staphylococcus aureus* evades opsonophagocytic clearance by producing Staphylococcal protein A (SpA), a surface protein that binds the Fc region of immunoglobulin G (IgG). This interaction prevents C1q recruitment and opsonization and killing of bacteria (reviewed by (1)). The inventors earlier developed and described the mouse monoclonal antibody 3F6-mhIgG2a that binds and neutralizes staphylococcal protein A (SpA) and staphylococcal binder of immunoglobulin (Sbi)(2, 3). The inventors transferred the complementarity-determining regions (CDRs) of 3F6-mhIgG2a onto human IgG1 (hIgG1). The newly humanized hIgG1 antibody (3F6-hIgG1) improved the outcome of MRSA bloodstream infections in experimental animals (4). The inventors also observed that N-glycan substitutions G1F and G2F but not G0F at Asn297 were critical for C1q binding and complement-mediated bacterial clearance (5). Alternatively, enzymatic inhibition of fucosylation, yielding glycoform variants G1 and G2 at Asn297, also promoted bacterial killing albeit that killing was mediated by engaging FcγRs (5).

Here, the inventors introduce amino acid substitutions in the Fcγ domain of 3F6-hIgG1 to prevent interference by the immunoglobulin binding proteins (IBPs): SpA, Sbi and SSL10. The new variants are tested for effector binding to C1q, Fcγ receptors, and neonatal Fc receptor (FcRn) in vitro as well as for their plasma half-life in mice and opsonophagocytic killing (OPK) of *S. aureus* in human whole blood. The inventors use tefibazumab (anti-C1fA IgG1; tefi) (6) as a calibrating standard to quantify the impact of such Fcγ amino acid substitutions on the activity of therapeutic antibodies.

A. Results

1. Variants 3F6-hIgG1$^{AESP}$ and 3F6-hIgG1$^R$ Display Improved Binding to SpA The inventors previously derived the anti-SpA antibody (3F6-mhIgG2a) from SpA$_{KKAA}$ vaccination of mice. This antibody binds to the immunoglobulin binding domains (IgBDs) of SpA and competitively blocks the association of SpA with IgG-Fc and V$_H$3-clonal variant heavy chains (2). The humanized antibody 3F6-hIgG1 produced from HEK 293F cells exhibits anti-staphylococcal activity in animal models of infection and promotes opsonophagocytic killing in human blood (example 2 herein). However, while the interaction between the CDR of 3F6-hIgG1 and SpA is highly specific, the Fc region of the antibody is still a ligand for SpA causing interference with the formation of effective immune complexes. This interference is best appreciated by comparing the binding affinity of 3F6-hIgG1 for SpA and SpAKKAA a modified SpA protein that can no longer interact with the Fc region of antibodies (KK substitutions) or V$_H$3 Fab (AA substitutions). 3F6-hIgG1 displayed a greater affinity toward SpA$_{KKAA}$, as a control hIgG1 interacted with SpA but not with SpA$_{KKAA}$ (FIG. 17a). The murine antibody 3F6-mIgG2a and control mIgG2a displayed similar binding affinities toward SpA and SpA$_{KKAA}$ (FIG. 18a). To examine whether such interference occurs physiologically, intact bacteria with surface displayed SpA were used as the antigen. 3F6-hIgG1 displayed relatively stronger binding toward Newman spakkaa, a strain variant that produces SpA$_{KKAA}$ on the cell surface as compared to Newman wild type (WT) (FIG. 17b). In agreement with the notion that the lower affinity of 3F6-hIgG1 toward SpA was due to the association between hIgG1-Fc and IgBD, the inventors observed that SpA but not SpA$_{KKAA}$ also competed with the interaction between the humanized monoclonal antibody Tefibazumab (Tefi) and its ligand C1fA-A (Clumping factor A-A domain) (FIG. 17c). Similarly, Tefibazumab affinity for C1fA was reduced when the antibody was incubated with wild type bacteria (WT) as compared to mutant bacteria Newman spakkaa (FIG. 17d). Based on X-ray structure analysis, four hydrogen bonds promote the interaction between SpA and hIgG1-Fc: Q$^9$ (hIgG1 S$^{254}$) Q10 (hIgG1 Q$^{311}$), N11 (hIgG1 N$^{434}$) and Y14 (hIgG1 L$^{432}$) (7). Single (S$^{254}$A [3F6-hIgG1A] Q$^{311}$E [3F6-hIgG1E], L$^{432}$S [3F6-hIgG1S], or N$^{434}$P [3F6-hIgG1p]) or four amino acid (S$^{254}$A, Q$^{311}$E, L$^{432}$S, and N$^{434}$P, designated 3F6- hIgG1$^{AESP}$) substitutions were introduced into the Fc region of 3F6-hIgG1. Additionally, the H$^{435}$R substitution was also introduced in the antibody generating variant 3F6-hIgG1$^R$ (8, 9). The IgG3 Fc domain that is not a substrate for SpA contains an arginine at position 435 (8, 9). The new 3F6-hIgG1 variants exhibited similar affinities to SpA$_{KKAA}$ (FIG. 18b). Increasing concentrations of SpA$_{AA}$, a SpA protein mutant that cannot bind VH3 Fab but can still interact with the Fc region of antibodies, continue to interact with immune complexes formed between SpA$_{KKAA}$ and antibodies with single amino acid substitutions S$^{214}$A, or Q$^{311}$E, or L$^{432}$S, or N$^{434}$P. However, SpAA failed to interact with immune complexes formed between SpA$_{KKAA}$ and variants 3F6-hIgG1$^{AESP}$ and 3F6-hIgG1$^R$(FIG. 17e and FIG. 18c), suggesting that the Fc fragments of 3F6-hIgG1$^{AESP}$ and 3F6-hIgG1$^R$ may no longer be subject to inhibition by SpA. Indeed, 3F6-hIgG1-Fc$^{AESP}$ and 3F6-hIgG1-Fc$^R$ displayed similar affinities toward SpA and SpA$_{KKAA}$, whether offered as purified antigens (FIG. 17f) or displayed on the surface of bacterial cells (FIG. 17g). As a control, no binding was observed when using the Newman Δspa strain deleted for the spa gene, confirming the specificity of antibodies (FIG. 18c). Together these data indicate that SpA can no longer associate with the Fc portions of 3F6-hIgG1-Fc$^{AESP}$ and 3F6-hIgG1-Fc$^R$.

Figure 19E:
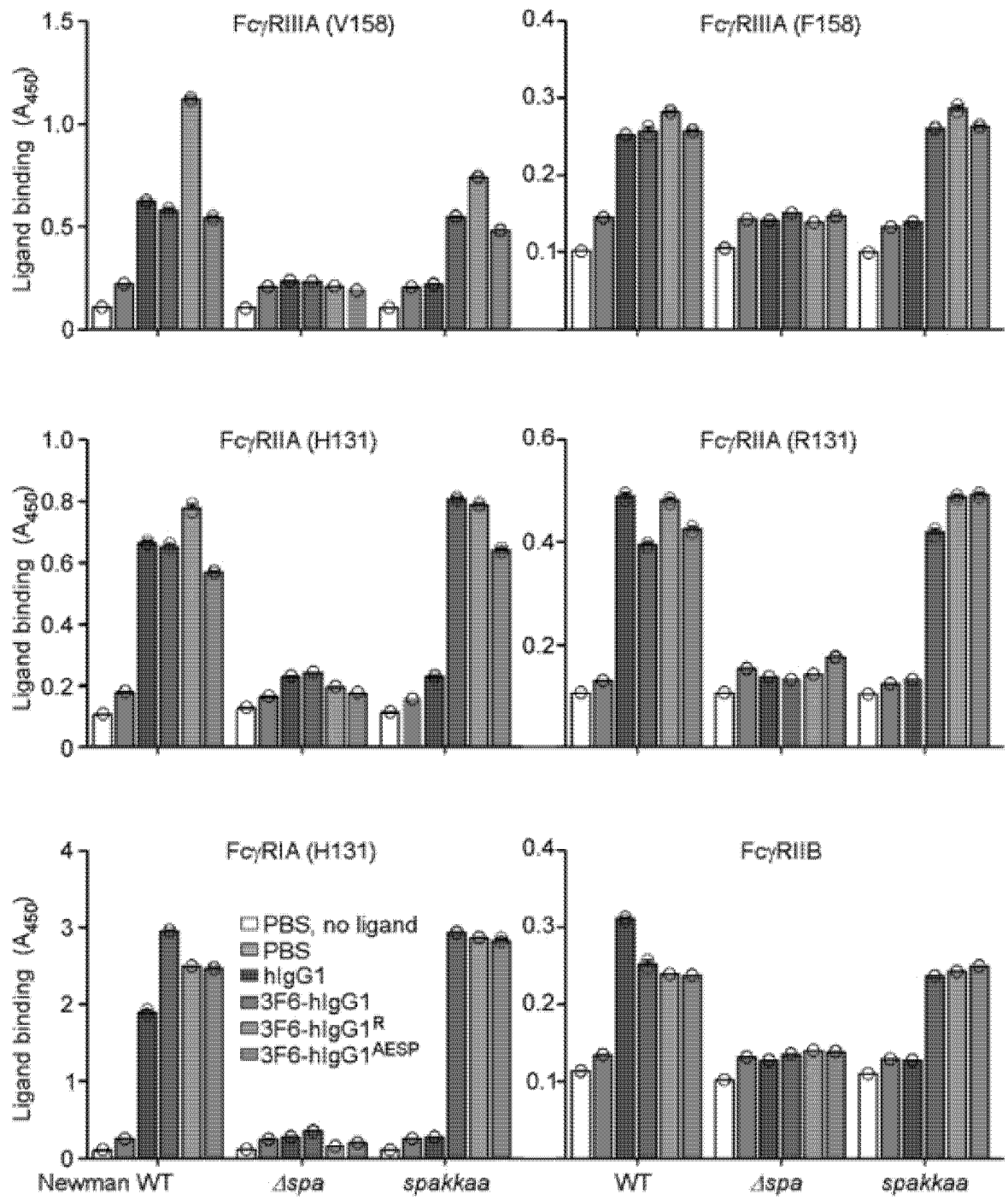

2. C1q Recruitment to 3F6-hIgG1$^{AESP}$ and 3F6-hIgG1$^R$ is No Longer Blocked by SpA Although earlier reports suggested that SpA blocks the effector functions of antibodies by preventing the engagement of complement (C1q) and Fcγ receptors on immune cells, direct evidences were missing (1). First, the inventors tested the ability of SpA to block the interaction between antibody and human c1q (hc1q). Immunocomplexes (ICs) formed between SpA and 3F6-hIgG1 showed markedly lower hc1q binding than ICs formed between SpA$_{KKAA}$ and 3F6-hIgG1 (FIG. 19a). When complexed with antigen, whether SpA or SpA$_{KKAA}$, 3F6-hIgG1$^{AESP}$ and 3F6-hIgG1$^R$ interacted with hc1q with greater affinity than 3F6-hIgG1 bound to SpA$_{KKAA}$ (FIG. 19a). Similarly, ICs of 3F6-mIgG2a and SpA displayed a weaker affinity for mouse c1q (mc1q) than ICs of 3F6-mIgG2a and SpA$_{KKAA}$ (FIG. 20a). SpA, but not SpA$_{KKAA}$, also reduced the interaction between hc1q and ICs of C1fA-A-Tefi (FIG. 19b). SpA interference was examined using whole bacteria. Increased hC1q binding was observed when using Newman WT strain and 3F6-hIgG1$^{AESP}$ or 3F6-hIgG1$^R$ as compared to hIgG1 or 3F6-hIgG1 (FIG. 19c). Differences in hc1q binding between 3F6 variants disappeared when using Newman spakkaa strain, and no binding was observed when using the Δspa strain whether purified hc1q was used or human serum (FIG. 19c). Increasing administration of Tefi gradually recruited more hc1q on the surface of Newman spakkaa but not of WT strain (FIG. 19d). Collectively, these findings indicate that SpA prevents the engagement of c1q to antibodies (such as hIgG1 and mIgG2a) to block complement activation. 3F6-hIgG1$^{AESP}$ and 3F6-hIgG1$^R$ circumvent SpA inhibitory activity on c1q recruitment.

3. Interactions with Fcγ Receptors are not Affected by Amino Acid Substitutions Introduced in the 3F6-hIgG1$^{AESP}$ and 3F6-hIgG1$^R$ Variants Next, the inventors examined whether SpA alters interactions between antibody and human FcγRs. Whole bacteria and purified receptors were used in ELISA assays. When compared to hIgG1, a non-V$_H$3 clonal antibody (FIG. 20b), all antibody variants tested in the study interacted with comparable affinity with most FcγRs (FIG. 19e), indicating that SpA did not inhibit the interaction between hIgG1-Fc and human FcγR.

4. SpA No Longer Reduces the Stability and Half-Lives of 3F6-hIgG1$^{AESP}$ and 3F6-hIgG1$^R$ Like c1q and FcγR, FcRn also interacts with the Fc region of antibodies to control their stability in vivo (10). Thus, the inventors tested whether SpA may reduce the stability of antibody by interrupting interactions between FcRn and hIgG1-Fc. First, the inventors confirmed that SpA strongly interacted with mIgG2a, mIgG2b, mIgG3, hIgG1, hIgG2, and hIgG4, and had low or no affinity for mIgG1 and hIgG3 (FIG. 21a, b). Addition of SpA inhibited the association of different mIgG with mouse FcRn (mFcRn) to various extends [mIgG3>mIgG2a>mIgG2b] (FIG. 22a). SpA inhibited interactions between hIgG1, hIgG2, hIgG4 and human FcRn (hFcRn) even more strongly than the mouse molecules (FIG. 22b). SpA$_{KKAA}$ did not affect the binding between mIgG or hIgG with mFcRn or hFcRn, respectively (FIG. 22a, b). Next, mice were inoculated with purified SpA or infected with wild type (WT) strain Newman. Animals were bled at timed intervals to measure the stability of test antibodies. Animals displayed reduced levels of mIgG2a and mIgG3 at early stage post SpA injection or Newman WT infection, as compared to mice that received SpA$_{KKAA}$ or were infected with Newman spakkaa (FIG. 22c, f). Levels of mIgG1 or mIgG2b remained unaltered (FIG. 21c-f). As expected from earlier findings (11), the elevated mIgG levels at late stage post infection with wild type bacteria were due to the SpA-dependent expansions of V$_H$3 antibody (FIG. 22e, f; FIG. 21e-j).

To address the effect of SpA on human antibody, hIgG1 and hIgG3 were injected into B cell deficient MT mice prior to intravenous challenge with the Newman wild type (WT) or spakkaa strains. hIgG1 and hIgG3 displayed similar stability in non-infected animals (PBS controls, FIG. 22g). Levels of hIgG3 in mouse sera were reduced similarly upon infection with S. aureus Newman or spakkaa, as compared to PBS. This can be explained by the secretion of the V8 protease that cleaves all human IgG (12, 13) (FIG. 22g). Levels of hIgG1 in animal sera were further reduced upon infection with S. aureus Newman but not S. aureus spakkaa, suggesting strong interference from SpA (FIG. 22g). Similarly, serum concentrations of Tefibazumab (Tefi) were greatly reduced upon injection of SpA but not of SpA$_{KKAA}$ in animals; hardly any Tefi antibody could be detected after day 11 post SpA injection (FIG. 22h) which also coincided with the expansion of polyclonal anti-Tefi antibodies (FIG. 21k). 3F6-hIgG1, 3F6-hIgG1$^{AESP}$ and 3F6-hIgG1$^R$ had comparable half-lives in animals that received PBS (FIG. 22i). Injection of SpA$_{KKAA}$ increased the turn-over of all three antibodies in animals as would be expected following the formation of ICs, but only the half-life of 3F6-hIgG1 was further reduced upon injection of SpA in animals (FIG. 22i). These results suggest that SpA greatly reduces the stability of antibodies through binding via its IgBDs unless the Fc sequence of these antibodies has been altered such as is the case for 3F6-hIgG1$^{AESP}$ and 3F6-hIgG1$^R$.

5. 3F6-hIgG1$^{AESP}$ or 3F6-hIgG1$^R$ display greater OPK activity toward S. aureus than 3F6-hIgG1

Earlier work developed a whole blood assay whereby enumeration of S. aureus after one hour incubation in freshly drawn anticoagulated blood is achieved by releasing bacteria from fibrin agglutinates upon treatment with streptokinase (14). Using this assay, 3F6-hIgG1 promotes killing of MRSA strains MW2 or USA300 in human blood as compared to hIgG1 (FIG. 23a; FIG. 24a). Addition of 3F6- hIgG1$^{AESP}$ or 3F6-hIgG1$^{H435R}$ promoted more killing than 3F6-hIgG1 (FIG. 23a; FIG. 24a). Addition of Tefi to human blood promoted killing of strain Newman spakkaa, but not of the wild type strain Newman (FIG. 23b) indicating that bacteria surface-exposed SpA binds hIgG1-Fc blocking OPK activity of anti-*S. aureus* antibodies.

6. Development of 3F6-hIgG1 Variants with Increased Stability

Figure 27:
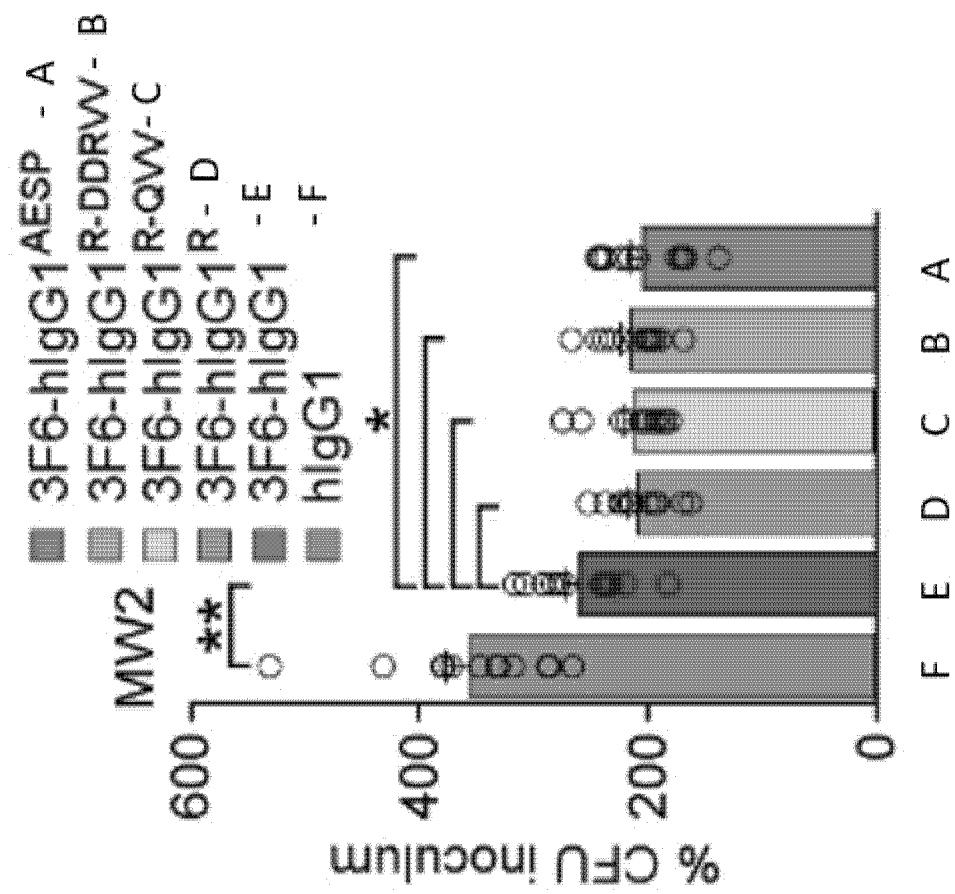
FIG. 27. 3F6-hIgG1$^{R-QVV}$ and 3F6-hIgG1$^{R-DDRVV}$ promote increased killing of MW2 as compared to 3F6-hIgG1. Antibodies 3F6-hIgG1$^R$ and 3F6-hIgG1$^{AESP}$ were included as controls.

To evaluate the stability of new antibody variants, interactions between hIgG1, 3F6-hIgG1, 3F6-hIgG1$^{AESP}$ and 3F6-hIgG1$^{H435R}$ were measured using the mouse neonatal Fc receptor (mFcRn) at pH 6.0 and 7.0. With the exception of 3F6-hIgG1$^{AESP}$, all antibodies displayed similar affinities toward mFcRn at pH 6.0 and 7.0 (FIG. 24b, c). These findings were in-agreement with the pharmacokinetic (PK) studies in mice (FIG. 22i). When the human FcRn (hFcRn) was used as the ligand, 3F6-hIgG1$^{H435R}$ and 3F6-hIgG1$^{AESP}$ showed very weak associations at pH6.0 as compared to hIgG1 and 3F6-hIgG1, and none of antibodies bound to hFcRn at pH 7.0 (FIG. 24d, e). These data suggested that Fc substitutions in 3F6-hIgG1$^{H435R}$ and 3F6-hIgG1$^{AESP}$ inactivate hFcRn binding, and could impact the half-life of antibodies in vivo precluding their usage in human. To overcome this problem, new amino acids substitutions were introduced into 3F6-hIgG1$^{AESP}$ or 3F6-hIgG1$^{R}$. Three mutation sets RV (for T$^{307}$R/A$^{378}$V), QVV (for T$^{307}$Q/Q$^{311}$V/A$^{378}$V) and DDRVV (T$^{256}$D/N$^{286}$D/T$^{307}$R/Q$^{311}$V/A$^{378}$V) were selected based on an earlier screen aimed at identifying half-life-enhancing Fc mutations (15). Introduction of the RV substitutions into 3F6-hIgG1$^{AESP}$ and 3F6-hIgG1$^{R}$ yielded the new variants designated 3F6-hIgG1$^{AESP-RV}$ and 3F6-hIgG1$^{R-RV}$ respectively. Introduction of QVV and DDRVV substitutions into 3F6-hIgG1$^{R}$, yielded variants 3F6-hIgG1$^{R-QVV}$ and 3F6-hIgG1$^{R-DDRVV}$, respectively. These substitutions were not introduced into 3F6-hIgG1$^{AESP}$, to avoid too many mutations that might enhance the immunogenicity of Fc. The new variants were produced in HEK cells and their integrity and homogeneity documented by Coomassie-stained SDS-PAGE under reducing and non-reducing conditions (FIG. 25a). All new variants exhibited a similar affinity for Newman WT and spakkaa strains as compared to 3F6-hIgG1$^{AESP}$ and 3F6-hIgG1$^{R}$ (FIG. 25b, c; FIG. 26a). Each new variant preincubated with SpA and SpA$_{KKAA}$ continued to interact with hc1q (FIG. 26b), indicating that the new Fc variants of 3F6-hIgG1 retain hc1q binding activity but cannot be recognized by SpA. When subjected to mFcRn and hFcRn affinity measurements, two of the new variants, 3F6-hIgG1$^{R-QVV}$ and 3F6-hIgG1$^{R-DDRVV}$, exhibited markedly increased affinity toward hFcRn at pH 6.0 and maintained hFcRn affinity at pH 7.0 as low as 3F6-hIgG1, 3F6-hIgG1$^{R}$, and 3F6-hIgG1$^{AESP}$ (FIG. 26c). 3F6-hIgG1$^{R-QVV}$ and 3F6-hIgG1$^{R-DDRVV}$ displayed higher affinity for mFcRn at pH 7.0 as compared to the other antibodies (FIG. 26c; FIG. 25d) suggesting that these two antibodies may have short half-lives in animals. As predicted, the concentrations of 3F6-hIgG1$^{R-QVV}$ and 3F6-hIgG1$^{R-DDRVV}$ rapidly decreased in animal sera following injection as compared to the other antibody candidates (FIG. 26d). Nonetheless, future experiments using Tg276 transgenic mice where the mFcRn α-chain has been replaced with the hFcRn α-chain will be performed to fully evaluate the stability of all human antibodies. When tested in the human whole blood killing assay, both 3F6-hIgG1$^{R-QVV}$ and 3F6-hIgG1$^{R-DDRVV}$ exhibited statistically increased opsonophagocytic activity when compared to 3F6-hIgG1 (FIG. 27). Assuming that these antibodies are stable in hFcRn α-chain transgenic animals, their activity will also be tested for protection against *S. aureus* bloodstream infection and abscess formation in soft tissues.

B. Discussion

The results presented here suggest that antibody directed against SpA can be improved by introducing amino acid substitutions in the Fc region that prevent binding by SpA and other proteins bearing IgBDs. SpA binding to the Fc region of antibodies is an evolutionary process to block the effector function of antibody. Specifically, SpA binding to Fc blocks further interactions with the key complement factor C1q. Here, the inventors find that therapeutic antibody 3F6-hIgG1 can be modified in the Fc region with either one amino acid substitution (H$^{435}$R) 3F6-hIgG1$^{R}$ or four amino acid substitutions (S$^{254}$A, Q$^{311}$E, L$^{432}$S, and N$^{434}$P, designated 3F6-hIgG1$^{AESP}$) 3F6-hIgG1$^{AESP}$. These antibody variants can now interact with C1q in a manner that is no longer blocked by SpA and hence can further enhance opsonization and bacterial killing as compared to unmodified 3F6-hIgG1.

However, the binding site of SpA on the Fc region overlaps with that of FcRn. Modifications of the antibody in the Fc region is thus accompanied by reduced binding to human FcRn at pH6. Such antibodies have a shorter half-life in humans. For example, IgG3 which is not a natural substrate for SpA carries an arginine at position 435; this arginine also affects interactions with human FcRn and IgG3 antibodies display the shortest half-life in human (8, 9). This makes IgG3 antibodies less suitable for therapeutic development. To circumvent this problem, stabilizing mutations can be introduced in antibody variants. The inventors performed such a test with variants 3F6-hIgG1$^{R}$ and 3F6-hIgG1$^{AESP}$. Based on in vitro measurements with human FcRn, the inventors report two possible candidates 3F6-hIgG1$^{R-QVV}$ and 3F6-hIgG1$^{R-DDRVV}$ as variants with increased stability and therapeutic value. Final tests to evaluate the stability of these antibodies will require the use of transgenic mice that express human FcRn.

C. Methods

1. Bacterial Strains, Mammalian Cell Lines and Growth Media.

Community-acquired methicillin-resistant *S. aureus* USA400 (MW2) and USA300 and methicillin sensitive Newman WT and Newman spakkaa variants were grown in tryptic soy broth or agar at 37° C. Suspension serum-free adapted FreeStyle™ 293-F cells (herein referred as HEK-293F cells) were cultured in FreeStyle™ 293 Expression Medium (Life Technologies) and maintained in a 5% CO$_2$ humidified incubator at 37° C.

2. Construction, Expression, and Purification of Recombinant 3F6-hIgG1 and Tefibazumab Variant Antibodies.

The clone encoding 3F6-hIgG1 was as described earlier (2, 3, 5). Briefly, plasmid encoding 3F6-hIgG1 was generated by swapping the coding sequences of the heavy and light chain genes of the mouse monoclonal antibody 3F6-mhIgG2a (2) into the expression vector pVITRO1-102.1F10-IgG1/λ (Addgene, #50366). This construct served as a template for further mutagenesis. The heavy and light chain genes of Tefibazumab (Tefi) were synthesized from published sequences (16, 17) and swapped into the pVITRO1 plasmid encoding WT 3F6-hIgG1. Primers 5' AACCGCTACACGCAGAAGAGCCTCTC 3' (SEQ ID NO:15) and 5' GTAGCGGTTGTGCAGAGCCTCATGCAT 3' (SEQ ID NO:16) were used to generate the Tefi$^{R}$ and 3F6-hIgG1$^{R}$. For other Tefi and 3F6-hIgG1 variants, partial Fc genes with corresponding mutation(s) were designed and the nucleic acid sequences synthesized by Integrated DNA Technologies, Inc. and then swapped into the vector encoding Tefi or 3F6-hIgG1 using the polymerase incomplete primer extension (PIPE) method (4). All new plasmids were transfected into HEK-293F cells using polyethylenimine. Transfectants were isolated with hygromycin B (400 µg/mL) selection and expanded in TripleFlask treated cultures. All variants were affinity purified from supernatants of expanded cultures on either protein A sepharose (Sigma) or protein G resin (GenScript), and dialyzed to PBS as described earlier (4, 5).

3. Animal Experiments.

To determine the effect of SpA on the level of mouse IgG (mIgG) in vivo, BALB/c mice (groups of 5) were injected into the peritoneal cavity with 100 µg recombinant SpA or $SpA_{KKAA}$ or into the periorbital venous plexus with $1 \times 10^7$ colony forming units (CFU) of S. aureus Newman WT (wild type) or Newman spakkaa. After 0, 4, and 6 hours, and after 1, 2, 3, 5, 8, 9, 11, and 15 days, periorbital venous blood was obtained and serum samples were analyzed by ELISA. Briefly, microtiter plates were coated overnight with 10,000× dilution of serum sample. After blocking, wells were incubated with anti-mIgG1, -mIgG2a, -mIgG2b, or mIgG3 (Novus Biologicals). Serum mIgG concentrations were calculated using a standard curve of purified mIgG1, mIgG2a, mIgG2b, and mIgG3 (Biolegend) at a range of 1-1500 ng/ml. Microtiter plates coating $SpA_{KK}$ (100 ng/well) were used to measure the $V_H3$-clonal mIgG in serum samples. To investigate the impact of SpA on the level of human IgG in vivo, MT mice (groups of 5) were injected into the peritoneal cavity with 100 µg of either purified hIgG1 or hIgG3 (Sigma). 16 h post injection, hIgG1 or hIgG3-injected mice were retro-orbitally infected with $1 \times 10^7$ cfu of S. aureus Newman WT or spakkaa mutant. After 4 hours, 3 and 11 days, serum samples were collected. Serum hIgG concentrations were calculated using a standard curve of purified hIgG1 and hIgG3 at a range of 1-50 ng/ml. To examine whether SpA decreases the half-life of Tefi in vivo, BALB/c mice (groups of 5) were injected into the peritoneal cavity with the mixture of 100 µg Tefi and 4 µg recombinant SpA (molar ratio of Tefi and SpA is approximately equal to 5:1) or of 100 µg Tefi and 4 µg of recombinant $SpA_{KKAA}$. After 4 hours, and after 1, 2, 3, 7, 11, and 15 days, serum samples were collected. Serum concentrations of Tefi were calculated using a standard curve of purified Tefi diluted in the serum at a range of 0.1-50 ng/ml. The recombinant SpA or $SpA_{KKAA}$ used above were purified from E. coli and only contained five IgBDs.

4. Staphylococcal Survival in Blood.

To measure staphylococcal survival in vitro, hIgG1 control antibody, 3F6-hIgG1$_{HEK}$, or other variants of 3F6-hIgG1$_{HEK}$ were added to 0.5 mL of freshly drawn human blood anticoagulated with 5 µg/mL desirudin. Where indicated, blood was pre-incubated for 10 minutes with cytochalasin D (CD, 0.04 mM) or 30 minutes with CVF (5 µg per milliliter of blood). At time 0, a 50 µL bacterial suspension in phosphate-buffered saline (PBS) ($5 \times 10^6$ colony-forming units, CFU) was added to the blood. After incubation at 37° C. for 0 minutes or 60 minutes, PBS containing 0.5% saponin, 100 U streptokinase (SK), 50 µg trypsin, 1 µg DNase, and 5 µg RNase (termed SK lysis buffer) were added to each sample for 10 minutes at 37° C. prior to plating on agar for CFU enumeration. Assays were performed in duplicate and repeated for reproducibility.

5. Ethics Statement.

Ethics statement. The University of Chicago's Institutional Review Board (IRB) reviewed, approved, and supervised the protocols used for all experiments utilizing blood from human volunteers and informed consent forms were obtained from all participants. Animal research was performed in accordance with institutional guidelines following experimental protocol review, approval, and supervision by the Institutional Animal Care and Use Committee at The University of Chicago. Experiments with S. aureus were performed in biosafety level 2 (BSL2)/animal BSL2 (ABSL2) containment upon review by The University of Chicago Institutional Biosafety Committee.

6. Statistical Analyses.

Staphylococcal survival in blood and the statistical significance of ELISA data were analyzed with the two-tailed Student's t-test. All statistical analyses were performed using GraphPad Prism, version 5.0 (GraphPad Software, Inc., La Jolla USA). Statistical significance was indicated as follows: ns, not significant; *, $P<0.05$; **, $P<0.01$.

D. REFERENCES FOR EXAMPLE 3

The following references, to the extent that they provide exemplary procedural or other details supplementary to those set forth herein, are specifically incorporated herein by reference.

1. Thammavongsa V, Kim H K, Missiakas D M, Schneewind O. 2015. Staphylococcal manipulation of host immune responses. Nat Rev Microbiol 13:529-543.
2. Kim H K, Emolo C, DeDent A C, Falugi F, Missiakas D M, Schneewind O. 2012. Protein A-specific monoclonal antibodies and the prevention of Staphylococcus aureus disease in mice. Infect Immun 80:3460-3470.
3. Thammavongsa V, Rauch S, Kim H K, Missiakas D M, Schneewind O. 2015. Protein A-neutralizing monoclonal antibody protects neonatal mice against Staphylococcus aureus. Vaccine 33:523-526.
4. Chen X, Sun Y, Missiakas D, Schneewind O. 2019. Staphylococcus aureus Decolonization of Mice With Monoclonal Antibody Neutralizing Protein A. J Infect Dis 219:884-888.
5. Chen X, Shi M, Tong X, Kim H K, Wang L X, Schneewind O, Missiakas D. 2020. Glycosylation-dependent opsonophagocytic activity of staphylococcal protein A antibodies. Proc Natl Acad Sci USA doi:10.1073/pnas.2003621117.
6. Patti J M. 2004. A humanized monoclonal antibody targeting Staphylococcus aureus. Vaccine 22 Suppl 1:S39-43.
7. Deisenhofer J. 1981. Crystallographic refinement and atomic models of a human Fc fragment and its complex with fragment B of protein A from Staphylococcus aureus at 2.9- and 2.8-A resolution. Biochemistry 20:2361-2370.
8. Hadji-Ghasemi F, Gharagozlou S, Ghods R, Roohi A, Khoshnoodi J, Shokri F. 2003. Generation and characterization of a mouse monoclonal antibody with specificity similar to staphylococcal protein A (SPA). Hybrid Hybridomics 22:33-9.
9. Damelang T, Rogerson S J, Kent S J, Chung A W. 2019. Role of IgG3 in Infectious Diseases. Trends Immunol 40:197-211.
10. Zalevsky J, Chamberlain A K, Horton H M, Karki S, Leung I W, Sproule T J, Lazar G A, Roopenian D C, Desjarlais J R. 2010. Enhanced antibody half-life improves in vivo activity. Nat Biotechnol 28:157-9.
11. Kim H K, Falugi F, Missiakas D, Schneewind O. 2016. Peptidoglycan-linked protein A promotes T-cell dependent antibody expansion during Staphylococcus aureus infection. Proc Natl Acad Sci USA 113:5718-5723.

12. Prokesova L, Potuznikova B, Potempa J, Zikan J, Radl J, Hachova L, Baran K, Porwit-Bobr Z, John C. 1992. Cleavage of human immunoglobulins by serine proteinase from *Staphylococcus aureus*. Immunol Lett 31:259-65.
13. Pietrocola G, Nobile G, Rindi S, Speziale P. 2017. *Staphylococcus aureus* Manipulates Innate Immunity through Own and Host-Expressed Proteases. Front Cell Infect Microbiol 7:166.
14. Thomer L, Schneewind O, Missiakas D. 2016. Pathogenesis of *Staphylococcus aureus* Bloodstream Infections. Annu Rev Pathol 11:343-64.
15. Booth B J, Ramakrishnan B, Narayan K, Wollacott A M, Babcock G J, Shriver Z, Viswanathan K. 2018. Extending human IgG half-life using structure-guided design. MAbs 10:1098-1110.
16. Weems J J, Steinberg J P, Filler S, Baddley J W, Corey G R, Sampathkumar P, Winston L, John J F, Kubin C J, Talwani R. 2006. Phase II, randomized, double-blind, multicenter study comparing the safety and pharmacokinetics of tefibazumab to placebo for treatment of *Staphylococcus aureus* bacteremia. Antimicrobial agents and chemotherapy 50:2751-2755.
17. Ganesh V K, Liang X, Geoghegan J A, Cohen A L V, Venugopalan N, Foster T J, Hook M. 2016. Lessons from the crystal structure of the *S. aureus* surface protein clumping factor A in complex with tefibazumab, an inhibiting monoclonal antibody. EBioMedicine 13:328-338.

---

The invention claimed is:

1. An engineered antibody comprising a light chain comprising a LCDR1, LCDR2, and LCDR3 with at least 95% sequence identity to SEQ ID NOS: 5, 6, and 7, respectively, a heavy chain variable region comprising a HCDR1, HCDR2, and HCDR3 with at least 95% sequence identity to SEQ ID NOS: 2, 3, and 4, respectively, and a constant region with at least 95% sequence identity to SEQ ID NO:8 and having:

a glutamine at position 87;

a valine at position 91;

a valine at position 158; and an arginine at position 215 of SEQ ID NO:8, and wherein the constant region comprises a glycosylation-modified amino acid at position 77 of SEQ ID NO:8.

2. The antibody of claim 1, wherein the antibody is humanized.

3. The antibody of claim 1, wherein the HCDR1, HCDR2, and HCDR3 comprises the amino acid sequence of SEQ ID NOS: 2, 3, and 4, respectively and wherein the LCDR1, LCDR2, and LCDR3 comprises an amino acid sequence of SEQ ID NOS: 5, 6, and 7, respectively.

4. The antibody of claim 1, wherein the antibody comprises fragment crystallizable region gamma (Fcγ).

5. The antibody of claim 1, wherein the glycosylation-modified amino acid comprises a galactosylated amino acid.

6. The antibody of claim 1, wherein the antibody is galactosylated at position 77 of SEQ ID NO:8.

7. The antibody of claim 1, wherein the antibody is afucosylated.

8. The antibody of claim 1, wherein the antibody is afucosylated at position 77 of SEQ ID NO: 8.

9. The antibody of claim 1, wherein the antibody is de-sialylated at position 77 of SEQ ID NO: 8.

10. The antibody of claim 1, wherein the glycosylation-modified amino acid at position 77 of SEQ ID NO:8 is further defined as having a modification structure of G2S2F, G2F, G1F, G2 or G1.

11. An engineered antibody comprising a light chain comprising a LCDR1, LCDR2, and LCDR3 with at least 95% sequence identity to SEQ ID NOS: 5, 6, and 7, respectively, a heavy chain variable region comprising a HCDR1, HCDR2, and HCDR3 with at least 95% sequence identity to SEQ ID NOS: 2, 3, and 4, respectively, and a constant region with at least 95% sequence identity to SEQ ID NO:8 and having an arginine at position 215 of SEQ ID NO:8, and wherein the constant region comprises a glycosylation-modified amino acid at position 77 of SEQ ID NO:8.

12. The antibody of claim 11, wherein the antibody is humanized.

13. The antibody of claim 11, wherein the HCDR1, HCDR2, and HCDR3 comprises the amino acid sequence of SEQ ID NOS: 2, 3, and 4, respectively and wherein the LCDR1, LCDR2, and LCDR3 comprises an amino acid sequence of SEQ ID NOS: 5, 6, and 7, respectively.

14. The antibody of claim 11, wherein the glycosylation-modified amino acid at position 77 of SEQ ID NO:8 is further defined as having a modification structure of G2S2F, G2F, GIF, G2 or G1.

15. The antibody of claim 11, wherein the constant region further comprises:
an aspartic acid at position 36;
an aspartic acid at position 66;
an arginine at position 87;
a valine at position 91; and
a valine at position 158 of SEQ ID NO:8.

16. An engineered antibody comprising a light chain comprising a LCDR1, LCDR2, and LCDR3 with at least 95% sequence identity to SEQ ID NOS: 5, 6, and 7, respectively, a heavy chain variable region comprising a HCDR1, HCDR2, and HCDR3 with at least 95% sequence identity to SEQ ID NOS: 2, 3, and 4, respectively, and a constant region with at least 95% sequence identity to SEQ ID NO:8 and having:
an alanine at position 34;
a glutamic acid at position 91;
a serine at position 212; and
a proline at position 214 of SEQ ID NO:8, and wherein the constant region comprises a glycosylation-modified amino acid at position 77 of SEQ ID NO:8.

17. The antibody of claim 16, wherein the antibody is humanized.

18. The antibody of claim 16, wherein the HCDR1, HCDR2, and HCDR3 comprises the amino acid sequence of SEQ ID NOS: 2, 3, and 4, respectively and wherein the LCDR1, LCDR2, and LCDR3 comprises an amino acid sequence of SEQ ID NOS: 5, 6, and 7, respectively.

19. The antibody of claim 16, wherein the glycosylation-modified amino acid at position 77 of SEQ ID NO:8 is further defined as having a modification structure of G2S2F, G2F, GIF, G2 or G1.

* * * * *

SEQUENCE LISTING

```
<160> NUMBER OF SEQ ID NOS: 22

<210> SEQ ID NO 1
<211> LENGTH: 399
<212> TYPE: PRT
<213> ORGANISM: Homo sapiens

<400> SEQUENCE: 1

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Lys Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Asp Glu
225                 230                 235                 240

Leu Thr Lys Asn Gln Val Ser Leu Thr Cys Leu Val Lys Gly Phe Tyr
                245                 250                 255
```

Pro Ser Asp Ile Ala Val Glu Trp Glu Ser Asn Gly Gln Pro Glu Asn
                260                 265                 270

Asn Tyr Lys Thr Thr Pro Pro Val Leu Asp Ser Asp Gly Ser Phe Phe
            275                 280                 285

Leu Tyr Ser Lys Leu Thr Val Asp Lys Ser Arg Trp Gln Gln Gly Asn
        290                 295                 300

Val Phe Ser Cys Ser Val Met His Glu Ala Leu His Asn His Tyr Thr
305                 310                 315                 320

Gln Lys Ser Leu Ser Leu Ser Pro Glu Leu Gln Leu Glu Glu Ser Cys
                325                 330                 335

Ala Glu Ala Gln Asp Gly Glu Leu Asp Gly Leu Trp Thr Thr Ile Thr
            340                 345                 350

Ile Phe Ile Thr Leu Phe Leu Leu Ser Val Cys Tyr Ser Ala Thr Val
        355                 360                 365

Thr Phe Phe Lys Val Lys Trp Ile Phe Ser Ser Val Val Asp Leu Lys
370                 375                 380

Gln Thr Ile Ile Pro Asp Tyr Arg Asn Met Ile Gly Gln Gly Ala
385                 390                 395

<210> SEQ ID NO 2
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 2

Gly Phe Thr Phe Asn Thr Asn Ala
1               5

<210> SEQ ID NO 3
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 3

Ile Arg Ser Lys Ser Asn Asn Tyr Ala Thr
1               5                   10

<210> SEQ ID NO 4
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 4

Val Thr Glu His Tyr Asp Tyr Asp Tyr Tyr Val Met Asp Tyr
1               5                   10

<210> SEQ ID NO 5
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 5

Glu Ser Val Glu Tyr Ser Gly Ala Ser Leu
1               5                   10

<210> SEQ ID NO 6
<211> LENGTH: 3
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 6

Ala Ala Ser
1

<210> SEQ ID NO 7
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Gln Gln Ser Arg Lys Val Pro Ser Thr
1               5

<210> SEQ ID NO 8
<211> LENGTH: 227
<212> TYPE: PRT
<213> ORGANISM: Homo sapiens

<400> SEQUENCE: 8

Asp Lys Thr His Thr Cys Pro Pro Cys Pro Ala Pro Glu Leu Leu Gly
1               5                   10                  15

Gly Pro Ser Val Phe Leu Phe Pro Pro Lys Pro Lys Asp Thr Leu Met
                20                  25                  30

Ile Ser Arg Thr Pro Glu Val Thr Cys Val Val Val Asp Val Ser His
            35                  40                  45

Glu Asp Pro Glu Val Lys Phe Asn Trp Tyr Val Asp Gly Val Glu Val
        50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Ser Arg Asp Glu Leu Thr Lys Asn Gln Val Ser
    130                 135                 140

Leu Thr Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

-continued

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
        210                 215                 220

Pro Gly Lys
225

<210> SEQ ID NO 9
<211> LENGTH: 472
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 9

Met Asp Leu Arg Leu Thr Tyr Val Phe Ile Val Ala Ile Leu Lys Gly
1               5                   10                  15

Val Leu Cys Glu Val Gln Leu Val Glu Ser Gly Gly Gly Leu Val Gln
            20                  25                  30

Pro Gly Gly Ser Leu Arg Leu Ser Cys Ala Ala Ser Gly Phe Thr Phe
        35                  40                  45

Asn Thr Asn Ala Met Asn Trp Val Arg Gln Ala Pro Gly Lys Gly Leu
    50                  55                  60

Glu Trp Val Ala Arg Ile Arg Ser Lys Ser Asn Asn Tyr Ala Thr Tyr
65                  70                  75                  80

Tyr Ala Asp Ser Val Lys Gly Arg Phe Thr Ile Ser Arg Asp Asp Ser
                85                  90                  95

Lys Asn Thr Leu Tyr Leu Gln Met Asn Ser Leu Lys Thr Glu Asp Thr
            100                 105                 110

Ala Ile Tyr Tyr Cys Val Thr Glu His Tyr Asp Tyr Asp Tyr Tyr Val
        115                 120                 125

Met Asp Tyr Trp Gly Gln Gly Thr Leu Val Thr Val Ser Ser Ala Ser
    130                 135                 140

Thr Lys Gly Pro Ser Val Phe Pro Leu Ala Pro Ser Ser Lys Ser Thr
145                 150                 155                 160

Ser Gly Gly Thr Ala Ala Leu Gly Cys Leu Val Lys Asp Tyr Phe Pro
                165                 170                 175

Glu Pro Val Thr Val Ser Trp Asn Ser Gly Ala Leu Thr Ser Gly Val
            180                 185                 190

His Thr Phe Pro Ala Val Leu Gln Ser Ser Gly Leu Tyr Ser Leu Ser
        195                 200                 205

Ser Val Val Thr Val Pro Ser Ser Ser Leu Gly Thr Gln Thr Tyr Ile
    210                 215                 220

Cys Asn Val Asn His Lys Pro Ser Asn Thr Lys Val Asp Lys Lys Val
225                 230                 235                 240

Glu Pro Lys Ser Cys Asp Lys Thr His Thr Cys Pro Pro Cys Pro Ala
                245                 250                 255

Pro Glu Leu Leu Gly Gly Pro Ser Val Phe Leu Phe Pro Pro Lys Pro
            260                 265                 270

Lys Asp Thr Leu Met Ile Ser Arg Thr Pro Glu Val Thr Cys Val Val
        275                 280                 285

Val Asp Val Ser His Glu Asp Pro Glu Val Lys Phe Asn Trp Tyr Val
    290                 295                 300

-continued

```
Asp Gly Val Glu Val His Asn Ala Lys Thr Lys Pro Arg Glu Glu Gln
305                 310                 315                 320

Tyr Asn Ser Thr Tyr Arg Val Val Ser Val Leu Thr Val Leu His Gln
            325                 330                 335

Asp Trp Leu Asn Gly Lys Glu Tyr Lys Cys Lys Val Ser Asn Lys Ala
        340                 345                 350

Leu Pro Ala Pro Ile Glu Lys Thr Ile Ser Lys Ala Lys Gly Gln Pro
    355                 360                 365

Arg Glu Pro Gln Val Tyr Thr Leu Pro Pro Ser Arg Asp Glu Leu Thr
370                 375                 380

Lys Asn Gln Val Ser Leu Thr Cys Leu Val Lys Gly Phe Tyr Pro Ser
385                 390                 395                 400

Asp Ile Ala Val Glu Trp Glu Ser Asn Gly Gln Pro Glu Asn Asn Tyr
            405                 410                 415

Lys Thr Thr Pro Pro Val Leu Asp Ser Asp Gly Ser Phe Phe Leu Tyr
        420                 425                 430

Ser Lys Leu Thr Val Asp Lys Ser Arg Trp Gln Gln Gly Asn Val Phe
    435                 440                 445

Ser Cys Ser Val Met His Glu Ala Leu His Asn His Tyr Thr Gln Lys
450                 455                 460

Ser Leu Ser Leu Ser Pro Gly Lys
465                 470

<210> SEQ ID NO 10
<211> LENGTH: 266
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 10

Met Ala Trp Met Met Leu Leu Leu Gly Leu Leu Ala Tyr Gly Ser Gly
1               5                   10                  15

Val Asp Ser Gln Ser Ala Leu Thr Gln Pro Pro Ser Met Glu Thr Asp
            20                  25                  30

Thr Leu Leu Leu Trp Val Leu Leu Leu Trp Val Pro Gly Ser Thr Gly
        35                  40                  45

Asp Ile Val Leu Thr Gln Ser Pro Asp Ser Leu Ala Val Ser Leu Gly
    50                  55                  60

Glu Arg Ala Thr Ile Asn Cys Arg Ala Ser Glu Ser Val Glu Tyr Ser
65                  70                  75                  80

Gly Ala Ser Leu Met Gln Trp Tyr Gln His Lys Pro Gly Gln Pro Pro
            85                  90                  95

Lys Leu Leu Ile Tyr Ala Ala Ser Asn Arg Glu Ser Gly Val Pro Asp
            100                 105                 110

Arg Phe Ser Gly Ser Gly Ser Gly Thr Asp Phe Thr Leu Thr Ile Ser
        115                 120                 125

Pro Val Gln Ala Glu Asp Val Ala Met Tyr Phe Cys Gln Gln Ser Arg
    130                 135                 140

Lys Val Pro Ser Thr Phe Gly Gly Gly Thr Lys Leu Glu Ile Lys Arg
145                 150                 155                 160

Thr Val Ala Ala Pro Ser Val Phe Ile Phe Pro Pro Ser Asp Glu Gln
            165                 170                 175
```

-continued

```
Leu Lys Ser Gly Thr Ala Ser Val Val Cys Leu Leu Asn Asn Phe Tyr
        180                 185                 190

Pro Arg Glu Ala Lys Val Gln Trp Lys Val Asp Asn Ala Leu Gln Ser
            195                 200                 205

Gly Asn Ser Gln Glu Ser Val Thr Glu Gln Asp Ser Lys Asp Ser Thr
        210                 215                 220

Tyr Ser Leu Ser Ser Thr Leu Thr Leu Ser Lys Ala Asp Tyr Glu Lys
225                 230                 235                 240

His Lys Val Tyr Ala Cys Glu Val Thr His Gln Gly Leu Ser Ser Pro
                245                 250                 255

Val Thr Lys Ser Phe Asn Arg Gly Glu Cys
            260                 265

<210> SEQ ID NO 11
<211> LENGTH: 30
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 11
tgaagccgcc gggggaccgt cagtcttcct                                    30

<210> SEQ ID NO 12
<211> LENGTH: 29
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 12
cccggcggct tcaggtgctg ggcacggtg                                     29

<210> SEQ ID NO 13
<211> LENGTH: 27
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 13
tgcgccgtct ccaacaaagc cctccca                                       27

<210> SEQ ID NO 14
<211> LENGTH: 26
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 14
gacggcgcac ttgtactcct tgccat                                        26

<210> SEQ ID NO 15
<211> LENGTH: 26
<212> TYPE: DNA
<213> ORGANISM: Artificial Sequence
<220> FEATURE:
<223> OTHER INFORMATION: Description of Artificial Sequence: Synthetic
      primer
```

<400> SEQUENCE: 15
aaccgctaca cgcagaagag cctctc                                          26

<210> SEQ ID NO 16
<211> LENGTH: 27
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 16
gtagcggttg tgcagagcct catgcat                                         27

<210> SEQ ID NO 17
<211> LENGTH: 5
<212> TYPE: PRT
<213> ORGANISM: Unknown
<220> FEATURE:
<223> OTHER INFORMATION: Description of Unknown:
      Sortase recognition motif sequence
<220> FEATURE:
<221> NAME/KEY: MOD_RES
<222> LOCATION: (3)..(3)
<223> OTHER INFORMATION: Any amino acid

<400> SEQUENCE: 17

Leu Pro Xaa Thr Gly
1               5

<210> SEQ ID NO 18
<211> LENGTH: 5
<212> TYPE: PRT
<213> ORGANISM: Unknown
<220> FEATURE:
<223> OTHER INFORMATION: Description of Unknown:
      Sortase recognition motif sequence

<400> SEQUENCE: 18

Leu Pro Glu Thr Gly
1               5

<210> SEQ ID NO 19
<211> LENGTH: 61
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 19

Ala Asp Ala Gln Gln Asn Gln His Asp Glu Ala Gln Gln Asn Ala Phe
1               5                   10                  15

Tyr Gln Val Leu Asn Met Pro Asn Leu Asn Ala Asp Gln Arg Asn Gly
            20                  25                  30

Phe Ile Gln Ser Leu Lys Asp Asp Pro Ser Gln Ser Ala Asn Val Leu
        35                  40                  45

Gly Glu Ala Gln Lys Leu Asn Asp Ser Gln Ala Pro Lys
    50                  55                  60

<210> SEQ ID NO 20
<211> LENGTH: 61
<212> TYPE: PRT
<213> ORGANISM: Artificial Sequence
<220> FEATURE:

```
<223> OTHER INFORMATION: Description of Artificial Sequence: Synthetic
      polypeptide

<400> SEQUENCE: 20

Ala Asp Ala Gln Gln Asn Gln His Asp Glu Ala Lys Lys Asn Ala Phe
1               5                   10                  15

Tyr Gln Val Leu Asn Met Pro Asn Leu Asn Ala Asp Gln Arg Asn Gly
            20                  25                  30

Phe Ile Gln Ser Leu Lys Asp Asp Pro Ser Gln Ser Ala Asn Val Leu
            35                  40                  45

Gly Glu Ala Gln Lys Leu Asn Asp Ser Gln Ala Pro Lys
        50                  55                  60

<210> SEQ ID NO 21
<211> LENGTH: 61
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 21

Ala Asp Ala Gln Gln Asn Gln His Asp Glu Ala Gln Gln Asn Ala Phe
1               5                   10                  15

Tyr Gln Val Leu Asn Met Pro Asn Leu Asn Ala Asp Gln Arg Asn Gly
            20                  25                  30

Phe Ile Gln Ser Leu Lys Ala Ala Pro Ser Gln Ser Ala Asn Val Leu
            35                  40                  45

Gly Glu Ala Gln Lys Leu Asn Asp Ser Gln Ala Pro Lys
        50                  55                  60

<210> SEQ ID NO 22
<211> LENGTH: 61
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 22

Ala Asp Ala Gln Gln Asn Gln His Asp Glu Ala Lys Lys Asn Ala Phe
1               5                   10                  15

Tyr Gln Val Leu Asn Met Pro Asn Leu Asn Ala Asp Gln Arg Asn Gly
            20                  25                  30

Phe Ile Gln Ser Leu Lys Ala Ala Pro Ser Gln Ser Ala Asn Val Leu
            35                  40                  45

Gly Glu Ala Gln Lys Leu Asn Asp Ser Gln Ala Pro Lys
        50                  55                  60
```